(12) United States Patent
Boucheron

(10) Patent No.: US 8,488,863 B2
(45) Date of Patent: Jul. 16, 2013

(54) COMBINATIONAL PIXEL-BY-PIXEL AND OBJECT-LEVEL CLASSIFYING, SEGMENTING, AND AGGLOMERATING IN PERFORMING QUANTITATIVE IMAGE ANALYSIS THAT DISTINGUISHES BETWEEN HEALTHY NON-CANCEROUS AND CANCEROUS CELL NUCLEI AND DELINEATES NUCLEAR, CYTOPLASM, AND STROMAL MATERIAL OBJECTS FROM STAINED BIOLOGICAL TISSUE MATERIALS

(75) Inventor: Laura E. Boucheron, Las Cruces, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1130 days.

(21) Appl. No.: 12/266,450

(22) Filed: Nov. 6, 2008

(65) Prior Publication Data

US 2010/0111396 A1    May 6, 2010

(51) Int. Cl.
*G06K 9/469*   (2006.01)
*G06T 7/12*    (2006.01)

(52) U.S. Cl.
USPC .......................................... 382/133; 382/131

(58) Field of Classification Search
USPC ... 324/300–322; 600/407–435; 382/128–132, 382/133
See application file for complete search history.

(56) References Cited

U.S. PATENT DOCUMENTS

| | | | | |
|---|---|---|---|---|
| 5,016,283 A | * | 5/1991 | Bacus et al. | 382/129 |
| 5,281,517 A | * | 1/1994 | Bacus et al. | 435/6.12 |
| 5,541,064 A | * | 7/1996 | Bacus et al. | 435/6.12 |
| 6,026,174 A | * | 2/2000 | Palcic et al. | 382/133 |
| 6,430,430 B1 | * | 8/2002 | Gosche | 600/410 |
| 7,801,361 B2 | * | 9/2010 | Binnig et al. | 382/227 |
| 7,904,187 B2 | * | 3/2011 | Hoffberg et al. | 700/83 |
| 8,019,134 B2 | * | 9/2011 | Athelogou et al. | 382/128 |
| 8,116,982 B2 | * | 2/2012 | Hunter et al. | 702/19 |
| 8,163,896 B1 | * | 4/2012 | Bentwich | 536/24.5 |
| 8,165,916 B2 | * | 4/2012 | Hoffberg et al. | 705/14.53 |
| 8,189,884 B2 | * | 5/2012 | Can et al. | 382/128 |
| 8,207,316 B1 | * | 6/2012 | Bentwich | 536/23.1 |
| 2004/0023415 A1 | * | 2/2004 | Sokolov et al. | 436/518 |
| 2006/0155398 A1 | * | 7/2006 | Hoffberg et al. | 700/86 |

(Continued)

OTHER PUBLICATIONS

K. Rodenacker and E. Bengtsson "A feature set for cytometry on digitized microscopic images" Analytical Cellular Pathology, vol. 25, pp. 1-36, 2003.

(Continued)

*Primary Examiner* — Melissa Koval
*Assistant Examiner* — Tiffany Fetzner
(74) *Attorney, Agent, or Firm* — John P. O'Banion

(57) ABSTRACT

Quantitative object and spatial arrangement-level analysis of tissue are detailed using expert (pathologist) input to guide the classification process. A two-step method is disclosed for imaging tissue, by classifying one or more biological materials, e.g. nuclei, cytoplasm, and stroma, in the tissue into one or more identified classes on a pixel-by-pixel basis, and segmenting the identified classes to agglomerate one or more sets of identified pixels into segmented regions. Typically, the one or more biological materials comprises nuclear material, cytoplasm material, and stromal material. The method further allows a user to markup the image subsequent to the classification to re-classify said materials. The markup is performed via a graphic user interface to edit designated regions in the image.

34 Claims, 74 Drawing Sheets

U.S. PATENT DOCUMENTS

| | | | |
|---|---|---|---|
| 2006/0188140 A1* | 8/2006 | Gholap et al. | 382/133 |
| 2007/0016373 A1* | 1/2007 | Hunter et al. | 702/19 |
| 2007/0053513 A1* | 3/2007 | Hoffberg | 380/201 |
| 2008/0008349 A1* | 1/2008 | Binnig et al. | 382/100 |
| 2008/0137937 A1* | 6/2008 | Athelogou et al. | 382/133 |
| 2009/0068108 A1* | 3/2009 | Sokolov et al. | 436/518 |
| 2009/0245598 A1* | 10/2009 | Can et al. | 382/128 |
| 2010/0111396 A1* | 5/2010 | Boucheron | 382/133 |
| 2010/0184093 A1* | 7/2010 | Donovan et al. | 435/7.21 |
| 2011/0156896 A1* | 6/2011 | Hoffberg et al. | 340/506 |
| 2011/0167110 A1* | 7/2011 | Hoffberg et al. | 709/203 |
| 2011/0236903 A1* | 9/2011 | McClelland et al. | 435/6.14 |

OTHER PUBLICATIONS

A. Doukine et al. "Nuclear texture measurements in image cytometry" Pathologica, vol. 87, pp. 286-299, 1995.

A. Hoover et al. "An Experimental Comparison of Range Image Segmentation Algorithms" IEEE Transactions on Pattern Analysis and Machine Intelligence, vol. 18, No. 7, pp. 673-689, Jul. 1996.

A. Tabesh et al. "Multi-Feature Prostate Cancer Diagnosis and Gleason Grading of Histological Images" IEEE Transactions on Medical Imaging, vol. 26, pp. 1366-1378, 2006.

T.R. Jones et al. "CellProfiler Analyst: data exploration and analysis software for complex image-based screens" BMC Bioinformatics, 2008, 9:482.

K. Masood et al. "Co-occurence and morphological analysis for colon tissue biopsy classification" Prov. 4th International Workshop on Frontiers of Information Technology (FIT '06), 2006.

A.E. Carpenter et al. "CellProfiler: image analysis software for identifying and quantifying cell phenotypes" Genome Biology, 2006.

"Definiens Cellenger Architecture: A Technical Review", Apr. 2004, http://www.palm-microlaser.com/dasat/images/3/100263-info-cellenger-0804.pdf.

R. Kamalov et al. "A Java application for tissue section image analysis", Computer Methods and Programs in Biomedicine, vol. 77, pp. 99-113, 2005.

"Definiens Enterprise Image Intelligence Suite, Technical document" http//www.definiens.com/binary_secure/826_definiens_enterprise_image_intelligence_suite.pdf-826.html.

"Definiens Developer 7" http://www.pcigeomatics.com/products/pdfs/definiens/referencebook.pdf.

"Cell Profiler Manual" http://cellprofiler.org/linked_files/CellProfilerManual_5811Bugfix.pdf.

* cited by examiner

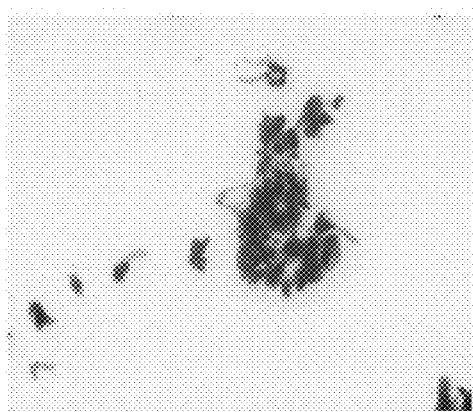
(a) Cytopathology, colon.
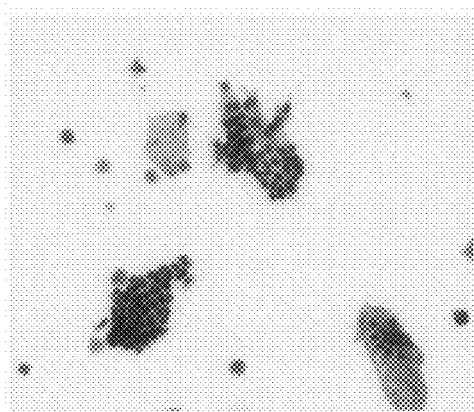
(b) Cytopathology, breast.
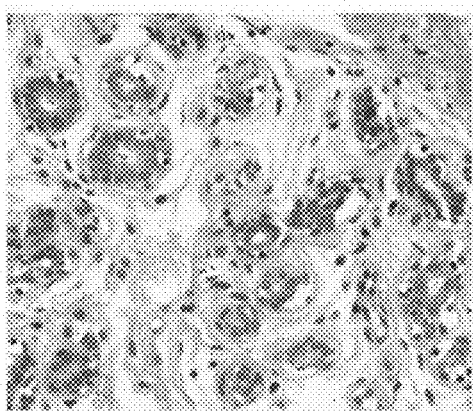
(c) Histopathology, breast.
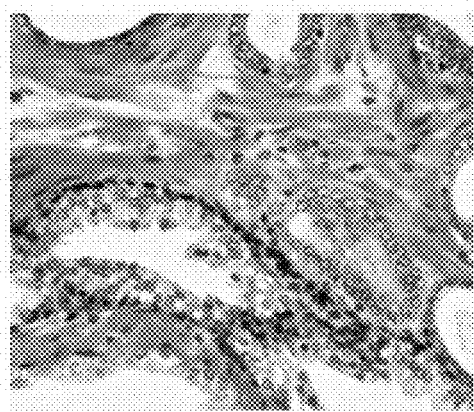
(d) Histopathology, prostate.
FIG. 1

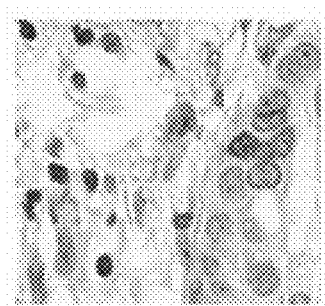
(a) Bands chosen to represent spectral peaks of human cones (580, 540, and 450 nm) [70].
(b) Bands chosen arbitrarily (660, 630, and 560 nm).
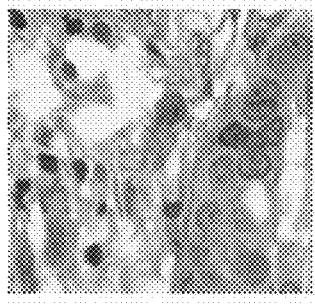
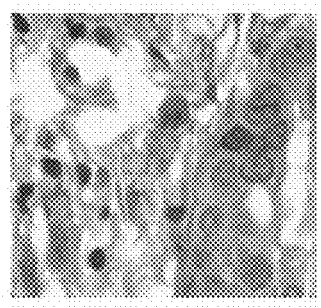
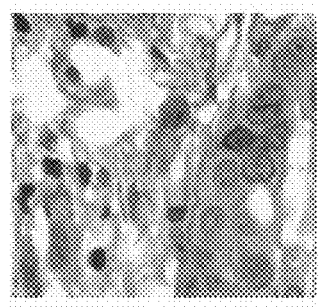
(c) Bands allocated equally and averaged, "rgbequal."
(d) Bands allocated with MatlabCentral function *spectrum-RGB*, "truecolor."
(e) Bands allocated to approximate spectral responses of common 3-CCD color cameras, "ccd."
FIG. 5

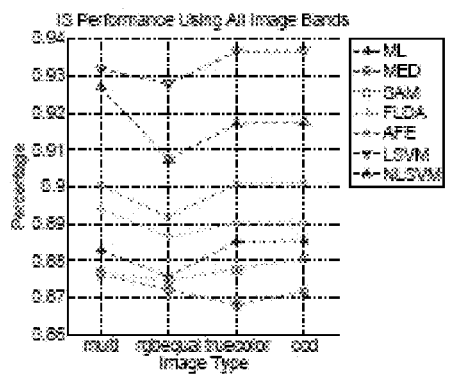
(a) IS performance score.
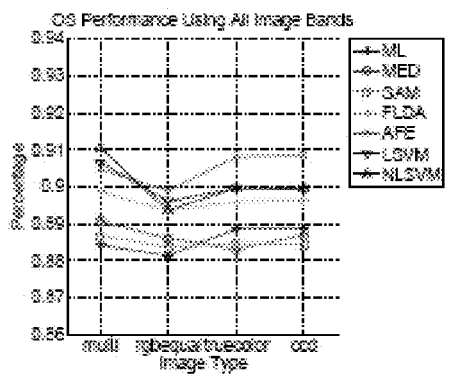
(b) OS performance score.
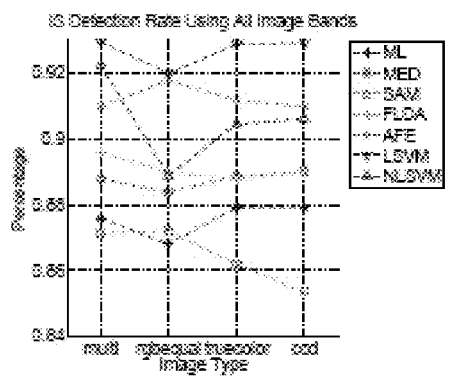
(c) IS detection rate.
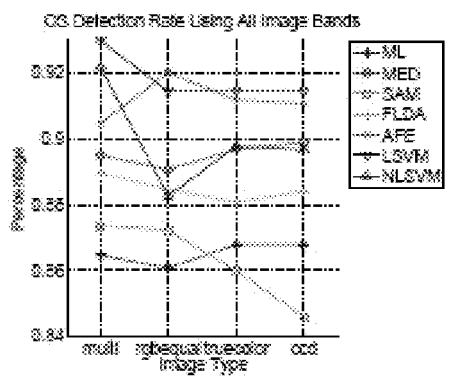
(d) OS detection rate.
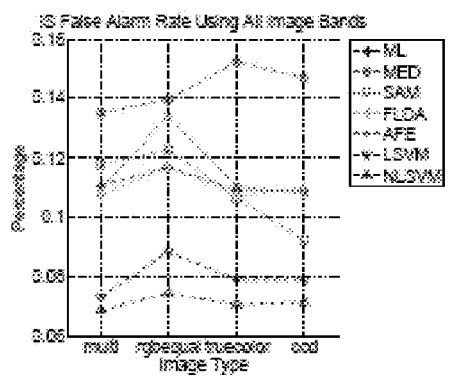
(e) IS false alarm rate.
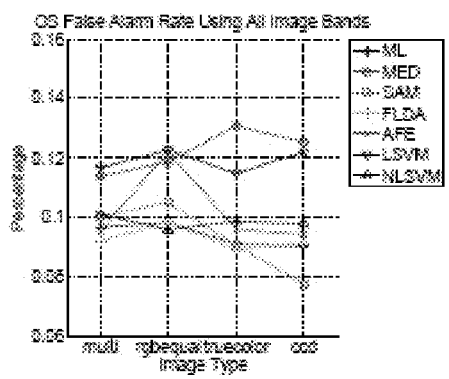
(f) OS false alarm rate.
FIG. 7

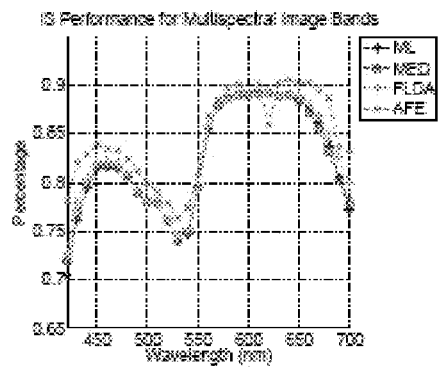 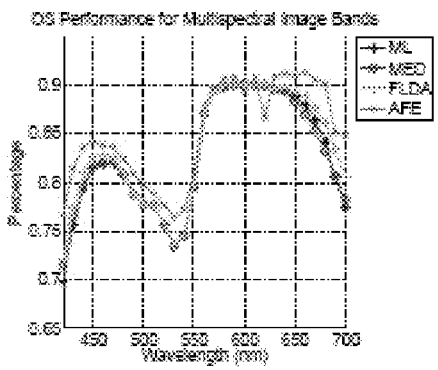
(a) IS performance scores.   (b) OS performance scores.
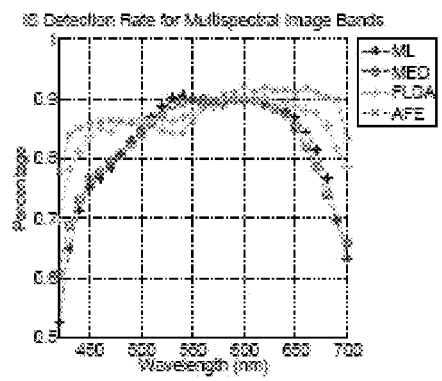 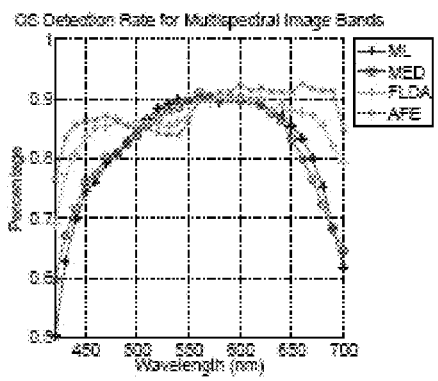
(c) IS detection rates.   (d) OS detection rates.
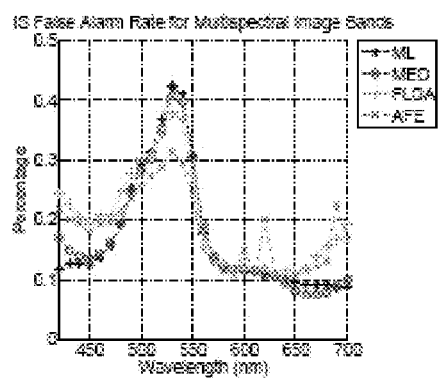 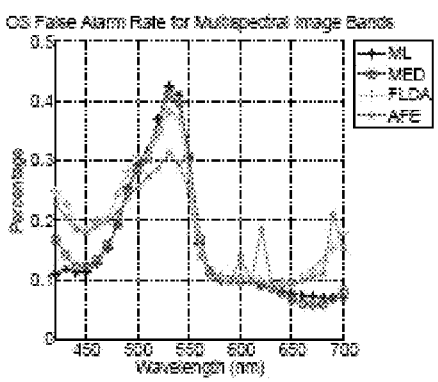
(e) IS false alarm rates.   (f) OS false alarm rates.
FIG. 8

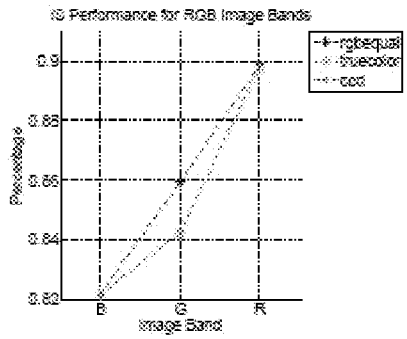
(a) IS performance scores.
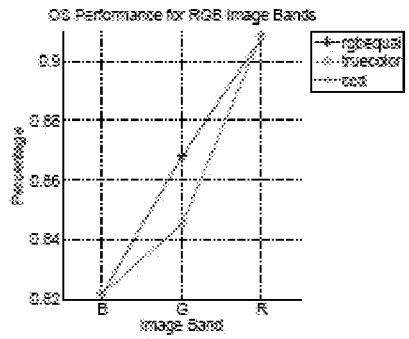
(b) OS performance scores.
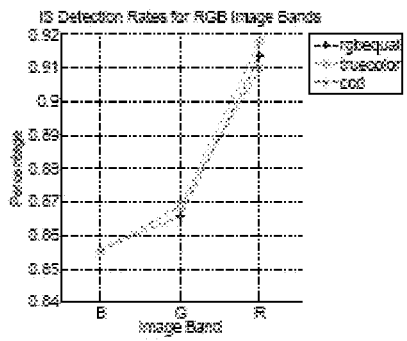
(c) IS detection rates.
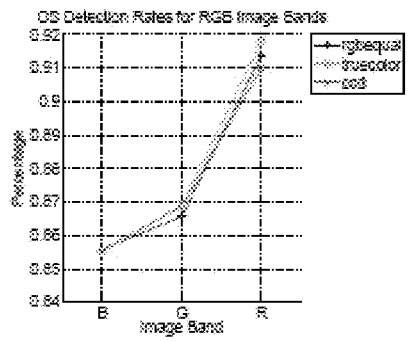
(d) OS detection rates.
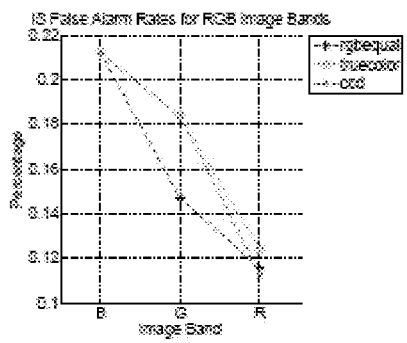
(e) IS false alarm rates.
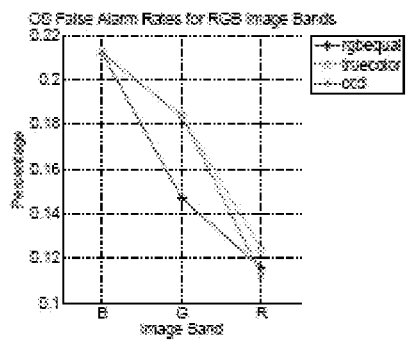
(f) OS false alarm rates.
FIG. 9

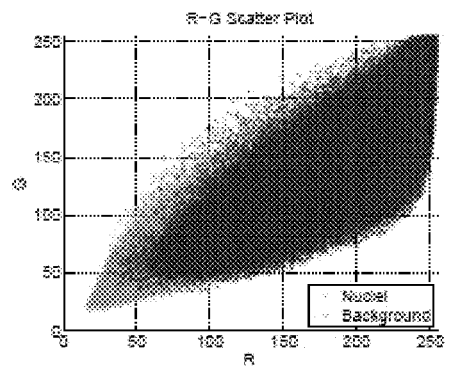
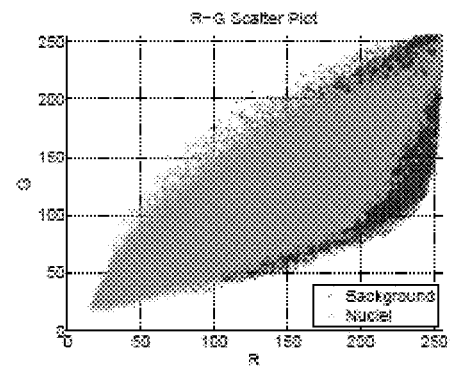
(a) R-G.
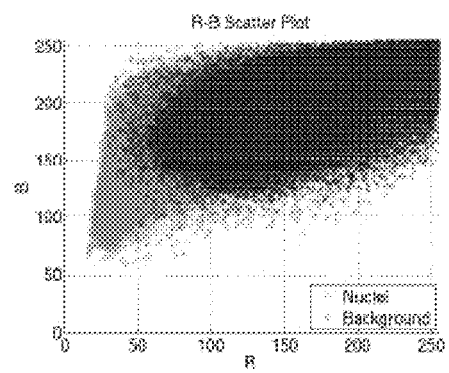
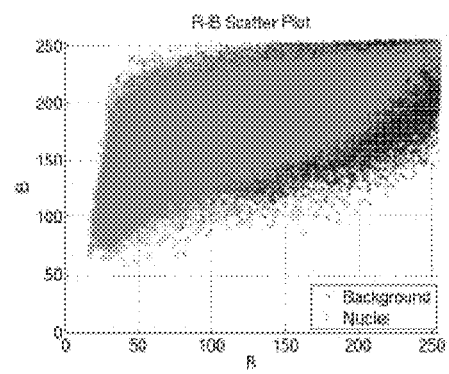
(b) R-B.
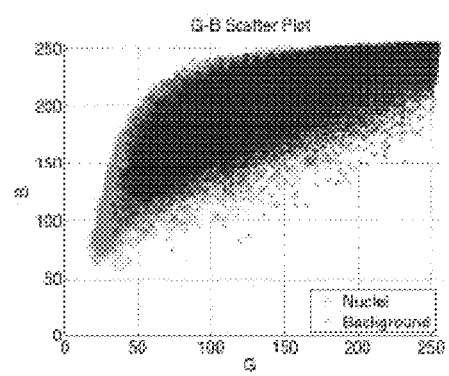
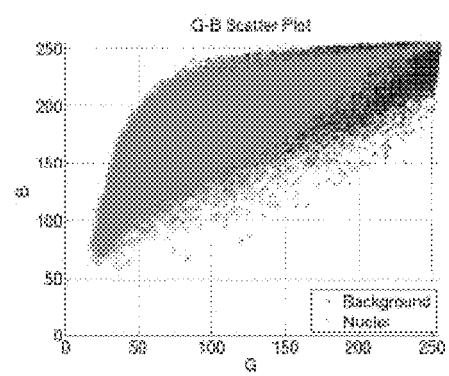
(c) G-B.
FIG. 10

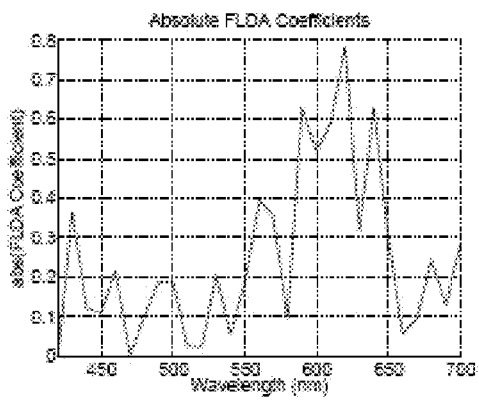 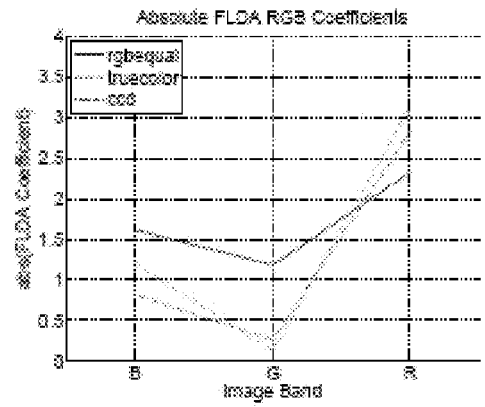
(a) Absolute value of FLDA coefficients for multispectral imagery.
(b) Absolute value of FLDA coefficients for RGB imagery.
FIG. 11
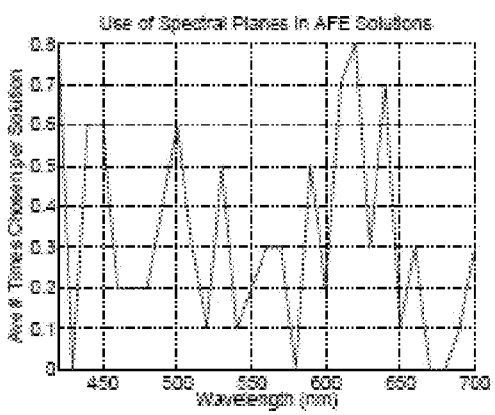 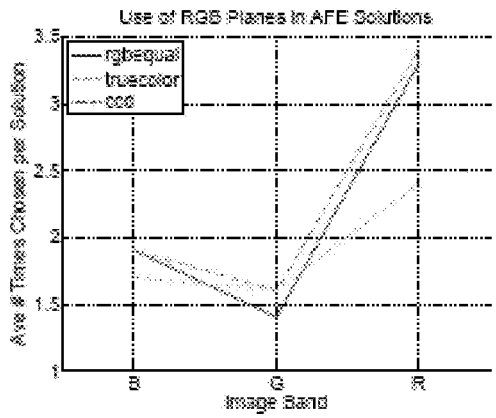
(a) Multispectral bands chosen in AFE solutions.
(b) RGB bands chosen in AFE solutions.
FIG. 12

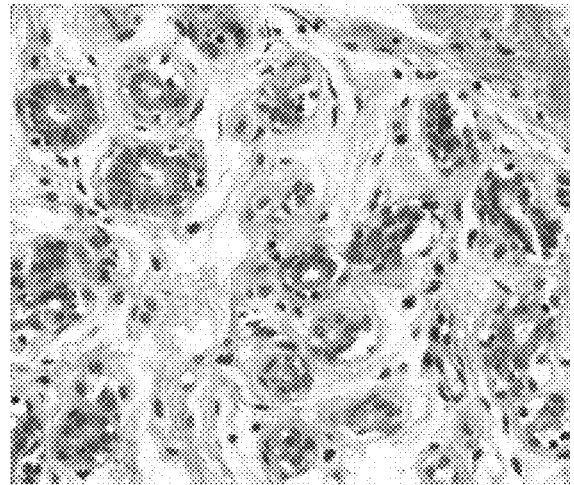
(a) Example ccd image.
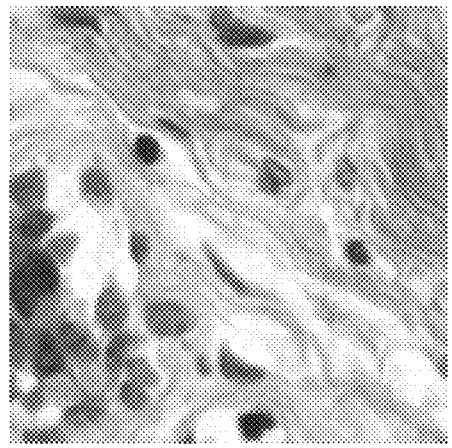 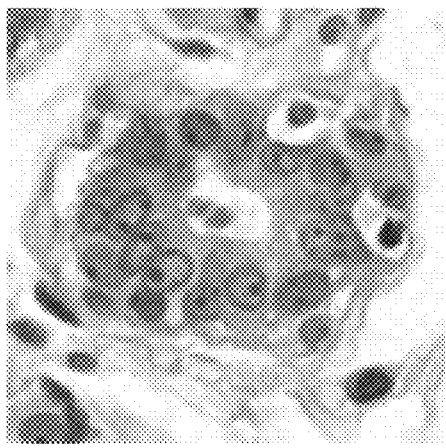
(b) Stroma can range in color and intensity, but generally displays a pink color and a sinuous, fibrous texture.
(c) Cytoplasm is generally granular to homogeneous in texture and is most apparent here on the inner edge of this ductal structure.
FIG. 17

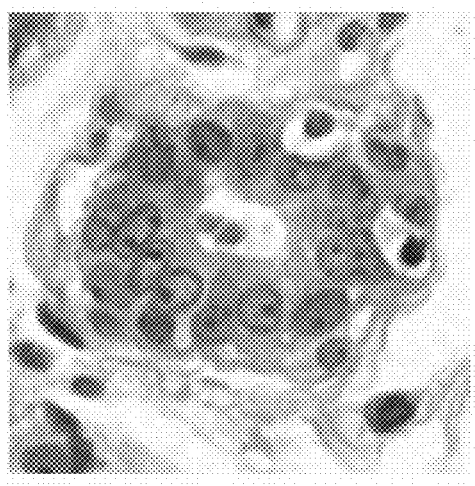 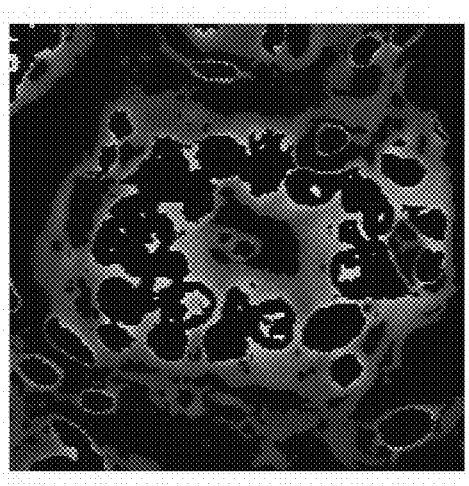
(a) Reference ccd image, displaying both stroma and cytoplasm.
(b) Gabor output (mean of the 12 features).
FIG. 18

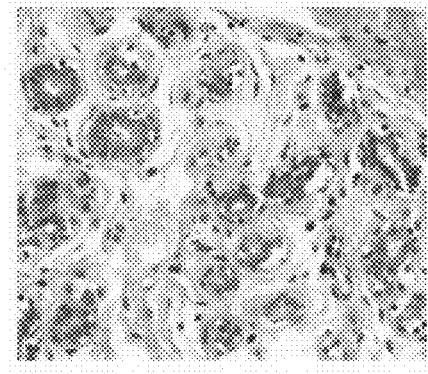
(a) Input.
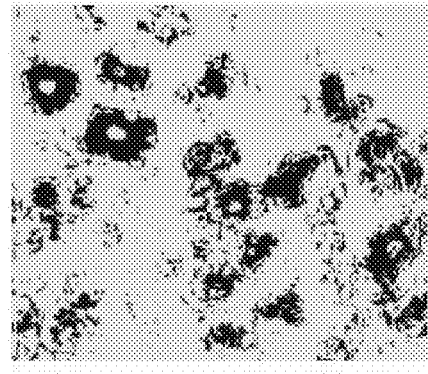
(b) ML output.
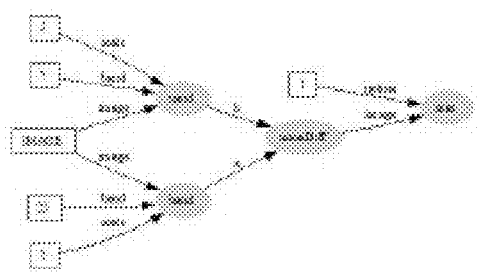
(c) Attribute 0. Normalized difference ($\frac{a-b}{a+b}$) of red (670 nm) band $a$ and blue (470 nm) band $b$ results in larger pixel values where the red value is larger than the blue; this result is dilated.
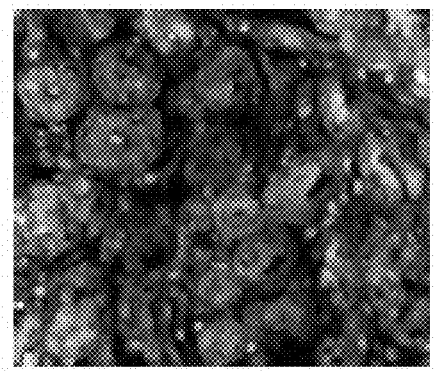
(d) Output 0. Highlights pink regions.
FIG. 19

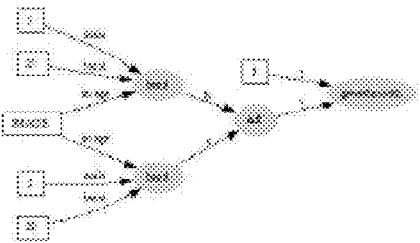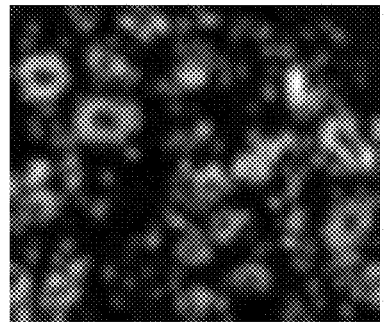

(e) Attribute 1. Absolute difference of two red bands (700 and 670 nm), i.e., $|a - b|$, for which the pixel values of nuclei vary more than for cytoplasm and stroma; this results in an image of cell nuclei, which is subsequently smoothed with a Gaussian filter.

(f) Output 1. Gaussian smoothed nuclei.

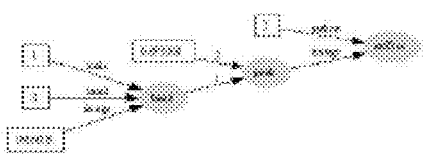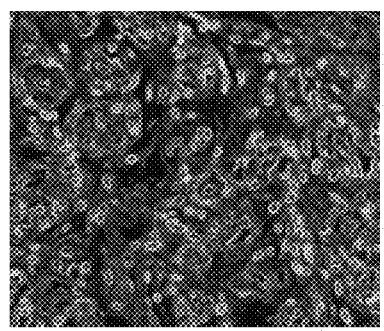

(g) Attribute 2. Blue band at 470 nm is clipped at max and min values and then Gaussian smoothed ("peak"), and the standard deviation of a disc-shaped neighborhood is computed for each pixel.

(h) Output 2. Edges of tissue and nuclei regions.

FIG. 19(cont.)

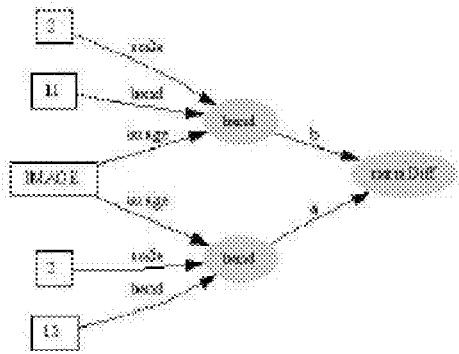

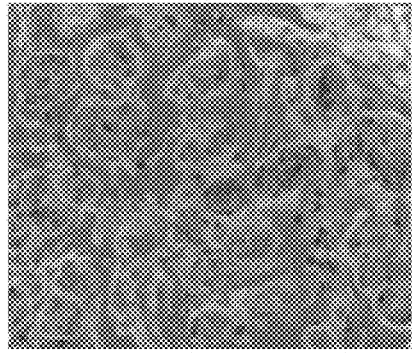

(a) Attribute 3. The normalized difference $\left(\frac{a-b}{a+b}\right)$ of two spectrally adjacent green bands $a$ (540 nm) and $b$ (530 nm).

(b) Output 3. Positive values appear as lighter gray, negative values as darker gray. Appears to highlight stroma as lighter colored than any other histologic class.

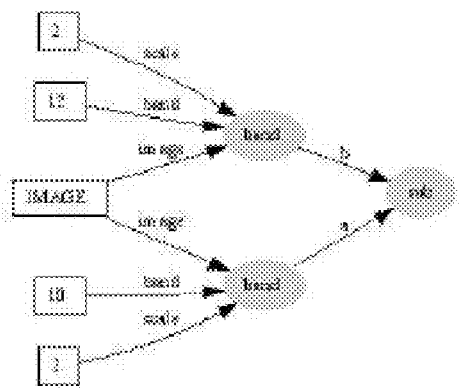

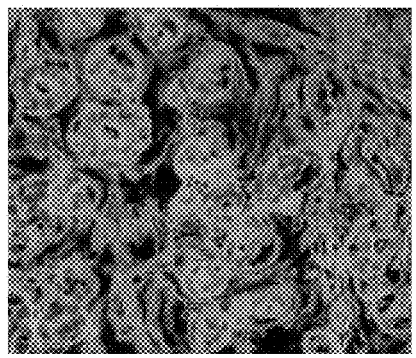

(c) Attribute 4. The subtraction of green bands $a$ (520 nm) and $b$ (540 nm), where the output is zero if $a < b$.

(d) Output 4. Highlights areas of tissue by the subtraction of a more spectrally transparent band from one that is less so.

FIG. 20

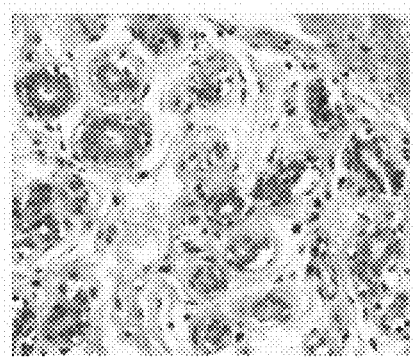
(a) Input.
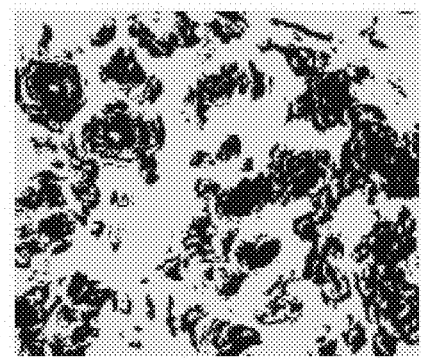
(b) ML output.
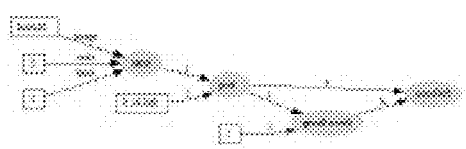
(c) Attribute 0. Computes the normalized difference ($\frac{a-b}{a+b}$) of the clipped and Gaussian smoothed ("peak") version of the blue channel ($b$) with a further Gaussian smoothing ($a$).
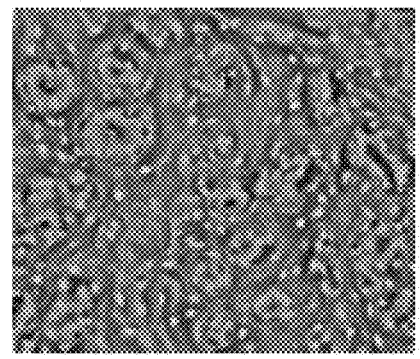
(d) Output 0. Appears to enhance tissue regions, with some nuclei particularly prominent.
FIG. 21

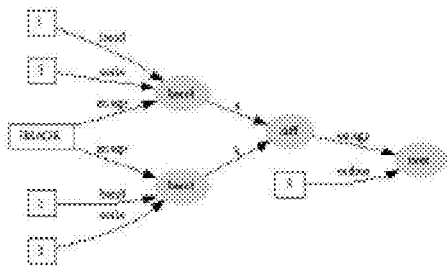

(e) Attribute 1. Takes the absolute difference of the green and blue channels and dilates the output.

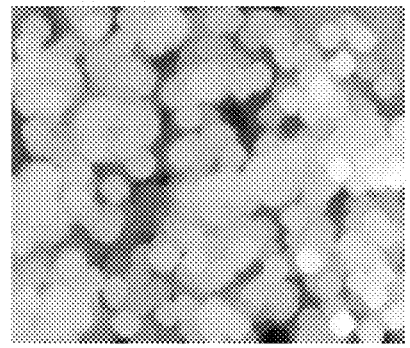

(f) Output 1. The absolute difference highlights areas of tissue, with nuclei appearing brightest. The morphological dilation expands these areas, again providing the brightest values at and around nuclei.

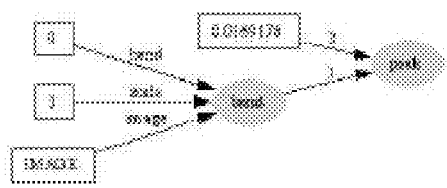

(g) Attribute 2. Clips and Gaussian smooths the red channel, enhancing nuclei.

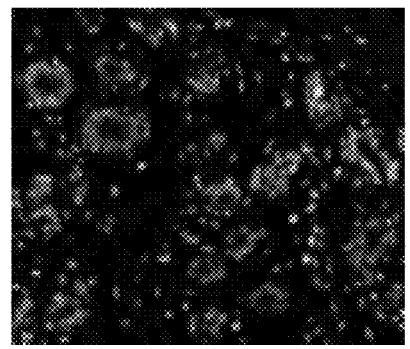

(h) Output 2. Nuclei.

FIG. 21 (cont.)

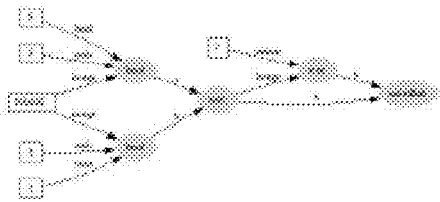

(a) Attribute 3. Multiplies the red and green channels, followed by the scaled subtraction (scaled to be greater than 0) of the multiplication and a dilated version of the multiplication.

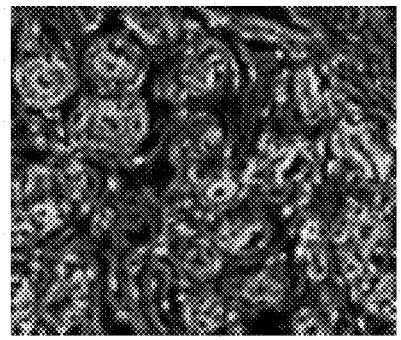

(b) Output 3. The multiplication of the red channel (with dark nuclei) and the green channel (with dark tissue) results in an image with dark nuclei. The subtraction of the dilated multiplication image from the multiplication image enhances edges of these dark regions. Thus, we have edges of nuclei (most prominent) and edges of other tissue.

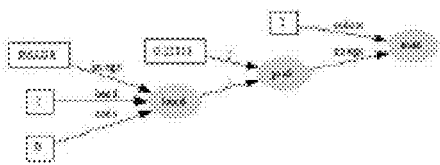

(c) Attribute 4. Clips and Gaussian smooths the blue channel, followed by a morphological dilation.

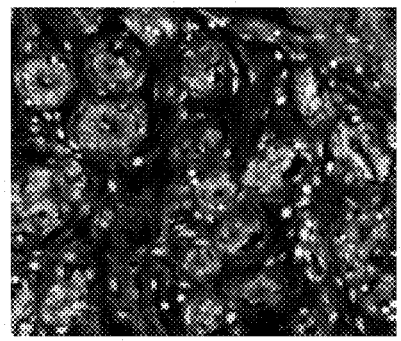

(d) Output 4. Dilated nuclei.

FIG. 22

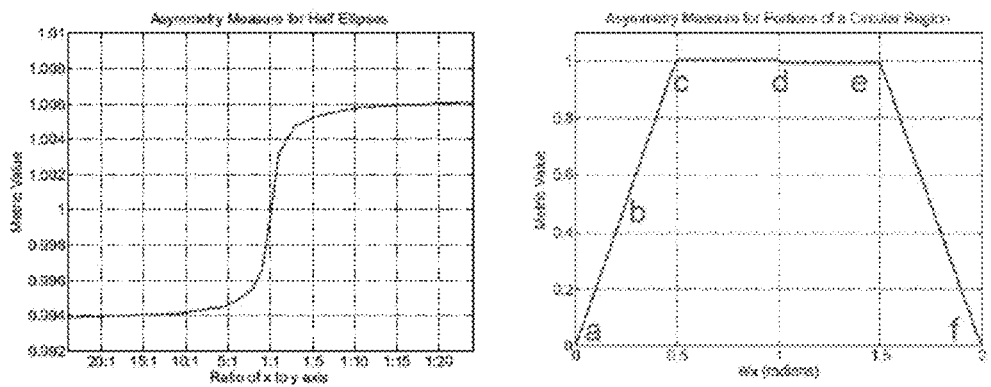

(a) Effect on the QS metric of ellipticity and orientation of missed pixels. The region missed is below the x-axis: ellipses plotted to the left of circular are missing half of their area along the major axis and to the right of circular, half their area along the minor axis. Note the possibility for the metric to be slightly larger than 1.

(b) Effect on the QS metric of the portion of a circular region of pixels missed. The maximum value for this metric occurs at (and around) $\theta = \pi$, when half of the region is missed. The metric tapers off to zero for small and large angles; this illustrates the need for a separate size metric, since this metric is scoring only the asymmetry.

(c) Example wedges removed from the discrete circular region in (b).

FIG. 23

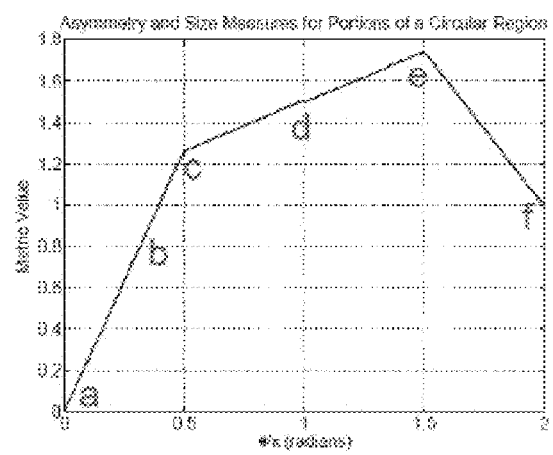
(d) Additive effect of the QS and size metrics. The combination of these two metrics yields the desired penalty. Note the maximum value of ~ 1.75.
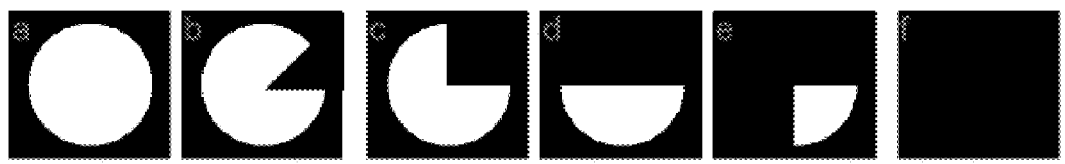
(e) Example wedges removed from the discrete circular region in (d).
FIG. 23 (cont.)

(a) Original hand silhouette with $CT = 5270$ object pixels.

(b) Erosion by 1 pixel; total of $PM = 524$ pixels eroded (missed). $\frac{2 \cdot QS}{CT} = 0.188$, $\frac{PM}{CT} = 0.099$, $term_2 = 0.107$.

(c) Thumb removed; total of $PM = 524$ pixels missed. $\frac{2 \cdot QS}{CT} = 0.397$, $\frac{PM}{CT} = 0.099$, $term_2 = 0.227$.

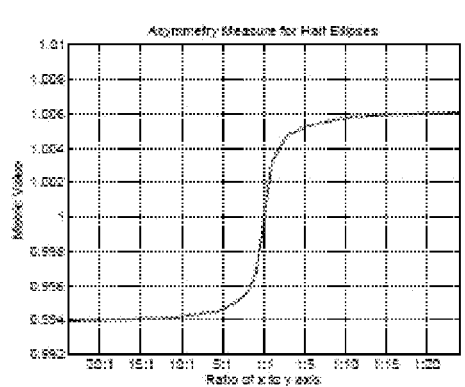
(a) The QS metric versus ellipticity and orientation of pixels missed.
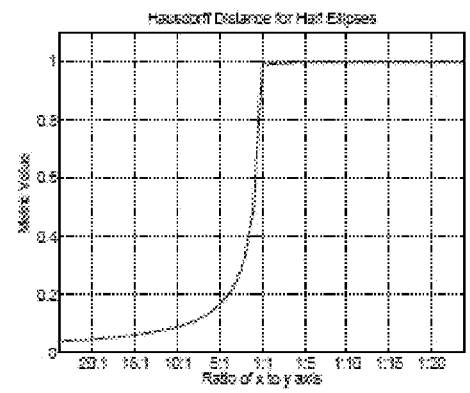
(b) The Hausdorff distance versus ellipticity and orientation of pixels missed.
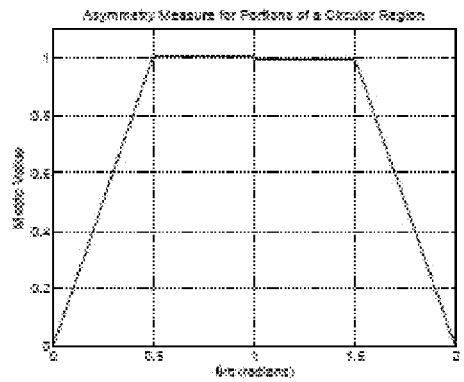
(c) The QS metric versus portion of a circular region of pixels missed.
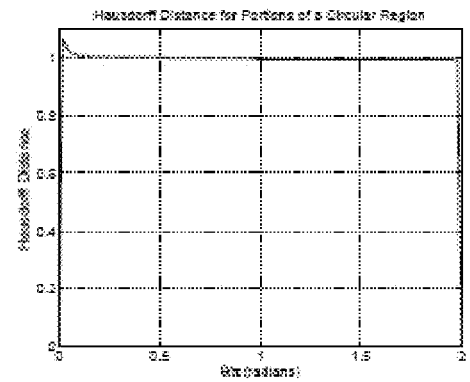
(d) The Hausdorff distance versus portion of a circular region of pixels missed.
FIG. 26

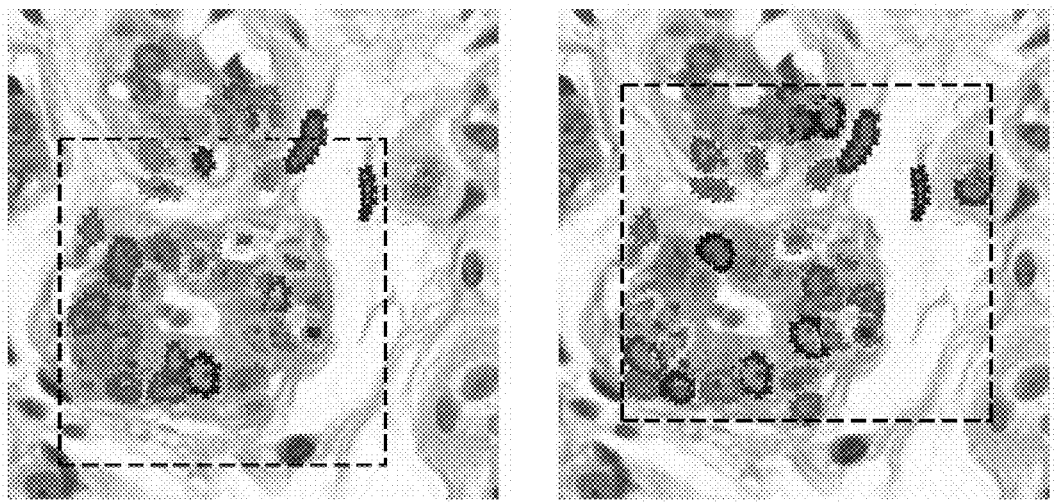
(a) Object delineation within the originally specified truth window. Each object perimeter is assigned a random color for display purposes.
(b) Recomputed truth window, the minimum bounding rectangle of the marked objects.
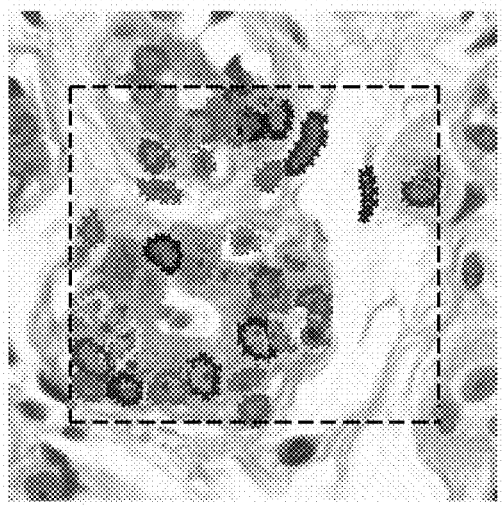
(c) Specification of unmarked objects within the recomputed truth window, displayed here as green dots.
FIG. 27

(a) Average performance.   (b) Standard deviation of average performance.

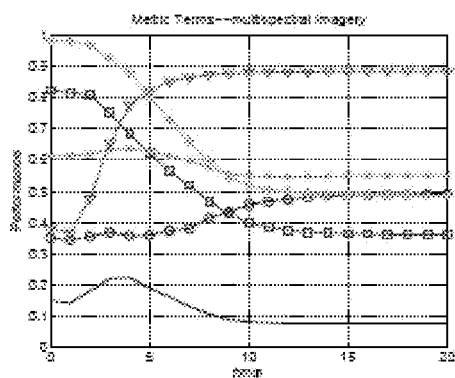
(b) Multispectral imagery.
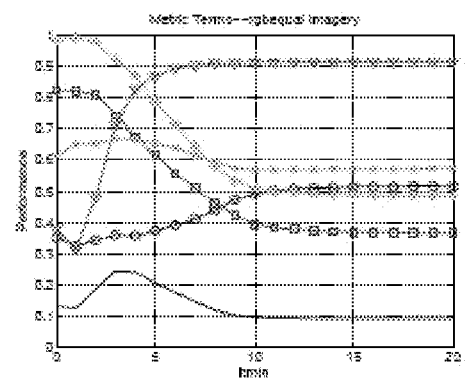
(c) rgbequal imagery.
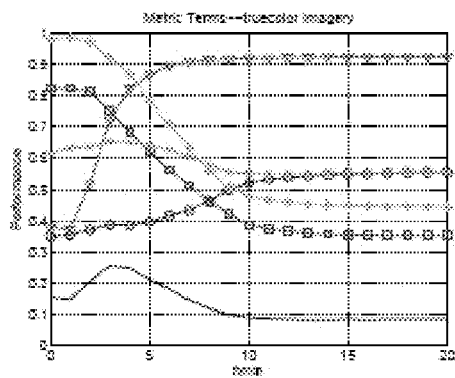
(d) truecolor imagery.
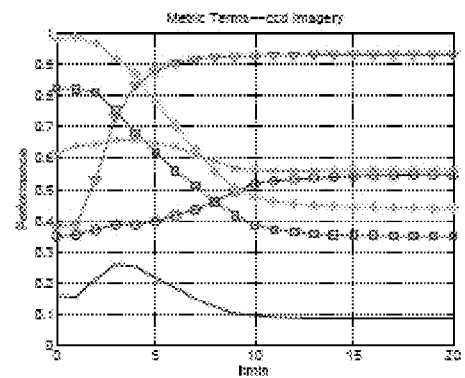
(e) ccd imagery.
FIG. 31

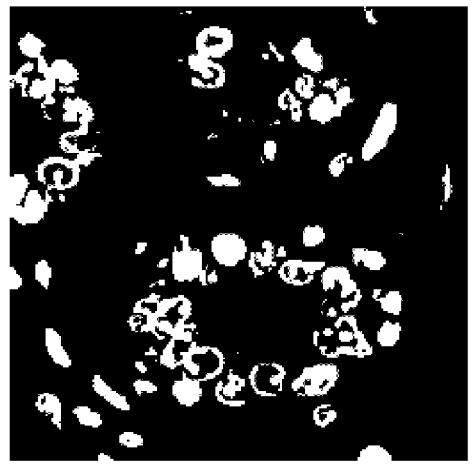
(a) Original binary image.
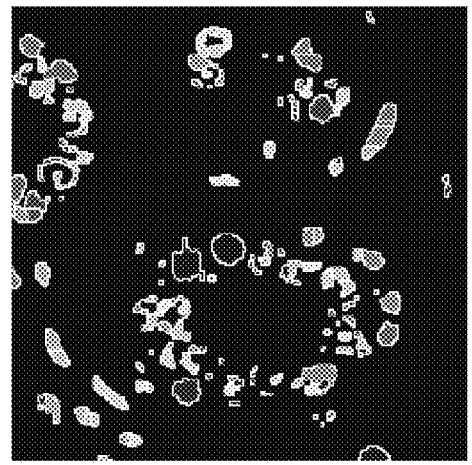
(b) $h_{min} = 0$, $P = 0.2435$.
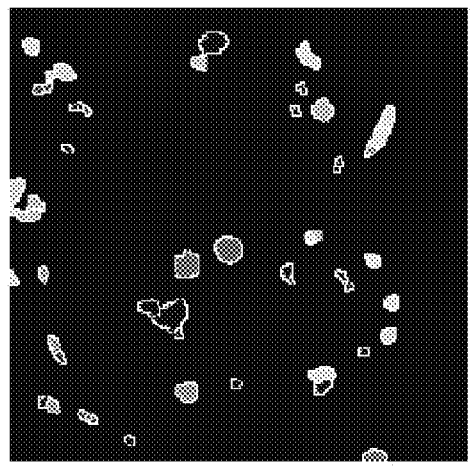
(c) $h_{min} = 4$, $P = 0.2685$.
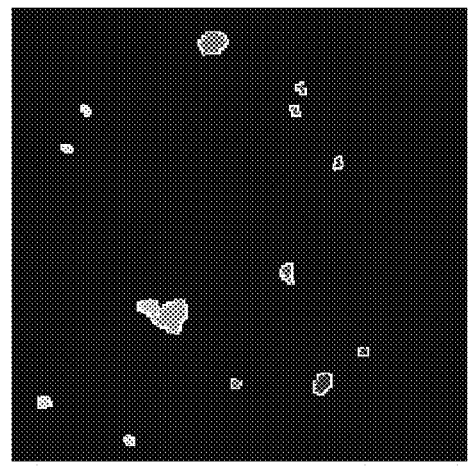
(d) $h_{min} = 10$, $P = 0.1355$.
FIG. 32

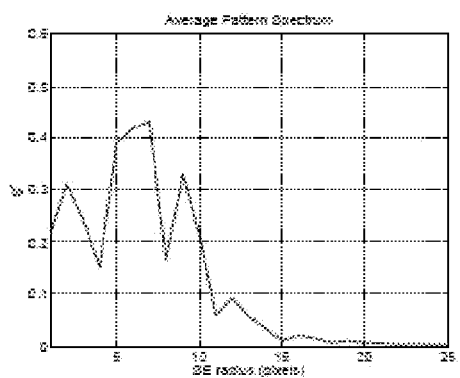
(a) Average pattern spectrum over all dataset images.
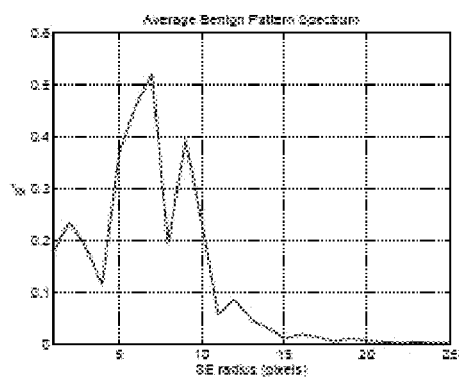
(b) Average pattern spectrum over benign images.
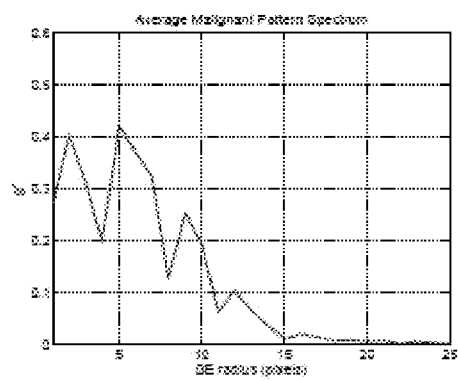
(c) Average pattern spectrum over malignant images.
FIG. 33

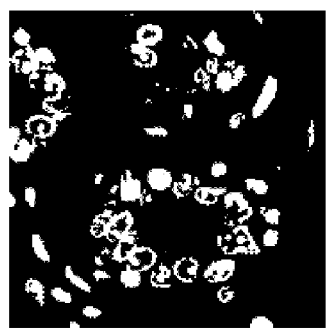 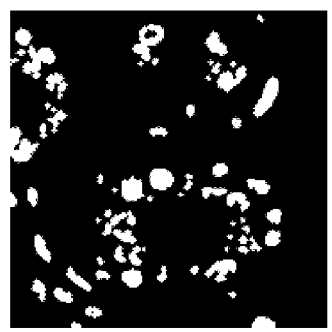 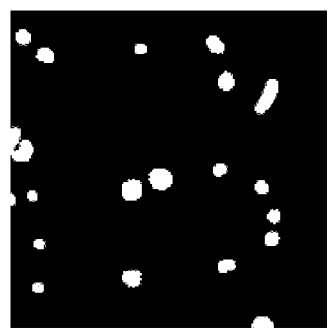
(a) Original binary benign image.
(b) Benign residue $r = 2$.
(c) Benign residue $r = 5$.
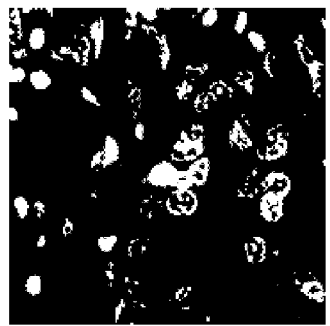 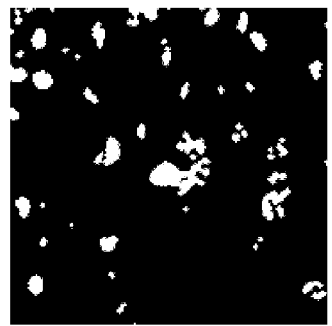 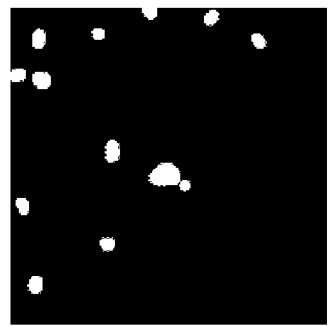
(d) Original binary malignant image.
(e) Malignant residue $r = 2$.
(f) Malignant residue $r = 5$.
FIG. 35

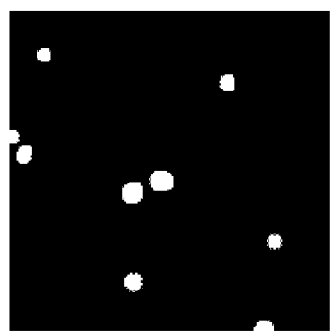
(g) Benign residue $r = 6$.
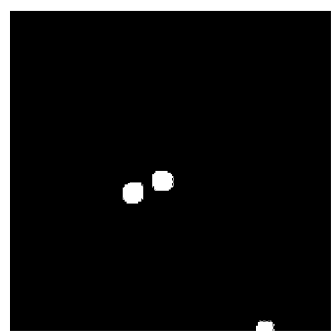
(h) Benign residue $r = 7$.
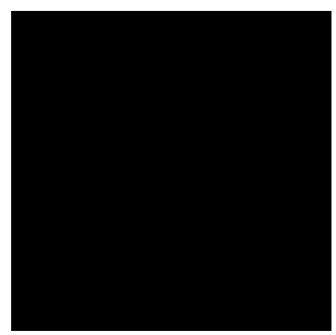
(i) Benign residue $r = 9$.
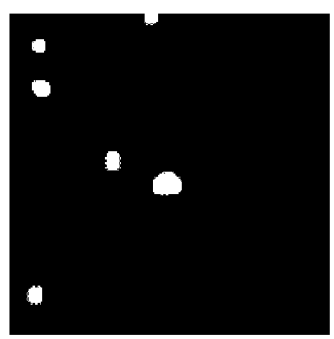
(j) Malignant residue $r = 6$.
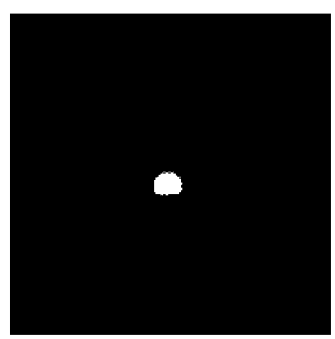
(k) Malignant residue $r = 7$.
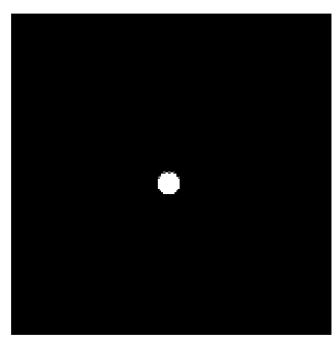
(l) Malignant residue $r = 9$.
FIG. 35 (cont.)

(a) Average performance.

(b) Standard deviation of average performance.

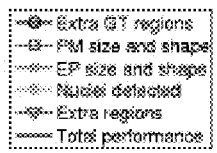
(a) Legend.
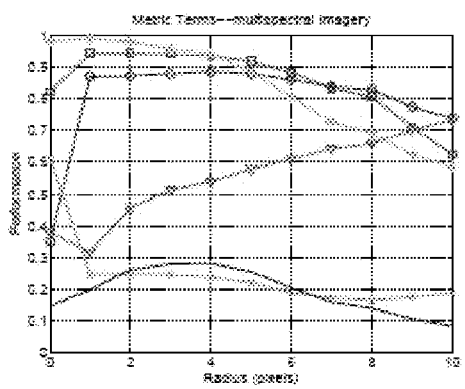
(b) Multispectral imagery.
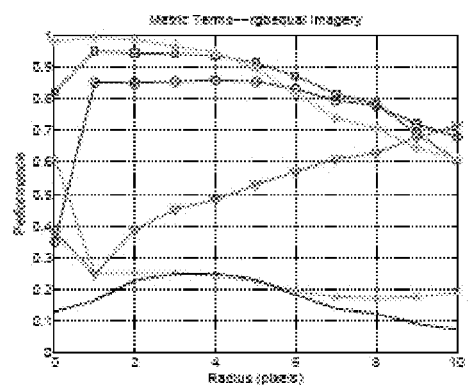
(c) rgbequal imagery.
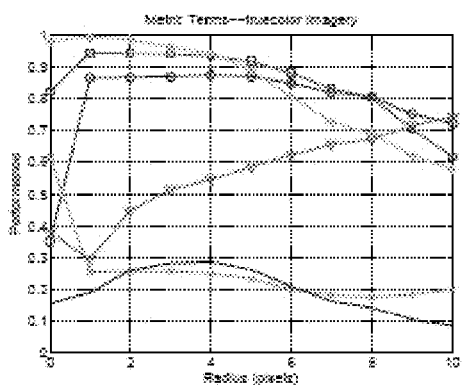
(d) truecolor imagery.
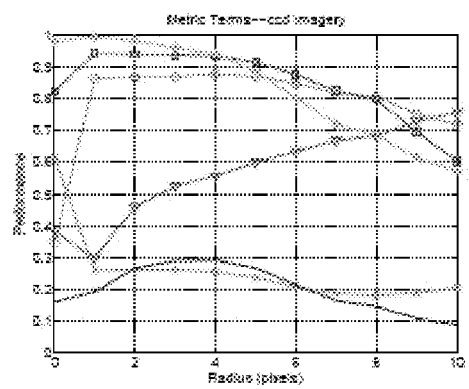
(e) ccd imagery.
FIG. 37

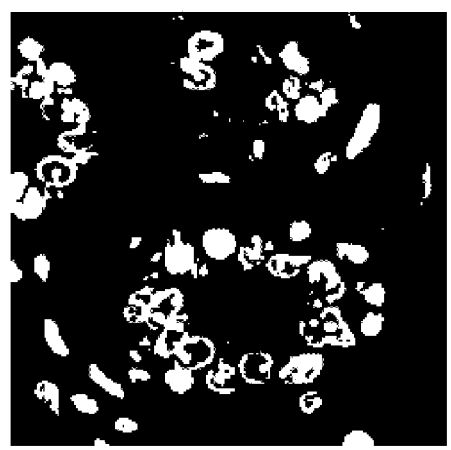
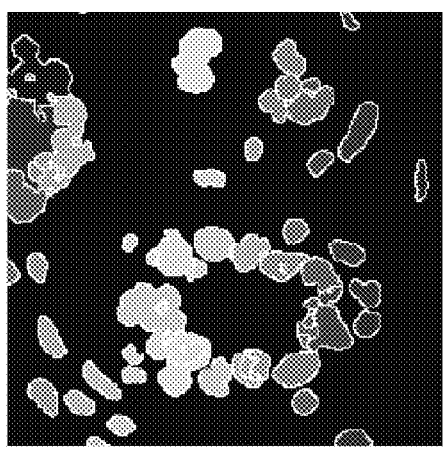
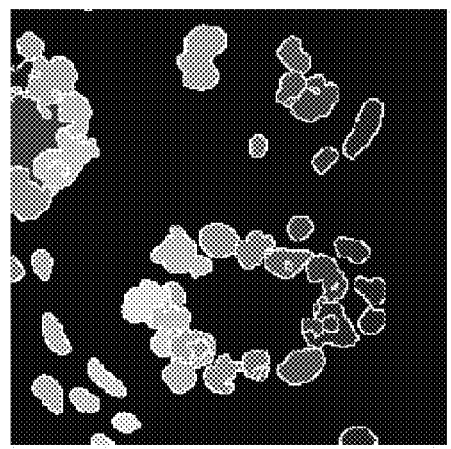
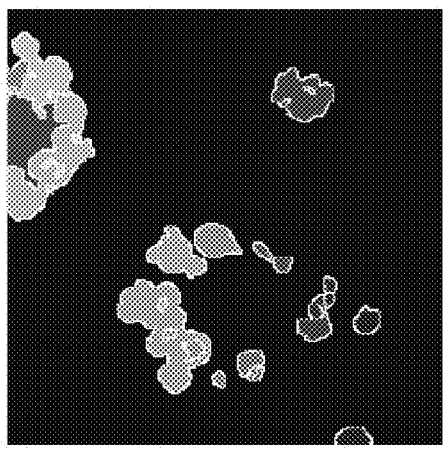
(a) Original binary image.  (b) $r = 2, P = 0.3485.$
(c) $r = 4, P = 0.2831.$  (d) $r = 6, P = 0.1291.$
FIG. 38

(a) Average performance.

(b) Standard deviation of average performance.

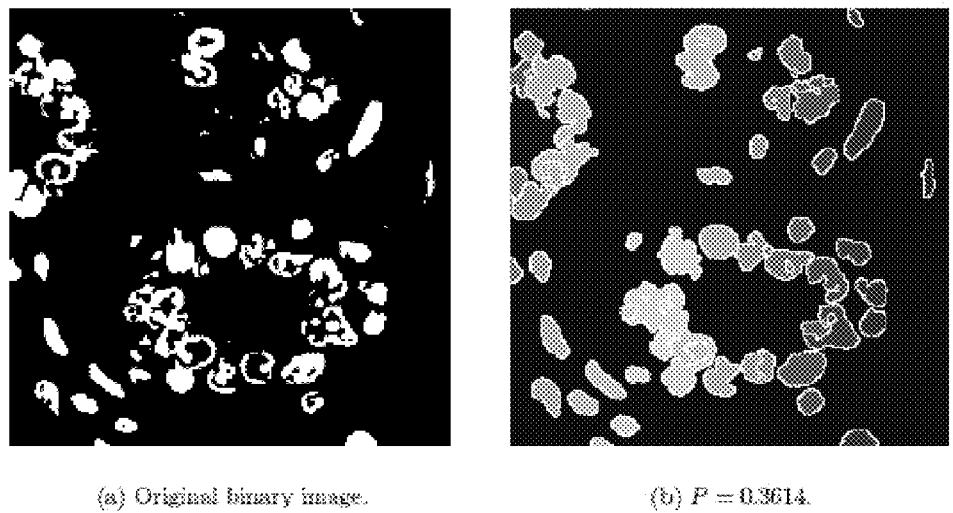

(a) Original binary image.    (b) $P = 0.3614$.

FIG. 41

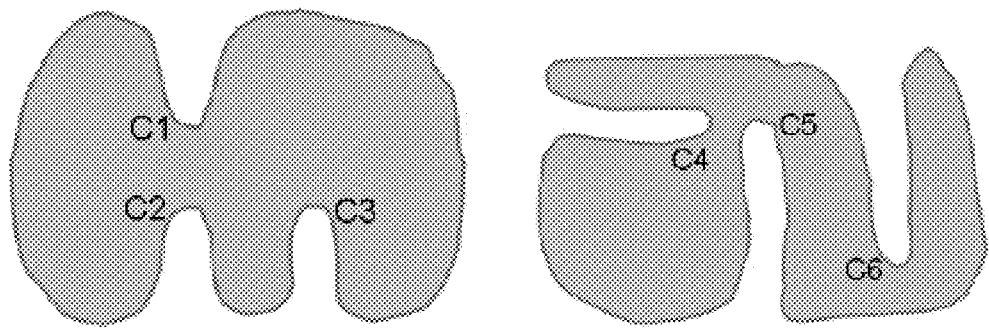

(a) Oppositely aligned concavities C1 and C2 define a more intuitive split line ($CC_{12} \approx 0$, $CL_{12} \approx 0$), while parallel concavities C2 and C3 do not ($CC_{23} \approx \pi$, $CL_{23} \approx \pi/2$). Concavities C1 and C3 form a split line with $CC_{13} \approx 0$ and $CL_{13} \approx \pi/4$.

(b) The split line defined by C4 and C5 ($CC_{45} \approx \pi/2$, $CL_{45} \approx \pi/2$) is a reasonable scenario; the split line between C5 and C6 ($CC_{56} \approx 0$, $CL_{56} \approx 3\pi/2$) is a possible scenario, but less likely.

FIG. 42

(a) Average performance.

(b) Standard deviation of average performance.

(a) Original binary image.

(b) Kumar segmentation, $P = 0.2367$.

(a) Average performance.

(b) Standard deviation of average performance.

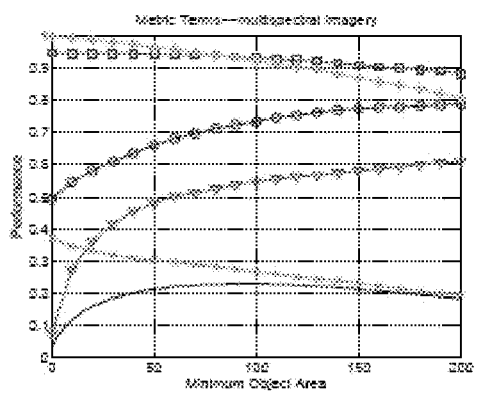
(b) Multispectral imagery.
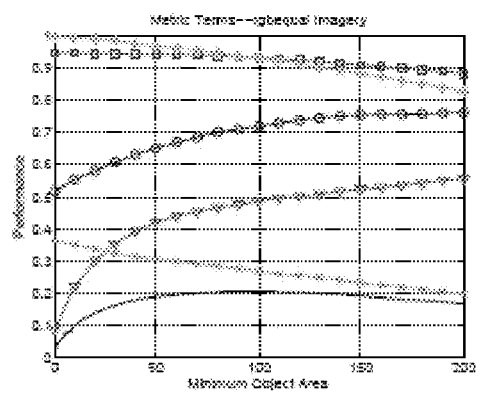
(c) rgbequal imagery.
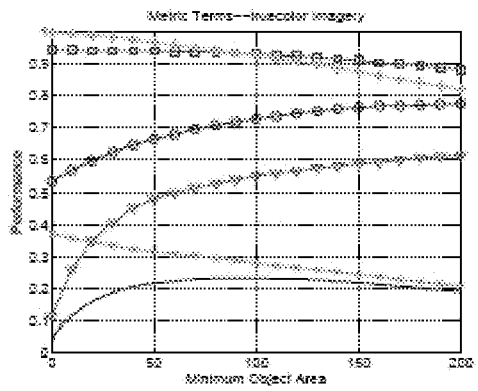
(d) truecolor imagery.
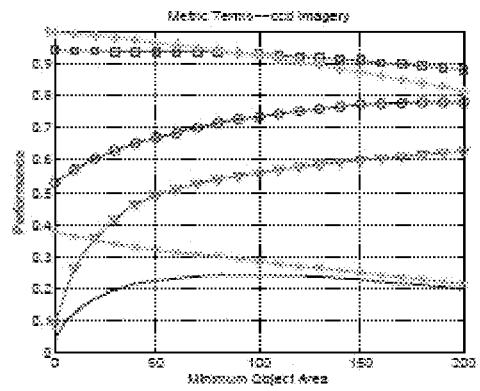
(e) ccd imagery.
FIG. 48

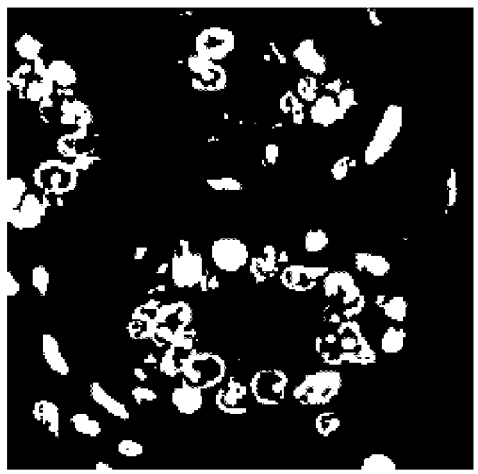
(a) Original binary image.
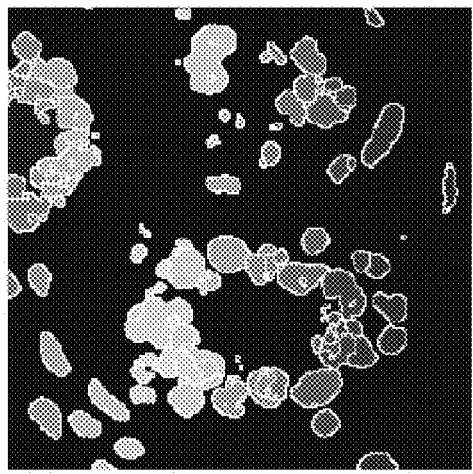
(b) $a = 0, P = 0.2463$.
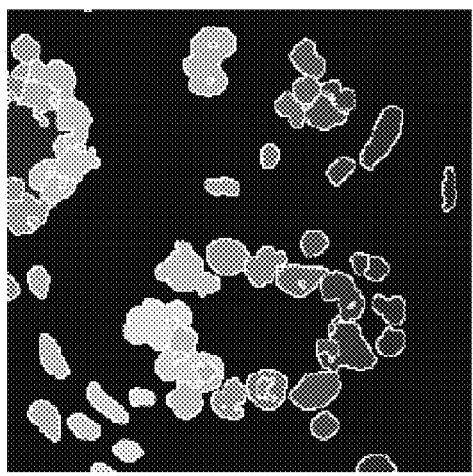
(c) $a = 50, P = 0.3880$.
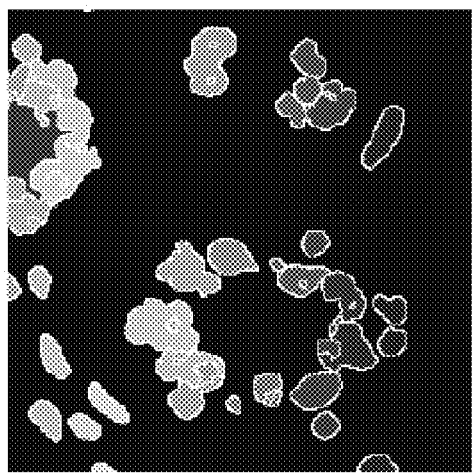
(d) $a = 100, P = 0.2785$.
FIG. 49

(a) Original ground truth image.
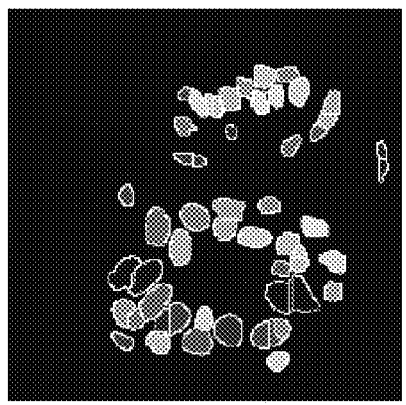
(b) WSCDT, $P = 0.4765$.
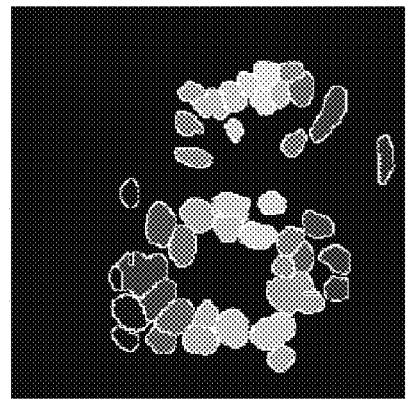
(c) WSGT, $P = 0.4130$.
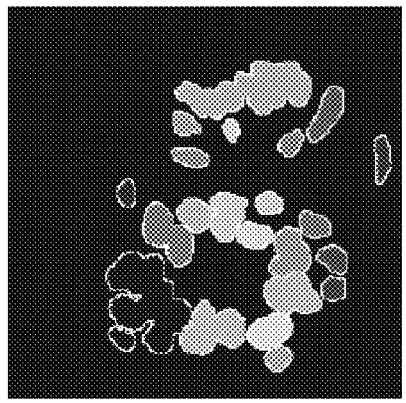
(d) WSGran, $r = 2$, $P = 0.5872$.
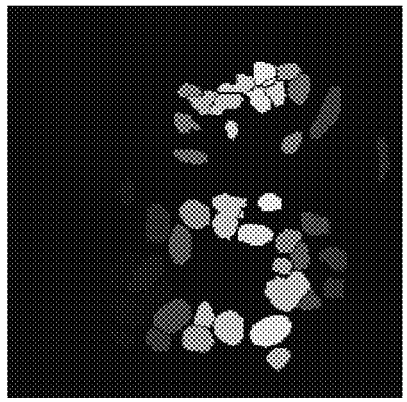
(e) Kumar, $P = 0.3171$.
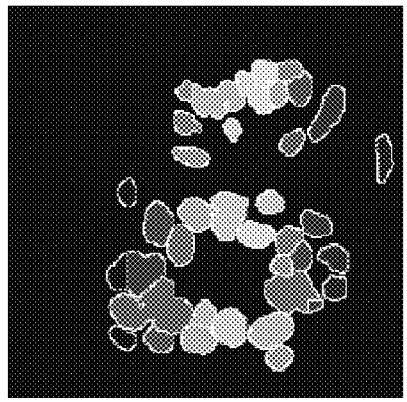
(f) WSCM, $P = 0.4544$.
FIG. 50

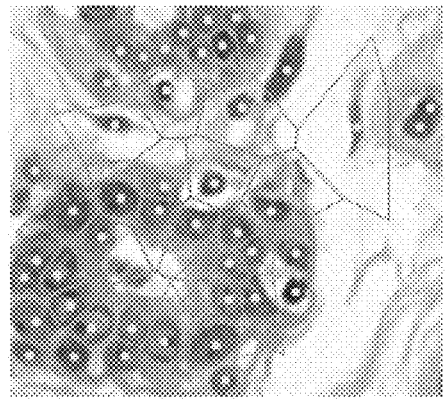

(a) Original image with GT nuclei centroids used to develop the Voronoi tessellation.

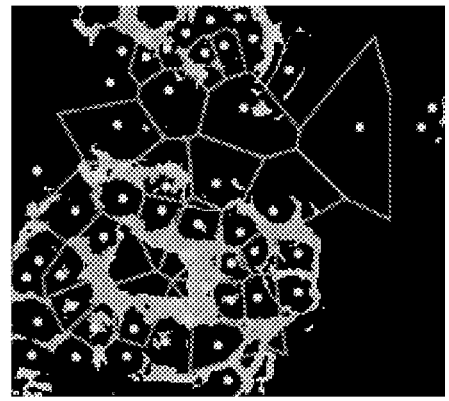

(b) Voronoi segmentation of the cytoplasm class. Each nucleus can be associated with the cytoplasm and features of the cytoplasm within the Voronoi cell.

(c) 8-connected component segmentation of the stroma class, where each color indicates a different segmented region.

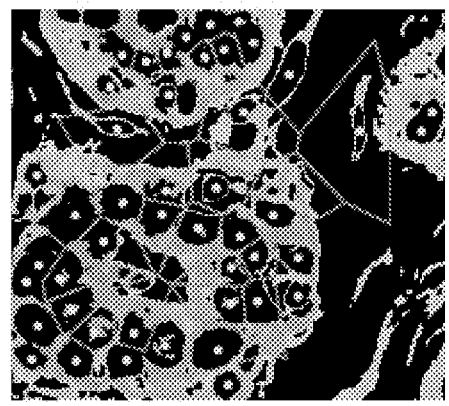

(d) Voronoi segmentation of the combined cytoplasm and stroma class.

FIG. 51

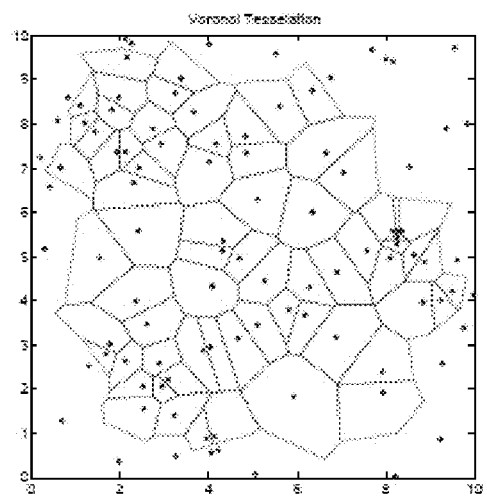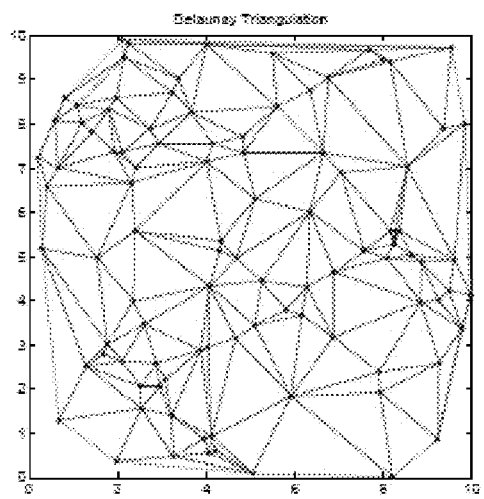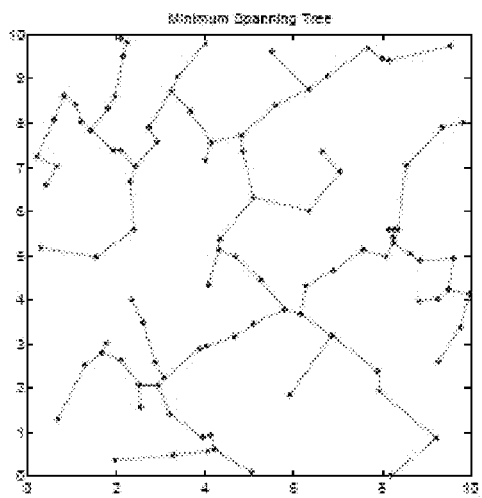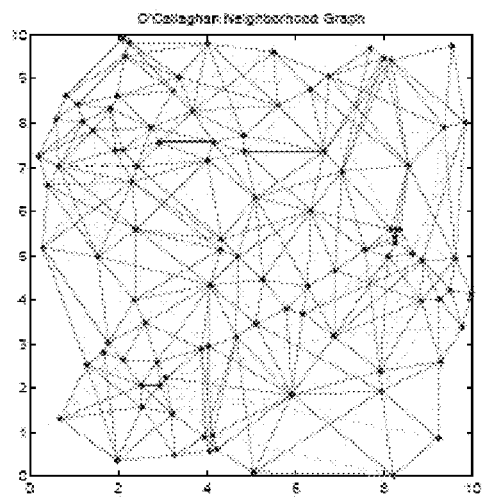
(a) Voronoi Tesselation.  (b) Delaunay Triangulation.  (c) Minimum Spanning Tree.  (d) O'Callaghan Neighborhood Graph.
FIG. 53

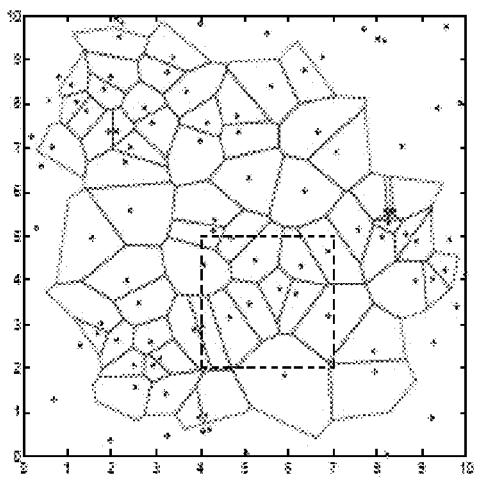 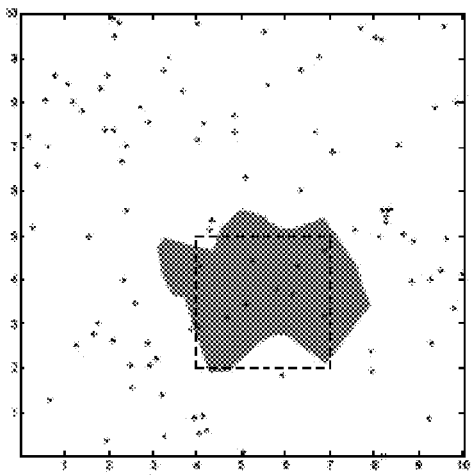
(a) Example Voronoi tessellation with square window delineating the region for spatial feature extraction.
(b) The region to which we attribute the spatial features is shaded gray. As reference, the original square window is included here.
FIG. 54

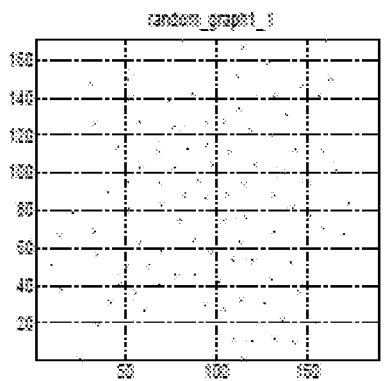
(a) Random graph 1.
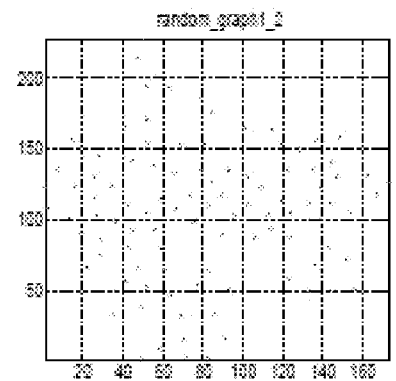
(b) Random graph 2.
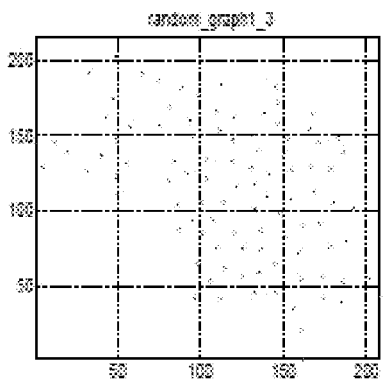
(c) Random graph 3.
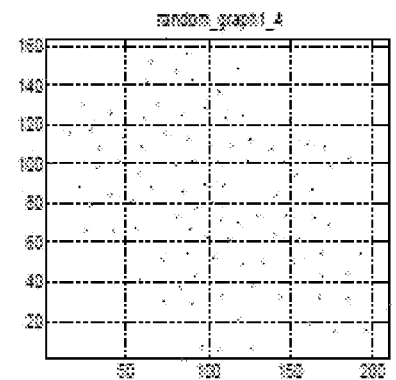
(d) Random graph 4.
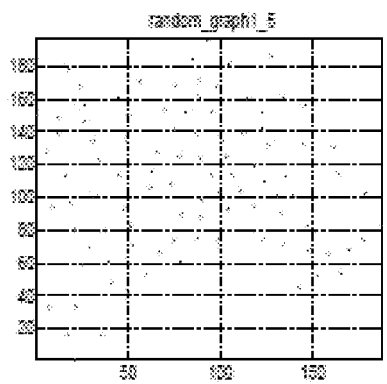
(e) Random graph 5.
FIG. 55

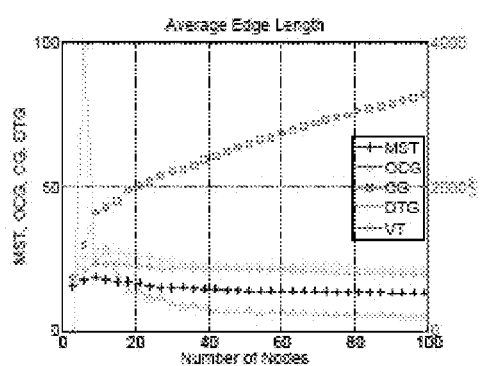
(i) Average edge length, random graph type 1.
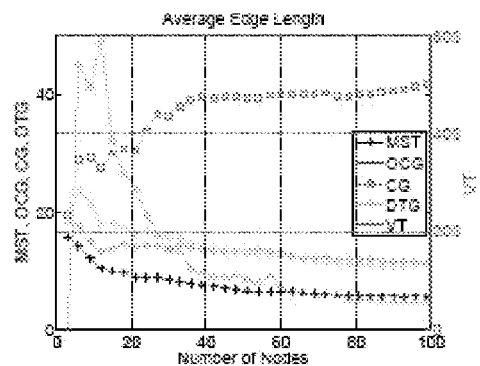
(j) Average edge length, random graph type 2.
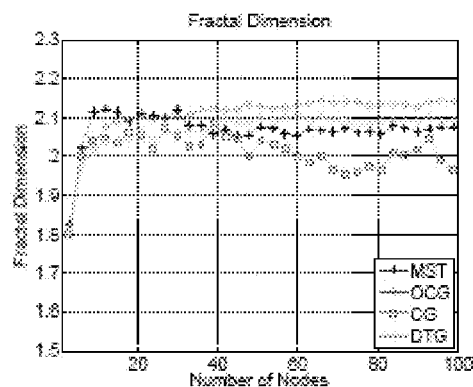
(k) Fractal dimension, random graph type 1.
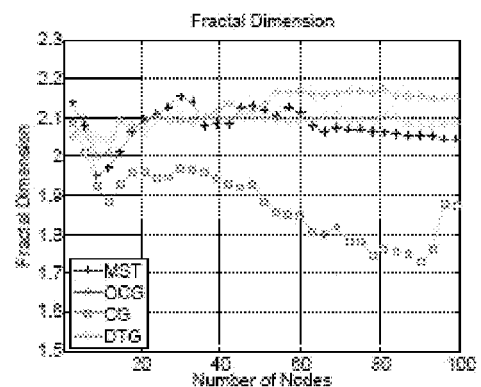
(l) Fractal dimension, random graph type 2.
FIG. 57 (cont.)

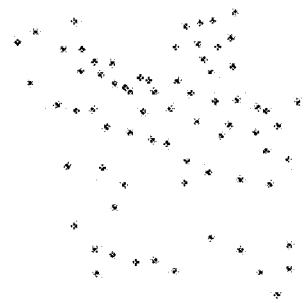 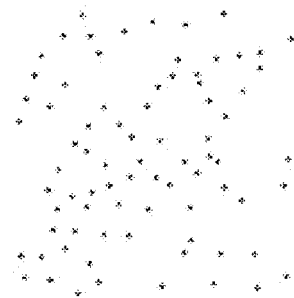
(a) Centroids of benign nuclei.  (b) Centroids of malignant nuclei.
 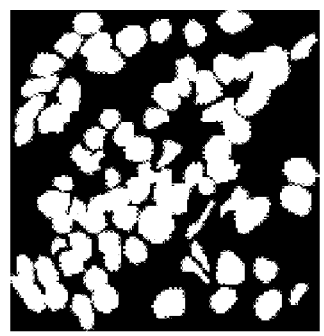
(c) Benign ground truth nuclei.  (d) Malignant ground truth nuclei.
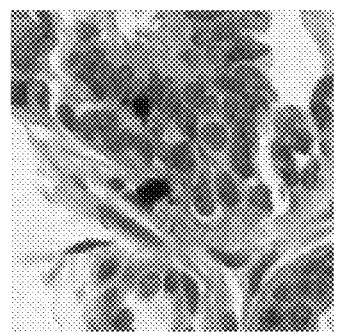 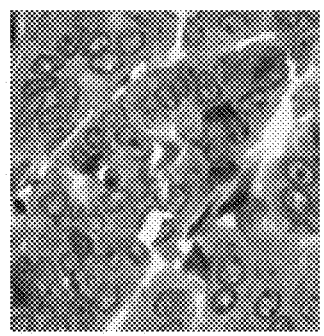
(e) Benign RGB image.  (f) Malignant RGB image.
FIG. 58

(a) One object strictly contained within another, i.e., NTPP.

(b) One object contained within the convex hull of another.

(a) NTPP: The blue region contains the same area as the yellow region. This corresponds with common models of cell cytoplasm and nuclei.

(b) EC: The blue region is defined only up to the boundary of the yellow region; thus, they share a boundary and are externally connected. This corresponds with the segmentations of cytoplasm and nuclei as discussed in Chapter 4.

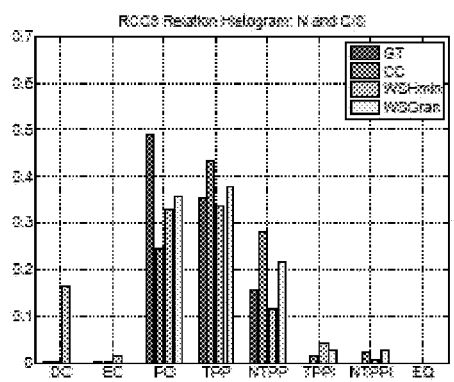
(a) Nuclei and cytoplasm/stroma.
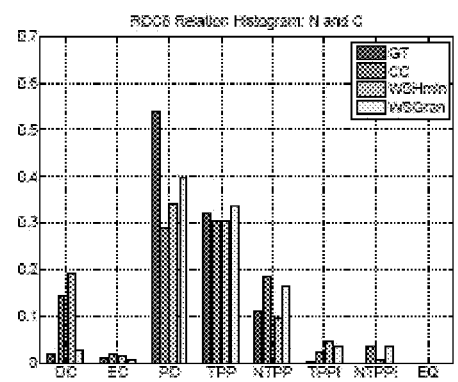
(b) Nuclei and cytoplasm.
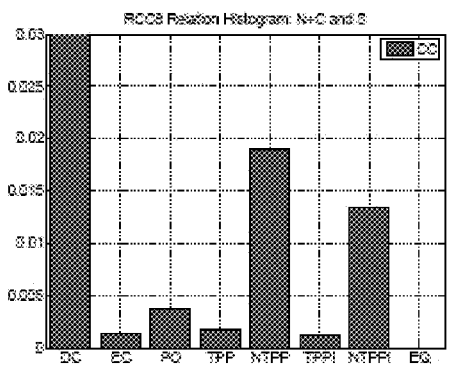
(c) Cells (nuclei + cytoplasm) and stroma.
FIG. 65

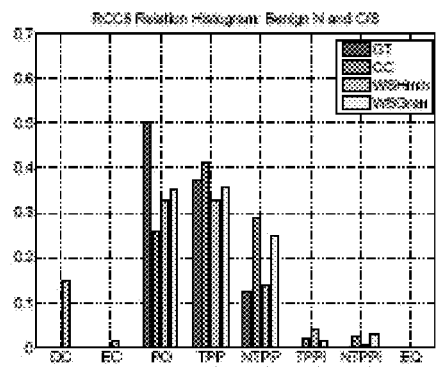
(a) N and CS, benign.
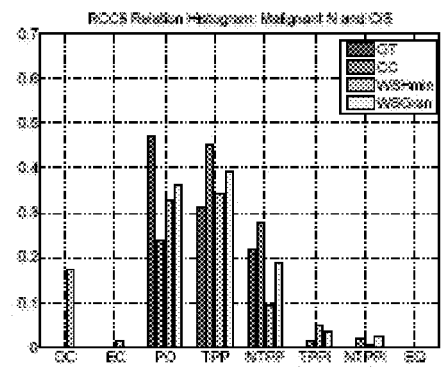
(b) N and CS, malignant.
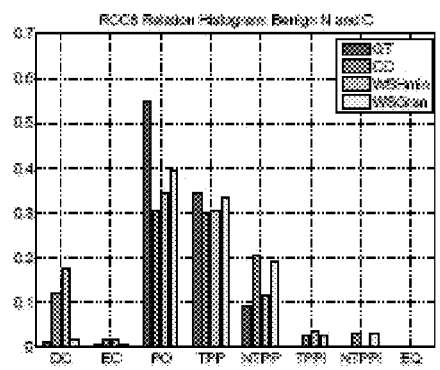
(c) N and C, benign.
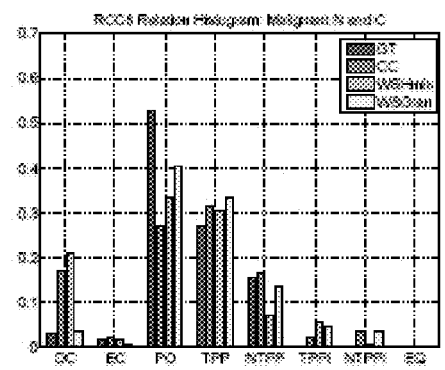
(d) N and C, malignant.
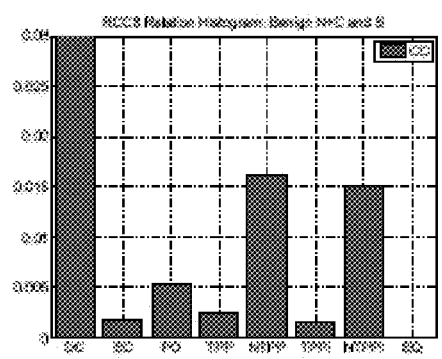
(e) N+C and S, benign.
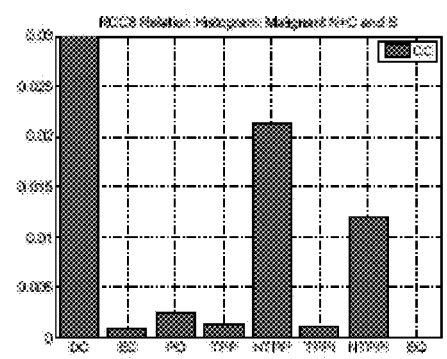
(f) N+C and S, malignant.
FIG. 66

(a) Illustrative "benign" cells.

(b) Illustrative "malignant" cells.

COMBINATIONAL PIXEL-BY-PIXEL AND OBJECT-LEVEL CLASSIFYING, SEGMENTING, AND AGGLOMERATING IN PERFORMING QUANTITATIVE IMAGE ANALYSIS THAT DISTINGUISHES BETWEEN HEALTHY NON-CANCEROUS AND CANCEROUS CELL NUCLEI AND DELINEATES NUCLEAR, CYTOPLASM, AND STROMAL MATERIAL OBJECTS FROM STAINED BIOLOGICAL TISSUE MATERIALS

STATEMENT REGARDING FEDERALLY SPONSORED RESEARCH OR DEVELOPMENT

This invention was made with Government support under Contract No. DE-AC52-06NA25396, awarded by the Department of Energy. The Government has certain rights in this invention.

CROSS-REFERENCE TO RELATED APPLICATIONS

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image analysis, and more particularly to cellular image analysis.

2. Description of Related Art

While the specific factors for developing breast cancer are diverse and not completely understood, it is estimated (based on 2000-2002 statistics) that 13.2% of women born today in the United States will be diagnosed with breast cancer.

This statistic, generally reported as "1 in 8," is the cumulative risk if a woman were to live 110 years; the actual risk depends on age, a bimodal distribution with the first peak at premenopause (40-50 years) and the second at approximately 65 years. Using data from 1969-2002, it was estimated that 211,240 new cases of invasive breast cancer and 58,490 new cases of non-invasive breast cancer would be diagnosed in 2005, while 40,410 women would succumb. Breast cancer is now known to consist of a variety of diseases; complicating the diagnosis and treatment procedures are a large number of conditions that mimic breast cancer and may present an increased risk for developing breast cancer.

Of particular interest are benign diseases and the possibility that these may be precursors to malignant conditions (i.e., "premalignancy")]. Established cytologic (cell) criteria can be contradictory, and even histologic (tissue) criteria (considered the gold standard for diagnosis) are subject to varied interpretation.

It has become common clinical practice to remove all breast masses due to the possibility of breast cancer, even though 80% of these excised lesions turn out to be benign. There is thus a need to quantitatively define characteristics of breast cancer to better coordinate clinical care of women presenting breast masses.

Infrared vibrational and Fourier transform spectroscopy have been used for classification of prostate and cervical tissue, in which very specific spectral information (at the molecular-level) is used, but spatial attributes are generally not utilized. Infrared spectroscopy uses infrared light to excite vibrations in the molecular structure of a specimen. These are reflected as energies which give insight into the underlying molecular constituents. In the more common case of Fourier transform infrared spectroscopy, instead of an array of energies, an interferogram is produced; the Fourier transform of this interferogram produces the energies. Using a pool of features hand-picked by spectroscopist analysis of pathologist-marked regions, Fernandez et al. achieved accuracies of 90.1%-100.0% for classification of histologic classes from 250 tissue microarray cores from 40 patients, and 100% classification of adenocarcinoma versus normal tissue. Focusing on the glycogen depletion in dysplastic (abnormal) tissue, Shaw et al. [30] achieved accuracies of 60%-70% in separating normal from abnormal Pap smears. A back propagation neural network was used by Zhao et al. along with feature sets derived from intensity statistics and the wavelet domain; pixel-level classification demonstrated a sensitivity of 95.2%, and nuclear-level classification of 97.6% for a dataset of 40 images. Segmentation of nuclei in fluorescence imagery is presented by Lin et al. [31] and Wählby et al. [32] for 2D imagery and 3D confocal imagery. Lin et al. [31] used a recursive, tree-based algorithm, and reported accuracy of 96.3% for 10 images of rodent brains. Wählby et al. [32] used a marker-based watershed transformation, region merging, and shape-based cluster separation; an accuracy of 91%-96% was achieved for a total of 6 2D images of cervical and prostatic carcinomas.

Luck et al. [33] describe segmentation for in vivo confocal reflectance imagery of cervical tissue based on nuclear modeling, anisotropic median diffusion, Gauss-Markov random fields, and a Bayesian classifier. The authors reported a 90% match to hand-segmented nuclei with an average of 6 false positives per frame.

The gross examination and manual feature extraction for 212 liver nodules, correlation-based feature selection, and several classification schemes (including decision trees, k-Nearest Neighbor (k-NN) classification, naive Bayes, and neural networks), resulted in a 95%-100% sensitivity and specificity for diagnosis as one of 3 conditions in Ciocchetta et al. [34].

Demir et al. [35] and Gunduz et al. [36] present a nuclei segmentation algorithm for H&E stained brain biopsies using the La*b* color space and a k-means algorithm. Features extracted are based on the concept of cell graphs [36] and augmented cell graphs [35], including such features as degree and eccentricity commonly defined for graph structures. Classification of normal, inflamed, and cancerous tissue was performed by an artificial neural network, with accuracies of 96.9%-97.1% for 64 patients in [35] and 85.7%-94.0% for 12 patients in [36].

The HSV color space was used by Sammouda et al. [37] for segmentation of H&E stained lung nuclei, using a Hopfield neural network and maximum drawable circle algorithm, and nuclear radii as features. 92%-97% of cancerous nuclei were correctly detected in 16 images.

Roula et al. [38] used a multispectral dataset (33 bands) of H&E stained prostate tissue, extracted texture and mathematical morphology features, reduced dimensionality using principal components analysis (PCA), and classified using quadratic discriminant analysis. Classification error for 230 hand-picked nuclei representing 3 conditions was 5.1%. GENIE (an automated feature extraction system developed at Los Alamos National Laboratory) has been used with a multispectral dataset (31 bands) of Pap-stained urine cytology images as presented by Angeletti et al. [39]. Using a training set of 12 cases and validation sets of 17 and 8 cases, GENIE was able to discriminate between malignant and benign urothelial cells with a sensitivity of 85%-87% and specificity of 96%. Additionally, GENIE was able to correctly classify atypical urothelial cell clusters as benign or malignant (determined clinically by 1-year followup) with an AUC of 0.728.

Narrowband red images (610 nm, 621 nm) have been used for detection of laryngopharyngeal cancer [8], discrimination of cervical cancers and atypias [9], and separation of benign hyperplastic prostatic lesions from true prostatic carcinoma [10]. Additionally Brewer et al. [40] used the red channel from standard RGB light microscopy to classify epithelial and stromal (connective tissue) nuclei in ovarian tissue. In Brewer et al. [40], 7 features were hand selected from 93 karyometric (nuclear) features to discriminate cancerous and benign conditions, resulting in accuracy of 66%-78% for H&E stained sections from 20 patients. Zahniser et al. [9] used narrowband images at 621 nm (for nuclear material) and 497 nm (for cytoplasmic material) of Feulgen and Orange II stained cervical Pap smears and linear discriminant analysis at both the single-cell and cell-cluster level. Zahniser et al. [9] reported classification accuracy of 100% for normal (14 cases), 45% for benign change (11 cases), and 97% for abnormal (29 cases). Both Neheret al. [8] and Mairinger et al. [10] used the CytoSavant image analysis system from OncoMetrics, Inc. (Vancouver, BC, Canada) to extract 114 nuclear features (plus mean, maximum, minimum, and variance for each) from 610 nm narrowband images of Feulgen stained tissue, and used stepwise linear discriminant function analysis for classification; Neheret al. [8] reported sensitivity and specificity of 72.7% and 82.4% for 145 cases and Mairinger et al. [10] reported sensitivity and specificity of 92% and 95% for 240 cases.

Similarly, narrowband green images (565 nm) were used for analysis of Feulgen-stained lung tissue [20, 41] and prostate tissue [41]. Weyn et al. [20] used 82 features (plus mean and standard deviation of each), including densitometry (optical density-related), morphometry, texture, and syntactic structure analysis (SSA) (related to spatial arrangement) measures. For a dataset of 39 cases of malignant mesothelioma, 20 cases of pulmonary adenocarcinoma, and 7 cases of hyperplastic mesothelium, k-NN classification yielded accuracies of 83.9%-96.8% for discrimination of the three conditions, 79.5%-94.9% in typing malignant mesothelioma, and 60.0%-82.9% for prediction of prognosis for malignant mesothelioma [20]. Weyn et al. in [41], on the other hand, derived features from the imagery using Voronoi diagrams, Gabriel's graphs, and minimum spanning trees, all of which quantitate spatial arrangement of tissue constituents. k-NN classification yielded correct disease classification of 73.9% (51 cases), correct typing of malignant mesothelioma of 82.6% (44 cases), and correct grading of prostatic adenocarcinoma of 75.7% (38 cases).

Analysis of immunostained imagery by Weyn et al. [22] used a CD31 immunostain (highlighting endothelial cells) and Hematoxylin counterstain to quantify prognosis based on vascular patterns in colorectal, cervical, and lung tissue. Extracted features include fractal analysis, vessel-derived (some manual), syntactic structure analysis, and clinical data (manual), as well as the mean, standard deviation, skewness, and kurtosis for each feature. Prognostic accuracies using a k-NN classification were 83.3% for cervical (78 images), 70.6% for colorectal (74 cases), and 86.4% for lung (27 images).

Ballerini and Franzén [42] (2004) utilized light microscopy of breast cancer tissue with immunohistochemically stained epithelium and Feulgen-staining of the nuclei. This method used fuzzy c-means clustering and conditional dilation to segment nuclei, and a neural network for classification. Extracted features include granulometric moments, fractal analysis, and mathematical morphology. 20 cases, with 10 images per case, were analyzed with this method, resulting in 87%-93% correct classification of normal tissue, fibroadenosis (a benign condition), and ductal and lobular cancer.

Harvey et al. [43] (2003) used the GENIE automated feature extraction system for detection of cancerous nuclei in multispectral H&E stained histopathology images of breast tissue. Using a training set of 7 images and a test set of 8 images, GENIE attained an average detection rate of 82.3%-87.4% and average false alarm rate of 0.4%-15.8%.

Lee and Street [44] (2003) present a neural network-based method to automatically detect, segment, and classify breast cancer nuclei in gray-scale cytological images from fine needle aspirations (FNA) of the breast. Nuclear features include size, perimeter, smoothness, concavity, and 24 radii from each nucleus. Overall, 94.1% of nuclei were correctly delineated in a dataset of 140 images, and 94%-96% of nuclei were correctly classified as malignant.

Latson et al. [17] (2003) implemented an automated segmentation algorithm for epithelial cell nuclei based on the application of fuzzy c-means to the hue band (of HSV color space) followed by a marker-based watershed transform. Results for a dataset of 39 H&E histopathology images found 57.2%-71.6% correctly segmented nuclei, with a variation in performance for typical hyperplasia, atypical hyperplasia, cribriform ductal carcinoma in situ, and solid ductal carcinoma in situ. Clumps, poorly segmented individual nuclei, and missed nuclei were 4.5%-16.7%, 22.5%-26.3%, and 0.4%-1.4%, respectively.

van de Wouwer et al. [45] (2000) used green-filtered (565 nm) light microscopy images of Feulgen-stained breast tissue sections to extract features for k-NN classification of breast tissue. Features included densitometry, first- and second-order texture parameters, wavelets, and mathematical morphology. For a dataset of 20 normal and 63 invasive ductal carcinomas, 67.1% of nuclei and 100% of patients were classified correctly.

Herrera-Espiñeira et al. [46] (1998) used two different segmentation algorithms, one for nonoverlapping nuclei (histogram-based threshold) and one for overlapping nuclei (edge detection and ellipse fitting); the choice in algorithms was decided by the human observer based on the image at hand. Nuclear features allowed 89.4%-91.5% average accuracy in discriminating benign (47 cases) from malignant (95 cases) for Pap-stained grayscale cytology imagery.

Weyn et al. [18] (1998) used the same imagery and similar analysis to [45]. Results in this study were 76.1% accuracy in benign versus malignant classification of images and 100% accuracy for patients. Also studied here was cancer grading, with 61.5% image accuracy and 78.5% patient accuracy.

Wang et al. [15] (1997) present a method for detection of breast cancer nuclei in light microscopy images of tissue immunostained for estrogen and progesterone receptors and counterstained with Hematoxylin. This method used receptive field theory, soft thresholding, and lighting correction to segment nuclei; the classification of nuclei was based on the YUV color space and derived features (average and variance) as well as a local texture measure. For a dataset of 28 images, the authors achieved a sensitivity of 83%.

Anderson et al. [19] (1997) applied a knowledge-guided approach previously developed by Thompson et al. [47] for segmentation of cribriform gland tissue to segmentation and architectural discrimination of H&E stained ductal breast lesions. Features were computed at the glandular and lumen level. The dataset was composed of 215 images from 22 cases of ductal carcinoma in situ and 21 cases of ductal hyperplasia. Glandular features provided 63% correct image and 65% correct patient classification, lumen features provided 70% correct image and 72% correct patient classification, combined features provided 83% correct patient classification.

Overall, for breast cancer image analysis, there is a range in classification accuracy. In general, however, the accuracy increases as the classification progresses from individual nuclei to image-level to patient-level. In particular, for previous studies on H&E imagery, the image-level classification accuracy is less than 90%.

Table 1 shows performance of general state-of-the-art histo/cytopathology image analysis. Table 2 shows performance of state-of-the-art histo/cytopathology image analysis for breast cancer.

Accordingly, an object of the present invention is to quantitatively define characteristics of breast cancer to better coordinate clinical care of women presenting breast masses.

A further object of the present invention is quantitative cytologic and histologic analysis of breast biopsy specimens, using expert (pathologist) input to guide the classification process.

BRIEF SUMMARY OF THE INVENTION

The present invention includes Quantitative Object and spatial Arrangement-Level Analysis (QOALA) of tissue using expert (pathologist) input to guide the classification process.

The method of the present invention involves a number of features. First, the utility of multispectral imagery for classification and segmentation tasks in histopathology imagery are quantitatively analyzed. Second, object-level segmentations for several histologic classes are developed, as well as a quantitative object-level segmentation metric. Third, a comprehensive set of both object- and spatial-level features are extracted, which are used in a feature selection framework for classification of objects and imagery. In addition, the concepts of object-level features to higher-level image objects are extended, the utility of these high-level objects for image classification are analyzed, and a probabilistic graph-based model of imagery is detailed.

The present invention yields very good object- and image-level classification performances. More specifically, the object-level features as implemented in the present invention are versatile and general enough to elicit important information from even imperfectly segmented objects. Additionally, the use of non-nuclear features, namely features of cytoplasm and stroma, have good classification performance, often exceeding that of nuclei. Higher-level features display a potential to increase both object- and image-level classification performance.

An aspect of the invention is a method for analyzing an image of tissue, comprising the steps of classifying one or more biological materials in said tissue into one or more identified classes on a pixel-by-pixel basis, and segmenting the identified classes to agglomerate one or more sets of identified pixels into segmented regions. Typically, the one or more biological materials comprises nuclear material, cytoplasm material, and stromal material.

The method further allows a user to mark up the image subsequent to the classification to re-classify said materials. Preferably, the markup is performed via a graphic user interface to edit designated regions in the image.

In a preferred embodiment, the image markup is used to develop one or more classifiers for specific classes of materials, wherein the classifiers are used to classify materials in subsequent imaging. In addition, the method may further include displaying the segmented regions, and allowing the user to markup the image to re-segment the identified classes.

In another embodiment, one or more algorithms are used to classify and segment the biological materials, wherein the image markup is used as input for the algorithms.

The method may further include additional iterations of performing object-level classification of the segmented regions (e.g. distinguishing segmented nuclei as cancerous or non-cancerous based on one or more predetermined object-level classifiers), and using the object-level classification as input for cellular-level segmentation (e.g. grouping nuclear and cytoplasmic material into identified cells).

In one embodiment, segmenting the identified classes comprises applying a plurality of segmentation algorithms, each segmentation algorithm providing a segmentation output, and the method further includes applying a segmentation metric to quantitatively compare the outputs of the individual segmentation algorithms, and selecting an output based on the segmentation metric comparison. In a preferred mode, the segmentation metric is a function of: number of segmented regions; size and shape of the region of pixels missed; size and shape of excess pixels; fraction of nuclei detected; and number of extra segmented regions. For example, the segmentation metric is a function of the equation:

$$P = \frac{1}{N_D} \sum_{i=1}^{N_D} \max\left(0, \left[1 - \alpha_1 \frac{SR-1}{\delta_{SR}} - \alpha_2 \frac{1}{1.75}\left(\frac{PM}{GT} + \frac{2QS_{PM}}{GT}\right) - \alpha_3 \frac{1}{1.75}\left(\frac{EP}{GT} + \frac{2QS_{EP}}{GT}\right)\right]\right) \cdot \left(1 - \alpha_4 \frac{N - N_D}{N}\right) - \alpha_5 \frac{ER}{N \cdot \delta_{ER}}$$

wherein $0 \leq \alpha_i \leq 1$, $i = 1, \ldots, 5$.

and wherein N is the number of ground truth nuclei in a user markup, $N_D$ is the number of nuclei detected by the segmentation algorithm, SR is the number of segmented regions overlapping the current ground truth nucleus, $\delta_{SR}$ is the upper limit for the number of segmented regions, PM is the number of pixels missed, GT is the number of pixels in the ground truth markup, $QS_{PM}$ is the quadrant sum of the pixels missed, EP is the number of excess pixels, $QS_{EP}$ is the quadrant sum of excess pixels, ER is the number of excess segmented regions, and $\delta_{ER}$ as the fraction of total ground truth nuclei allowed as excess regions.

In yet another embodiment, classifying one or more biological materials comprises classifying cytoplasm materials and stroma materials by subtracting out pixels related to background and nuclei.

Another aspect is a machine readable medium on which are provided program instructions for analysis of an image, the program instructions comprising: program code for receiving a cell image showing the biological components of one or more cells; program code for classifying on a pixel-by-pixel basis one or more biological components in the tissue into one or more identified classes, and program code for segmenting the identified classes to agglomerate one or more sets of identified pixels into segmented regions of the cell image to obtain a segmented digital image.

In one embodiment of the current aspect, program code is included for extracting one or more parameters from the segmented digital image to characterize the nucleus, cytoplasm or stroma of at least one of the cells of the cell image.

In another embodiment, program code is included for inputting the user markup as training data and incorporating machine learning using the training data to develop one or more classifiers for specific classes of components, wherein the one or more classifiers are used to classify components in subsequent imaging. A graphical user interface may be used to allow user markup of the image subsequent to the classification to re-classify the components.

In another embodiment, program code is included for user markup of the image to re-segment the identified classes.

In yet another embodiment, program code is included for allowing additional higher-level segmentation and classification iterations, e.g. higher-level classification comprises object-level classification of the segmented regions, and using the object-level classification as input for cellular-level segmentation.

The program code may be configured to apply a plurality of segmentation algorithms, each segmentation algorithm providing a segmentation output, along with program code having a segmentation metric to quantitatively compare the outputs of the individual segmentation algorithms, and for selecting an output based on the segmentation metric comparison.

Another aspect is a method for imaging tissue, including the steps of: providing a digital cell image showing the biological components of one or more cells, providing a graphical user interface allowing a user to markup the image for classification and segmentation; inputting, as training data, the image markup to build one or more classifiers; based on the one or more classifiers, classifying one or more biological materials in the tissue into one or more identified classes on a pixel-by-pixel basis; and segmenting the identified classes to agglomerate one or more sets of identified pixels into segmented regions.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 1A-1D illustrate exemplary cytopathology and histopathology images.

Figure 3:
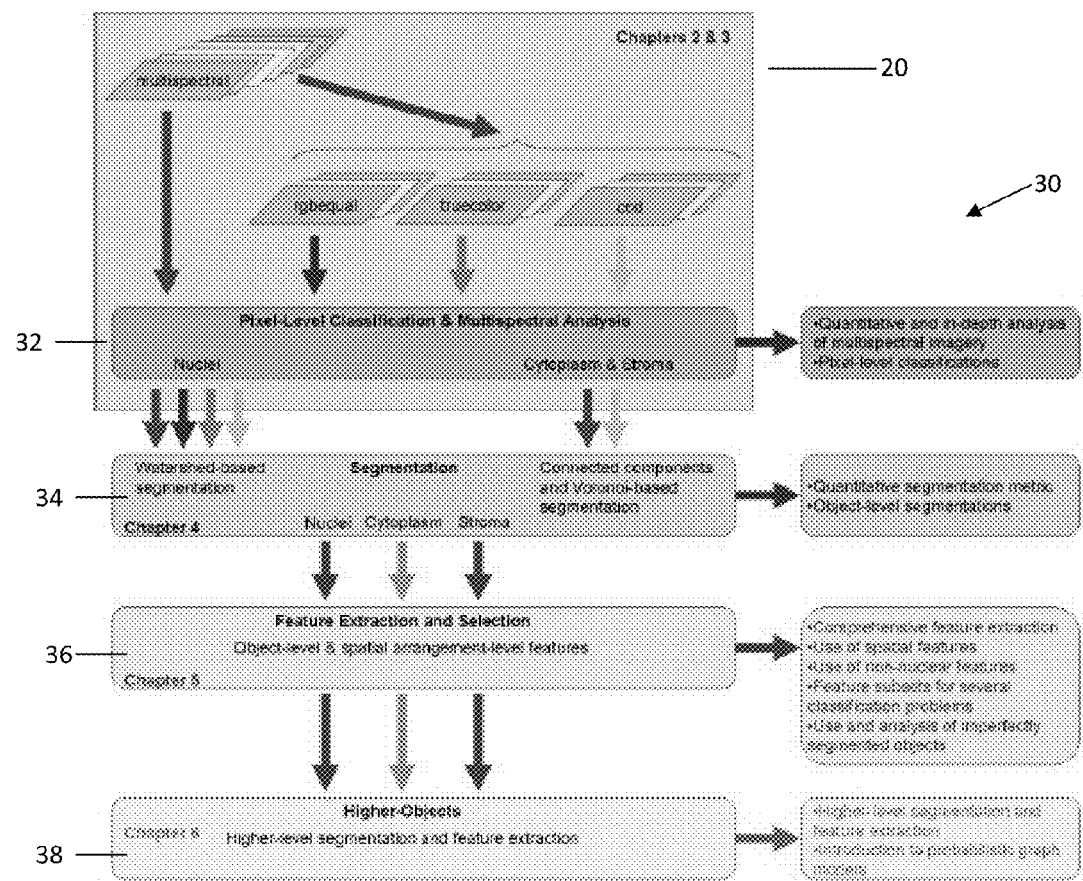

FIG. 3. Illustrates a flowchart for image analysis steps in accordance with the present invention.

Figure 4:
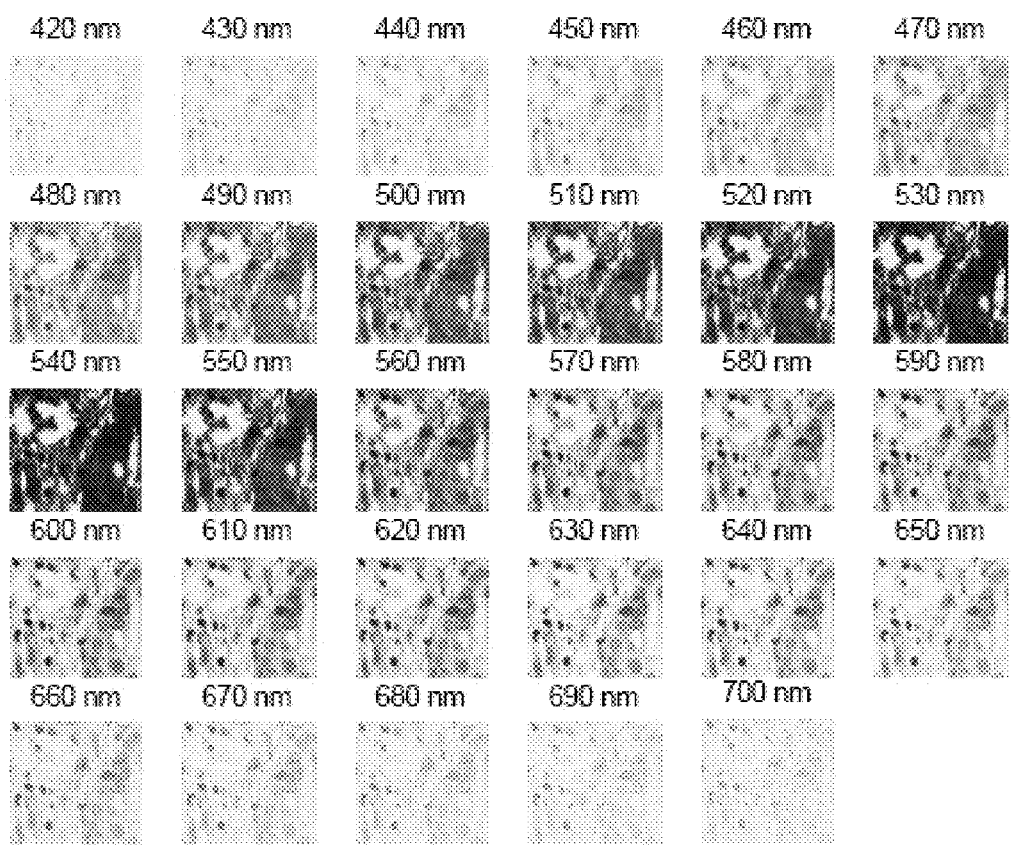

FIG. 4 shows an exemplary multispectral image stack

FIGS. 5A-5E are RGB representations of the multispectral stack in FIG. 4.

Figure 6:
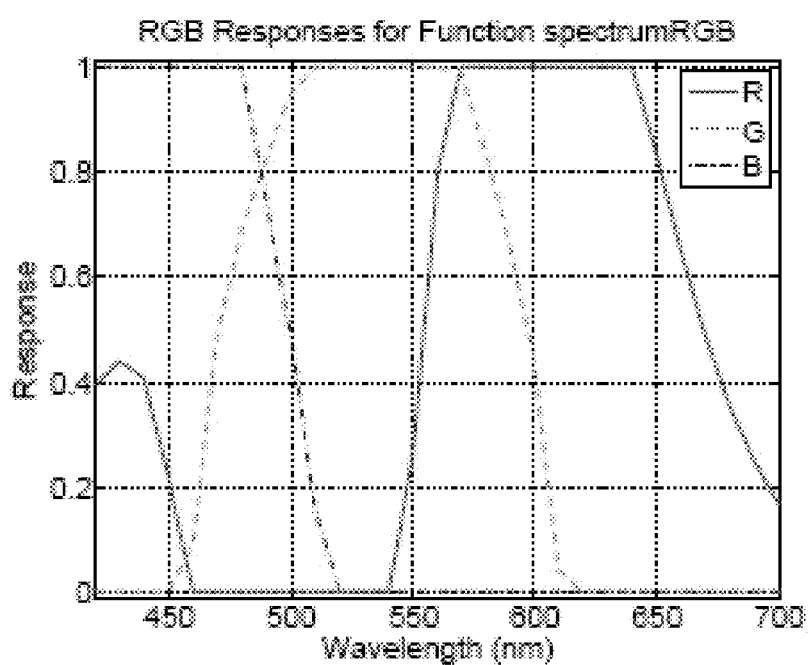
Figure 13:
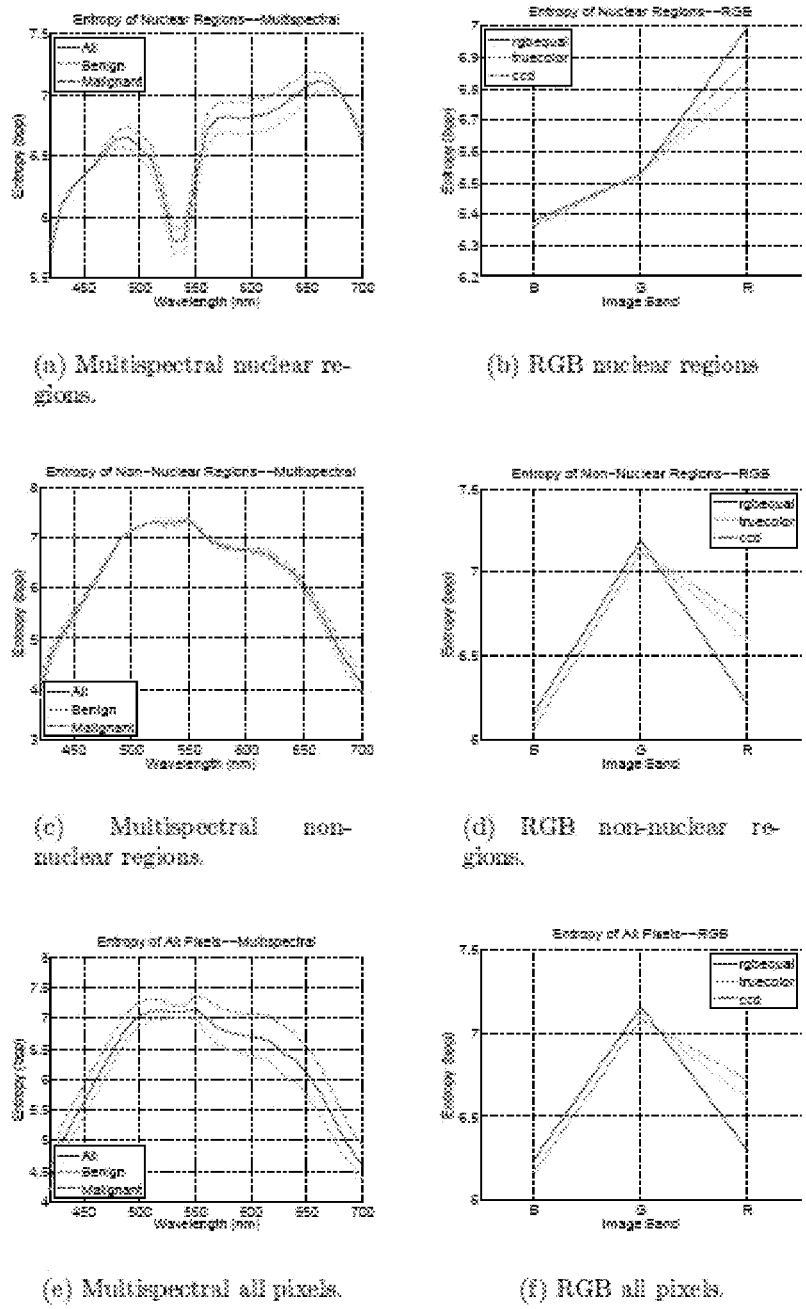

FIG. 6 is a plot of RGB responses for the MatlabCentral function spectrumRGB.

FIGS. 7A-7F are plots of average P, DR, and FAR using all image bands for classification of nuclei pixels.

FIGS. 8A-F are plots of performance, DR, and FAR on single multispectral bands for classification of nuclei pixels.

FIGS. 9A-F are plots of Performance, DR, and FAR on single RGB bands for classification of nuclei pixels.

FIGS. 10A-C are Scatter plots of nuclei versus non-nuclei.

FIGS. 11A-B are plots of FLDA coefficients

FIGS. 12A-B are plots of spectral bands chosen in AFE solutions

FIGS. 13A-F are plots of entropy of images/image regions.

Figure 14:
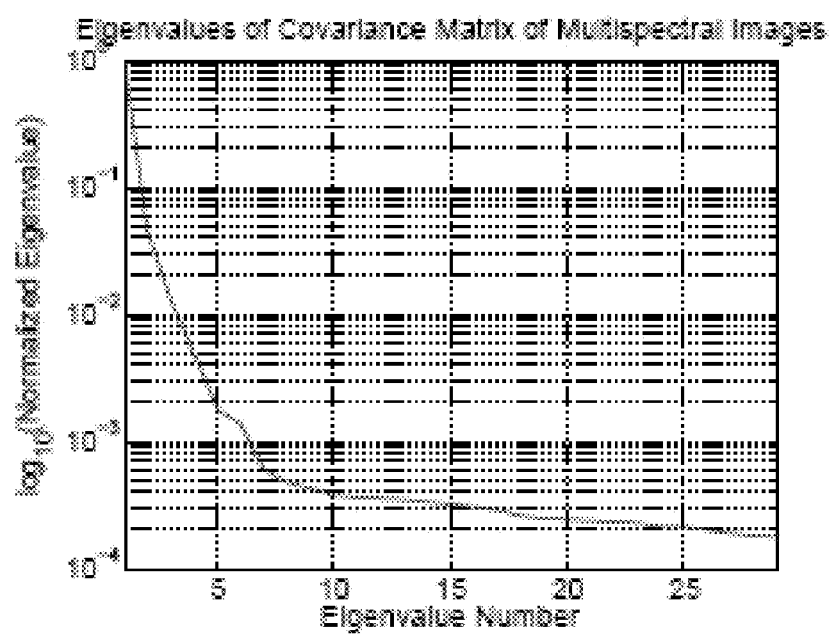
Figure 15:
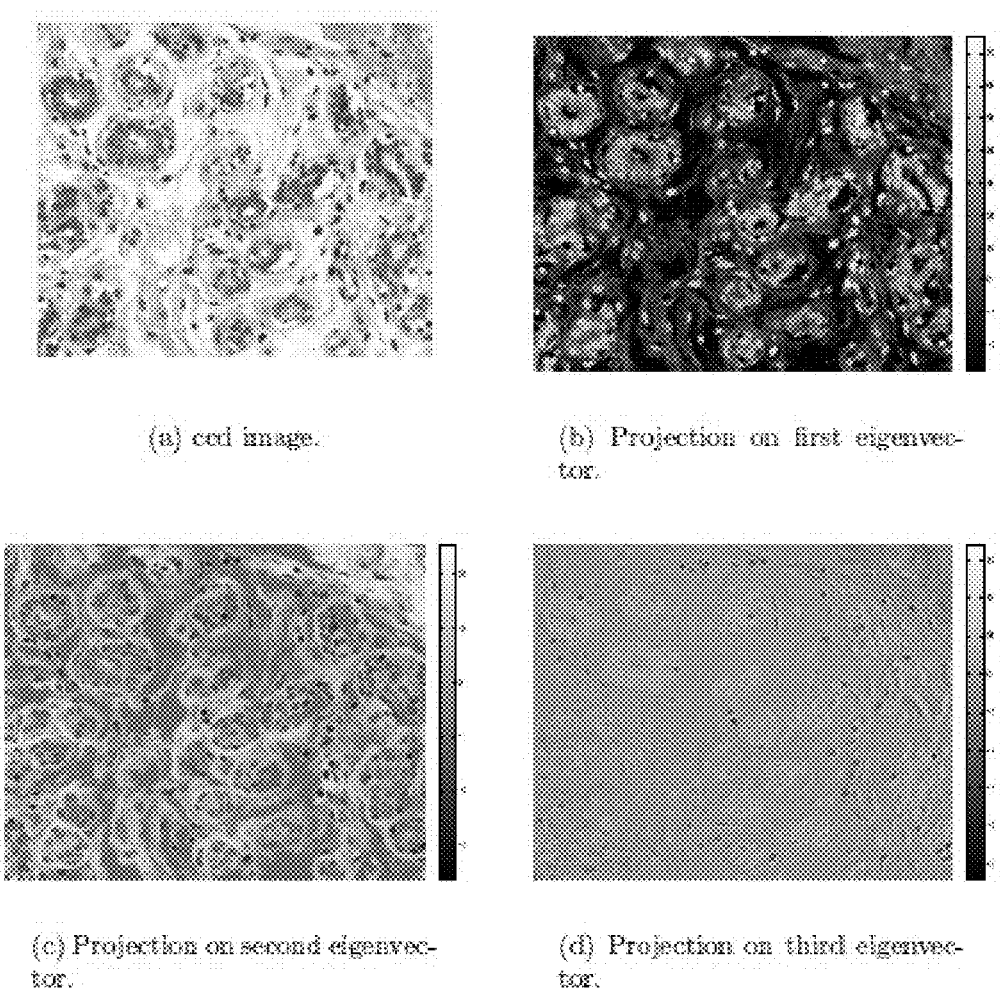
Figure 16:
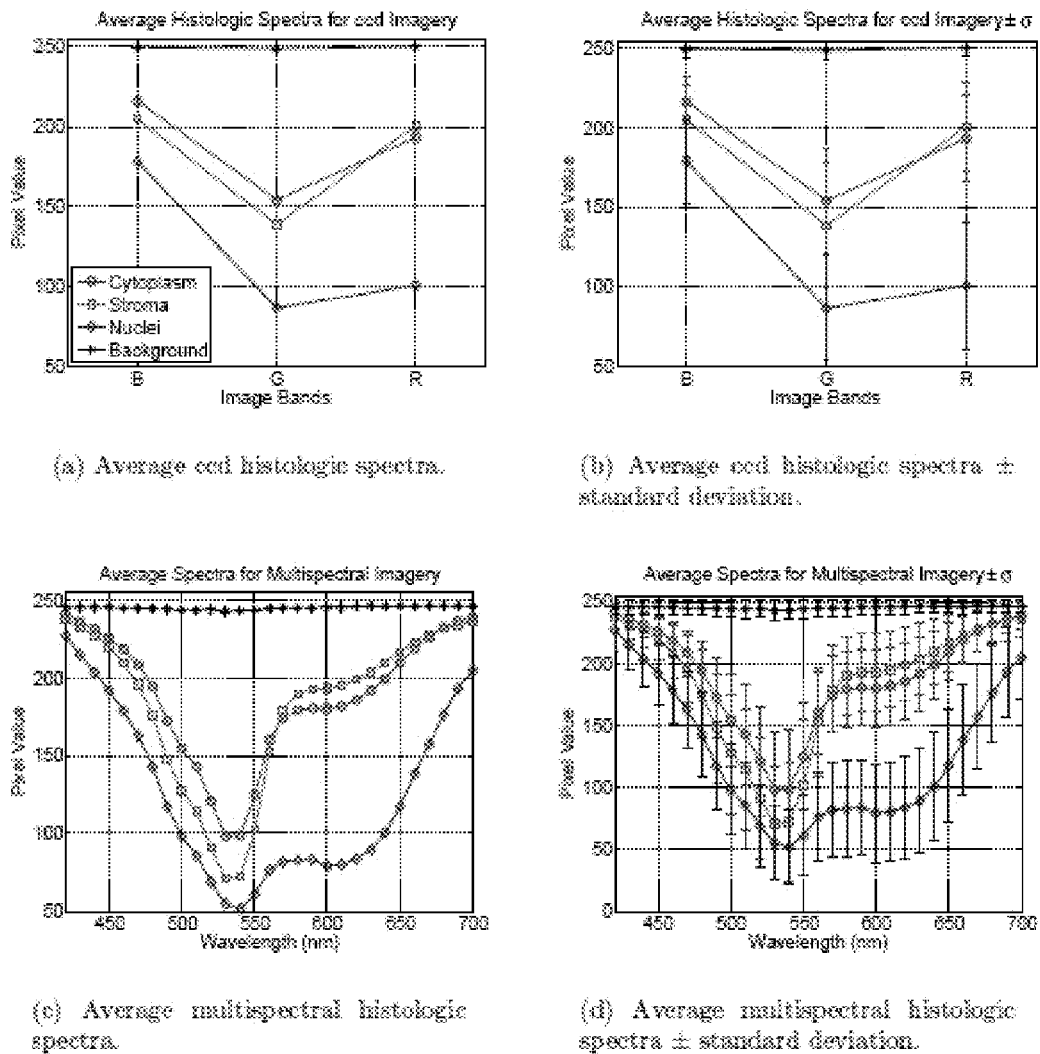

FIG. 14 is a logarithmic plot of PCA eigenvalues.

FIGS. 15A-D illustrate the projection of an image onto first three eigenvectors.

FIGS. 16A-D illustrate multispectral and ccd average histologic spectra.

FIGS. 17A-C are exemplary images of stroma and cytoplasm.

FIGS. 18A-B illustrate Gabor output.

FIGS. 19A-H show the Genie Pro 2-class algorithm using multispectral imagery.

FIGS. 20A-D show the Genie Pro 2-class algorithm using multispectral imagery.

FIGS. 21A-H show the Genie Pro 2-class algorithm using ccd imagery.

FIGS. 22A-D show the Genie Pro 2-class algorithm using ccd imagery.

FIGS. 23A-E are plots illustrating the performance of the QS metric.

Figure 24:
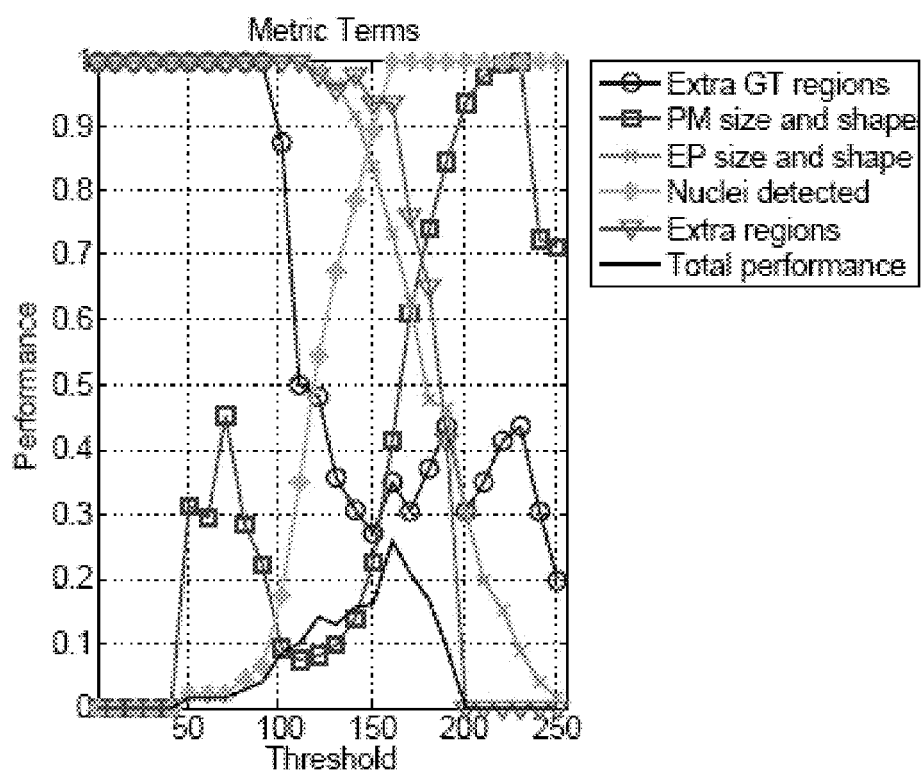

FIG. 24 is a plot of the segmentation metric variation versus segmentation quality.

Figure 25:

FIG. 25 illustrates the application of the Quadrant Sum (QS) and size metrics to an example silhouette FIGS. 26A-D are plots showing the comparison of the QS metric and Hausdorff distance FIGS. 27A-C Illustrate the image markup process for first level segmentation.

Figure 28:
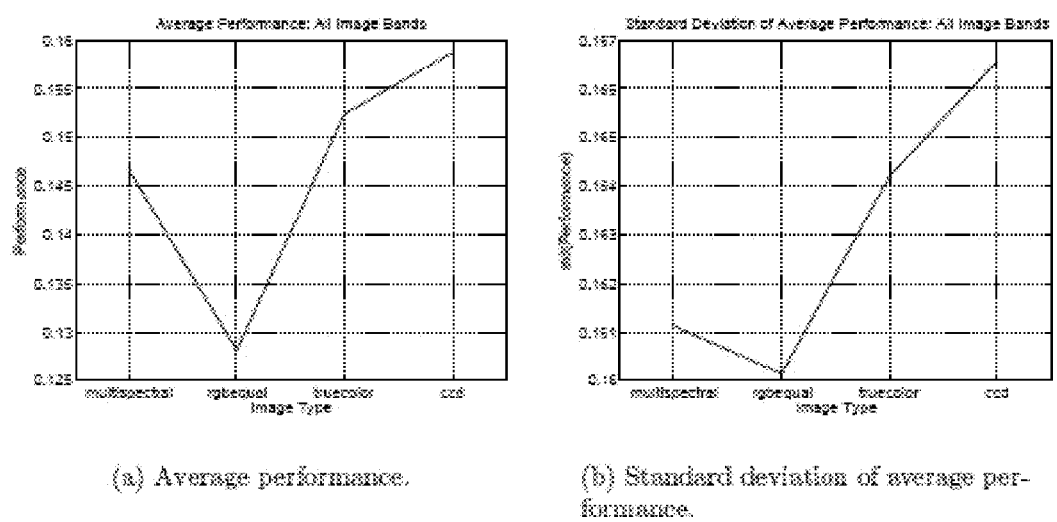
Figure 29:
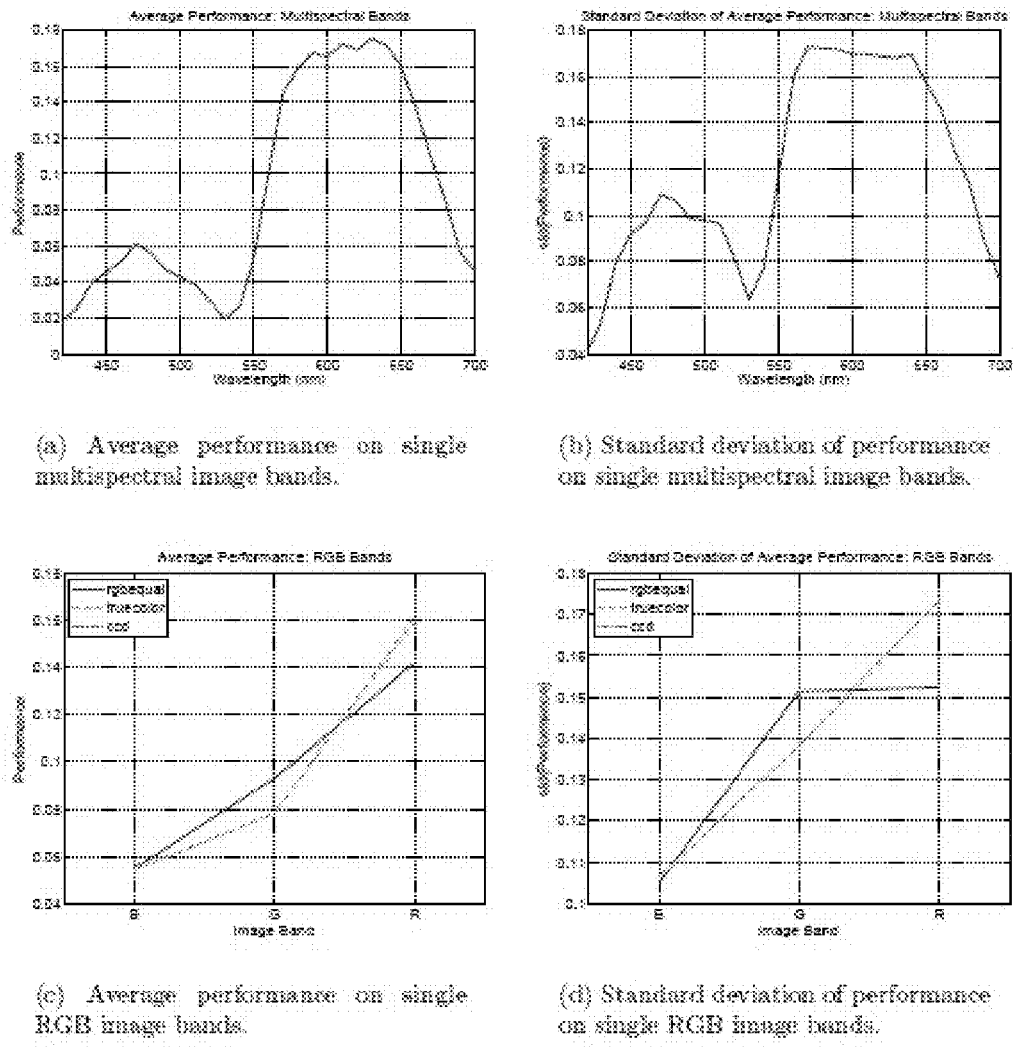

FIGS. 28A-B illustrate WSCDT segmentation performance of entire image stacks.

FIGS. 29A-D illustrate WSCDT segmentation performance on single image bands.

Figure 30:
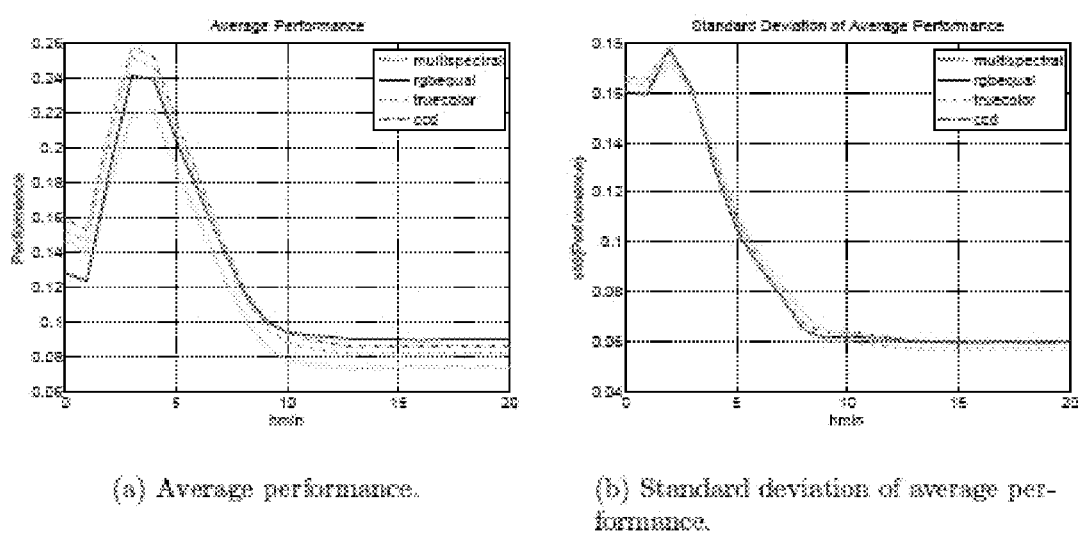

FIGS. 30A-B illustrate WSHmin segmentation performance on image stacks.

FIGS. 31A-E illustrate the value of WSHmin performance metric terms for different imagery.

FIGS. 32A-D illustrate example WSHmin segmentations.

FIGS. 33A-C illustrate pattern spectra of dataset images.

Figure 34:
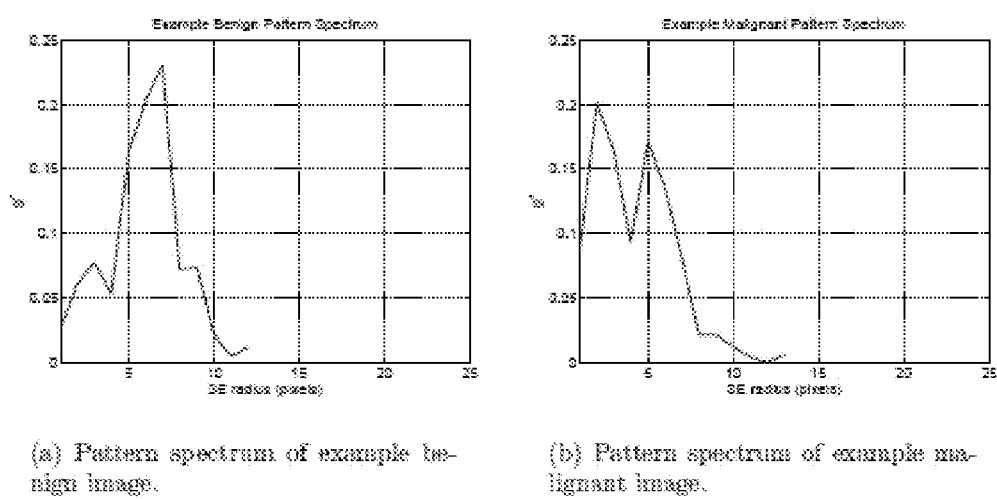

FIGS. 34A-B illustrate pattern spectra of example images.

FIGS. 35A-L illustrate sample residue images.

Figure 36:
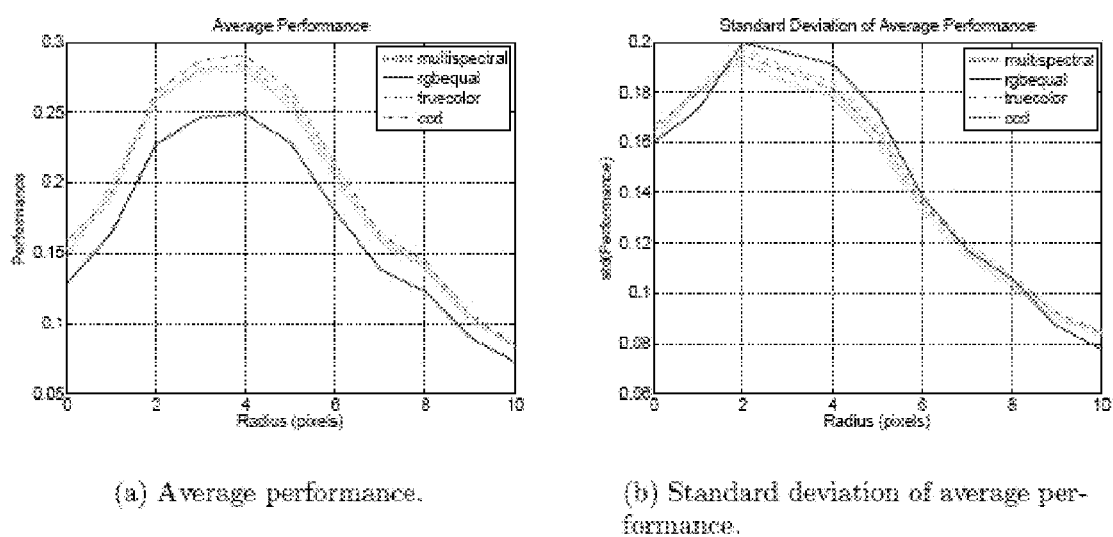

FIGS. 36A-B show WSGran segmentation performance.

FIGS. 37A-E are plots of the value of WSGran performance metric terms on different imagery.

FIGS. 38A-D are example WSGran segmentations.

Figure 39:
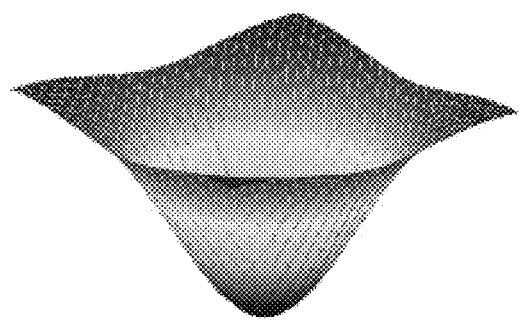

FIG. 39 illustrates the Laplacian of Gaussian filter.

Figure 40:
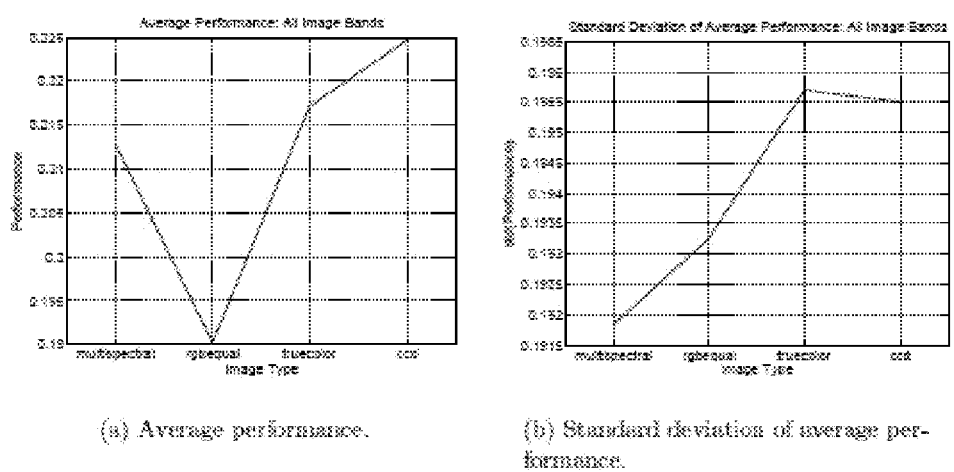

FIGS. 40A-B show WSBlob segmentation performance of entire image stacks.

FIGS. 41A-B are example WSBlob segmentations.

FIGS. 42A-B are illustrative examples of Concavity-Concavity (CC) and Concavity-Line (CL) alignment metrics for the Kumar method.

Figure 43:
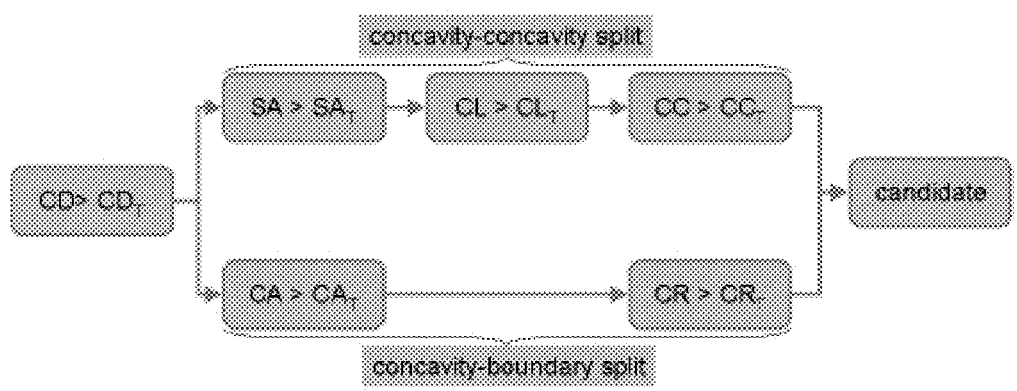

FIG. 43 shows a flowchart of the candidate split line selection process for the Kumar method.

Figure 44:
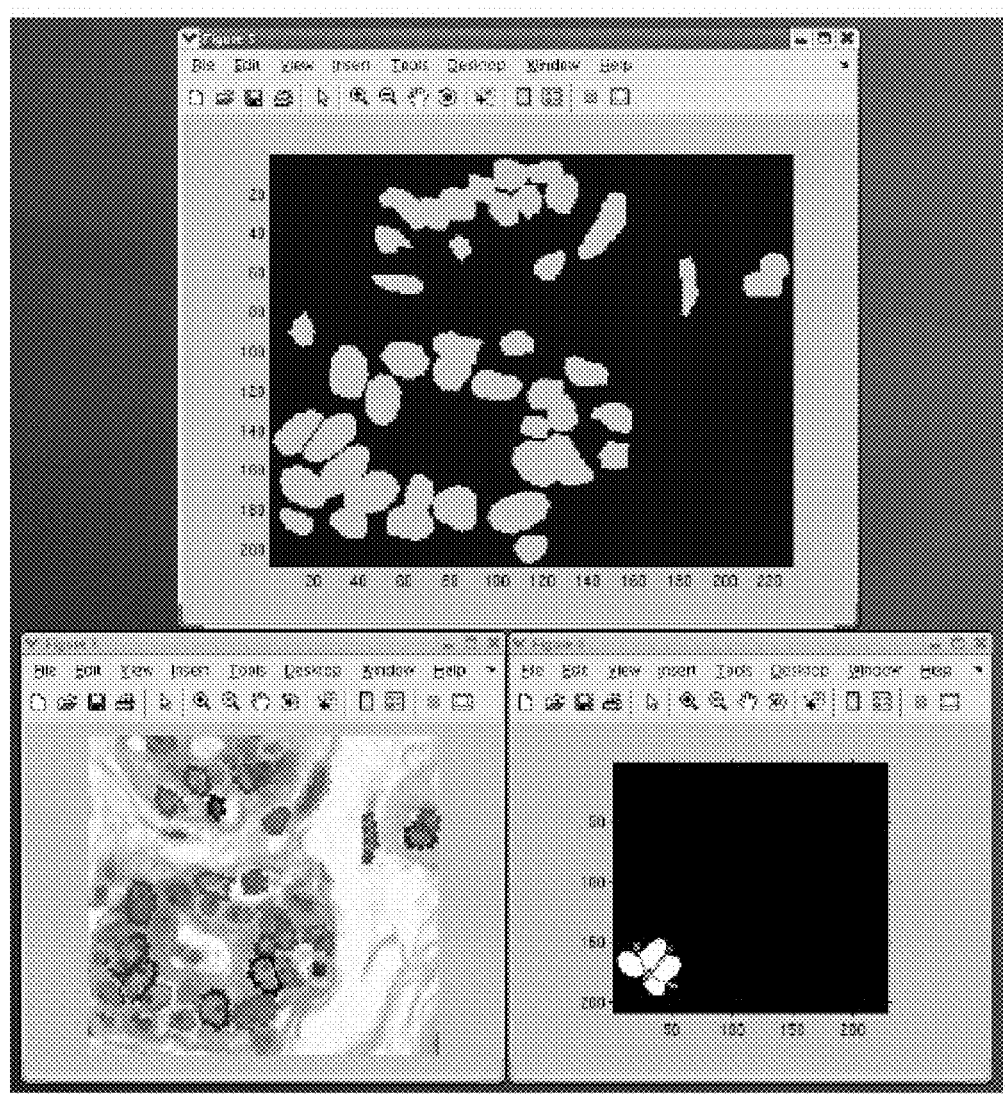

FIG. 44 shows screenshots of the Kumar ground truth markup process.

Figure 45:
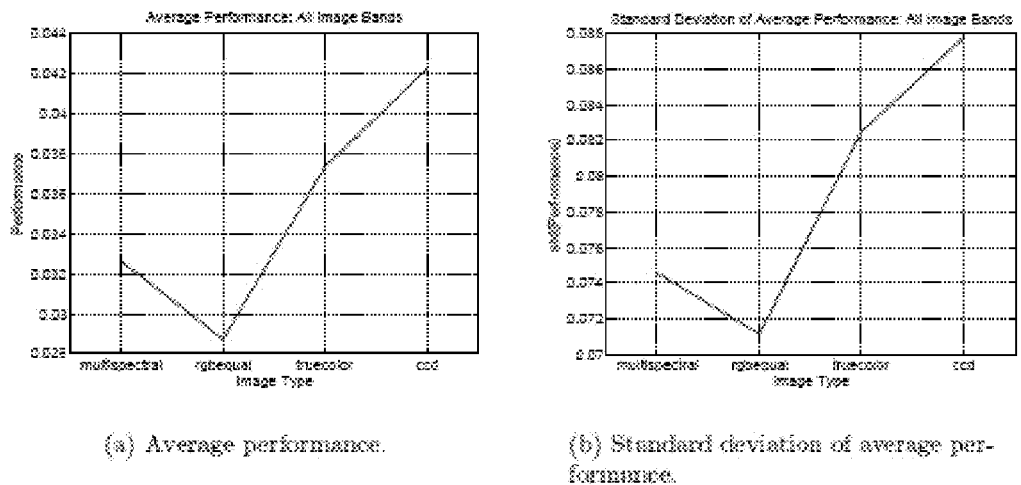

FIGS. 45A-B illustrate Kumar segmentation performance.

Figure 46:
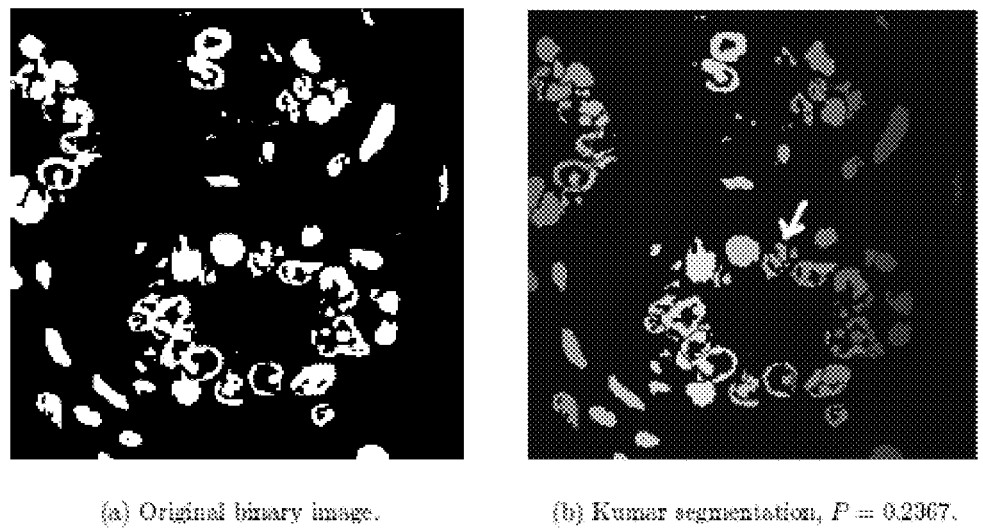

FIGS. 46A-B illustrate examples of Kumar segmentation.

Figure 47:
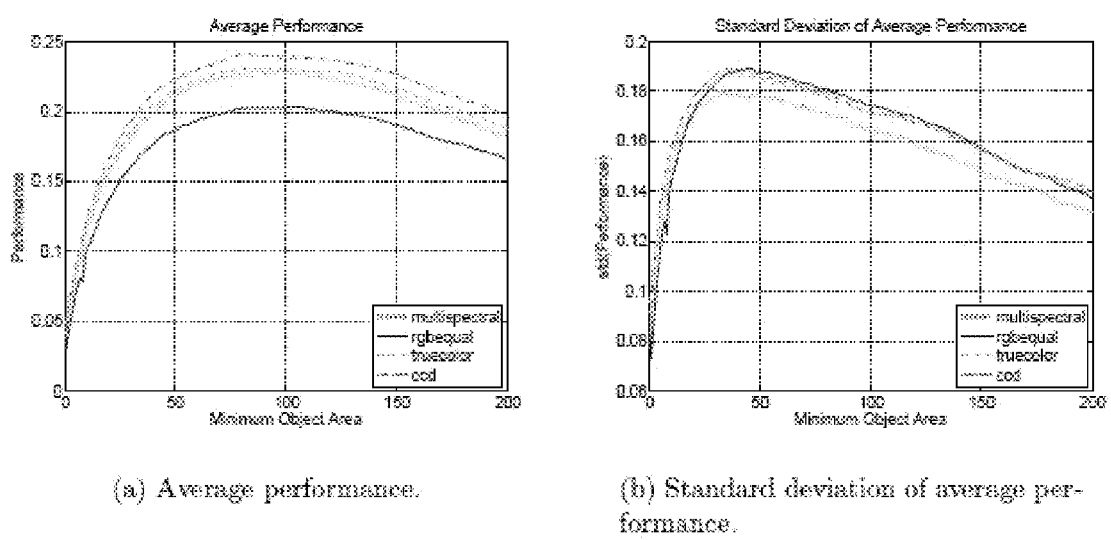

FIGS. 47A-B show WSCM segmentation performance.

FIGS. 48A-E show the value of WSCM performance metric terms for different imagery.

FIGS. 49A-D illustrate example WSCM segmentations.

FIGS. 50A-F illustrate example ideal segmentations.

FIGS. 51A-D illustrate example cytoplasm and stroma segmentations.

Figure 52:
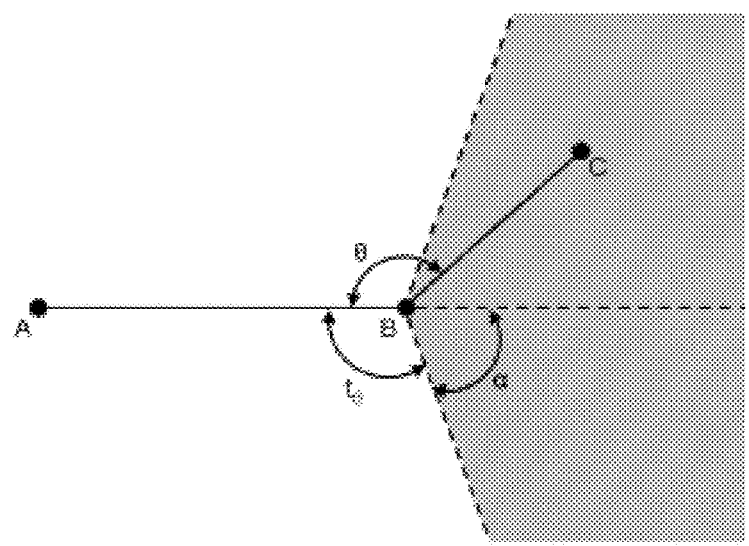
Figure 56:
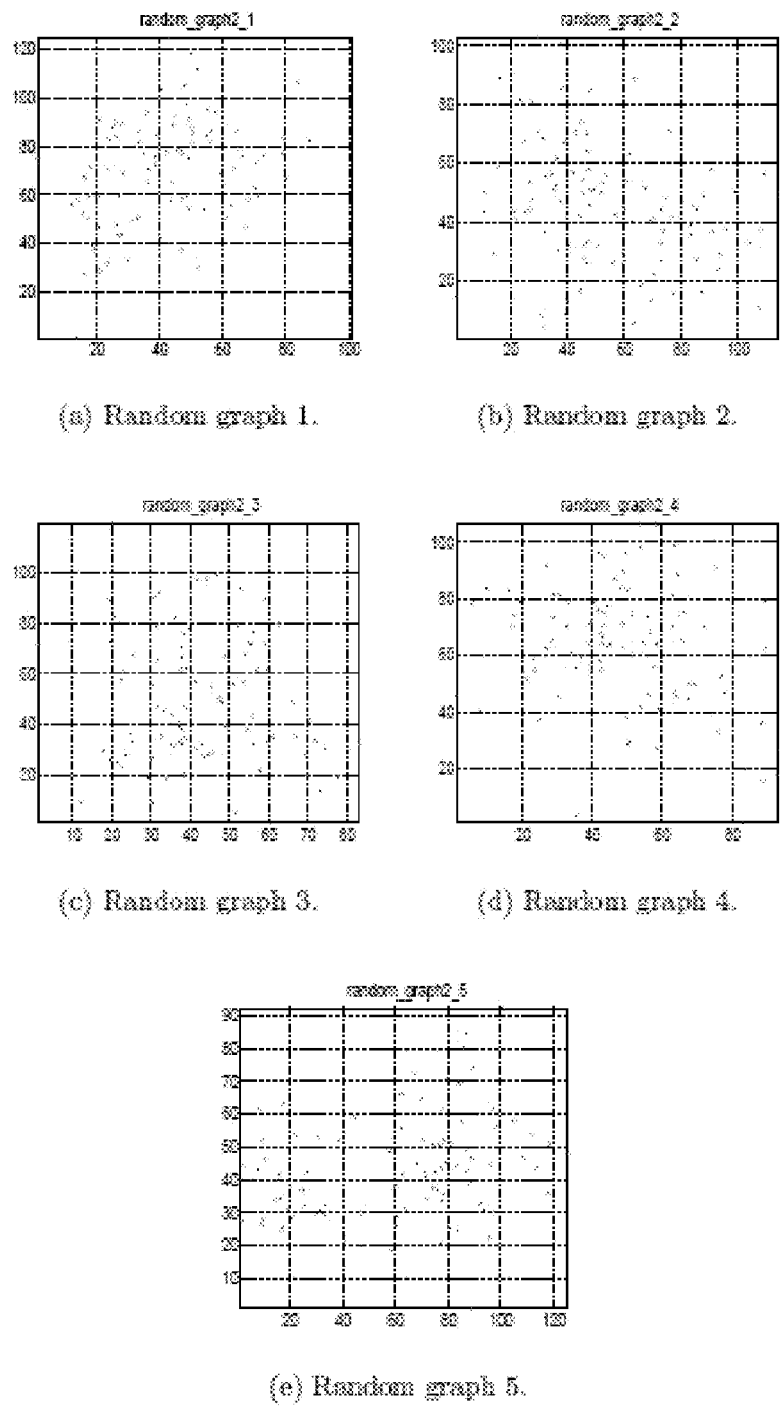
Figure 57:
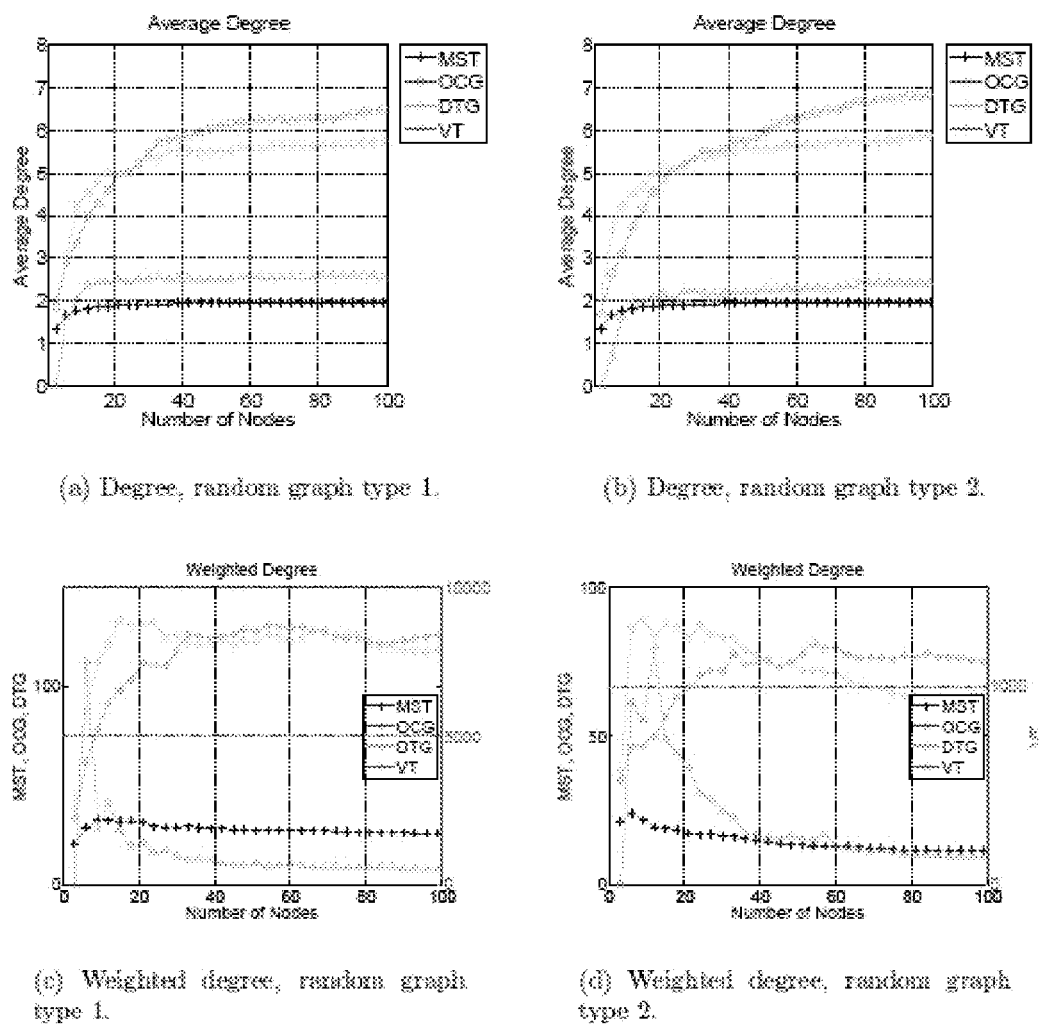
Figure 57:
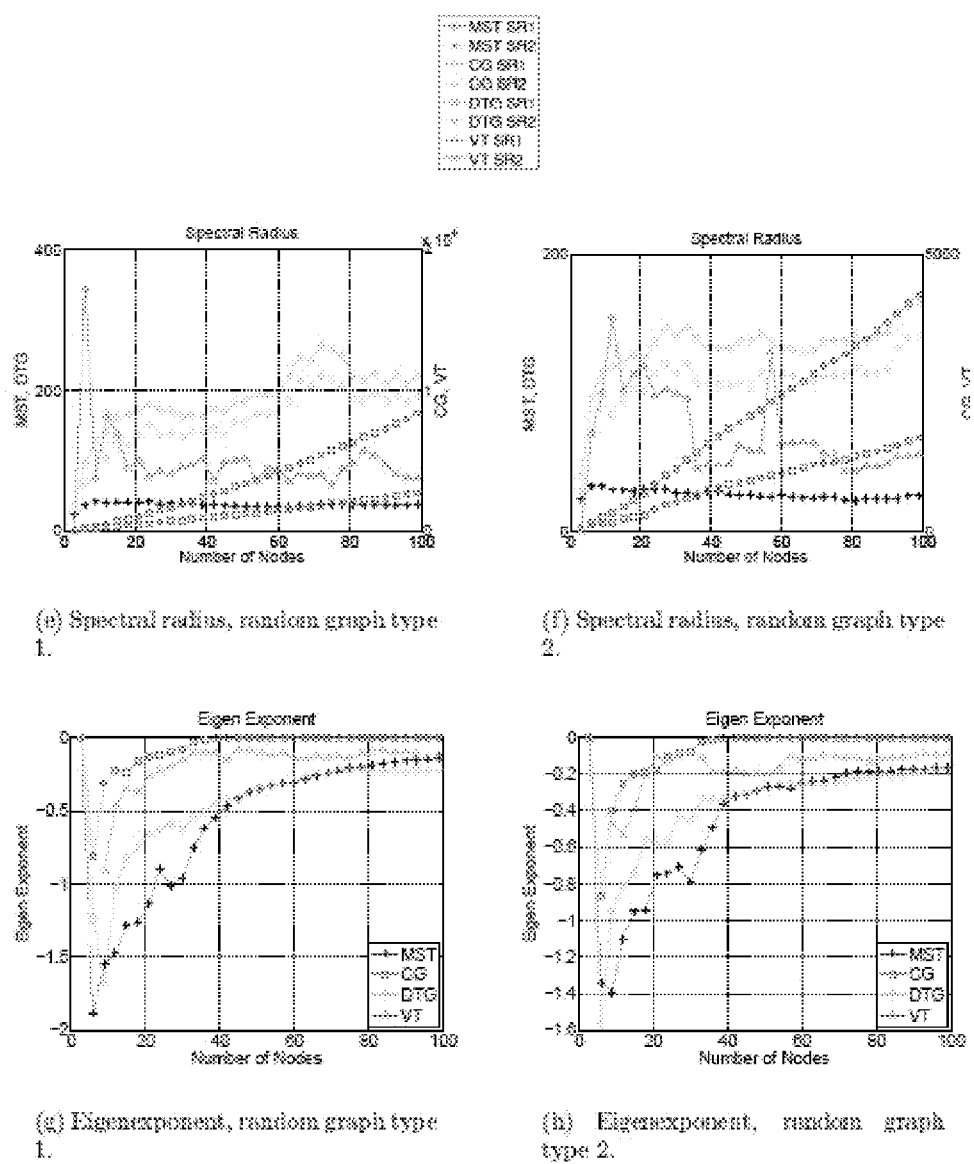
Figure 59:
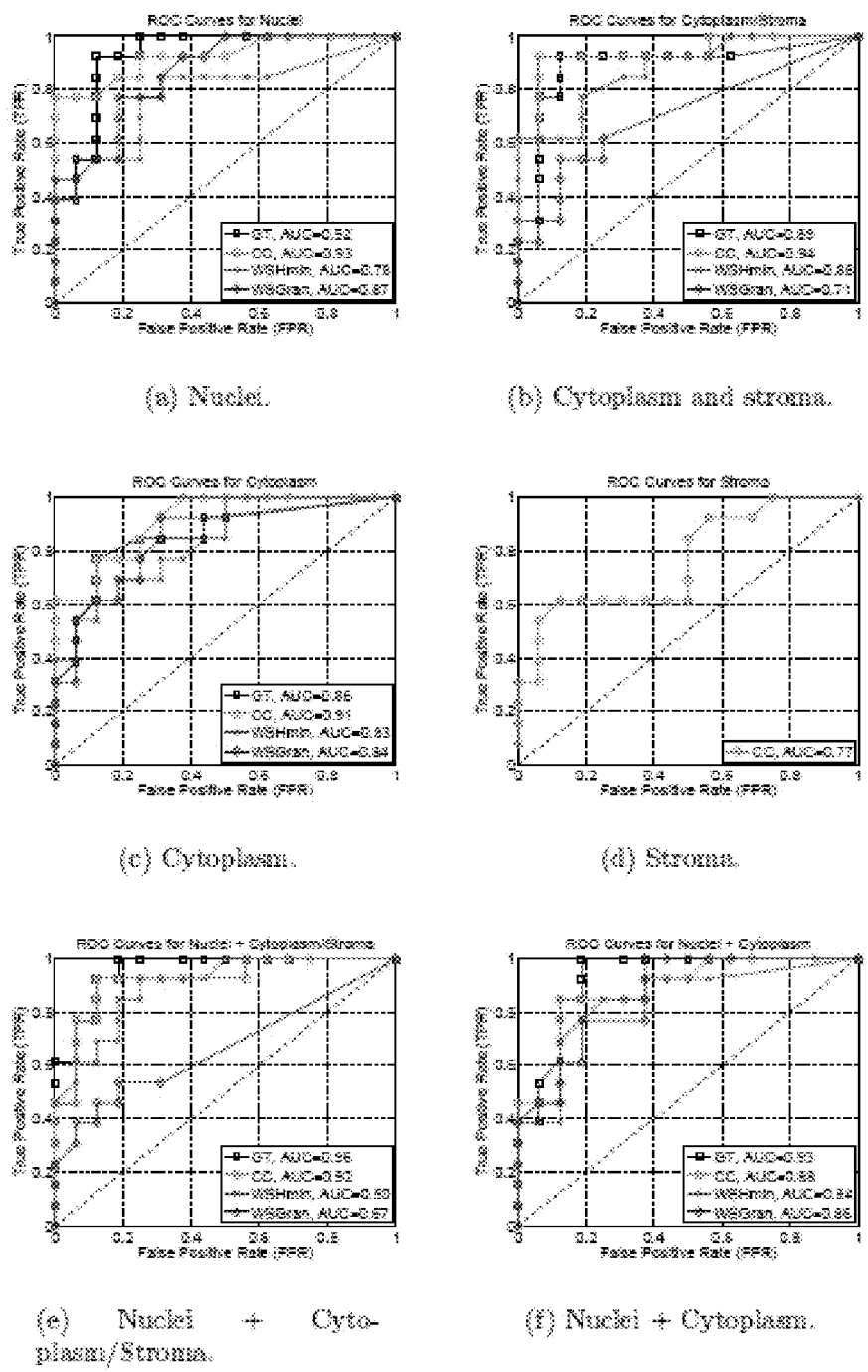
Figure 60:
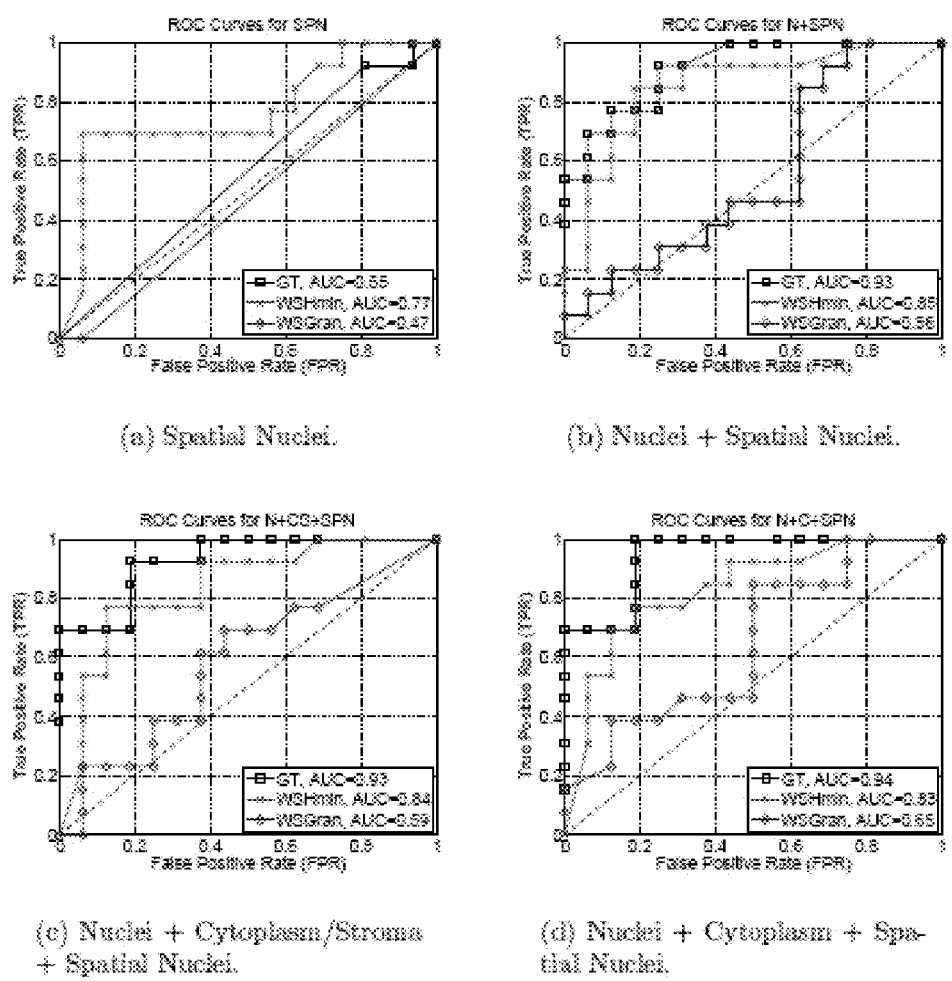

FIG. 52 is a diagram illustrating the O'Callaghan direction constraint.

FIGS. 53A-D are example graph and tree structures.

FIGS. 54A-B illustrate region-based spatial features.

FIGS. 55A-E illustrate random graphs, type 1.

FIGS. 56A-E illustrate random graphs, type 2.

FIGS. 57A-L illustrate random graph features.

FIGS. 58A-F illustrate different levels of visual information.

FIGS. 59A-F are ROC curves for OS image-level performance.

FIGS. 60A-D are ROC curves for OS spatial-level performance.

Figure 61:
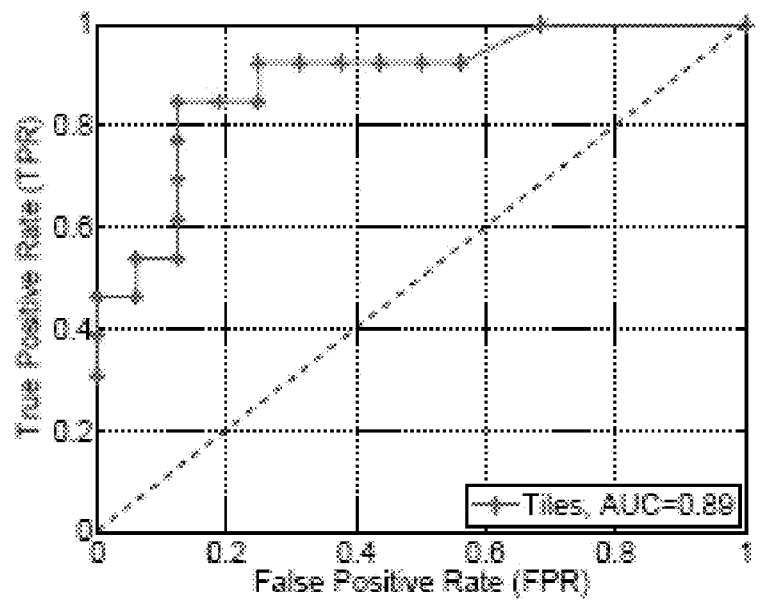

FIG. 61 is a ROC curve for tiles.

Figure 62:
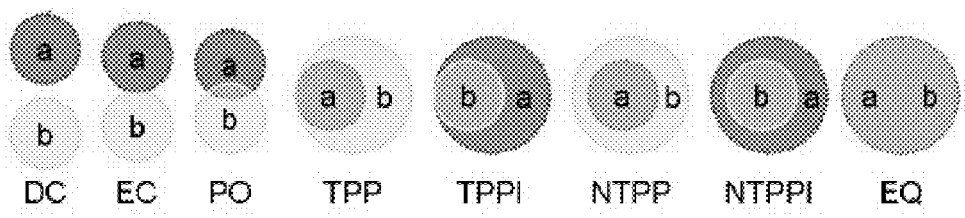

FIG. 62 illustrates the eight base relations of RCC8.

Figure 63:
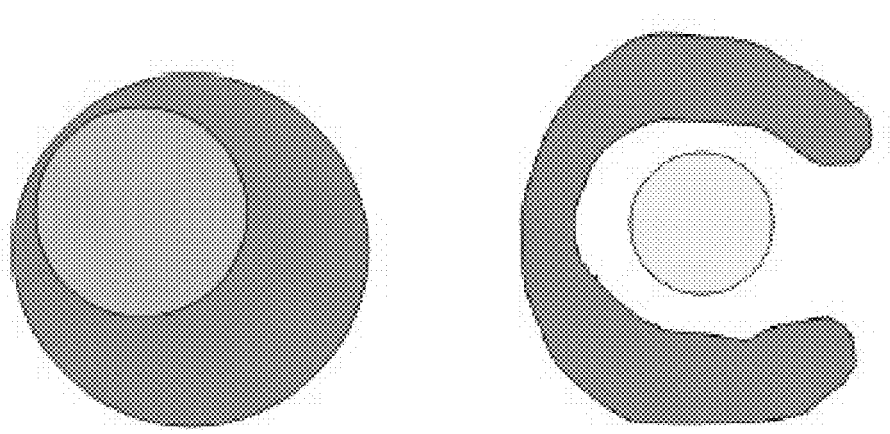

FIGS. 63A-B illustrate higher-level spatial reasoning using RCC8.

Figure 64:
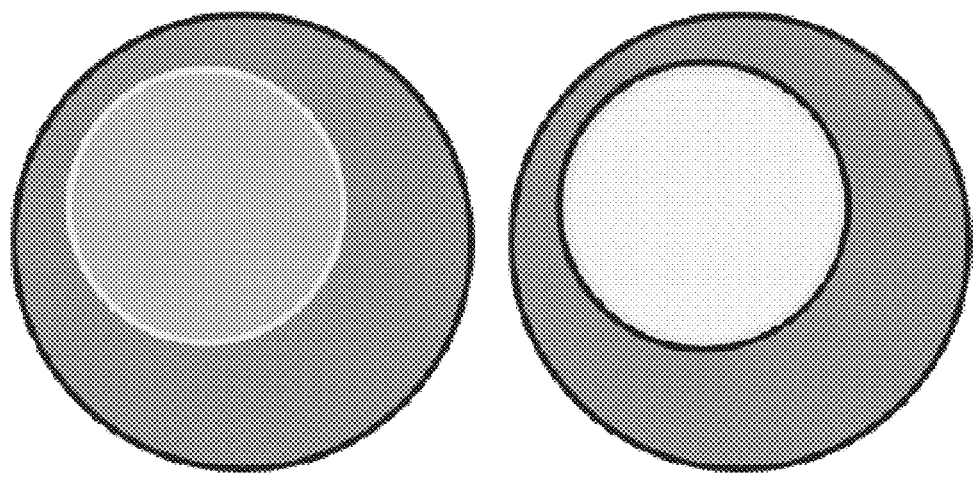

FIGS. 64A-B illustrate proper part versus externally connected.

FIGS. 65A-C show histograms of RCC8 relations between histologic entities.

FIGS. 66A-F show histograms of RCC8 relations between histologic entities, benign and malignant.

FIGS. 67A-B illustrate "histology" images.

Figure 67:
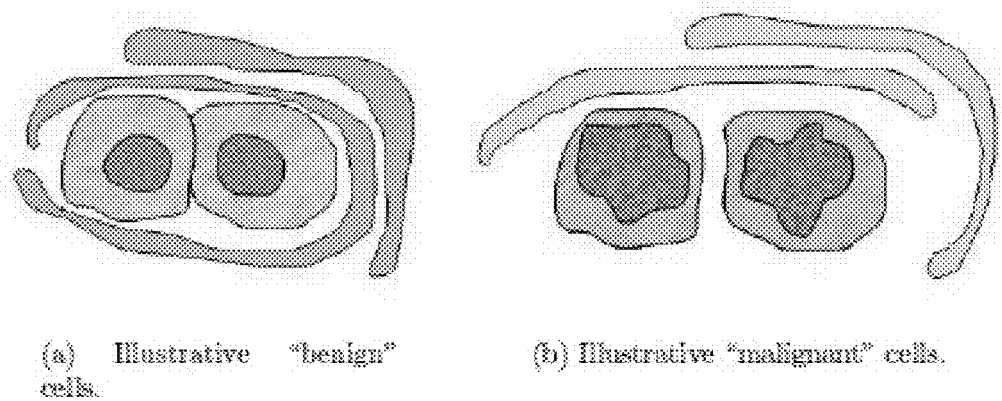
Figure 68:
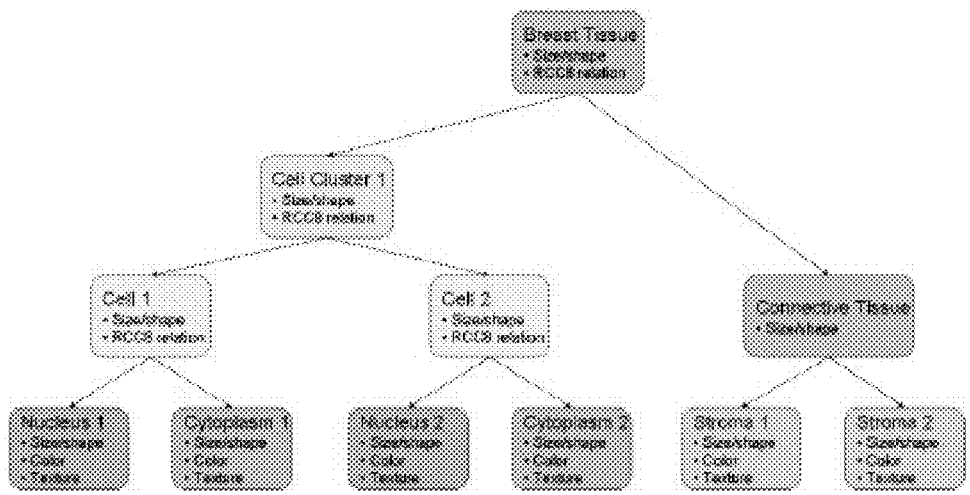
Figure 69:
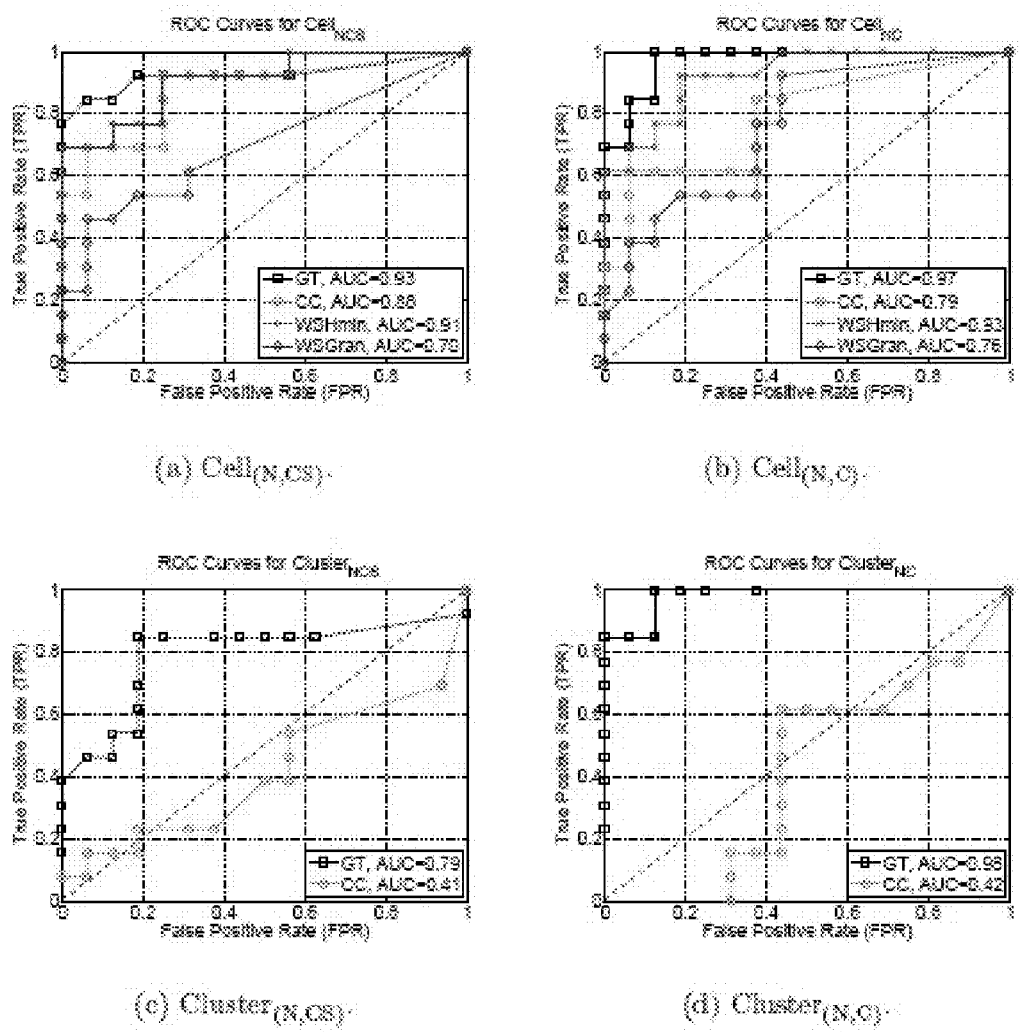

FIG. 68 is a diagram of example hierarchy for the images in FIG. 67.

FIGS. 69A-D illustrate ROC curves for OS image-level performance for high-level objects.

Figure 70:
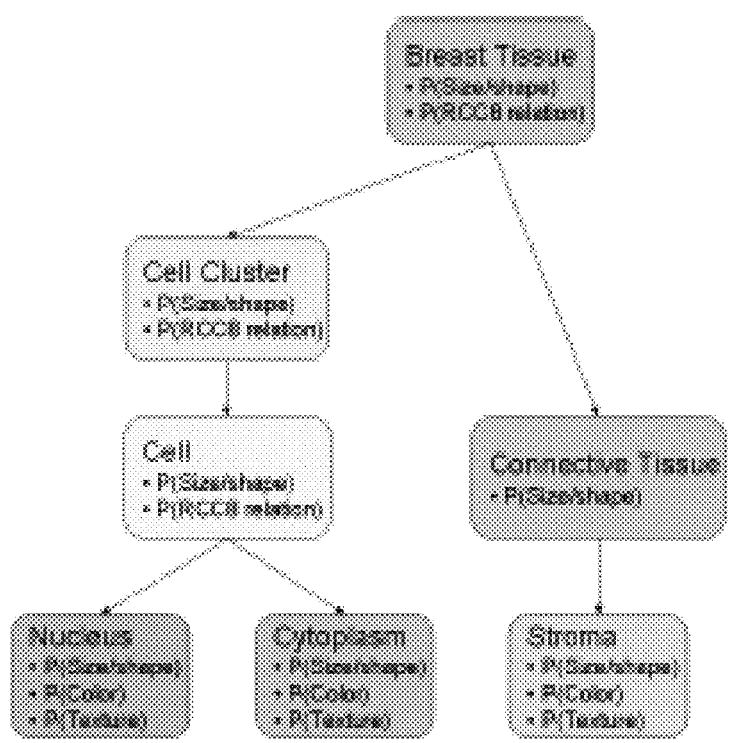

FIG. 70 is a probabilistic graph model for the hierarchy in FIG. 68.

DETAILED DESCRIPTION OF THE INVENTION

Referring more specifically to the drawings, for illustrative purposes the present invention is embodied in the apparatus generally shown in FIG. 1 through FIG. 70. It will be appreciated that the apparatus may vary as to configuration and as to details of the parts, and that the method may vary as to the specific steps and sequence, without departing from the basic concepts as disclosed herein.

1. OVERVIEW 1.1 Objectives

A primary objective of the present invention is the development of techniques for higher-level image analysis, i.e., object-level analysis. While the present invention may be employed in many applications, the discussion disclosed herein primarily is directed to systems and methods to assist in the quantification of breast cancer in histo/cytopathology imagery.

1.2 Pathology 1.2.1 Histo- and Cyto-Pathology

The following are definitions related to the disclosure herein described:

Pathology: the branch of medicine concerned with disease, especially its structure and its functional effects on the body.

Cytology: The study of cells. Implies the use of light or electron microscopic methods for the study of morphology.

Histology: The study of cells and tissue on the microscopic level. [12]

Thus, cytopathology is the study of diseased cells and histopathology is the study of diseased tissues, both at the microscopic level. The distinction between the two techniques is a bit blurred since any study of tissue will inherently include the study of constituent cells. The distinction is, then, usually determined by the technique used to harvest the specimens. Exfoliative (obtained by scraping) and aspirative (obtained via syringe) cytology are two common sources of cytopathology images; a very common example of exfoliative cytology is the routine cervical Pap smear. These images, due to the nature of the specimen retrieval, consist mainly of individual cells and cell clusters (see FIGS. 1A-1B illustrating the cytopathology of the colon and breast). While these cell clusters may retain some of the underlying tissue architecture (i.e., spatial arrangement of the cells within clusters, indicative of tissue origin and disease state), there is not a global sense of tissue structure in cytopathology images.

Histopathology images (see FIGS. 1C-1D illustrating the histopathology of the breast and prostate) on the other hand, are usually obtained from a biopsy specimen as a thin slice, and thereby do retain global tissue structure.

FIG. 1 shows exemplary cytopathology images of colon (a) and breast (b); these images consist mainly of individual cells and cell clusters which may retain some of the underlying tissue architecture. There is not, however, a global sense of tissue structure as there is in histopathology images, shown as breast (c) and prostate (d).

1.2.2 Imagery and Multispectral Image Acquisition

58 Hematoxylin and Eosin (H&E) stained histology images of breast tissue were obtained the Department of Pathology at Yale University, as well as images of other cancers. To achieve the best acceptance of (or least resistance to) new techniques in analyzing histo/cytopathology images, it is important to fit them, with minimal disruption, into existing processing streams in the clinical laboratory. With this in mind, focus was placed on routine H&E or Pap-stained imagery from a standard light microscope. The microscope setup uses a liquid crystal tunable filter (LCTF) for multispectral imaging capabilities: the VariSpec™ (CRi, Woburn, Mass.). The use of standard H&E and Pap-stained imagery facilitates easy adoption of analysis techniques into routine pathology practice, as well as allowing for the possibility to analyze a wealth of archival samples.

Our collaborators in the Department of Pathology at Yale University use an Olympus BH-2 light microscope (Olympus America, Melville, N.Y.) with the Cri VariSpec™ model VIS2-CM, coupled to a Retiga 1300 monochrome CCD camera (Quantitative Imaging, Burnaby, British Columbia, Canada). The VIS2-CM has a wavelength range of 400 nm to 720 nm, and can be tuned for bandwidths between 0.25 nm and 20 nm with response times on the order of 50 ms to 150 ms [13]; the filter was tuned for 10 nm bandwidths, and is most commonly used with wavelengths from 420 nm to 700 nm. Image acquisition was controlled with CRi's PanKroma software which calculates exposure times for each acquisition wavelength and corrects for uneven illumination with flat-fielding. The CCD camera acquires each spectral band as an 8 bit, 768×896 image, with spatial resolution of <1 µm per pixel.

The general image acquisition procedure is as follows. First, the slide is loaded onto the microscope stage and a low power (100× total magnification) manual scan of the slide is performed. For regions of interest, a higher power (400×) magnification is used for further analysis and image acquisition. A white cube was acquired for the flat-fielding operation, which requires the acquisition of a full wavelength range for an empty portion of the slide; this is also used to acquire exposure times for each wavelength, such that each band will occupy the full dynamic range. Finally, the region of interest was centered and focused manually and the multispectral image stack was acquired and flat-fielded. This whole process takes on the order of several minutes.

1.2.3 Specimen Preparation

Histology specimen preparation follows the general process of fixation, embedding, mounting, and staining: fixation stops metabolic processes in cells and preserves cell structure; embedding allows the specimen to be sliced into thin sections (usually 5-15 µm); mounting fixes the thin section to a slide; and staining colors the otherwise colorless cellular material for viewing under a microscope, and provides the ability to highlight certain molecular characteristics [14]. The most common pathological preparation for tissue is the formalin-fixed, paraffin-embedded, Hematoxylin and Eosin (H&E) stained section.

Hematoxylin is a blue-staining basic dye that stains genetic material; this is mainly seen in cell nuclei, although some components of cytoplasmic and extracellular material are also stained. This may be seen in FIG. 1C where the nuclei are the blue-purple, roughly elliptical blobs. Eosin is a pink-staining acidic dye that stains membranes and fibers; this is most obviously seen in cytoplasm and connective tissue (in FIG. 1C, these are the pink areas surrounding the nuclei and the wispy pink filaments, respectively).

1.2.4 Cytology Characteristics of Breast Cancer

As with many biological specimens, breast cancers present a wide variability in appearance even among the same subtype. Some general cytology characteristics of breast cancer include [2]:
  Slide Background
  Cellularity (abundance of cells)
  Nuclear and/or cytoplasmic debris, necrosis
  Poor cohesion of cells, single cells
  Absence of naked, bipolar nuclei (elongated, dark nuclei, indicative of proper epithelial differentiation)
  Cells
  Abundant and dispersed
  Irregular and disordered clumps/clusters
  Pleomorphic (containing more than one stage in the life cycle) and enlarged
  Nuclei
  Pleomorphic
  Hyperchromatic (overall increase in staining intensity) with indicative chromatin (nuclear material, including DNA) texture and prominent nucleoli (small, round suborganelles)
  Eccentric, crowded, enlarged
  Irregular membranes
  Increased mitoses (dividing cells).

None of these characteristics is solely indicative of the presence of cancer; furthermore, many benign breast diseases have similar characteristics. It is the expertise and experience of the clinical pathologist that determines the diagnosis. Most cytology specimens are used to determine a suspicion of cancer and subsequent histologic specimens are used for the final diagnosis. In particular, cytology specimens do not allow distinction between invasive and in situ cancers since there is no information about tumor margins. In addition to the inherent variability in specimen characteristics, there are a wide variety of types and subtypes assigned to breast cancers (more are distinguished on a regular basis in an attempt to facilitate efficient treatment). These subtypes display subtle morphologic differences, which underscores the importance of pathologist input to the quantitative analysis process. While computer vision techniques may be able to elucidate even more subtle information than a human (e.g., chromatin texture), it is essential to provide a system in which the expert pathologist can properly train the computer vision algorithms.

1.3 Analysis of Histo/Cytopathology Images 1.3.1 Challenges

Biological and Staining Variability

Perhaps the largest difficulty in computer analysis of biological images is the inherent variability found in biological specimens. Even within a single cell type in the body, an amazing amount of normal variation can be found. This variation becomes more pronounced with diseases such as cancer in which the cells no longer retain proper morphology associated with their lineage. Adding to this difficulty is the variability in preparation and staining procedures. Many researchers call for standardization of these procedures and many pathology labs have protocols in place, but staining variation is still present in specimens. This may be due to differences in the staining procedure, but is also dependent on intrinsic properties of the specimen being stained. As an example, one characteristic of breast cancer cells is hyperchromasia, an overall increase in staining intensity.

Lack of Ground Truth

Accepting the presence of biological and staining variability, there are still many problems related to the definition of appropriate ground truth for pathology specimens. Generally, within the pathology community, the diagnosis rendered from a histopathology section of an excisional biopsy is considered ground truth for the patient. In addition, many researchers use patient followup as either ground truth for the biopsy or as further evidence of a correct diagnosis. While this may be the standard, there is overwhelming evidence of inter- and intraobserver variability in diagnoses [5, 6, 15-24]; this results in some well-founded concern about using another pathological diagnosis as ground truth for new studies in pathological diagnoses [25]. The use of various grading systems has sought to alleviate these problems and lend a more quantitative bent to the diagnosis process; however, the sheer number of grading systems [4-6, 17, 19, 21, 22, 26, 27] and the constant revision of such systems [4, 5] does not lend a consistent view of any cancerous disease. The use of clinical data such as patient followup and survival can alleviate these problems somewhat, although a true gold standard for pathology specimens is not available in the same sense that it may be for other datasets (e.g., remote sensing).

Diagnoses of "Atypias"

While most pathologists can easily identify and categorize truly benign and frankly malignant specimens, there are many cases which fall somewhere in the continuum between benign and malignant. These are often given the diagnosis of "atypia." For cytology specimens, the diagnosis of aytpia usually means a more invasive followup procedure to acquire a tissue specimen. It is still unknown how exactly to approach treatment of atypical conditions, but furthermore, there is no standard for grading atypias. The problem of pathologist variability in diagnosis is increased greatly for atypical conditions. While this vague area between benign and malignant conditions poses an image analysis challenge, it also poses very important questions about the premalignancy potential of benign conditions.

Human Cognition and the Diagnosis Process

Humans' concept of the world is inherently object-based, as opposed to the largely pixel-based representation of computer vision. As such, human experts describe and understand images in terms of such objects. For pathologists, diagnosis criteria are inevitably described using terms such as "nucleus" and "cell." It is thus important to develop computer vision methods capable of such object-level analysis. This is important not just for the biomedical imaging fields, but for most computer vision applications.

1.3.2 Performance Metrics

The following is a brief description of metrics used in the disclosure herein disclosed:

Accuracy: refers to the probability of a correct decision, $N_C/N$ where $N_C$ is the number of correctly determined cases and N is the total number of cases.

Error: refers to the probability of an incorrect decision, $N_I/N$ where $N_I$ is the number of incorrectly determined cases and N is the total number of cases. Note that Accuracy=1−Error.

Sensitivity/Detection Rate (DR): refers to the probability that a positive case will be correctly decided, $N_{TP}/(N_{TP}+N_{FN})$ where $N_{TP}$ is the number of true positives and $N_{FN}$ is the number of false negatives.

Specificity: refers to the probability that a negative case will be correctly decided, $N_{TN}/(N_{TN}+N_{FP})$ were $N_{TN}$ is the number of true negatives and $N_{FP}$ is the number of false positives.

False Alarm Rate (FAR): refers to the probability that a case labeled as positive is actually negative, $N_{FP}/(N_{TP}+N_{FP})$ where $N_{FP}$ is the number of false positives and $N_{TP}$ is the number of true positives; this is the metric that will be referred to in the next section. Alternatively, and possibly more commonly, false alarm rate can be defined as $N_{FP}/(N_{TN}+N_{FP})$ where $N_{FP}$ is the number of false positives and $N_{TN}$ is the number of true negatives.

ROC curve, AUC: A Receiver Operating Characteristic (ROC) curve allows a graphical representation of the tradeoff between sensitivity and specificity (sensitivity on the y-axis and 1-specificity on the x-axis). Equivalently, this may also be plotted as true positive rate versus false positive rate. First, a diagonal line from (0,0) to (1,1) represents the results for a random guess. Second, the line from (0,0) directly to (0,1) and then to (1,1) (i.e., the left and top edges of the plot box) represents a perfect classifier. Thus, the closer an actual ROC curve is to this ideal, the better the classifier. Third, the Area Under the Curve (AUC) is often used as a single number to quantify a classifier; note that a perfect classifier has an AUC of 1.0 and the random guess an AUC of 0.5.

1.4 QOALA Two-Step Process

The following discussion will detail systems and methods for higher-level image analysis, i.e., object-level analysis via Quantitative Object and spatial Arrangement-Level Analysis (QOALA) framework for our hierarchical image analysis. The system and methods of the present invention may be used on a variety of differing applications. The foregoing text focuses on methods and systems to assist in the quantification of cancer in histo/cytopathology imagery. However, a flexible framework is provided that allow the use of such methods in a broad range of application areas. Further discussion will focus on histo/cytopathology applications, although it should be noted that any of these specific analyses could be replaced with other application-specific analyses within the same framework.

The methods and system of the present invention allow an expert (e.g. pathologist) to interactively provide expertise (e.g. in the form of training data or the like) to facilitate the estimation of a desired classifier or segmentation algorithm. A simple example of such a task is the discrimination of cancerous from non-cancerous cell nuclei. Of more interest to pathologists, however, are more complex tasks, such as distinguishing different grades of cancers, determining the prognosis of the patient, suggesting treatment options, quantifying premalignancy, etc. While all of these tasks are currently attempted via the subjective opinion of the pathologist, the present invention provides a quantitative analysis for such tasks, something that is previously lacking in current pathology practice.

Object-level analysis generally involves some underlying segmentation mechanism. It is the segmentation methodology that determines what constitutes an object. Commonly, an object is defined as a connected group of pixels satisfying some similarity criterion. Objects have been defined in terms of contour [48, 49]; homogeneous color [50, 51] or texture [51]; as an anomaly (in some sense) compared to the rest of the image [52]; location, size, and shape [53]; and topological and connectivity relations [54, 55].

An object of the present invention is to work beyond the details of pixel-level segmentation issues. While the initial segmentation of histologic structures is ultimately important and worthy of appropriate analysis (see Section 4), we use this imperfect segmentation and work to gain further information from the imagery.

The system and methods of the present invention is flexible in the definition of the various objects; essentially, there are no limitations to a predefined set of objects and the analysis routines associated with those objects Referring to FIG. 2, the present invention employs an iterative and modular approach to object-level analysis, using a two-step iterative process 10 with pathologist expertise at one or more decision points. This procedure involves alternating steps of classification and segmentation in each iteration and can continue with expert input until the analysis has reached a satisfactory level (e.g. according to the expert).

This flexibility allows the same framework to be used for a wide variety of analysis tasks; e.g., a user could use this same system to perform a segmentation of connective tissue, or further the analysis and locate connective tissue adjacent to malignant epithelial cells.

The system and methods of the present invention provide a flexible platform to allow an intuitive interaction process to determine the resulting analysis procedures.

In a preferred embodiment, the interactive step may take the form of a simple image markup procedure whereby the expert uses a mouse or tablet stylus to designate areas within the image via a graphic user interface.

Figure 2A:
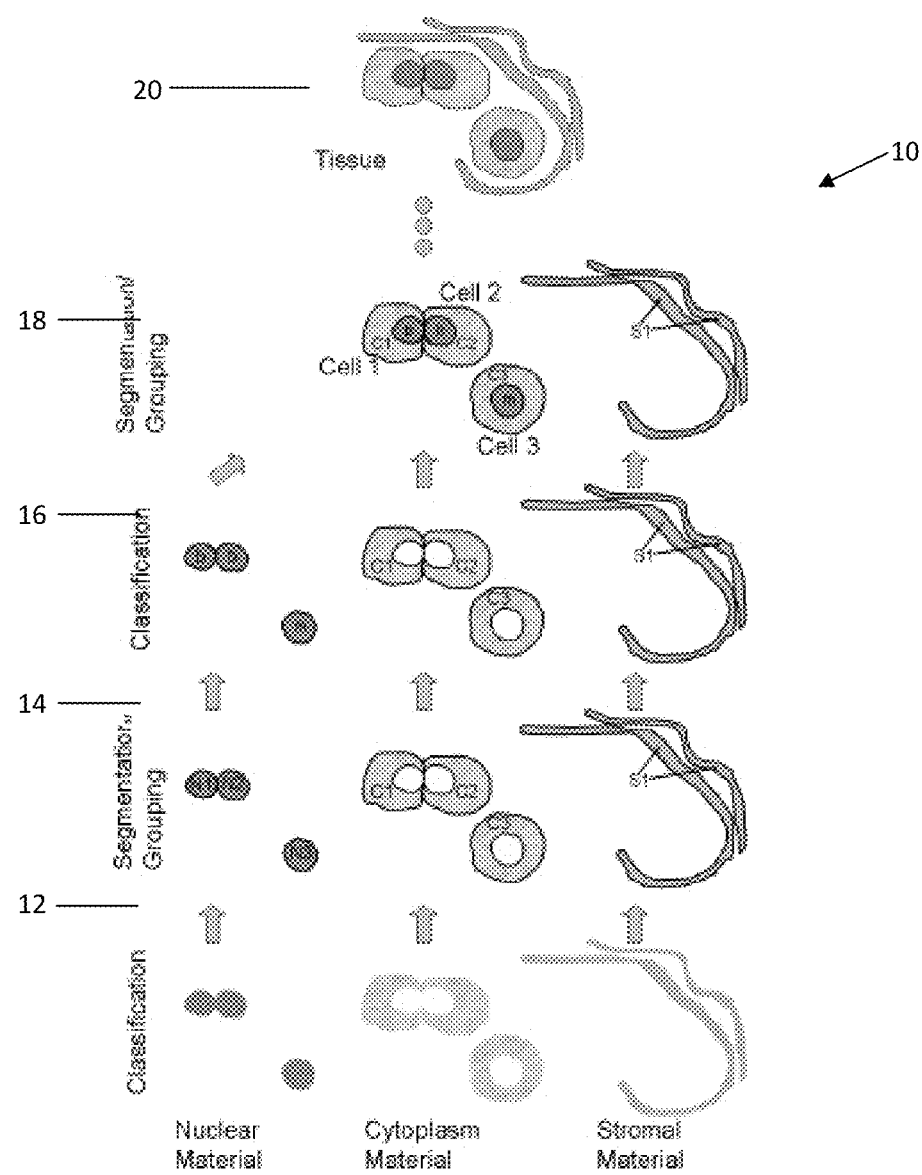
FIG. 2A is a diagram of the two-step iterative process in accordance with the present invention.

For the first iteration shown in FIG. 2A, the pathologist may identify different histologic material (e.g., nuclear material, cytoplasm material, stromal material) as the training data via the graphic user interface. At this first level (bottom row 12), biologic materials are generally classified on a pixel-by-pixel basis.

Markup would generally comprise painting a series of pixels corresponding to a certain histologic class. The system may then use machine learning to develop a classifier for each specified category. The pathologist would have the opportunity to view the resulting classification, and modify the training data and retrain if the current classifiers are not satisfactory. The classifier would then be used to automatically classify subsequent images without significant input from the pathologist. However, at all times, the pathologist has the option to accept the output or edit it via markup.

Once the classification for step 12 is accepted, segmentation is performed at the second step 14. The pathologist may provide input on the proper segmentation of the identified classes (usually in the form of clicking or specifying boundaries or borders). The materials may then be segmented into their constituent objects based on user feedback. This training data would provide information on which pixels should be agglomerated to form a proper histologic segmentation. As in the previous step, the pathologist will have the opportunity to view the resulting segmentation and modify training data if necessary.

It is important to note the distinction of classification from segmentation throughout this framework; as this separation is to better focus any optimization techniques. For this example, in the classification step 12, the object is to learn classifiers that can accurately identify all pixels belonging to a certain histologic class. Whereas, in the segmentation step 14, the object is the proper agglomeration of sets of these properly identified pixels to form appropriate segmented structures.

Subsequent iterations of the process would continue as alternating steps of classification and segmentation (e.g. second iteration classification step 16 (third overall step) and segmentation step 18 fourth overall step)), where each new iteration yields a higher level classification and segmentation than the previous ones. In step 16, the pathologist may, for example, further classify and distinguish certain nuclei as cancerous (designated as "m" for malignant) or non-cancerous (designated as "b" for benign). In the fourth step 18, segmentation of "cell" objects is performed to group nuclear and cytoplasmic material into cells (e.g. Cell 1, Cell 2, and Cell 3). This process will continue (with n iterations) until the pathologist has achieved the level of abstraction/analysis desired. In the above example, the process ends at the concept of "tissue" at the topmost level 20. Note the level of abstraction may be controlled by user input at each level; this can be seen in the maintenance of the stromal elements as a single object.

This provides a flexible method of quantitative analysis, allowing the pathologist to interact with all steps of the processing, and tailor the analysis to a specific purpose in an easy and intuitive fashion. Additionally, the system needs little (if no) image processing expertise of the user since the actual analysis algorithms take as input only the image markup. The interactive, modular, and iterative approach of the present invention is a new contribution to the field of object-level analysis.

Figure 2B:
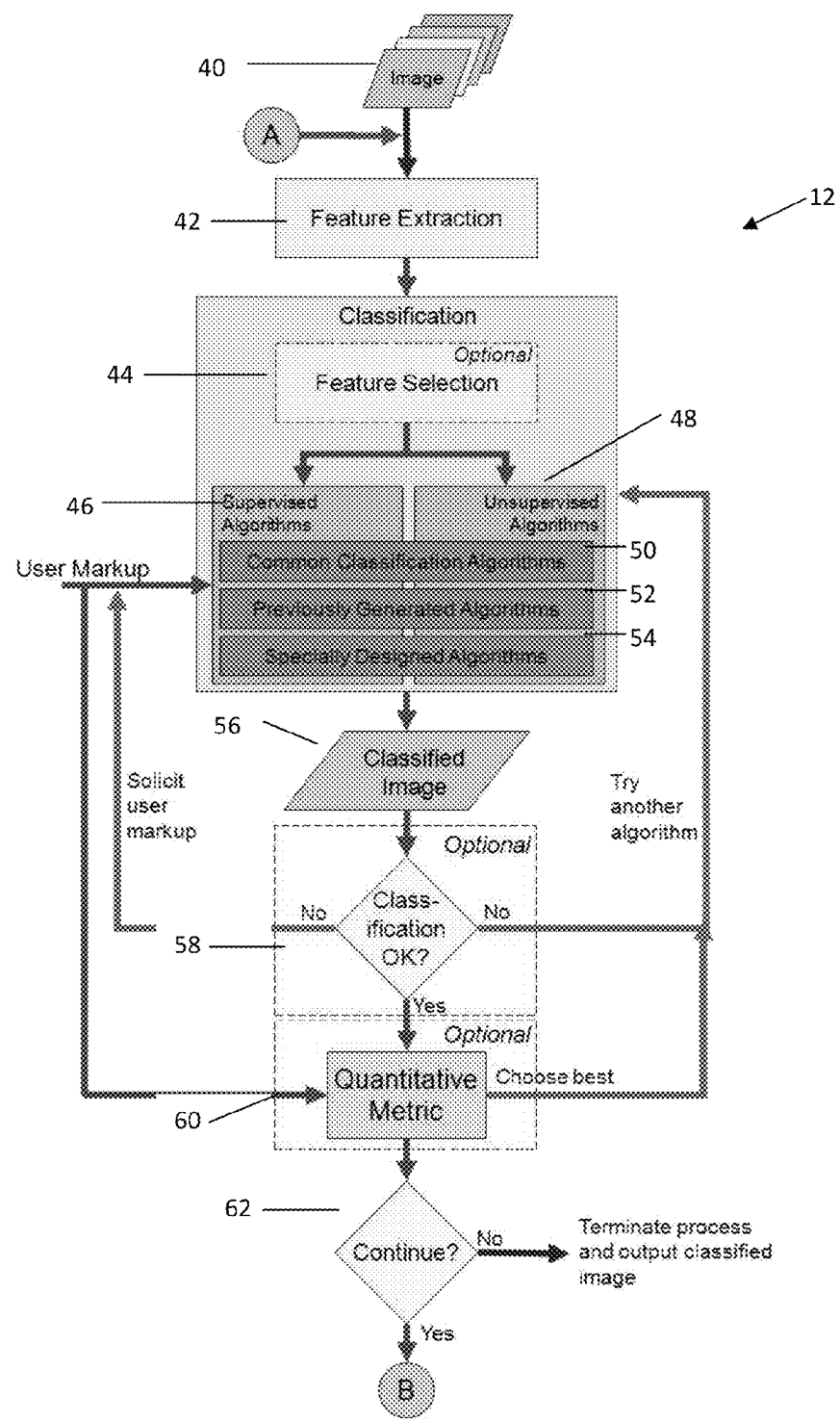
FIG. 2B is a detailed flowchart of the classification step of FIG. 2A.
Figure 2C:
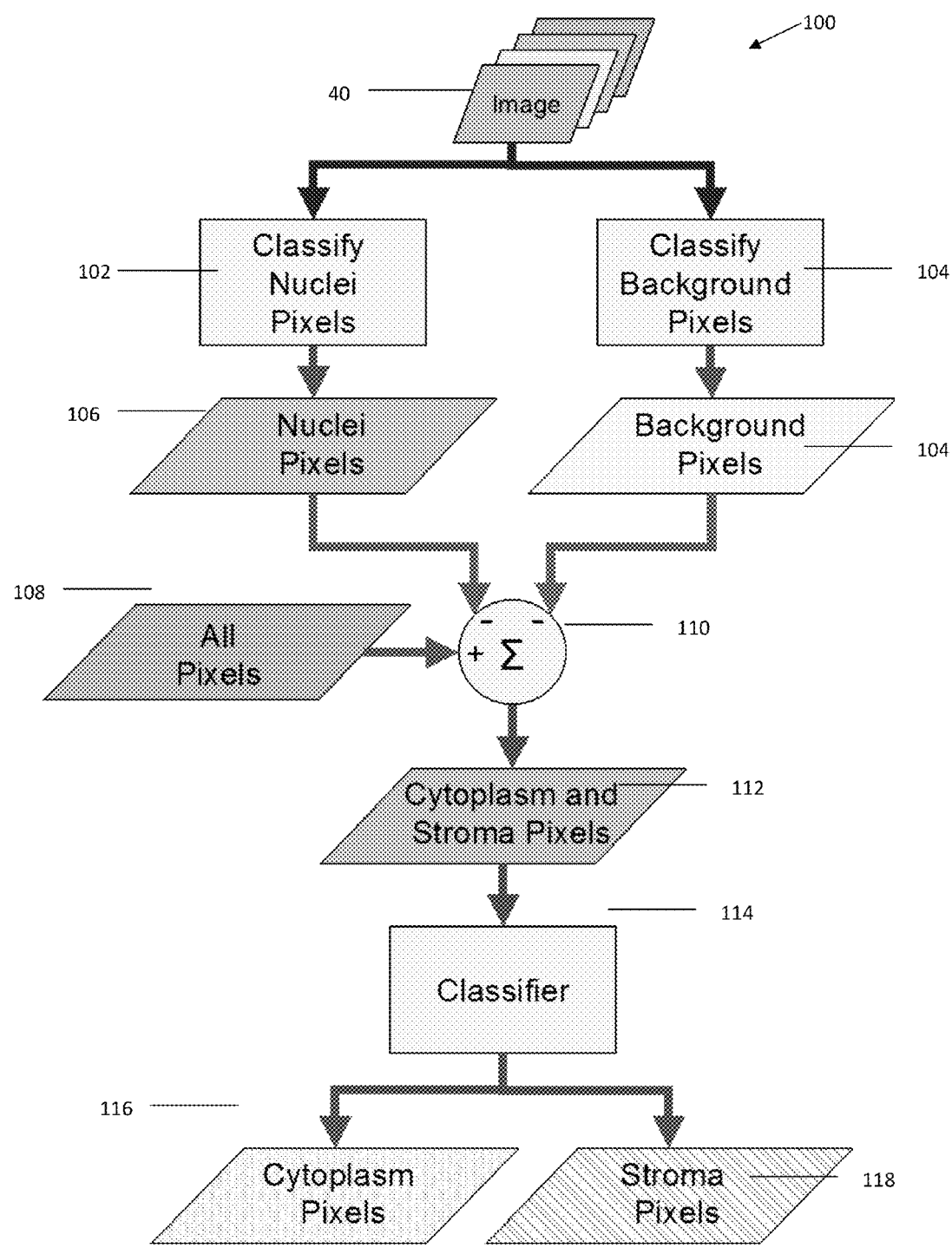
FIG. 2C is a detailed flowchart of the classification step of FIG. 2B for cytoplasm and stroma.
Figure 2D:
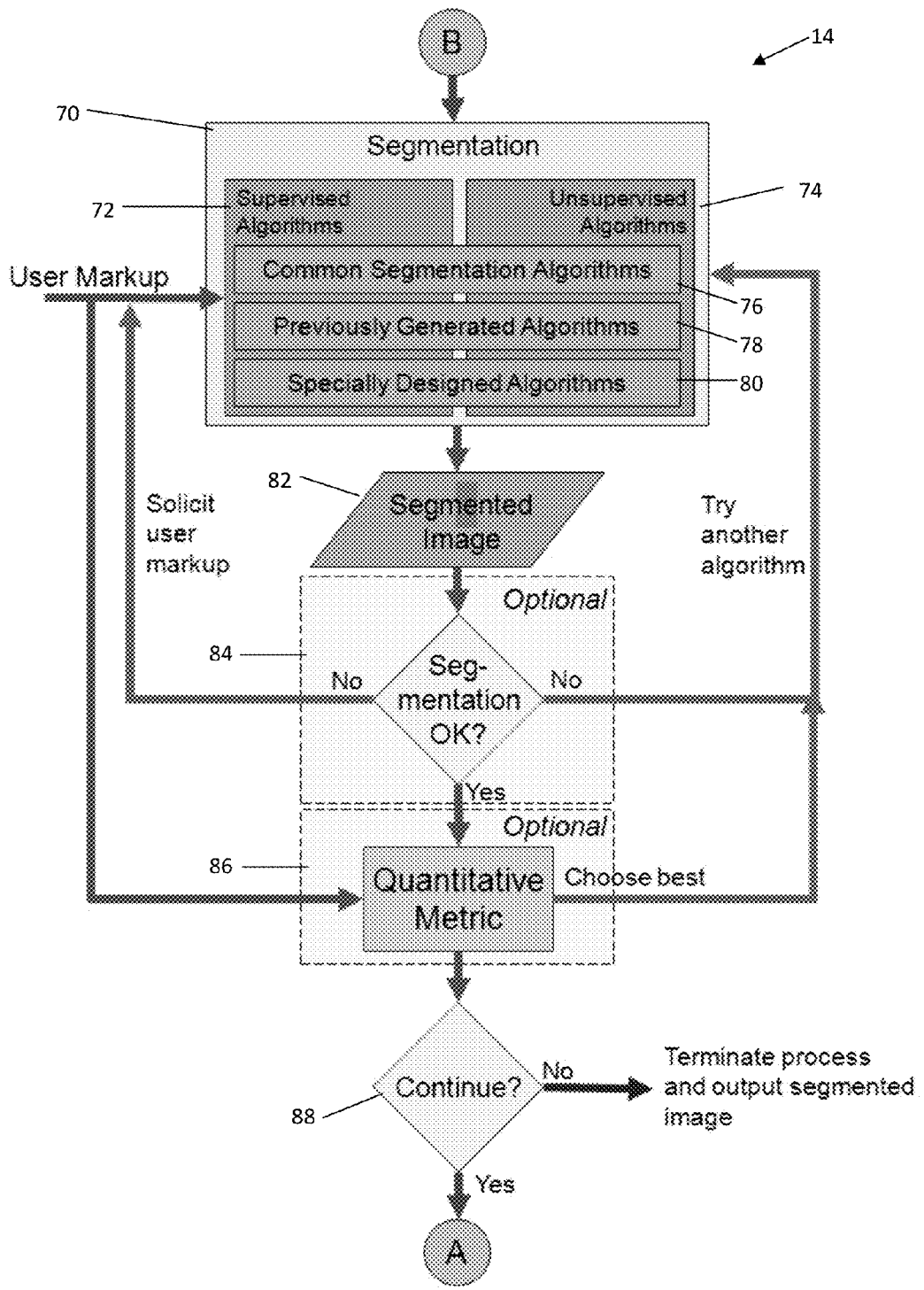
FIG. 2D is a detailed flowchart of the segmentation step of FIG. 2A.

While FIG. 2A shows a specific example of the workflow of the QOALA process, FIGS. 2B and 2D show a flowchart representation of the general QOALA process. FIG. 2B illustrates the workflow of the classification step and FIG. 2D illustrates the workflow of the segmentation step.

Considering FIG. 2B in more detail, an image 40 is taken as input to the system. This image could be grayscale, or multiband (including standard RGB or multispectral). The image taken as input to the classification step may be the segmentation from a higher level as indicated by the input A. In general, features are extracted at 42 from the objects (or pixels at the lowest level) and these features are input to a classification block. The classification block may perform a feature selection 44, reducing the dimensionality, but this is optional. Any number of classifiers may be used within the QOALA framework, including both supervised 46 (which make use of user input) and unsupervised 48. Within both of these two broad categories of classifiers, any number of specific classifiers may be used, including common classification algorithms 50, classifiers previously generated from the QOALA process 52, or specially designed classifiers 54, which are application specific. For all subsequent discussion, there is no feature extraction or selection used for the pixel-level classification, as it is solely the spectral information used for features in that first classification step. There is no reason, however that further features (e.g., texture) couldn't be incorporated in a feature extraction, feature selection, and classification flow as generalized here.

The output of the classifier block in FIG. 2B is a classified image 56, wherein the objects from the previous segmentation are classified; for the first iteration, the objects are considered the pixels. This classified image may be input directly to the next stage where the user may choose to end the analysis or to move on to the segmentation stage (FIG. 2D), or may go through a subjective or objective check for accuracy. In the first optional decision block 58, the user is presented with the classified image and is provided the opportunity to fine tune the user markup or view the output of another classification algorithm if the classified image is not satisfactory. In the second optional decision block 60, a quantitative metric is used to choose the best classification algorithm. This quantitative metric may or may not make use of the user markup (ground truth).

Next, in the last decision block 62 of FIG. 2B, the process may be terminated and the current classified image is output, or the process may continue to the next stage and segment the classified image.

Considering FIG. 2D in more detail, the classified image from the previous stage is used as input to the segmentation block 70. Any number of segmentation algorithms may be used within the segmentation block, including algorithms that make use of user markup to learn algorithm parameters 72 (supervised) and algorithms that do not make use of user markup 74 (unsupervised). As with the classification bock in FIG. 2B, within both of these two broad categories of segmentation algorithms, any number of specific algorithms may be used, including common segmentation algorithms 76, algorithms previously generated from the QOALA process 78, or specially designed algorithms which are application specific 80.

The output of the segmentation block in FIG. 2D is a segmented image 82, wherein the previously classified objects have been agglomerated into higher level objects. The segmented image may be input directly to the next stage where the user may choose to end the analysis or to move on to another level of classification (FIG. 2B), or may go through a subjective or objective check for accuracy. In the first optional decision block 84, the user is presented with the segmented image and is provided the opportunity to fine tune the user markup or view the output of another segmentation algorithm if the segmentation is not satisfactory. In the second optional decision block 86, a quantitative metric is used to choose the best segmentation algorithm. This quantitative metric may or may not make use of the user markup (ground truth). One specific quantitative segmentation metric will be presented below in Section 4. At step 88, the process may end and output the segmented image, or be input back to the classification block for higher-level classification.

It is important to note that the user markup for the classification and segmentation stages may take different forms. For example, a classification stage may ask the user to indicate objects of a certain class, while a segmentation stage may require a delineation of individual objects. Thus, user markup and decisions about the level of analysis is sought during each iteration of the QOALA process.

FIG. 2C shows a specific method 100 to classify cytoplasm and stroma pixels further discussed in Section 3. Within this method, the nuclei 106 and slide background 108 pixels are classified separately. Subtracting at step 112 the mask of nuclei pixels 106 and background pixels 108 from the image 110 the remaining pixels are assumed to belong to the two remaining classes, namely cytoplasm and stroma 114. These cytoplasm and stroma pixel group 114 may now be further classified at 116 into individual sets of cytoplasm pixels 118 and stroma pixels 120. The specifics of this process will be discussed in detail in Section 3.

Note that the proposed iterative process exemplified in FIG. 2 does not incorporate any concept of feedback between the steps. However, this may be implemented as well to improve the overall process by allowing further analysis to modify lower-level results.

1.5 QOALA Framework Overview

FIG. 3 illustrates the QOALA framework of the present invention, and details the individual components 32-38, as they will be discussed in detail in their respective sections (sections 2-6) below. For purposes of this description, efforts are focused on the study of histology images, since we are primarily interested in the quantification of multiple levels of information, including spatial arrangement of histologic entities. These methods, however, are easily applicable to cytology imagery as well.

The first step 32 focuses on multispectral analysis of pixel-level nuclear classification. The datasets used are unique in histo- and cyto-pathology in that they are imaged multispectrally (usually with 29 bands covering the visible spectrum from 420 nm to 700 nm, though capability exists for other bands). Throughout the disclosure, the utility of the multispectral nature of our imagery will be analyzed. Section 2 details multispectral data for the pixel-level classification of nuclei, resulting in quantitative and in-depth analysis of multispectral versus RGB imagery for pixel-level nuclear classification of H&E stained imagery. This method is not limited to use of multispectral imagery and can make use of grayscale, RGB, or other color spaces as well.

Section 3 details the pixel-level classification of cytoplasm and stroma in accordance with the present invention. While the characteristics of cell nuclei are well established as useful for diagnostic purposes, it is expected that the characteristics of cytoplasm and stroma will be similarly useful. The discrimination between cytoplasm and stroma, however, is not commonly addressed in quantitative pathology studies, especially for standard H&E stained imagery. In Section 3 further details the development and analysis of a pixel-level classifier for discrimination of cytoplasm and stroma. The features useful for cytoplasm/stroma discrimination are analyzed.

Step 34 comprises segmentation of nuclei, cytoplasm and stroma, and is described in further detail in section 4. The segmentation of cell nuclei on an object level is a very difficult problem. The present invention provides a solution that is feasible for H&E stained imagery and that avoids too many underlying assumptions about the nuclear characteristics (e.g., parameterization as an ellipse). An object-level segmentation metric is also detailed for application in nuclear segmentations, as well as other application areas.

Step 36 comprises feature extraction and selection. In Section 5, the various object-level and spatial-relation features extracted from various image objects are described. A comprehensive list of spatial arrangement features for object- and spatial-level feature extraction is compiled. Results on the feature selection and classification performance are presented using various categories of features. Use of non-nuclear features, namely cytoplasm and stroma features, are described, along with feature subsets for several classification tasks. In addition, use of and analysis of performance for imperfectly segmented objects in a feature extraction, selection, and classification framework are detailed.

Step 38 includes higher-level object segmentation using the Qualitative Spatial Reasoning (QSR) formulation Region Connection Calculus (RCC) as a means to segment, i.e., agglomerate higher-level image objects. In Section 6, these higher-level image objects are used for classification as well as the construction of a probabilistic image representation, "probabilistic graph models" (PGMs) are detailed. Step 38 results in characterization of higher-level segmentation via RCC, object- and image-level classification using higher-level objects, and probabilistic graph models.

2. MULTISPECTRAL ANALYSIS OF PIXEL-LEVEL NUCLEAR CLASSIFICATION 2.1 Overview

Analyses are presented of multispectral data designed to test the hypothesis that the additional spectral bands contain more information useful for classification than the three standard bands of RGB microscopy imagery. Results indicate slight performance differences using multispectral imagery as opposed to derived RGB imagery. These conclusions hold for both classification using all available image bands as well as using single image bands, indicating that the multispectral bands may not contain any more useful spectral information than do the RGB bands for this nuclear classification task. Preliminary results from this section are presented in [74] and [75], incorporated herein be reference in their entirety.

2.3 Computation of Derived RGB Images

The dataset used for multispectral analyses consists of 58 H&E-stained histopathology images of breast tissue from the Yale Tissue Microarray Facility (http://tissuearray.org/facility/inventory/list.php). These data were captured from 5 microarrays (ytma10, 12, 49, and 55), with (6, 6, 34, and 6) images captured per array, respectively; in total there are 26 malignant images, and 32 benign (including 6 normal from ytma55). These 58 images are not microarray images in the general sense since they are with single histopathology images as might be obtained from standard clinical biopsy specimens. The multispectral images have 29 bands, spaced 10 nm apart, ranging within the visible spectrum from 420 to 700 nm. Each band is represented in an image stack as an 8 bit, 768×896 grayscale image.

FIG. 4 illustrates an exemplary multispectral image stack, with each band displayed as an 8-bit grayscale image. Only a portion of the entire histology image is displayed here to allow better appreciation of detail. Note the good contrast for nuclei in the red portion of the spectrum (e.g., 570-630 nm) and the lack of inter-tissue contrast in the green portion of the spectrum (e.g., 520-550 nm).

There are a number of methods for the derivation of RGB imagery from multispectral. Single representative wavelengths may be chosen for red (R), green (G), and blue (B); this can result in a qualitatively wide variety of visualizations, two of which are shown in FIGS. 5A and 5B ((A) Bands chosen to represent spectral peaks of human cones (580, 540, and 450 nm) [79]. (B) Bands chosen arbitrarily (660, 630, and 560 nm).

This approach, however, limits any further analysis to the three narrow bands chosen. Another approach is to find some allocation for all the multispectral bands to R, G, and B. We use here:

1. rgbequal: Created by (approximately) equally allocating the 29 bands to R, G, and B, similar to the approach in [72], reflecting a rough approximation of the three spectral ranges associated with the three colors red, green, and blue, albeit with some ambiguity in allocation of intermediate colors (e.g., yellow). We define the blue band of such images as the average of the first 9 multispectral bands (420-500 nm), the green band as the average of the next 10 bands (510-600 nm), and the red band as the average of the last 10 bands (610-700 nm). An example rgbequal image is shown in 5C (bands allocated and averaged equally).

2. truecolor: Created by converting the illumination wavelength for each band into the constituent RGB values as perceived by humans, then averaging the contribution to R, G, and B for each band. This method uses the MatlabCentral function spectrumRGB. The transfer functions for conversion of wavelength values to RGB values by spectrumRGB are shown in FIG. 6 Note the second lobe in the red channel response that occurs in the blue wavelengths; this is due to the human perception of violet toward that end of the visible spectrum. An example truecolor image is shown in FIG. 5D.

3. ccd: A modification of truecolor imagery to better match the spectral response of common 3-CCD color cameras used in microscopy setups for biomedical research. This method also uses the spectrumRGB function, but removes the second lobe in the red response; thus ccd imagery will differ from truecolor imagery only in the red channel. An example ccd image is shown in FIG. 5E.

Other color spaces besides RGB may be used, in particular, YUV [15], HSV [17, 37], and HSI [15, 80]. In all of these applications, the new color space is computed from an image originally specified in RGB. We have chosen to compare performance of our multispectral data to that of RGB imagery, since that provides the most straightforward derivation of 3-band imagery from multispectral and requires no further processing of the multispectral data itself.

2.4 Pixel-Level Classification of Nuclei

In this section the classifiers used for pixel-level classification of nuclei are described, and the metric used to quantify classification performance is shown. It is appreciated that other classifiers or other segmentation metrics may be used within the framework of the present invention.

2.4.1 Classifiers

Six classifiers were used. These classifiers were chosen based on their established performance and use for multispectral data, sparsity of parameters to optimize, computational efficiency, and the use of (primarily) spectral information. The use of primarily spectral information is important in these analyses since the basic hypothesis in question deals with the spectral information content of our imagery. The exceptions to these characteristics are noted in the classifier descriptions to follow. Notation in the following text will use bold-faced letters and symbols to denote vectors. Additionally, image pixels and class means are considered as vectors, $$y = [b_1, b_2, \ldots, b_B]^T \quad (2.1)$$

where $b_i$, $i = 1, \ldots, B$, is the value of the pixel in the ith band, and B is the total number of image bands.

Maximum Likelihood (ML) calculates the likelihood of class membership for an observation and assigns the observation to the class with the highest likelihood [81]. That is, a pixel is assigned the label of the class that it is most likely to be a member of. Likelihood is defined probabilistically, using the estimated joint probability density or mass function. The likelihood L as a function of the current observation y is defined as:

$$L(y) = f_y(x_1, x_2, \ldots, x_n | y) \quad (2.2)$$

where $x_1, x_2, \ldots, x_n$ are n random variables corresponding to n classes. The ML estimate, $\hat{y}$, of y is thus defined as $$\hat{y} = \max L(y) \quad (2.3)$$

We are interested here, however, only in the class label z of $\hat{y}$, $$z = C_i \text{ if } \hat{y} \in C_i \quad (2.4)$$

Mean and covariance is computed for each class, assuming Gaussianity, which results in a quadratic discriminant boundary.

Minimum Euclidean Distance (MED) finds the Euclidean distances between a current observation and the class means. The observation is assigned the class label of the closest class mean, i.e., the minimum Euclidean distance. The MED classification of observation y is thus defined as $$z = C_i \text{ if } |y - m_i| < |y - m_j|, i = 1, \ldots, n, i \neq j \quad (2.5)$$

where $m_i$ is the mean of the ith class for n total classes, and $|\bullet|$ is the Euclidean distance metric.

Spectral Angle Mapper (SAM) finds the angle between a current observation and the class means. The observation is assigned the class label for which this angle is minimum. In this case, $$z = C_i \text{ if } \theta_i = \angle(y, m_i) < \theta_j = \angle(y, m_j), i = 1, \ldots, n, i \neq j \quad (2.6)$$

Using the definition of the dot product of two vectors, a and b, $$a \cdot b = |a||b|\cos(\theta) \quad (2.7)$$

Equation (2.6) can be rewritten as $$z = C_i \text{ if } \arccos\left(\frac{y \cdot m_i}{|y||m_i|}\right) < \arccos\left(\frac{y \cdot m_j}{|y||m_j|}\right), \quad (2.8)$$

$$i = 1, \ldots, n,$$

$$i \neq j$$

Fisher Linear Discriminant Analysis (FLDA) constructs a decision hyperplane based on a linear combination of the input data planes. More specifically, it projects the multi-dimensional data to one dimension, maximizes a function representing the difference between the projected class means, and normalizes by the within-class scatter along a direction perpendicular to the decision hyperplane [82]. Further discussion here will be limited to the two-class case (following the explanation of Bishop in [82]), since we are considering here a two class problem. An input observation x (of B dimensions) is projected to one dimension via the mapping $$y = w^T x \quad (2.9)$$

To implement a criterion to maximize class separation, we could choose the weight vector w to maximize the function $$w^T(m_2 - m_1) \quad (2.10)$$

subject to w being unit length. To normalize by the within-class scatter, the within-class covariance is used:

$$s_k^2 = \sum_{n \in C_k} (y^n - w^T m_k), \quad (2.11)$$

$$k = 1, 2$$

where $y^n$ is the n-th element of class $C_k$. The Fisher criterion is thus defined as $$J(w) = \frac{(w^T m_2 - w^T m_1)^2}{s_1^2 + s_2^2} \quad (2.12)$$

Substituting previous equations into Equation (2.12), differentiating with respect to w, and simplifying, it can be shown that $$w \propto S_W^{-1}(m_2 - m_1) \quad (2.13)$$

where $S_W$ is the total within class covariance, in this case $$S_W = \sum_{n \in C_1} (x^n - m_1)(x^n - m_1)^T + \sum_{n \in C_2} (x^n - m_2)(x^n - m_2)^T \quad (2.14)$$

The projected data may now be used to construct a discriminant function d and threshold $y_o$ such that $$z = \begin{cases} C_1 & \text{if } d(x) \geq y_0, \\ C_2 & \text{else.} \end{cases} \quad (2.15)$$

The FLDA classifier is also equivalent to the ML formulation if there are equal covariance matrices for the two classes; this results in a linear discriminant boundary.

An automated feature extraction (AFE) tool called GENIE (GENetic Imagery Exploitation) is based on evolutionary computation and is designed to explore the entire feature space of spectral and spatial operators for multispectral data, and evolve a solution best fit for the classification task. More practically speaking, GENIE selects a subset from the available data planes and develops an algorithm, consisting of spectral and spatial operators, to extract various feature planes which are subsequently fed to a standard classifier backend. GENIE selects an initial set of algorithms consisting of randomly selected operators and randomly selected data planes as input. Throughout the evolution process, only appropriate algorithms with appropriate data input will survive, as quantified by the classification performance of the algorithms. Classification performance is defined as an equal tradeoff between detection rate and false alarm rate. For this work, GENIE uses a simple Fisher linear discriminant backend, although the capability exists for other backend classifiers [83].

Support Vector Machines (SVMs) construct a linear hyperplane that maximizes the margin (minimum separation (i.e., distance)) between classes. This is a nonlinear optimization problem: for a two class problem, find the parameters w and $w_0$ of the hyperplane $$w^T x + w_0 = 0 \quad (2.16)$$

minimizing the quantity $$J(w, \omega_0, \xi) = \frac{1}{2} \|w\|^2 + C \sum_{i=1}^{N} \xi_i \quad (2.17)$$

subject to $$y_i[w^T x_i + \omega_0] \geq 1 - \xi_i, \xi_i \geq 0, i = 1, 2, \ldots, N \quad (2.18)$$

where $\xi$ is a vector of "slack variables" representing the three categories of training vectors: correctly classified training outside of the class separation band, correctly classified training inside of the class separation band, and incorrectly classified training [84]; C is a positive constant that weights the relative contribution of the two terms in J; $x_i$ is the i-th training vector; and $y_i$ is the class label ($\pm 1$). In the case of nonlinear SVMs, the data is first mapped to a higher dimensional space, where a linear hyperplane is computed to the class label ($\pm 1$). In the case of nonlinear SVMs, the data is first mapped to a higher dimensional space, where a linear hyperplane is computed to separate the classes, using a kernel function which defines the inner product operation in the higher dimensional space [84]. We have implemented an SVM using SVM$^{light}$ [85], with linear (LSVM), $$K(x,z) = x \cdot z \quad (2.19)$$

and quadratic (NLSVM), $$K(x,z) = (sx^T z + c)^2 \quad (2.20)$$

kernels. For the nonlinear SVM, the kernel parameters (s and c for quadratic) must be explicitly optimized for the training data; this is the only classifier used in this study which requires optimization of parameters.

2.4.2 Performance Metric

A general metric of classification performance was chosen that equally penalizes both types of classification errors: 1) true (nuclei) pixels incorrectly labeled as false (non-nuclei) and 2) false pixels incorrectly labeled as true. In particular, the performance metric is defined as $$P = 0.5(R_d + (1 - R_f)) \quad (2.21)$$

where $R_d$ is the fraction of true pixels classified correctly (detection rate), $R_f$ is the fraction of false pixels classified incorrectly (false alarm rate), and the factor of 0.5 scales the metric to the range [0, 1]. Note that a perfect segmentation will yield a performance score of 1 (100%), while a score of 0.5 (50%) can be obtained by a trivial solution of all pixels labeled true (or false). We will present our results in terms of this metric P, as well as the individual metrics comprising P: detection rate (DR) and false alarm rate (FAR).

The performance metric in Equation (2.21) is valid for cases where ground truth is defined on a pixel-by-pixel basis for some region(s) of the image; the best estimate of performance is achieved when ground truth is defined for the entire image. As a compromise between the necessity of comprehensive ground truth for proper quantification of classification accuracy, and the tedious and time-consuming aspect of human delineation of such ground truth, we have marked a 200×200 pixel window in each of the 58 histology images. These windows were chosen to best encompass the range of visual features in the imagery, according to subjective evaluation by the human viewer. We feel that this approach will not be any more biased toward certain image features than would a random approach; in many cases, a randomly located 200×200 pixel window could encompass little, if any, cellular material. This window is used to determine classification performance for each image, as well as provide training data for classifier optimization.

2.5 Pixel-Level Nuclear Classification Results

In this section the nuclear classification performance of our imagery is demonstrated using several well known classifiers. Entire multispectral stacks were used, each of the three derived RGB images, as well as individual bands from each of the image types (multispectral, rgbequal, truecolor, and ccd). Nuclear classification is an important task since many of the characteristics of cancer are expressed in the cell nuclei.

Indeed, much of cytology analysis is based solely on nuclear characteristics. Additionally, it is easy to define a reasonably precise pixel-level ground truth for nuclei, which lends this task to a thorough examination of classification accuracy. The pixel-level classification of cytoplasm and stroma are discussed in Section 3.

Classification performance using all available image bands of each image type are discussed in Section 2.5.1, followed by classification performance of individual image bands in Section 2.5.2, and a discussion of the differences in performance using all available bands versus individual bands in Section 2.5.3. We conclude our discussion of results by presenting the image bands used preferentially in the AFE and FLDA classifiers (Section 2.5.4), analysis of the entropic content of individual image bands (Section 2.5.5), and a principal components analysis of the image stacks (Section 2.5.6).

2.5.1 Classification Using all Available Image Bands

The dataset was split in (approximately) half to create a training set of images and a test set of images; half of the benign and malignant subsets were randomly assigned to the training or test set to allow for even representation of benign and malignant characteristics in both sets. The same random half of the data was provided to each classifier. Applying the six aforementioned classifiers to each complete image stack (i.e., all available bands of multispectral, rgbequal, truecolor, and ccd), and averaging over the images contained in the training (in-sample) and test (out-of-sample) sets, the results shown quantitatively in Table 3 and graphically in FIGS. 7A-F were achieved. Table 3 shows Detection rate (DR), false alarm rate (FAR), and performance (P) using all available image bands. Results are presented as in-sample (IS)/out-of-sample (OS) and as percentages. Bold rates correspond to the best rates over all image types for each classifier.

FIGS. 7A-F show the average performance and detection/false alarm rates using all available image bands for in-sample (IS) and out-of-sample (OS). Since the AFE tool GENIE is stochastic, averages for ten independent runs are presented. Since the optimization of the quadratic kernel for NLSVM is very time consuming, results presented here are for a randomly selected 10% of the training data.

In Table 3, the best in-sample (IS) and out-of-sample (OS) performance scores are in bold-face. The best performance occurs for either the multispectral or ccd image stacks, with ML and AFE performing better with ccd; MED, FLDA, and both SVMs performing better with multispectral, and SAM split between the two for IS and OS. It is important to note, however, that these increases in performance are only 0.004 IS and 0.004 OS when averaged over all classifiers.

It was unexpected that the OS performance is generally higher (0.0076 increase in performance) than the IS performance for all classifiers but the SVMs, since performance generally decreases for unseen data. Looking at the performance images in both the training and test sets with markedly poor performance; it appears that the IS set has slightly poorer performing images than the OS set. As a further test of this conjecture, we retrained a classifier (in this case, MED) with 9 additional randomly chosen training sets (10 training sets total including the original set used for all previous results). The IS and OS performance on multispectral image stacks for these different training sets are shown in Table 4. Table 4 shows performance of the Minimum Euclidean Distance (MED) classifier on entire image stacks for different randomly selected training sets. Set 1 is the training set used for all the previously reported results. To facilitate easy observation of the better performing set (in-sample (IS) or out-of-sample (OS)), the better performance is presented in bold face.

It appears from Table 4 that the choice of images for the training and test sets affects the relative performance between the two, i.e., with other randomly chosen training and test sets, we see that we have an IS performance better than OS performance about half of the time.

From the results in Table 3 and FIGS. 7A-F, it is apparent that we can achieve a performance P (Equation (2.21)) ranging from 0.876 to 0.937 for IS and from 0.887 to 0.911 for OS, depending on the particular classifier. Results are also presented for DR and FAR in Table 3 and FIGS. 7A-F as reference. FAR and DR are commonly used metrics for classification performance, and were defined in Section 1.3.2. A relative weighting assigned to DR and FAR, in terms of performance required by pathologists, may also be done.

A paired Wilcoxon signed-rank test is used to determine the statistical significance of these differences in performance; results are shown in Table 5 where only half of these differences are statistically significant for a p-value of 0.05 (the starred entries in Table 5). Only a few performance differences satisfy the corrected p-value of $0.05/21 \approx 0.0024$ (bold entries), according to the Bonferroni correction. Wilcoxon paired signed-rank test p-values for performances of multispectral versus RGB imagery, presented as in-sample (IS)/out-of-sample (OS). Starred (*) entries correspond to statistical significance at the p-value of 0.05. Using the Bonferroni correction for these 42 tests, we look for the corrected p-value of $0.05/21 \approx 0.0024$, which are presented as bold entries in the table. Note that all bold entries also satisfy the less conservative p-value of 0.05 although they are not explicitly starred.

We have shown in this section, using a pairwise Wilcoxon signed rank test, that only a few performance differences between multispectral and RGB imagery are actually statistically significant. Taking the performance differences from Table 3 for all those shown to be statistically significant in Table 5 the expected performance increase can be determined for all statistically significant differences. In the following, bold differences correspond to significance at the Bonferroni corrected p-value and the remainder for significance at the uncorrected p-value of 0.05:

IS: 0.004, 0.008, and 0.004 increase in favor of multispectral over rgbequal, truecolor, and ccd, respectively, for MED; 0.002 in favor of multispectral over rgbequal for SAM; 0.007, 0.004 and 0.004 in favor of multispectral over rgbequal, truecolor, and ccd, respectively, for FLDA; 0.008 in favor of multispectral over rgbequal for AFE; and 0.020, 0.010, and 0.009 in favor of multispectral over rgbequal, truecolor, and ccd, respectively, for NLSVM.

OS: 0.005, 0.008, and 0.004 increase in favor of multispectral imagery over rgbequal, truecolor, and ccd, respectively, for MED; 0.003 in favor of multispectral over truecolor for SAM; 0.006 in favor of multispectral over rgbequal and 0.003 in favor of ccd over multispectral for AFE; 0.011 in favor of multispectral over rgbequal for LSVM; and 0.017, 0.011, and 0.011 in favor of multispectral over rgbequal, truecolor, and ccd, respectively, for NLSVM.

2.5.2 Classification Using Single Image Bands

To gain more understanding of the relative contributions of specific image bands, the ML, MED, FLDA, and AFE classifiers are applied to each individual image band for each image type. The SAM classifier is excluded here since it will fail on one-band images, and the SVMs are excluded for computational reasons (it would be prohibitively computationally intensive to optimize kernel parameters for each image band). Performance scores for classification using single multispectral bands are shown in FIGS. 8A and 8B where the best performance scores occur in the red portion of the spectrum, with poorer performance in the green portion and at the extremes of the spectrum. Empirical observations of typical multispectral image stacks (refer to FIG. 4) reveal a good contrast between nuclei and non-nuclei pixels in the red bands, decent contrast in the blue bands, and very little contrast in the green bands and extreme ends of the spectrum. These empirical observations correspond nicely with the graphs in FIGS. 8A and 8B.

Looking at the DR and FAR for single multispectral bands, shown in FIGS. 8C-F, the DR for the bands is more consistent across the spectrum of image bands, with a rolloff at the extremes of the spectrum. The FAR on the other hand, displays much more variation over the image bands; thus it seems that FAR has the major effect on overall performance score.

In these classification runs, the AFE tool tends to outperform the other classifiers, although it does not have as clear an advantage as when using the entire image stacks. Additionally, AFE has lower DR in the green portion of the spectrum, but also lower FAR. AFE is the only classifier that has degraded performance for the bands at 600 and 620 nm; this is due to the poor performance of one of the 10 independent runs for these particular image bands. The last thing we note is the better performance of the AFE classifier in the blue portion of the spectrum compared with the other classifiers. This is most likely due to the ability of AFE to extract local spatial features to assist in the more difficult classification of blue bands. Using purely spectral information in the red bands (i.e., ML, MED, and FLDA), however, performs nearly as well as AFE.

Referring now to FIGS. 9A-F, the classification results for single RGB channels are detailed. Plotted in FIGS. 9A-F are the performance, DR, and FAR of the AFE classifier on single image bands of rgbequal, truecolor, and ccd imagery. The AFE classifier is plotted here since it consistently yielded the highest performance scores. It should be noted that while the green and blue channels of ccd imagery are identical to those of truecolor imagery, all three ccd channels are plotted for completeness. Similar to the multispectral single band plots, the red channels yield the best performance, as well as the highest DR and lowest FAR; this is most likely due to the good contrast for nuclei in the red channels (refer to FIG. 4). The most significant differences between the RGB image types occur in the green channels.

The distinction in performance of red channels between the RGB image types is not large; refer to Table which shows maximum performance using all available image bands and single image bands presented as in-sample (IS)/out-of-sample (OS). "P" is the performance on entire image stacks, "Max P" is the maximum performance of a single image band, and "Max P Band" is the band yielding the best performance. Here the single best performing multispectral band yields a performance increase of 0.005 IS and 0.006 OS, similar to the performance increase using entire multispectral stacks versus entire RGB stacks. As reference, Table 6 also displays the IS and OS performance using all image bands.

It was noted that the poorest performing RGB channel was found to be the blue, whereas with multispectral data, the green portions of the spectrum are the poorest performers. While it may seem contradictory that in RGB imagery the green channel out performs the blue channel when the opposite is true in multispectral imagery, it is important to remember how the multispectral bands are allocated to each of the RGB bands. Consider, for example, the allocation of bands in rgbequal imagery: the bands from 510 nm to 600 nm are averaged to yield the green channel. Referring to FIG. 8A these bands have a large variation in performance. Thus, to obtain the green channel, we are averaging multispectral bands, several of which have relatively good performance. A similar situation occurs with the truecolor and ccd imagery, albeit with less weighting applied to these better performing "green" bands.

Since the nuclei are stained with the blue-colored Hematoxylin which will block red light, the red portions of the spectrum have the best contrast and perform best for this nuclear classification task. While green light is also blocked by the Hematoxylin, so also is it blocked by the Eosin, rendering the green portion of the spectrum less informative for the task at hand.

The distinction in performance of red channels between the RGB image types is not large; however, the single best performing multispectral band yields a performance increase of 0.006 as compared to the single best RGB bands, averaged over all 4 classifiers. This performance increase is consistently in favor of single multispectral image bands, but is not generally statistically significant (refer to Table 7), especially for the more complex (and physically realistic) allocations of the truecolor and ccd imagery. Table 7 shows Wilcoxon paired signed-rank test p-values for performances of the best multispectral band versus the red channel of RGB imagery, presented as in-sample (IS)/out-of-sample (OS). Starred (*) entries correspond to statistical significance at the p-value of 0.05. Using the Bonferroni correction for these 24 tests, we look for the corrected p-value of $0.05/12 \approx 0.0042$, presented as bold entries in the table. Note that all bold entries also satisfy the less conservative p-value of 0.05 although they are not explicitly starred.

In sum, performance differences between single multispectral image bands and single RGB image bands are not statistically significant. This indicates that the individual multispectral image bands are not yielding any more useful spectral information than are the individual RGB image bands for classification of nuclei pixels in H&E stained imagery.

2.5.3 Single Image Bands Versus All Image Bands

One unexpected result from the previous section is that use of single image bands tend to outperform classification using all image bands; this results in a performance increase of 0.007 IS and 0.007 OS (most easily seen in Table 6). While these differences in performance are not large, the consistency of the bias toward single image bands is striking. Additionally, this performance difference may be statistically significant in as many as half of the cases (refer to Table 8). Table 8 shows Wilcoxon paired signed-rank test p-values for performances of best single image bands versus all image bands, presented as in-sample (IS)/out-of-sample (OS). Starred (*) entries correspond to statistical significance at the p-value of 0.05. Using the Bonferroni correction for these 24 tests, we look for the corrected p-value of $0.05/16 \approx 0.0031$, presented as bold entries in the table. Note that all bold entries also satisfy the less conservative p-value of 0.05 although they are not explicitly starred.

To attempt to explain this result, we look at the distribution of nuclei and background pixels in the form of scatter plots FIGS. 10A-C, which show scatter plots of nuclei versus non-nuclei in ccd imagery of the whole dataset. Nuclei points are green o's and non-nuclei points are blue x's. Each scatter plot is displayed both with blue and green on top to allow better appreciation of the extent of each class. Since all the classifiers considered use a linear (or approximately linear) decision hyperplane, they may have a slightly easier time correctly discriminating a 1-D distribution (e.g. just the red channel). Referring to the 2-D scatter plots in FIGS. 10A-C, the distributions are distinctly non-Gaussian (an assumption made by several of the classifiers), and it appears that a curved decision boundary may improve performance While the ML classifier results in a quadratic boundary, FIGS. 10A-C show that the two classes have approximately equal scatter. This would indicate approximately equal covariance matrices which will yield an approximately linear boundary. The addition of more image bands may decrease performance slightly, by adding additional dimensions for which a linear hyperplane cannot adequately compensate. Although the scatter plots in FIGS. 10A-C appear to have significant inter-class overlap, it is the density of these points that allows for as good a classification as we achieve with simple linear classifiers.

As a test of our conjecture, we return to our nonlinear SVM results from the previous section (refer to Table 3). There is an average performance of 0.927 IS and 0.901 OS, as compared to the best non-SVM performance of 0.901 IS and 0.908 OS from the AFE classifier. This would seem to indicate the superiority of a curved (quadratic, in this case) decision boundary for the higher dimensional classification problems, at least for IS data. While we also note in Table 3 that the linear SVM (LSVM) outperforms the quadratic SVM (NLSVM), we must keep in mind that the NSLVM kernel was trained for only 10% of the training data, resulting in a less than optimal solution as compared to the LSVM which had access to 100% of the training data.

2.5.4 Analysis of FLDA Coefficients and Bands Chosen in AFE Solutions

One would expect that the single image bands which yield the best performance should also be the bands used most often by the classifiers. A direct examination of this is possible with the FLDA and AFE classifiers. For FLDA, image bands are weighted and summed; the higher the absolute value of the coefficient, the more important the image band. A plot of these coefficients for multispectral and RGB imagery is shown in FIGS. 11A-B. For the AFE classifier, more important image bands should be chosen more often in solutions; a plot of the average number of times an image band is chosen in an AFE solution is shown in FIGS. 12A-B, where the 10 independent runs have been averaged. Once again, in both the FLDA and AFE classifier, there is a preference for the red portion of the spectrum.

We note also that with RGB imagery (FIGS. 11B and 12B) the FLDA classifier weights the red channel the most, followed by the blue, and finally green channels. Similarly, the AFE classifier chooses the red channel most often, followed in turn by blue and green. Comparing the multispectral plots for the AFE and FLDA classifiers (FIGS. 11A and 12A) there are striking similarities in the relative use/weighting of bands, particularly in the red portion of the spectrum (i.e., 580-650 nm). The more prevalent use of green and blue bands in the AFE classifier, compared to FLDA, may be due to the classifier's ability to extract local spatial features, making those bands more useful beyond the raw spectral attributes used by the FLDA classifier. Additionally, some of these differences may average out if more AFE runs were considered. (In particular, the AFE classifier displays an odd preference for 420 nm which has very little contrast (refer to FIG. 4)). Overall, considering the disparate nature of these two classifiers, we find it very interesting that they both display similar preferences for particular image bands.

The analysis in this section is used as a complement to the analysis of performance on single image bands. Specifically, we have shown that image bands that yielded better performances are also the image bands chosen preferentially in both the FLDA and AFE classifiers. While it may be more qualitatively satisfying if the plots of FIGS. 11A and 12A would bear more resemblance to those of FIGS. 8A and 8B it is important to note that these two analyses are very distinct from one another. In the case of FIGS. 8A and 8B, we are limiting the classifiers to a single image band, and optimizing the performance, whereas for FIGS. 11A and 12A we are providing the classifiers with a choice of all available image bands and optimizing performance. As a more intuitive example, for the FLDA classifier, even if a specific image band X performs well when used alone, this same image band X may not yield as much information as, say, the linear combination of bands Y and Z. We have shown, therefore, in this analysis, a classifier preference for image bands that have also been shown to yield better performance when used singly in classification.

2.5.5 Entropic Analysis of Image Bands

In order to quantify the source of the slight performance differences between the various image types, we look at the entropy of nuclear regions in our imagery. For this, entropy is defined as $$H = -\sum_{i=1}^{N} P(\alpha_i)\log_2 P(\alpha_i), \tag{2.22}$$

where N is the total number of grayscale levels, $a_i$ is the i-th level, and P ($a_i$) is the probability of the i-th level (generally estimated from the image histogram) [79]. Entropies of this imagery are plotted in FIGS. 13A-F and summarized in Table 9.

Several observations may be made form these results. First, the highest entropy occurs in the red portion of the spectrum, corroborating well with the best performing image bands being in the red portion of the spectrum. Second, malignant images have a higher entropy than the benign images; this is not surprising since malignant nuclei tend to have more pronounced chromatin texture. There is, however, significant overlap between entropies of individual images and the average malignant or benign entropies. Third, our multispectral imagery has slightly higher nuclear entropy than any of the derived RGB imagery. This could lead to the erroneous conclusion that multispectral imagery should therefore have the best performance; entropy is, however, only one particular measure of information content. The information that human experts use in their segmentation of nuclei involves higher level concepts beyond pixel-level entropy.

2.5.6 Principal Components Analysis of Multispectral Images

Principal Components Analysis (PCA) [88] was used as a dimensionality reduction method to see how many "important" bands actually exist within our multispectral image stacks. Input to the PCA algorithm is the (768·896)×29 matrix where rows correspond to a single image pixel and columns are the pixel values for each of the 29 multispectral image bands. The average sorted eigenvalues of the covariance matrix of this input are plotted in FIG. 14, where the eigenvalues for each image are normalized such that the largest eigenvalue has unit value.

There was very little difference in this plot for malignant and benign subsets of our data, so the eigenvalue plot is averaged over our entire dataset. It was unexpected that there was only one dominant eigenvalue, with the second ranked eigenvalue at approximately one-tenth the value of the dominant one. Given that there are two stains in our histopathology imagery, we expected that there would be two dominant eigenvalues. FIGS. 15A-D show the projection of an example image (FIG. 15A) onto the first three eigenvectors. The first projection (FIG. 15B) appears to highlight nuclear regions (i.e., the Hematoxylin), the second projection (FIG. 15C) appears to highlight the connective tissue and cytoplasm (i.e., the Eosin), and the third (FIG. 15D) and subsequent projections do not have any obvious correlation with the tissue stains.

We have thus found that PCA indicates the presence of two dominant eigenvalues, if the principal components responsible for 97% of the variation in the data are considered. This indicates the presence of only two information-bearing projections of the imagery for this nuclear classification task, providing insight into the approximately equivalent performance of the RGB imagery and multispectral. We have also shown that these two informative projections demonstrate a direct relationship to the two image stains. Interestingly, the first component is responsible for 93% of the total variation; this component is generally correlated with Hematoxylin, but is sometimes correlated instead with what appears to be a grayscale version (i.e., intensity) of the original image; the reasons for this are not immediately clear. The possibility that other image bands may contain important diagnostic information for further analysis (i.e., analysis beyond a simple pixel-level nuclear classification) is still an open question [76].

2.6 Summary

We have shown in this section a demonstration of performance for different image types and different classifiers in a nuclear classification task. First, results indicate only slight performance differences using multispectral imagery as opposed to derived RGB imagery. These performance differences are not, however, statistically significant in many cases, especially in the OS set and for the physically realistic ccd and truecolor imagery. These conclusions hold for both classification using all available image bands as well as using single image bands, indicating that the multispectral bands may not contain any more specific spectral information than do the RGB bands for this nuclear classification task in H&E imagery.

Second, it has been shown that the single image bands with the best performance are the image bands chosen more often/weighted more heavily by the AFE and FLDA classifiers. Analysis of the entropy of image bands similarly reveals a preference for the red portion of the spectrum for nuclei.

Finally, it has been shown through the use of PCA as a dimensionality reduction method, that only two bands are carrying 97% of the variation in our image data, and appear to be correlated with the two image stains. This result provides some insight into the roughly equivalent performance of RGB imagery to multispectral.

2.7 Additional Considerations

First, the above discussion is only directed to a single low-level classification task for nuclei. However, additional embodiments may entail pixel-level classification of other histologic entities (some of which is detailed in Section 3), molecularly specific pixel-level classification [76] (to identify subtle differences in the spectra associated with different dye-protein interactions), as well as the object-level classification of histologic entities (see Section 5).

Second, while analysis has been shown for the RGB color space, there may be other color spaces more suitable for this and other classification tasks. As previously mentioned, YUV [15], HSV [17, 37], and HSI [15, 80] may be utilized. Additionally, the conversion of the imagery to optical density (OD), which provides a linear relationship between image intensity and staining density, may provide a useful image space to explore the virtues of multispectral and standard RGB imagery. Similarly, dimensionality reduction techniques such as PCA and Independent Components Analysis (ICA) [89] may also provide an informative image space.

Finally, feedback may also be incorporated into the system. In this case, the system would "fine-tune" the results of the pixel-level classification based on the results of a further higher-level analysis. In particular, the results of higher-level analysis can be incorporated into the performance metric for the pixel-level classification.

3. PIXEL-LEVEL CLASSIFICATION OF CYTOPLASM AND STROMA 3.1 Introduction

In our imagery, cytoplasm and stroma are not easily distinguished based solely on spectral information, especially when the inter-image variability in staining is taken into account. Thus, we find a pixel-level classification for the combined cytoplasm/stroma class and then discuss methods of discrimination between cytoplasm and stroma using texture and other features. The foregoing discussion details a method to distinguish between tissue and background, whereby the previous nuclei classification results may be subtract from the new tissue class to yield a combined cytoplasm and stroma class. This cytoplasm and stroma class can be further processed to discriminate between the two classes.

3.2 Motivation

While the characteristics of cell nuclei are well established as useful for diagnostic purposes, the characteristics of cytoplasm and stroma may have similar utility. We seek to develop a method to automatically and robustly distinguish cytoplasm from stroma in our pathology imagery. This allows a full object-level description for both entities in addition to the commonly quantified nuclear features.

Of ultimate interest is the separate classification of cytoplasm and stroma pixels. This appears to be a difficult task using solely spectral information, especially considering the wide variability in the spectral appearance of cytoplasm (from light purple to vivid pink). FIGS. 16A and 16D shows multispectral and ccd average histologic spectra plots (respectively) to allow better appreciation of the spectral shape, and average spectra± the standard deviation are plotted in FIGS. 16B and 16C to illustrate the overlap of the cytoplasm and stroma classes across the spectrum. Background and nuclei classes are shown as reference; note that these classes do not have the same overlap as do the cytoplasm and stroma classes Of particular interest is the 2-class problem, distinguishing between tissue and background, whereby the previous nuclei classification results can be simply subtracted from the new tissue class to yield a combined cytoplasm and stroma class. This cytoplasm and stroma class can be further processed to discriminate between the two classes. Referring to FIG. 17A-C, the entire image shown in FIG. 17A are detailed with respect to stroma in FIG. 17B and cytoplasm in FIG. 17C. In general, stromal structures range in color in intensity, but generally display a pink color and a sinuous and fibrous structure with a strong parallel direction between the various fibers. Cytoplasm, on the other hand, has a more homogeneous and granular texture and is most apparent on the inner edge of the ductal structure.

In our imagery, cytoplasm and stroma are not easily distinguished based solely on spectral information, especially when the inter-image variability in staining is taken into account. In this section we present the development and analysis of a classifier for cytoplasm and stroma. Section 3.3 details the pixel-level classification for the combined cytoplasm/stroma class of the present invention and Section 3.4 discusses methods of discrimination between cytoplasm and stroma. A summary is provided in Section 3.5 and conclude with additional considerations in Section 3.6.

3.3 Pixel-Level Classification

Since cytoplasm and stroma are both stained predominantly with Eosin, the problem of the classification of the combined cytoplasm and stroma class may be solved with solely the use of spectral information. The following discussion involves methods for the classification of tissue versus background. One method would be to find a threshold for the green channel which could separate out the tissue portions of the image. While this is certainly a valid approach, the use of a threshold-based method may not be ideal with imagery that is subject to such wide variation in staining intensity. This leads us to approach the problem as an unsupervised classification.

3.3.1 k-means Clustering and Region Merging

As opposed to the supervised classification techniques used in Section 2, unsupervised techniques do not rely on a training markup but rather attempt to cluster the image pixels according to some similarity criterion defined a priori. The k-means clustering algorithm is chosen for pixel-level classification of cytoplasm and stroma versus nuclei and background. k-means is an algorithm which clusters data into k clusters while minimizing the intracluster variance [97]:

$$V = \sum_{k'=1}^{k} \sum_{x \in C_{k'}} \|x - m_{k'}\|^2 \qquad (3.1)$$

where $C_{k'}$ is the k'-th cluster. The number of clusters k must be specified by the user and is generally based on the desired number of output classes or knowledge of the image constituents.

Noting that there should be three main spectrally distinct classes, background (white), nuclei (blue-purple), and cytoplasm/stroma (pink-red), we choose k=3. k-means clusters are assigned to the background $C'_b$, nuclei $C'_n$, and cytoplasm/stroma $C'_{cs}$ as follows: $C'_b$ is the class with lightest average green value, $C'_n$ is the class with the darkest average green value, and $C'_{sc}$ is the remaining k-means class. This rule-based approach is based on the observation that the nuclei tend to be the darkest staining histologic entities in the image.

While it may seem odd to classify cytoplasm and stroma pixels as the absence of nuclei and background pixels, it is the background and nuclei pixels that are the easiest to quantify. Indeed, we have thorough pixel-level markups of nuclei used in Section 2. These ground truths can be used as a measure for the classification ability of the k-means classifier. This will lend a quantitative metric to the classification of the k-means algorithm beyond the qualitative analysis of the cytoplasm/stroma classification.

Although we expect three main spectrally distinct classes, the merging of a larger number of classes may prove more accurate. The rule-based approach presented above is modified for use with k>3, where the average values of the red, green, and blue channels (R(k), G(k), and B(k), respectively) have been calculated ahead of time:

1. Find the cluster with the lightest average gray value in the green band. The green band is used since this band encompasses the wavelengths of light that are blocked by both Hematoxylin and Eosin. Thus, the intensity of the green band gives an indication of the intensity of total stain. This cluster with the lightest average green value is assigned to the background. Call this cluster $C'_b$.

2. Find the cluster with the darkest average gray value in the green band. It is expected that the darkest regions of the image will correspond to the high-density chromatin areas of the nuclei. Call this cluster $C'_n$.

3. Iterate through the following steps:
    (a) Find the most commonly occurring spatially adjacent label to $C'_n$.
    (b) Define $k_{sa}$ as the label of this most common adjacent cluster, if $$B(k_{sa}) > R(k_{sa}) + \text{mean}(B-R), \qquad (3.2)$$

then assign this cluster to nuclei ($C'_n = C'_n \cup C_{ksa}$), and proceed to step (c). Otherwise, assign this and all remaining clusters to cytoplasm/stroma ($C'_{cs} = C_{ksa} \cup (C'_b \cup C'_n)^c$ and terminate the iterative process. In the preceding equations $\cup$ is the union and $(\bullet)^C$ is the set complement operator.
    (c) (Degenerate case) If $C'_n \cup C'_b \equiv \cup C_k$, terminate the iterations. Otherwise, repeat step (a).

3.3.2 Classification Results

We quantify the performance of this k-means merging algorithm by computing the classification performance on just the nuclei using the same ground truth used in Section 2. This allows a comparison of the nuclei classification capabilities of the k-means merging algorithm as compared to the supervised learning methods that were extensively studied in Section 2. Only the ccd RGB imagery is used for this quantification. The k-means merging method presented above would work as is for the rgbequal and truecolor imagery, and could be easily modified to work with the multispectral imagery. We choose to focus our efforts on the ccd imagery, however, since we have shown in the previous section the approximately equivalent performance of spectral classification algorithms between the different imagery. Choice of the ccd imagery is also motivated by positive feedback from our pathology collaborators as to the aesthetic equivalence of our ccd imagery to standard H&E stained imagery in histology textbooks [93]. The three metrics presented in Section 2, namely detection rate (DR), false alarm rate (FAR), and performance (P) are used; refer to Section 2.4.2 and Equation 2.21 therein. Results for k=3, . . . , 15 are presented in Table 10. For easy reference, Table 11 includes the OS rates for ccd imagery from the six classifiers of Section 2.4.1. More specifically, Table 10 shows detection rate (DR), false alarm rate (FAR), and performance (P) for k-means classification. Bold rates correspond to the best rates. Performance for nuclei is compiled using the comprehensive ground truth of Section 2, while performance for the background class is compiled using the sparser 4-class ground truth previously introduced in this section. Table 11 shows out-of-sample detection rate (DR), false alarm rate (FAR), and performance (P) for Section 2.4.1 classifiers. Bold rates correspond to the best rates.

Referring to Table 10, there are fairly consistent results across the different values of k, with a slight performance advantage (on average) for k=3. Since the larger values of k require longer computation time to converge, k=3 is chosen as the optimal value both in terms of computational efficiency and overall performance. Table 10 also shows the performance for classification of background pixels, compiled using the background class in the sparse 4-class markup introduced in this section. There is a very good performance for this class across all values of k. We were expecting a degraded performance from the k-means algorithm as compared to the classifiers used in Section 2.4.1, shown in Table 11, but instead found comparable performance. As such, both the k-means classification of the combined cytoplasm/stroma class as well as nuclei could be used for further analysis. The discrimination between cytoplasm and stroma will be discussed in subsequent sections.

3.4 Discrimination between Cytoplasm and Stroma

After the pixel-level classification of both nuclei and the background, leaving the combined cytoplasm and stroma class remaining, the next step is discrimination between the cytoplasm and stroma classes.

4.1 Gabor Feature-Based Discrimination

A wavelet-based texture measure is chosen as a powerful but compact representation of texture (i.e., high energy spatial information). In general, stromal structures display a sinuous and fibrous structure with a strong parallel direction between the various fibers (as shown in FIG. 17. Due to the strong orientation component of the stromal texture, the Gabor wavelet is chosen as a basis for a texture discrimination between cytoplasm and stroma.

Gabor functions are Gaussians modulated by complex sinusoids. The two-dimensional Gabor functions in the time- and frequency-domain are defined as [100, 101]:

$$g(x, y) = \frac{1}{2\pi\sigma_x\sigma_y} e^{\left[-\frac{1}{2}\left(\frac{x^2}{\sigma_x^2}+\frac{y^2}{\sigma_y^2}\right)+2\pi fWx\right]} \quad (3.3)$$

$$G(u, v) = e^{\left[-\frac{1}{2}\left(\frac{(u-W)^2}{\sigma_y^2}+\frac{v^2}{\sigma_x^2}\right)\right]} \quad (3.4)$$

where $\sigma_u = 1/2\pi\sigma_x$ and $\sigma_v = 1/2\pi\sigma_y$. The parameters are chosen according to [100, 101] (in which $\sigma_u$ and $\sigma_v$ are computed to minimize the redundancy between the various Gabor filters), and a modification of the code from [100] is used, where the Gabor filtering is performed in the frequency domain to avoid the computationally intensive convolutions required in the time domain. The mean and standard deviation of the resulting filtered output are commonly used features for texture characterization [100, 101]; we use six orientations and one scale, resulting in twelve features.

FIGS. 18A-B illustrate Gabor output with FIG. 18A being the reference ccd image displaying both stroma and cytoplasm. The nuclei and background have been masked out in the Gabor output in FIG. 18B, leaving only the combined cytoplasm and stroma class. Note that stromal areas display a larger value in the Gabor output (red areas in FIG. 18B), whereas the cytoplasm areas display smaller values (orange and yellow in FIG. 18B). Since stromal regions are expected to have stronger Gabor output a robust threshold for the Gabor output is desired. An absolute threshold is avoided due to the staining intensity variations in our imagery. Defining a relative threshold as the point at which the rate of change of the thresholded images is maximum, this should correspond to the threshold at which the major cytoplasm regions are eliminated. Results using these thresholds are shown in Table 12, where there are poor DRs for both cytoplasm and stroma and an overall performance (averaged cytoplasm and stroma performance) of 0.714. Table 12 shows detection rate (DR), false alarm rate (FAR), and performance (P) for Gabor cytoplasm/stroma discrimination, using the sparse ground truth markup for compilation of results. Total performance is the average of cytoplasm and stroma performance. Since there are twelve results from the Gabor filtering, the mean over these feature planes is presented. The mean is used rather than the maximum since we are interested in regions with a strong response in any orientation, rather than just in the six specific orientations of the Gabor filters. Empirical observations of the resulting segmentations suggest that the addition of the red channel information may improve the segmentation performance. This leads to the question of whether there are other features that could be of use in a feature selection framework.

3.4.2 Nuclear Proximity Gabor, and Spectral Feature Based Discrimination

Cytoplasm and stroma are distinguished by the human expert based on proximity to the nucleus, texture, and sometimes color information (some stroma is dark pink) [93]. As such, three categories of features related to color, nuclear proximity, and texture were chosen for use in a standard classification framework. We will discuss each of these feature categories in turn, followed by the feature selection and classification aspects.

Proximity to Nuclei

Proximity to nuclei is one of the most telling characteristics of cytoplasm besides its general textural difference from stroma. The concept of "proximity" is more of a high-level architectural concept, but we seek to model this in a simple geometric fashion. While there are some heuristics about the extent of cytoplasm with respect to nuclear size, we will simply compute the Euclidean distance to the nearest nucleus, and allow the classification method to determine an appropriate threshold based on our training data. Thus, for each cytoplasm/stroma pixel, we have a single distance feature to the nearest nucleus perimeter:

$$d_{nn} = \min_{N_p} |N_p - CS_i| \quad (3.5)$$

where $N_p$ is the set of nuclear perimeter pixels, $CS_i$ is the current cytoplasm/stroma pixel, and $|\cdot|$ is the 2-D Euclidean distance metric.

For texture features, we use a vector consisting of twelve values per pixel, where for each orientation and scale both the mean and standard deviation of the filtered output is computed. Additionally, the average over the mean values and the standard deviation values are computed, resulting in a length-14 vector:

$$g=[m_{11},\sigma_{11},\ldots,\sigma_{SK},m,\sigma]^T \quad (3.6)$$

where S is the total number of scales (1) and K is the total number of orientations (6).

Spectral Features

While the ccd imagery was used for the k-means classification of the combined cytoplasm and stroma class, the multispectral information for this class can be substituted. While there is significant spectral overlap between the cytoplasm and stroma classes (refer again to FIG. 16), the use of spectral information, in combination with our other feature categories, may improve the discrimination between cytoplasm and stroma. Thus we have a length-32 feature vector for spectral information, where the first 29 indices correspond to the 29 bands of the multispectral imagery, and the following three are the (R, G, B) values of the ccd imagery:

$$\lambda=[\lambda_{420},\lambda_{430},\ldots,\lambda_{700},\lambda_R,\lambda_G,\lambda_B] \quad (3.7)$$

Combining the proximity, texture, and spectral features, we have a length-47 feature vector, $$f=[d_{cc}g^T\lambda^T]^T \quad (3.8)$$

for each pixel in the combined cytoplasm and stroma class.

Feature Selection Methods

Feature selection is a means to select the relevant and important features from a large set of features, many of which may be redundant, irrelevant, or not particularly useful (and possibly detrimental) to the classification performance. While humans have innate abilities to process and understand imagery, they do not tend to excel at explaining how they reach their decisions. As such, large feature sets are generated in the hopes that some subset of features incorporates the information the human expert is using for analysis.

Well-known feature selection methods include the sequential search methods, namely sequential forward selection (SFS) [102] and sequential backward selection (SBS) [103]. SFS works by sequentially adding the feature that most improves the classification performance; similarly, SBS begins with the entire feature set and sequentially removes the feature that most improves the classification performance. It may seem counter-intuitive that removal of a feature could improve the classification performance. As previously mentioned, however, not all features are similarly useful for classification. Removal of features that may be redundant, irrelevant, or contradictory will improve the classification performance.

Both SFS and SBS suffer from the "nesting effect" whereby features that are selected (SFS) or discarded (SBS) cannot be revisited in a later step and are thus suboptimal [104]. Pudil et al. [104] proposed the use of floating search methods, sequential floating forward search (SFFS) and sequential floating backward search (SFBS), in which previously selected/discarded features can be re-evaluated at later steps. While these methods still cannot guarantee optimality of the selected feature subset, they have been shown to perform very well compared to other feature selection methods and are, furthermore, much more computationally efficient [104].

More recent feature selection research has focused on such methods as boosting [105-107] and grafting [108, 109]. SFFS, however, has been shown to have comparable performance to grafting for several problem sets [110], and has been shown to outperform many other feature selection methods [111]. SBFS has similar performance to SFFS in many cases, but tends to suffer from higher computational complexity in the initial steps due to the larger feature set with which it begins.

Results

We choose SFFS as our feature selection method, Fisher linear discriminant analysis (FLDA) as the classifier, and use the PRTools package from Delft University [112], which includes a wide variety of feature selection and classification methods. The choice of the FLDA classifier is motivated by the good performance of this classifier for the nuclei classification task of Section 2 and by the use of a FLDA backend on the Genie Pro system which will allow for easy comparison in the following section. Additionally, preliminary tests with a quadratic classifier yielded poorer results for this cytoplasm/stroma discrimination. The total training set contains 190,140 samples (139,047 stroma and 51,093 cytoplasm) and the test set contains 185,929 samples (131,958 stroma and 53,971 cytoplasm). Since these datasets are very large and would be computationally expensive to process, a random subset of 1000 samples is selected for the training set. Since the training data are unbalanced, 500 samples are selected from each stroma and cytoplasm examples for each set. Using the unbalanced data tends to result in algorithms that classify the majority of the image as stroma, thus achieving a good score for the majority of the samples. By balancing the training data, we seek a better performance on both cytoplasm and stroma. To test the performance of the classification algorithm, both the entire training and test sets were tested.

The performance of the SFFS feature selection is shown in Table 13. Table 13 shows Detection rates, false alarm rates, and performance for Sequential Floating Forward Selection (SFFS) cytoplasm/stroma discrimination versus scale, using the sparse ground truth markup for compilation of results. Results are presented as in-sample (IS)/out-of-sample (OS). Bold rates correspond to the best rates and total performance is the average of cytoplasm and stroma performance. In addition to feature selection over the 47-D feature set, SFFS is also applied over smaller feature subsets: the 35-D subset excluding the orientation specific Gabor features and the 6-D subset excluding both the orientation specific Gabor features and the multispectral features. The 47-D feature set can achieve a performance of 0.80 IS and 0.77 OS.

The use of the 35-D feature set was motivated by the desire for none of the features to be orientation specific, as this will degrade the generalizability of the algorithm. The use of the 6-D feature set was intended to explore the utility of the multispectral information for this cytoplasm/stroma discrimination task. We expected a slight increase in performance using the 35-D feature set as opposed to the 47-D subset, but instead we find a slight decrease in performance for this dataset. There is an even further decrease in performance for the 6-D feature set, indicating that there may be some subtle spectral information within the multispectral bands that is useful for the cytoplasm/stroma discrimination. Application to other H&E stained histopathology imagery may see an advantage to the orientation invariant 35-D and 6-D feature sets.

3.4.3 Genie Pro-Based Discrimination

We also use Genie Pro for discrimination of cytoplasm and stroma. Genie Pro computes features using a pool of pre-defined image operators and the selection of relevant features is based on evolutionary computation. Thus, the selection of features is "evolved" based on the performance on training data. For the definition of ground truth the nuclei and background classes are defined as an unknown and the class that Genie Pro assigns to these regions is considered irrelevant. Rather, it is the discrimination between cytoplasm and stroma that is of interest here. Genie Pro was allowed to train for 100,000 iterations (approximately a day on an Intel Core Duo 2.33 GHz tablet PC with 2 GB of RAM), and the performance was analyzed. This high number of iterations allows Genie Pro ample time to refine its algorithm to achieve the best possible classification performance. Results are shown in the first row of Table 14, with 0.89 IS and 0.86 OS. Overall, Table 14 shows Genie Pro 2-class cytoplasm-stroma results, presented as in-sample (IS)/out-of-sample (OS). Bold rates correspond to the best rates. Original refers to the original 2-class training data as described in the text; masked refers to the original training data applied to a masked image, where the combined cytoplasm/stroma class is masked from the background and nuclei; and ccd refers to the training data applied to the ccd RGB image.

This 2-class markup (incorporating only cytoplasm and stroma as described above) was also applied to a masked image; this masked image contains the combined cytoplasm/stroma class as output from the k-means rule-based algorithm of Section 3.3.1. The use of this training data was motivated by the hypothesis that providing Genie Pro with an unambiguous unknown class (i.e., an obviously unique background to the cytoplasm/stroma class that we are trying to discriminate) would provide easier means to focus on the cytoplasm/stroma discrimination problem at hand. These results are shown in the second row of Table 14, with poorer performance.

One advantage of Genie Pro is the ability to visualize the resulting algorithm. This can allow insight into the features that Genie Pro uses in the classification process. The algorithm resulting from the original training data is shown in FIGS. 19A-19H. Within FIGS. 19A-19H, the various attributes correspond to the feature planes that Genie Pro has extracted from the imagery. Both the graphical representation of the algorithm for feature extraction as well as the output for one of our dataset images are shown. The final output is determined from the attribute planes using a ML classification. In actuality, there are two steps in the feature extraction in Genie Pro: the first is the spectral and textural feature extraction which is shown in FIGS. 19A-19H and the second is a morphological post-processing designed to mitigate clutter in the resulting ML output.

Three of the five Genie Pro attributes use the difference of spectrally close bands; in two cases two green bands (attributes 3 and 4 shown in FIGS. 20A and 20C respectively), and in one case two red bands (attribute 1 shown in FIG. 19E). This may indicate some extra information contained in the multispectral data that is useful for the discrimination of cytoplasm and stroma. On the other hand, attribute 0 (FIG. 19C) uses two spectrally distinct bands and attribute 2 (FIG. 19G) uses a single band. Genie Pro was run on ccd imagery using the same 2-class markup to look at the attributes extracted when there are not spectrally similar bands available. Results for this training run are shown in the last row of Table 14, and the attributes in FIGS. 21A-H. Table 14 shows that the ccd classification does not perform as well as the multispectral, but better than the masked multispectral.

Most of the ccd attributes seem to be related to the nuclei, with the possible exception of attribute 3 (FIG. 22A) which appears to be enhancing edges of tissue. Multispectral attribute 1 (FIG. 21E) appears to be related to nuclei as well. Necessarily, all the masked attributes are some derived feature of solely the combined cytoplasm/stroma class. We hypothesize that Genie Pro is using the nuclei information to help discriminate cytoplasm from stroma.

To test the hypothesis that Genie Pro is using nuclei information to help discriminate cytoplasm from stroma, the multispectral and ccd solutions were modified to provide access to only one of the attribute planes for classification. While it is well established that a combination of features can be more discriminating than single features, this will give some idea of the relative usefulness of the individual attribute planes.

The classification performance for each attribute plane for the multispectral Genie Pro solution is shown in Table 15. More specifically, Table 15 shows Genie Pro single attribute plane results for the multispectral solution, presented as in-sample (IS)/out-of-sample (OS). The results from the original solution using all five attribute planes is included here for easy reference. The best single attribute for the multispectral solution is attribute 1, which appears to be a smoothed version of the nuclei. Similarly, in the ccd solution, attributes 0 and 1 are the best performing single features, both appear to be related to nuclei; the worst performing attribute is 3, which does not have as direct a relation to nuclei.

For a complete analysis of Genie Pro's ability to discriminate between cytoplasm and stroma, we would need to develop several independent solutions for each of the training cases (multispectral, ccd, and masked). We have shown, however, a proof of concept that Genie Pro is making use of nuclei information to help with the discrimination of cytoplasm and stroma. We have also shown that these attributes related to the nuclei are the best performing single feature planes within the solutions. Based on our analysis here, we will use the Genie Pro 2-class solution for further analysis of cytoplasm and stroma regions.

3.5 Summary

In the above detailed methods for classification and discrimination of cytoplasm and stroma, the best overall average performance (OS) was found to be approximately 0.86. The data did not find a spectral difference between the two histologic classes (see FIG. 16).

3.6 Further Considerations

A dataset for could be utilized for which a more comprehensive ground truth could be developed for cytoplasm and stroma, e.g., serial sections classified with vibrational spectroscopy [29] or stained with other more specific stains. This would allow for a more comprehensive analysis of the performance of various cytoplasm and stroma classification methods.

While we have presented analysis of this problem using an intuitively satisfying feature set, there may well be other features better suited for this classification problem. Indeed, some of these well-suited features may stem from a higher-level conceptual analysis of the imagery, leading back to the need for feedback from higher levels of analysis. Given our intriguing results indicating the utility of nuclei for the discrimination of cytoplasm and stroma, other nuclear proximity features, may also be used e.g., a simple dilation of the binary nuclei.

Additionally, multiple independent Genie Pro algorithms for cytoplasm and stroma discrimination could be of use either directly for the discrimination process, or for further insight into relevant features.

4. SEGMENTATION OF NUCLEI, CYTOPLASM, AND STROMA 4.1 Introduction

This section details the first-level segmentation (the second row of FIG. 2) for cell nuclei, cytoplasm, and stroma. A new object-level metric for segmentation evaluation is described its correspondence to qualitative observations of general segmentation characteristics is shown. This metric is also used to compare several methods for delineation of cell nuclei, and to illustrate the dependence of this higher-level segmentation on the accuracy of the underlying pixel-level classification (Section 2). Analysis of multispectral versus RGB imagery is furthered, showing that for nuclear segmentation, the RGB imagery performs better than the multispectral. Furthermore, methods of segmentation for cytoplasm and stroma in accordance with the present invention are discussed.

4.2 Motivation

We seek domain-specific first-level segmentations for our histopathology imagery to serve as a foundation for our hierarchical object-level analysis. The segmentation of cell nuclei on an object level is a very difficult problem. Solutions for the H&E stained imagery are sought that avoid too many underlying assumptions about the nuclear characteristics (e.g., parameterization as an ellipse). An object-level segmentation metric is shown to be applicable to our nuclear segmentations, and possibly other application areas.

In this section, methods for the segmentation of cytoplasm and stroma in accordance with the present invention are discussed, which will be used to extract object level features for both histologic entities.

The work presented here begins the development of object-level analysis of our imagery, i.e., the second level of the framework of FIG. 2, with first-level segmentation for cell nuclei, cytoplasm, and stroma. The object-level metric for segmentation accuracy is described as well as the specification of object-level ground truth for cell nuclei in Section 4.3. Results for two categories of nuclear segmentation are shown in Sections 4.4 and 4.5, including analysis of the segmentation accuracy and efficiency. The variability of these segmentation methods is analyzed over our entire dataset and the expected maximum segmentation performance is shown given an ideal pixel-level classification in Section 4.6. The segmentation of cytoplasm and stroma is discussed in Section 4.7.

4.3 Segmentation Metric

The following metric was defined with the segmentation of cell nuclei, i.e., roughly circular or elliptical objects, in mind. For the segmentation of cell nuclei, we seek to penalize not only the size of regions missed and extraneous regions, but also the shape of those same regions. Additionally included are terms to penalize over- and under-segmentation. The quadrant sum is used as a method of quantifying deviation in shape from the ground truth by comparing the mass across two orthogonal axes through the object's center of mass. While this section will focus on elliptical objects, use of the quadrant sum for arbitrarily shaped objects will be shown in Section 4.3.3.

4.3.1 Definition

The segmentation metric of the present invention is defined as:

$$P = \frac{1}{N_D} \sum_{i=1}^{N_D} \max\left(0, \left[1 - \alpha_1 \frac{SR-1}{\delta_{SR}} - \alpha_2 \frac{1}{1.75}\left(\frac{PM}{GT} + \frac{2QS_{PM}}{GT}\right) - \alpha_3 \frac{1}{1.75}\left(\frac{EP}{GT} + \frac{2QS_{EP}}{GT}\right)\right] \cdot \left(1 - \alpha_4 \frac{N-N_D}{N}\right) - \alpha_z \frac{ER}{N \cdot \delta_{ER}}\right) \quad (4.1)$$

where $0 \leq \alpha_i \leq 1$, $i = 1, \ldots, 5$.

Taking each additive term in the equation above, we will define the variables. First we would like to point out that for the sake of clarity and brevity, Equation (4.1) does not include the necessary clipping functions to assure that each term is less than 1. We will discuss the need for these clipping functions and explicitly display them in the discussions of individual terms to follow.

In Equation (4.1), N is the number of ground truth nuclei defined in the user markup and $N_D$ is the number of nuclei detected by the segmentation algorithm; thus the summation averages scores for individual nuclei. We penalize for each nucleus detected:

1. The number of segmented regions:

$$term_1 = \alpha_1 \min\left(1, \frac{SR-1}{\delta_{SR}}\right) \quad (4.2)$$

Figure 2E:
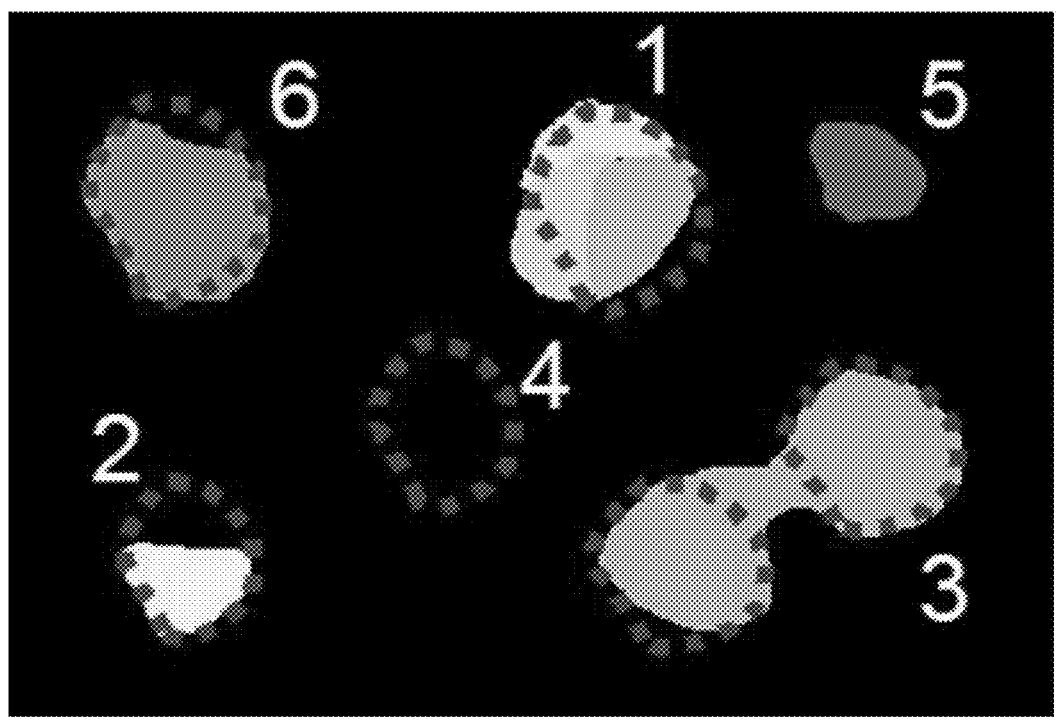
FIG. 2E illustrates examples of the segmentation metric of the present invention.

SR is defined as the number of segmented regions overlapping the current ground truth nucleus, and $\delta_{SR}$ as the upper limit for number of segmented regions. For a perfect segmentation there would be only one segmented region per ground truth region and $\delta_{SR}=1$ would be an intuitive value for evaluation of very good segmentations; we leave this as a parameter, however, to allow for comparison of poorer segmentations with more tendency to oversegment. The minimum function is used to clip this term to a maximum value of $\alpha_1$ for any number of segmented regions greater than $\delta_{SR}$. Overall, the weight $\alpha_1$ can be thought of as the penalty for an oversegmented nucleus. FIG. 2E illustrates some examples of segmented regions that can be helpful in understanding the metric; within FIG. 2E, the red dashed lines are considered the outline of each ground truth nucleus. The object labeled 1 is an illustration of a nucleus that has been segmented into multiple parts, while object 6 is an example of a nucleus that has been segmented into a single region.

2. The size and shape of the region of pixels missed:

$$term_2 = \alpha_2 \min\left(1, \frac{1}{1.75} \cdot \left(\frac{PM}{GT} + \min\left(1, \frac{2 \cdot QS_{PM}}{GT}\right)\right)\right) \quad (4.3)$$

PM is defined as the number of pixels missed; that is, the pixels belonging to the ground truth markup of the nucleus, but missed by the segmentation algorithm. GT is the number of pixels in the ground truth markup, which we use to normalize our size metric PM. Thus, PM/GT quantifies the size of the region of missed pixels.

We also look at the spatial distribution of the missed pixels, since we wish to penalize certain spatial distributions more than others. For example, a distribution of missed pixels in an annulus about the centroid of the nucleus will affect the shape other higher-level metrics far less than a distribution of missed pixels encompassing half of the nucleus. Note that this is a different approach than a simple pixel distance error as in [120] and tends towards an appreciation of the ultimate goal of this image analysis as in [122]. We take the "quadrant sum" of the pixels missed, $QS_{PM}$ as follows:

$$QS_{PM} = \|r_1 + r_3 - r_2 - r_4\| + \|r_1 + r_2 - r_3 - r_4\| \quad (4.4)$$

where $r_i$ are the number of pixels in the respective quadrants 1-4, and the quadrants are defined in a counter-clockwise direction. Looking at the polar coordinate representation of the PM region, the number of pixels in each of the four quadrants can be determined:

$$r_1 = \sum \|e^{j\theta_{PM}}\|, \text{ for } 0 < \theta_{PM} < \frac{\pi}{2}$$

$$r_2 = \sum \|e^{j\theta_{PM}}\|, \text{ for } \frac{\pi}{2} < \theta_{PM} < \pi$$

$$r_3 = \sum \|e^{j\theta_{PM}}\|, \text{ for } -\frac{\pi}{2} < \theta_{PM} < -\pi$$

$$r_4 = \sum \|e^{j\theta_{PM}}\|, \text{ for } 0 < \theta_{PM} < -\frac{\pi}{2}$$

4.5

Thus, $QS_{PM}$ is a measure of symmetry about the x- and y-axes of the region, where the origin is at the ground truth centroid. $QS_{PM}$ is normalized by GT/2, since the maximum value this sum can (theoretically) take is half of the area. Due to the discrete nature of the regions, however, it is possible that $QS_{PM}$ may slightly exceed GT/2; to compensate for this, we take the minimum of 1 and $(2\text{-}QS_{PM})/GT$. While this metric does normalize by the total size of the region, it is not duplicating the size metric PM/GT, since it is calculating here a measure of asymmetry according to the region size. While this is a simple and easy to compute metric, there is no reason why another shape metric could not be substituted, with appropriate attention to the inclusion of the size metric. In FIG. 2E, object 2 has a large and asymmetrical region of pixels missed, while objects 3 and 6 are a better segmentation in terms of the region of pixels missed.

Overall, $\alpha_2$ can be thought of as the penalty for regions of pixels missed, penalizing both size and shape. More details of the performance of this QS term is explained in FIG. 22A-C for circular and elliptical regions, including the motivation for the normalization factor of 1.75.

FIGS. 23A-C illustrate performance of the Quadrant Sum (QS) metric for pixels missed in discrete elliptical and circular regions. The QS metric in these plots has been normalized by GT/2 and the size metric by GT, where GT is the number of ground truth pixels. FIG. 23A shows the effect on the QS metric of ellipticity and orientation of missed pixels. The region missed is below the x-axis: ellipses plotted to the left of circular are missing half of their area along the major axis and to the right of circular, half their area along the minor axis. Note the possibility for the metric to be slightly larger than 1.

FIG. 23B shows on the QS metric of the portion of a circular region of pixels missed. The maximum value for this metric occurs at (and around) $\theta=\pi$, when half of the region is missed. The metric tapers off to zero for small and large angles; this illustrates the need for a separate size metric, since this metric is scoring only the asymmetry.

FIG. 23C shows the additive effect of the QS and size metrics. The combination of these two metrics yields the desired penalty. Note the maximum value of ~1.75.

3. The size and shape of the region of excess pixels:

$$term_3 = \alpha_3 \min\left(1, \frac{1}{1.75} \cdot \left(\min\left(1, \frac{EP}{GT}\right) + \min\left(1, \frac{2 \cdot QS_{EP}}{GT}\right)\right)\right) \quad (4.6)$$

Similar to term 2, EP is defined as the number of excess pixels; that is, the pixels segmented as part of the nuclear region that do not correspond with the ground truth markup. Since it is possible in the case of a severely undersegmented nucleus that EP/GT>1, we take the minimum of 1 or the ratio. Analogously to term 2, the quadrant sum of the excess pixels, $QS_{EP}$, is calculated:

$$QS_{EP}=\|r_1+r_3-r_2-r_4\|+\|r_1+r_2-r_3-r_4\| \quad (4.4)$$

where, for this quantity, the polar representation of the EP region is used:

$$r_1 = \sum \|e^{j\theta_{EP}}\|, \text{ for } 0 < \theta_{EP} < \frac{\pi}{2} \quad (4.8)$$

$$r_2 = \sum \|e^{j\theta_{EP}}\|, \text{ for } \frac{\pi}{2} < \theta_{EP} < \pi$$

$$r_3 = \sum \|e^{j\theta_{EP}}\|, \text{ for } -\frac{\pi}{2} < \theta_{EP} < -\pi$$

$$r_4 = \sum \|e^{j\theta_{EP}}\|, \text{ for } 0 < \theta_{EP} < -\frac{\pi}{2}$$

The same normalization factor GT/2 is used for $QS_{PM}$. It is possible, however, that this term can be much larger than 1, in particular for an adjacent nucleus segmented as part of the current nuclear region; as such, we again use the minimum function, taking the minimum of 1 and $(2 \cdot QS_{EP})$/GT. Again the sum of the two factors is normalized by 1.75. $\alpha_3$ is thus the penalty for size and shape of excess pixel regions, and is related to the degree of undersegmentation of the nucleus. In FIG. 2E, the object labeled as 3 actually encompasses two ground truth nuclei. Thus, for each ground truth nucleus, there is a large and asymmetrical region of extra pixels. Objects 1, 2, and 6 have smaller and more symmetrical regions of extra pixels.

Averaging these three terms provides a measure of the segmentation performance on all detected nuclei. We wish also, however, to weight this average by the general detection rate of nuclei. Thus the average of the previous three terms is scaled by:

4. The fraction of nuclei detected:

$$term_4 = 1 - \alpha_4 \frac{N - N_D}{N} \quad (4.9)$$

This term with $\alpha_4=1$ would simply be the detection rate; the fraction of missed pixels $(N-N_D)/N$ is scaled by weight $\alpha_4$ and then subtracted from 1 to get a modified fraction of detected nuclei. In many cases it may be sufficient and desirable to set $\alpha_4=1$, but it is left as a parameter since in the segmentation of nuclei, the accuracy of the nuclei that are segmented may be of more importance than the actual detection rate. This harkens back to the theory of UMA [122], wherein it is the accuracy of further image analysis that determine the accuracy of the underlying segmentation. In FIG. 2E, the object labeled 4 has been missed by the segmentation while objects 1, 2, 3, and 6 have been detected.

Finally we wish to penalize over the whole region of ground truth:

5. The number of extra segmented regions:

$$term_5 = \alpha_5 \min\left(1, \frac{ER}{N \cdot \delta_{ER}}\right) \quad (4.10)$$

While terms 1-3 are defined for a single nucleus, and term 4 scales the average of terms 1-3, this term looks at the excess segmented regions that have no correspondence to a ground truth nucleus. For this term, ER is defined as the number of excess segmented regions and $\delta_{ER}$ as the fraction of total ground truth nuclei that we will allow as excess regions; in general $\delta_{ER}=1$. $\alpha_5$ is, therefore, the penalty for excess segmented regions, similar to the concept of noise in [118]. In FIG. 2E, object 5 is an extra region; it has been segmented as a separate region, but does not correspond to any ground truth nucleus.

Overall, the choice of $a_i$ reflects a weighting of the relative importance of the various penalties. Similarly, the choice of $\delta_{SR}$ and $\delta_{ER}$ reflects a choice in the latitude given to certain errors in segmentation. A reasonable choice for default parameters would be=[0.5 0.5 0.5 1 0.5], $\delta_{SR}=1$, and $\delta_{ER}=1$, reflecting an equal penalty for under- and over-segmentation errors ($\alpha_1$, $\alpha_2$, and $\alpha_3$), a direct weighting by the detection rate ($\alpha_4$), equal importance given to the correct detection and segmentation of cell nuclei and the avoidance of erroneously detected and segmented nuclei ($\alpha_5$), one segmented region allowed per nucleus ($\delta_{SR}$), and weighting of the erroneously segmented regions proportional to the total number of cell nuclei ($\delta_{ER}$). It is important to note, however, that while the choice of these parameters will affect the absolute values of the metric terms, a direct comparison of segmentation performance for different algorithms may be achieved with any reasonable parameter choice.

4.3.2 Metric Variation versus Segmentation Quality

We apply the segmentation metric (Equation (4.1)) to the watershed transform of the complemented Euclidean distance transform (WSCDT) of a thresholded red channel for an example ccd image. The threshold is varied over the entire range of gray scale values it can assume, [0, 255], and all pixels less than the threshold value are retained. The use of the red channel is motivated by the high contrast for nuclei present in this channel.

While the WSCDT is a common approach to watershed segmentation, for the sake of clarity, we will describe in more detail the individual steps.

1. Compute the negative of the Euclidean distance transform on the complemented binary image, setting the distance of all background pixels in the binary image to a depth of $-\infty$.

2. Compute the watershed transform on the resulting distance transform.

Thus by varying the threshold and computing the segmentation metric (Equation (4.1)) of the WSCDT segmentation, we will get a sense of the expected variation in our metric for a range of segmentation possibilities. These possibilities include the two extremes whereby either all or none of the pixels have been classified as nuclei. The performance of the individual metric terms as well as the overall performance is displayed in FIG. 24. It is important to note that in this figure the performance of the individual terms are plotted rather than the terms themselves; thus the subtraction of each term from a value of 1 is plotted.

FIG. 24 shows the metric variation versus segmentation quality for an example ccd image. The red channel was thresholded, retaining all pixels less than the threshold, and was then segmented with the Watershed on the Complemented Distance Transform (WSCDT) method. It should be noted that all terms plotted here are performance, i.e., one minus the penalty, where the penalties are the terms previously discussed in relation to the segmentation metric. The terms are denoted by a brief description in the legend, but they are also plotted in numerical order, i.e., blue circles are term 1, red squares are term 2, and so forth. We have downsampled the plot for less clutter.

FIG. 24 illustrates that the performance is zero for both extremes of the threshold classification. Observation of the individual terms shows expected trends, namely that:

Term 1 (extra GT regions) decreases in performance as the threshold increases. As the regions thresholded as nuclei become larger with more complicated boundaries, the distance transform has multiple minima per connected component in the binary thresholded image. This results in a tendency to oversegment.

Term 2 (pixels missed) increases in performance as more pixels are attributed to nuclei. The dip in performance at high thresholds is due to an assumption that the largest watershed region is the background; this is generally valid for reasonable classifications, but becomes invalid as nearly the entire image is classified as foreground.

Term 3 (extra pixels) decreases in performance as nuclei tend to merge in the binary thresholded image.

Term 4 (nuclei detected) increases in performance as more pixels are attributed to nuclei.

Term 5 (extra regions) decreases in performance as more extraneous regions are thresholded as nuclei. The performance of this term returns to 1 for a threshold of 256, since there are no longer any extraneous regions; this is not apparent in FIG. 24 since we have downsampled the plot for less clutter.

We have presented here a general segmentation metric computed on an object level. This metric uses simple quantities that are easy to compute using the segmentation and ground truth images, namely the regions of pixels segmented that do not belong to a ground truth region, and the regions of pixels not segmented that do belong to a ground truth region. We have also shown the variation in this metric for a variety of segmentations using a simple watershed-based segmentation (WSCDT). We will first make a few remarks about the ground truth markup process, as well as the application of this metric to non-elliptically shaped objects and a comparison to other metrics. We will then present segmentation results using our newly defined metric.

4.3.3 Application to Non-Elliptically Shaped Objects

We would like to briefly discuss the applicability of the QS metric to non-elliptically shaped objects; in this section the focus will be on the use of the PM QS metric, but the arguments are identical for the EP case. The use of the centroid of the ground truth object is what allows this metric to work for irregularly shaped objects. For a planar object with uniform density, the mass (number of pixels in this case) will be equal across any arbitrary line through the center of mass (equivalent to the centroid in the uniform density case). By defining orthogonal axes through the centroid, we can eliminate the chance of the arbitrary line corresponding to a reflectional symmetry of the region of pixels missed.

An example of the application of the PM QS metric to a hand silhouette is shown in FIG. 25A-C, where we see the utility of the QS metric in quantifying the deviation in shape of the hand, rather than simply the size of the deviation. FIG. 25A-C illustrates application of the QS and size metrics to an example silhouette and "segmentations." Qualitatively, the segmentation in FIG. 25B (erosion by 1 pixel; total of PM=524 pixels) retains more resemblance to the original silhouette in FIG. 25A (GT=5270 object pixels) than does the segmentation in FIG. 25C where the entire thumb is missed. A size metric alone (as the one used in [124]) would rank the two results in FIG. 25B and FIG. 25C as equally good segmentations, while the use of the QS metric penalizes the change in shape of FIG. 25C. Note that in FIG. 25B the addition of the shape metric does not change the value of the original size-based metric by much (0.8%).

4.3.4 Comparison to Other Segmentation Metrics

The Vinet measure is directed to establish a region-to-region correspondence between images by looking for the maximum region overlap. A dissimilarity measure is then defined using the cardinality of the overlap. Thus, the Vinet measure can be thought of as a measure of the pixels missed and extra pixels, i.e., the pixels that are not contained in the intersection of the two objects. FIG. 25 in the previous section shows the size metric for the hand silhouette. This size metric, however, does not capture any difference in shape of the objects, as does the QS metric.

The Hausdorff distance defines the deviation between two sets of points as the largest distance between any two corresponding points [115, 134]. Defined formally, given two sets of points $A=\{a_1, \ldots, a_m\}$ and $B=\{b_1, \ldots, a_n\}$, the Hausdorff distance is:

$$H(A, B) = \max(h(A, B), h(B, A)) \quad (4.11)$$

where $$h(A, B) = \max_{a \in A} \min_{b \in B} \|a - b\| \quad (4.12)$$

This is commonly used for boundary matching in, e.g., object detection and image retrieval applications; more recently it has been used for face recognition [135] and hand recognition [136]. It is unclear whether this metric can easily be applied to objects consisting of multiple boundaries and/or objects with holes. Additionally, in the application to segmentation of cell nuclei, we are more interested in the object itself rather than just the boundary.

FIG. 26A-D shows the Hausdorff distance for elliptical and circular regions, where, for reference, the same plots for the QS metric are included (from FIG. 23). FIG. 26A-D shows a comparison of the Quadrant Sum (QS) metric and Hausdorff distance for pixels missed in discrete elliptical and circular regions. The QS metric in these plots has been normalized by GT/2, where GT is the number of ground truth pixels, and the Hausdorff distance has been normalized by the largest diameter of the object. The Hausdorff distance provides a poor measure of the deviation in shape, and is not easily normalized (especially apparent in FIG. 26B).

It appears that, while the Hausdorff distance may be well suited for boundary matching problems, it is not well suited for applications in which a measure of shape deviation is of importance. Additionally, it is not clear how to properly normalize the Hausdorff distance.

4.3.5 Ground Truth Image Markup

An interactive system is disclosed herein for user delineation of object-level ground truth. Within this system, the user designates objects by delineating the perimeter; objects may overlap, and can be defined with as many or as few points as desired. These points are used to create an object mask containing the pixels within the designated perimeter. The user uses a truth window, a rectangular box, to help focus the image markup to a particular image region. There is no reason why this could not be extended to include image markups involving several truth windows, but we concentrate here on the case of one truth window to better correspond with the pixel-level image markups we use in Section 2.

FIG. 27A-C illustrate the image markup process. While it is easy to specify a pixel-level markup within a designated truth window, such a specification becomes more complicated with an object-level markup. Consider the fact that in a pixel-level markup, an object that spans the truth window boundary can be marked up to the boundary without losing any important information for the overall classification. In an object-level markup, however, the actual extent and border of the object is of utmost importance. Moreover, if objects are marked within a rough concept of a truth window, there is the possibility that the truth window will contain parts of objects that have not been delineated by the user. This will lead to erroneously low performance since the segmentation metric will assume that these regions were incorrectly segmented.

To help alleviate this problem, after the user indicates that the delineation of objects within the chosen truth window is complete (FIG. 27A the truth window is recomputed as the minimum bounding rectangle of the object markups (FIG. 27B). Using this new truth window, the user is asked to mark a minimum of one point for each unmarked object that is either completely or partially enclosed by the new truth window. These points should ideally be the centroid for unmarked regions entirely enclosed within the truth window and a point within the object and the truth window for objects partially contained (FIG. 27B). This information is used in a connected-components analysis to determine if extra segmented regions are associated with an object that has not been delineated in the ground truth markup. This allows for some disambiguation of the truly extra segmented regions from those segmented regions that can not be accurately accounted for in the ground truth markup.

We store as the ground truth file 1) the values of the perimeter points (which are generally not specified according to the discrete image grid, but a continuous one), 2) the object mask, 3) a mask of the entire image markup (computed by the Boolean OR of the various object markups), and 4) the points designating non-delineated objects. While it is possible to store only the perimeter and non delineated object points (and thereby save disk space), the pixel masks are also stored to speed future computation. For the dataset of 58 images, defining object level ground truth in a −200×200 window, with an average of 50 marked and 9 unmarked objects per truth window, the ground truth files use approximately 8 MB of disk space, with an average individual file requiring about 138 kB.

4.4 Watershed-Based Segmentation of Nuclei

The text below details watershed-based segmentation methods for extraction of cell nuclei. Default weights (refer to Section 4.3.1) of $\alpha=[0.5\ 0.5\ 0.5\ 1\ 0.5]$, $\delta_{SR}=1$, and $\delta_{ER}=1$ are assigned.

4.4.1 Watershed on the Complemented Distance Transform (WSCDT)

The segmentation metric (Equation (4.1)) is applied to the watershed transform of the complemented Euclidean distance transform (WSCDT) of a pixel-level classification. As the binary image, we use the output of the pixel-level classifiers discussed in Section 2. In further discussion, no distinction will be made between the five classifiers; instead average segmentation performance of this algorithm and performance differences over the image types and image bands will be presented. For consideration of Wilcoxon p-values, the classifiers will be individually considered.

FIG. 28A-B shows the segmentation performance on entire image stacks for the WSCDT, averaged over the five pixel-level classifiers used in Section 2 (ML, MED, SAM, FLDA, and AFE). Note that the ccd images perform best overall, but also have the highest standard deviation in performance. Multispectral and rgbequal imagery have lower performance and lower standard deviation. The standard deviation in performance versus image type follows the same trend as the average performance versus image type. There is a performance increase of ~0.01 for ccd imagery versus multispectral, slightly larger than the performance differences seen in the pixel level classifiers (Section 2). It is important to note also that all scores are very poor (within the range of 0.125-0.160). Additionally, the standard deviation in scores is nearly the same as (and slightly larger than) the average performance, indicating that there is a wide spread in performance over the individual images. Table 16 shows the Wilcoxon p-values for each of the five classifiers, comparing the WSCDT performance for multispectral imagery versus RGB. More specifically, Table 16 shows Wilcoxon paired signed-rank test p-values for performances of multispectral versus RGB imagery for Watershed on the Complemented Distance Transform (WSCDT) nuclear segmentation. Starred (¤) entries correspond to statistical significance at the p-value of 0.05. Using the Bonferroni correction for these 15 tests, we look for the corrected p-value of 0.05/15≈0.0033, which are presented as bold entries in the table. Note that all bold entries also satisfy the less conservative p-value of 0.05 although they are not explicitly starred. It appears that about half of these differences are statistically significant, indicating that while multispectral outperforms rgbequal imagery for WSCDT nuclear segmentation, truecolor and ccd imagery outperform the multispectral. Remember that the multispectral versus RGB imagery distinction comes straight from the application of pixel-level classifiers to nuclei from Section 2.

The performance on single image bands for multispectral and RGB imagery is shown in FIG. 29A-D. Not surprisingly, for multispectral bands (FIGS. 29A and 29B) we note the same trend in performance that as in Section 2 (refer to FIG. 8). Similarly, the RGB plots appear very similar to those in Section 2 (FIG. 9). Again, the performance is poor and the standard deviation in performance is on the same order as the actual performance.

4.4.2 Watershed on H-minima Transforms (WSHmin)

The segmentation metric (Equation (4.1)) is now applied to the watershed transform of an h-minima transform of the complemented distance transform. This has the practical effect of disregarding minima that are relatively shallow. More precisely, we:

1. Compute the Euclidean distance transform of the complemented binary image.
2. Suppress all minima less than some value $h_{min}$.
3. Take the negative of the h-minima transform of the distance transform, and set the distance of all background pixels in the binary image to a depth of $-\infty$.
4. Compute the watershed transform on the resulting h-minima transform of the distance transform.

Again, the binary images used as input to this algorithm are the outputs of the various pixel-level classifiers used in Section 2. For analysis here, the focus is on the performance for entire image stacks, since the computation of multiple h-minima transforms increases the computation time required. The AFE classifier is excluded here, since accurate performance results requires an averaging of the 10 independent classifier runs. For an $h_{min}$ range of [1, 20], as shown in FIG. 30A-B, the four image types (multispectral, rgbequal, truecolor, and ccd), and the four pixel-level classifiers (ML, MED, SAM, and FLDA), 18,560 separate h-minima and watershed transforms must be computed. Including the AFE classifier would increase this to 30,160; including all image bands would require 607,840 transforms.

In FIG. 30A-B, performance at first increases to a maximum at an $h_{min}$ value of 3 or 4, after which the performance decreases and levels out. Multispectral imagery has the poorest performance for all values of $h_{min}$ except 0 and 1. Again, however, these performances are not particularly good, and the standard deviation is on par with the actual performance. Table 17 shows the Wilcoxon p-values for each of the four classifiers, comparing the $WSH_{min}$ performance for multispectral imagery versus RGB for $h_{min}=4$. More specifically, Table 17 shows Wilcoxon paired signed-rank test p-values for performances of multispectral versus RGB imagery for Watershed on H-minima Transforms (WSHmin) nuclear segmentation, hmin=4. Starred (*) entries correspond to statistical significance at the p-value of 0.05. Using the Bonferroni correction for these 12 tests, we look for the corrected p-value of $0.05/12 \approx 0.0042$, which are presented as bold entries in the table. Note that all bold entries also satisfy the less conservative p-value of 0.05 although they are not explicitly starred. It appears most of these differences are statistically significant, indicating that all three types of RGB imagery outperform the multispectral.

FIG. 31A-E plots the value of the various segmentation metric terms as they vary with $h_{min}$. FIG. 31A-E shows the value of Watershed on H-minima Transforms (WSHmin) performance metric terms versus hmin for different imagery. All terms plotted here are performance, i.e., one minus the penalty, where the penalties are the terms previously discussed in relation to the segmentation metric. The terms are denoted by a brief description in the charts, but they are also plotted in numerical order, i.e., blue circles are term 1, red squares are term 2, and so forth. The behavior of the individual metric terms is consistent with intuition: as hmin increases, the suppression of minima results in fewer total segmented regions and the performance of terms 1 (extra regions per ground truth region) and 5 (extra segmented regions) increases, while the performance of terms 2 (pixels missed), 3 (extra pixels), and 5 (nuclei detected) decreases. The brief increase in term 3 is due to smaller extraneous watershed regions being suppressed by the h-minima transform; after a certain point, however, the h-minima transform creates few enough minima that nuclei regions are merged by the watershed transform, resulting in the subsequent decrease in performance of term 3.

FIG. 31A-E plots the value of the various segmentation metric terms as they vary with $h_{min}$. FIG. 31A-E shows the value of Watershed on H-minima Transforms (WSHmin) performance metric terms versus $h_{min}$ for different imagery. All terms plotted here are performance, i.e., one minus the penalty, where the penalties are the terms previously discussed in relation to the segmentation metric. The terms are denoted by a brief description in the charts, but they are also plotted in numerical order, i.e., blue circles are term 1, red squares are term 2, and so forth. The behavior of the individual metric terms is consistent with intuition: as $h_{min}$ increases, the suppression of minima results in fewer total segmented regions and the performance of terms 1 (extra regions per ground truth region) and 5 (extra segmented regions) increases, while the performance of terms 2 (pixels missed), 3 (extra pixels), and 5 (nuclei detected) decreases. The brief increase in term 3 is due to smaller extraneous watershed regions being suppressed by the h-minima transform; after a certain point, however, the h-minima transform creates few enough minima that nuclei regions are merged by the watershed transform, resulting in the subsequent decrease in performance of term 3.

FIG. 32A-D shows example segmentation results for different values of $h_{min}$ along with the corresponding performance, and shows example Watershed on H-minima Transforms (WSHmin) segmentations where each color indicates a different segmented region. Note that as $h_{min}$ increases, the oversegmentation is diminished, but many valid nuclei are completely missed. This illustrates the fact that the initial increase in performance with increase in $h_{min}$ is most likely due to the decrease in oversegmentation, although we do lose some well segmented nuclei in the process. Similarly, we can see that subsequent decrease in performance as $h_{min}$ further increases is most likely due to the further loss of objects.

4.4.3 Watershed Using Granulometry-Based Markers (WSGran)

Granulometries are a common technique to elicit information about the size distribution of objects in an image. Granulometries are calculated by applying successively larger structuring elements in a morphological image operation and analyzing the residue image. More specifically, we use the morphological opening of a binary image with a disk-shaped structuring element (SE). The radius of the SE is increased by 1 pixel each iteration and the residue of the image (the sum of the pixels) is calculated. Iteration terminates when the image residue is zero, i.e., the structuring element is large enough to completely remove all non-zero pixels. Thus, there is a set of structuring elements $GSE_k$ which are used to calculate the morphological opening of a binary image $I \bigcirc GSE_k$. Defining $\psi_k$ as the area (number of pixels) in the k-th residue image, the function $$\phi(k) = 1 - \frac{\Psi_k}{\Psi_0} \quad (4.13)$$

is used to calculate the size distribution of image I [137,138]. Looking at the first derivative (the element-wise subtraction) of $\phi(k)$ will yield a local maximum for a structuring element with approximate size of a large number of objects in the original binary image. The derivative $\phi'(k)$ is often called the pattern spectrum of image I.

The average pattern spectra of the dataset, as well as the benign and malignant subsets of the dataset are shown in FIGS. 33A-C. Significant local maxima occur at SE radii of 2, 5-7, and 9, with less significant minima at radii of 12, 16, and 19. These pattern spectra are averaged over all five pixel-level classifiers of entire image stacks.

We expected a more significant difference between the pattern spectra of benign and malignant imagery, namely that the larger nuclei inherent in malignant imagery would manifest itself as larger objects in the granulometry plots. Instead, it appears that the pattern spectra of benign and malignant imagery are quite similar, with the main differences being the relative height of the local maxima. Oddly enough, it is the malignant imagery that has more objects of radius 2 and 5, and the benign more at radius 7. We hypothesize that this effect is due to the fragmented pixel-level segmentation of malignant nuclei due to the more prominent chromatin texture.

FIGS. 34A-B show the pattern spectrum of a single benign image and single malignant image (output of the FLDA classifier), which are used as example images to support our hypothesis about the reason for differing malignant and benign pattern spectra. The x-axis (structuring element (SE) radius) is scaled between 1 and 25 to allow better comparison to the plots in FIG. 33, even though these particular pattern spectra do not contain non-zero values past a radius of 12 or 13. In FIG. 34A-B, the two images chosen as examples display the same trends in local maxima as the average plots in FIG. 33.

FIG. 35A-L shows the image residues for SE radii of 2, 5, 6, 7, and 9 (the local maxima) for these example images. Note that in the original binary images (FIGS. 35A and 35D) the malignant image contains many small regions within several nuclei, due to the chromatin distribution. Thus, the residue after a SE of radius 2 contains significantly fewer objects than the corresponding residue of the benign image; this corresponds with the more significant maxima in the pattern spectrum of the malignant imagery at a SE radius of 2. A similar effect can be seen at radius 5, whereas the benign residues have a larger relative difference for radii of value 6, 7, and 9. These observations correspond nicely with the pattern spectra plots in FIG. 34.

While it was initially surprising to find such a similarity between the pattern spectra of benign and malignant images, this may ultimately prove helpful in the definition of nuclei markers for a marker-based watershed (or other segmentation) algorithm. We compute watershed transforms with minima of the input image imposed according to foreground and background markers:

Foreground markers: We use image residues from structuring elements of varying radii:

$$F = I \bigcirc GSE \quad (4.14)$$

where I is the original binary image, $\bigcirc$ is the image opening operator, and GSE is the structuring element. GSE is a discrete circle of radius r, where r is chosen as the approximate size of most image objects, according to the pattern spectrum. These markers serve as an approximation of the center of the binary objects.

Background markers: We use the erosion of the complement of the original binary image:

$$B = \tilde{I} \ominus SE \quad (4.15)$$

where $\tilde{I}$ is the binary complement of I, $\ominus$ is the erosion operator, and SE in this case is a fixed size discrete circle of radius 3. These markers impose a minima in all parts of the background of the binary image. The erosion operator creates a separation between the background markers and the object boundaries. The markers can be thought of as seeds for the watershed transform.

FIG. 36A-B shows the performance of the WSGran method versus the SE radius used to determine the foreground markers. There is a general increase in performance as the SE radius increases, up to a radius of 4 pixels, followed by a decrease in performance. Also, the standard deviation in performance is once again similar to the average performance. Similar to the WSCDT and $WSH_{min}$ performances, multispectral imagery seems to perform the worst. Wilcoxon p-values for multispectral versus the RGB imagery are shown in Table 18 where it appears that many of these differences in performance are statistically significant. Table 18 shows Wilcoxon paired signed-rank test p-values for performances of multispectral versus RGB imagery for Watershed using Granulometry-based markers (WSGran) nuclear segmentation, r=4. Starred (¤) entries correspond to statistical significance at the p-value of 0.05. Using the Bonferroni correction for these 15 tests, we look for the corrected p-value of 0.05/12≈0.0033, which are presented as bold entries in the table. Note that all bold entries also satisfy the less conservative p-value of 0.05 although they are not explicitly starred.

FIG. 37A-E shows the performance of individual metric terms for different SE radii. With the introduction of granulometry-derived markers (radius 1), there is a sudden jump in the performance of term 1 (extra segmented regions per ground truth region) and a sudden decrease in performance of term 3 (extra pixels). This indicates an overall tendency towards undersegmentation of the granulometry-based marker method. For SE radii of 1-4, there is a general increase in the performance of terms 1 (extra segmented regions per ground truth region) and 5 (excess segmented regions), relatively flat performance for terms 2 (pixels missed) and 3 (extra pixels), and a decrease in term 4 (nuclei detected). This corresponds with the intuition that as the SE size is increased, there will be less markers and thus less watershed regions (increasing the performance of terms 1 and 5), while the overall pixels included in each ground truth nucleus should remain relatively constant. As the SE radius increases beyond 4 pixels, the performance of all terms begins to decrease (with the exception of term 5). Again, this corresponds nicely with intuition that as the SE is increased beyond the average size of objects in the image, we will begin to lose entire objects from the marker selection and watershed segmentation. Refer again to FIG. 35 for illustration of the effects of SE size.

FIG. 38A-D shows example segmentations for different SE radii as markers. We note qualitatively here that the WSGran segmentations yield fewer small regions compared to the WSHmin segmentations. This can be seen in the many merged nuclei in FIG. 38A-D compared to FIG. 32. To this end, note the relatively poor performance of term 3 (extra pixels) for all values of SE radius (refer to FIG. 37). Conversely, WSHmin has a relatively poor performance for term 1 (extra regions per GT region), indicating that WSHmin has a tendency to oversegment. The performance of other terms is comparable between the two methods.

4.4.4 Blobdetector-Based Segmentation (WSBlob)

For this method we use an a priori assumption about the shape of cell nuclei, namely that they are roughly circular in shape and approximately the same diameter.

For use in our brightfield imagery, we use a non-inverted LoG filter in a "blobdetector" framework [139]. The LoG filter is shown in FIG. 39 for reference; the filter size is chosen to be the median diameter of the blobs of interest. The blobdetector framework also implements a local-maxima search over the LoG filtered image, using another parameter characterizing the minimum distance between blob centers (generally assumed to be approximately half the filter width). We note a few relevant characteristics of the blobdetector method:

1. The use of a circular model for cell nuclei is motivated by the desire for rotation invariance of the filtered output, and is shown in [139] to provide both quantitatively and qualitatively good results for roughly elliptical objects.

2. While one can fine tune the filter size and object separation parameters, the method does not appear to be overly sensitive to choice of these parameters.

3. The method was applied to a range of image types and was shown to have good performance for cell nuclei detection, as measured by average error in nuclei counting.

This method, however, was developed for the task of nuclei detection and counting applications; it does not address the issue of nuclear delineation. We are interested, however, in using the detection capabilities of this method as a seed for a subsequent watershed segmentation. Thus, although some a priori assumption about nuclei shape is used for detection of the rough location of nuclei, the watershed transform is used to delineate the shape of individual nuclei. This method (WSBlob) proceeds in a similar fashion to other marker-based watershed methods previously discussed:

Detect nuclei using the red channel of the ccd imagery and use these locations as foreground markers for the watershed transform. A filter size of 25 pixels in diameter and an inter-blob distance of 12 was empirically chosen.

Use the eroded complement of the binary nuclei classification as background markers.

By using the shape-based information from the blobdetector method as foreground markers and the spectral information from the pixel-level classification to develop the background markers and the distance transform, the false nuclei detections of the blobdetector method can be ignored if they fall outside of the spectrally classified nuclei regions. This makes the assumption that the pixel-level classification of nuclei more accurately determines regions of nuclear material, while the blobdetector more accurately locates individual nuclei.

Average results for the WSBlob method are shown in FIG. 40A-B, which illustrates a performance between that of the WSCDT and other methods. There is again a large standard deviation in performance. Wilcoxon p-values for multispectral versus RGB imagery is shown in Table 19. An exemplary WSBlob segmentation is shown in FIG. 41A-B, where each color indicates a different segmented region. Table 19 shows Wilcoxon paired signed-rank test p-values for performances of multispectral versus RGB imagery for blobdetector-based (WSBlob) nuclear segmentation. Starred (*) entries correspond to statistical significance at the p-value of 0.05. Using the Bonferroni correction for these 15 tests, we look for the corrected p-value of $0.05/15 \approx 0.0033$, which are presented as bold entries in the table. Note that all bold entries also satisfy the less conservative p-value of 0.05 although they are not explicitly starred.

4.5 Concavity-Based Segmentation of Nuclei

Motivated by observations that shape is a large factor in humans' ability to properly discriminate individual nuclei, we turn our attention to a shape-based segmentation method, using concavities as the basis of possible segmentation lines. We use the method presented by Kumar et al. in [140]. We will first provide an overview of the concavity-based method before describing our results.

4.5.1 Overview of the Concavity-Based Segmentation Algorithm (Kumar)

The concavity-based segmentation method of Kumar et al. [140] is the culmination of previous work Kumar and other researchers, namely [141-144]. It uses a rule-based approach for the segmentation of binary objects, beginning with a measure of concavity depth, adopted from a study of several measures of concavity in [145]. In this method, the segmentation of one binary blob into multiple constituent objects is accomplished with the use of a "split line." This split line represents the boundary between the constituent objects. A split line may occur between two object concavities, or between a single concavity and the opposite object boundary. Binary objects are split recursively until no further valid split lines are found.

There are six features used to determine the presence of valid split lines [140]:

Concavity-concavity alignment (CC): This metric represents the relative alignment of the concavities with respect to each other. Denoting the unit vector connecting the concavity pixel $C_i$ with the midpoint of chord $K_i$ as $v_i$, and similarly the unit vector associated with $C_j$ as $v_j$, we denote the alignment of the concavities as the radial value $$CC_{ij} = \cos^{-1}(-v_i \cdot v_j) = \pi - \cos^{-1}(v_i \cdot v_j) \quad (4.17)$$

$0 \leq CC_{ij} \leq \pi$, with smaller values indicating a better concavity-concavity alignment. This can be further understood by the intuitive consideration that an ideal split line would occur for two concavities with oppositely aligned $v_i$ and $v_j$, meaning that $-v_i \cdot v_j = 1$ and thus $CC_{ij} = 0$. Conversely, a poor split line would occur between two parallel concavities, in which case $-v_i \cdot v_j = -1$ and $CC_{ij} = \pi$. An illustration of this can be seen in FIG. 42A.

Concavity-line alignment (CL): This metric measures the alignment of the candidate split line with respect to the alignment of both endpoint concavities. Again using the unit vectors $v_i$ and $v_j$ as defined above, as well as the unit vector $u_{ij}$ defining the direction of the candidate split line, the concavity-line alignment is defined as the radial value $$CL_{ij} = \max(\cos^{-1}(v_i \cdot u_{ij}) = \pi - \cos^{-1}(v_j \cdot (-u_{ij}))) \quad (4.18)$$

$0 \leq CL_{ij} \leq$, again with smaller values indicating a better alignment. In practice, however, the maximum value of $CL_{ij}$ is expected to be not much larger than $\pi/2$; refer to FIG. 42B for illustration.

Concavity angle (CA): Denoting $w_{i1}$ and $w_{i2}$ as the unit vectors between concavity pixel $C_i$ and the endpoints of chord $K_i$, the concavity angle is defined as the angle between these two unit vectors:

$$CA_i = \cos^{-1}(w_{i1} \cdot w_{i2}) \quad (4.19)$$

A small concavity angle indicates a sharp concavity which is intuitively the best choice to begin a split line.

Concavity ratio (CR): The relative depth of the concavity pixel $C_i$ is computed by normalizing by the largest concavity depth ($CD_m$) in the object:

$$CR_i = \frac{CD_i}{CD_m} \quad (4.20)$$

Once concavities exceeding a concavity depth threshold $CD_T$ are found, SA, CC, and CL are used to determine valid candidates for concavity-concavity split lines. CA and CR are used to determine valid candidate concavity-boundary split lines, in the case that there is either no valid concavity-concavity split line, or only one concavity exceeding the threshold $CD_T$ exists. The algorithm for finding candidate split lines is summarized in the flowchart in FIG. 43.

Choice of the size thresholds $CD_T$, $SA_T$, $CL_T$, $CC_T$, $CA_T$, and $CR_T$ were determined empirically in [140]. We determine our thresholds based on training data, which will be discussed in a later section.

For cases where a choice among multiple candidate split lines must be decided, Kumar et al. introduce another metric X which is reduced to a linear decision boundary between concavity depths $C_i$ and $C_j$ and the distance between them, $d(C_i, C_j)$ [140]. Since this introduces two more parameters (the slope and y-intercept of the decision line), in addition to the six thresholds, we instead propose the following metric to determine the "best" split line.

For concavity-concavity split lines, choose the split line candidate that maximizes $$D_{cc} = \frac{CD_1 + CD_2}{2CD_T} + \frac{SA}{SA_T} + \left(1 - \frac{CL}{CL_T}\right) + \left(1 - \frac{CC}{CC_T}\right) \quad (4.21)$$

where $CD_1$ and $CD_2$ are the concavity depths of the two endpoints, and the remaining terms are as defined previously. For concavity-boundary splits, maximize $$D_{cb} = \frac{CD}{CD_T} + \left(1 - \frac{CA}{CA_T}\right) + \frac{CR}{CR_T} \quad (4.22)$$

Since these measures are computed for valid split lines, all the various parameters have satisfied the corresponding thresholds. Thus normalizing by the threshold values will yield a value in the range [0, 1]. For the parameters where a smaller value is better (i.e., the parameters that must satisfy a '<' relationship with the threshold), the normalized value is subtracted from 1. This allows us to directly choose the largest $D_{cc}$ or $D_{cb}$ from the candidate split lines.

4.5.2 Ground Truth Markup

The interactive system described in Section 4.3.5 is extended to include the ability to delineate ground truth markup for use in concavity-based segmentation. After the object-level delineation of Section 4.3.5, the user is presented with both the original image with an overlay of the individual object perimeters (for reference) as well as with a new window which will display individual connected components of the binary total markup (the Boolean OR of the individual object markups).

The total markup image is used to elicit user input on appropriate split lines for the data in question. The user is sequentially presented with individual connected components of the total markup, with instructions to define appropriate split lines. For reference and disambiguation, the user may still access the original color/grayscale image with an overlay of the object perimeters. As new split lines are specified, they are assigned consecutive numbers and added to the total markup image. This new image will be saved as ground truth for determination of the necessary concavity-based segmentation thresholds. A screen capture illustrating the Kumar ground truth markup process is shown in FIG. 44. Clockwise from the top window: the total markup image with user specified split lines, the current connected component where the user marks the split lines, and the original image with object perimeters for reference.

4.5.3 Choice of Thresholds

We choose appropriate thresholds for the six concavity-based segmentation parameters using the ground truth markup described in the previous section. From this concavity markup, we can easily locate valid split lines and the concavity(ies) associated with them. These will yield the distributions of the various parameters for valid split lines. In order to develop a threshold to distinguish valid from invalid split line candidates, we must also compute the distributions of the six parameters for non split lines.

To this end, for each connected component in the concavity markup, CD, CR, and CA are computed for each concavity in the object that is not associated with a split line in the markup. Then SA, CL, and CC are computed for the split line between the current concavity and all other concavities in the object. Thus the distribution of all six parameters is obtained for a variety of invalid split lines.

For an object with n concavities (equivalently, n convex hull chords), c valid concavity-concavity splits, and b valid concavity-boundary splits, there will be 2c+b representative points in the distribution of valid CD values; c points in the distribution of valid SA, CL, and CC values; and b points in the distribution of valid CA and CR values. For the distribution of invalid points, there will be n−2c−b for CD, CA, and CR and $O(n^3)$ for SA, CL, and CC. Since all split lines must satisfy a particular concavity depth, all points not satisfying $CD_T$ are eliminated prior to determining SA, CL, and CC (or CA and R). No further points are eliminated during the threshold calculations since the subsequent parameters are considered equal in merit, and the order in which they are tested is arbitrary.

The threshold is chosen by exhaustive search over the range of parameter values, and choosing the threshold that maximizes the performance:

$$P = w_1 N_{C1} - N_{I2} \quad (4.23)$$

where $N_{C1}$ is the number of correctly classified class 1 samples, and $N_{I2}$ is the number of incorrectly classified class 2 samples. The weight $w_1$ is chosen such that $$w_1 N_1 = N_2 \quad (4.24)$$

where $N_1$ and $N_2$ are the total number of class 1 and class 2 samples, respectively; this takes care of unbalanced training. Note that the performance in Equation (4.23) is used only to find the threshold for which the term is maximized, not for any further comparison; accordingly, we do not concern ourselves with any normalization factors for P.

Using the procedures outlined above, we obtain the thresholds shown in Table 20. These were obtained using the in-sample images as training; these are the same in-sample images used for training in Section 2. As a point of reference, Table 20 also displays the thresholds determined using benign and malignant in-sample images, as well as the parameters chosen empirically in [140]. More specifically, Table 20 shows In-sample thresholds for concavity-based segmentation. The Inequality column is a reminder of the direction of the decision for each parameter. The four thresholds presented (tIS, tbenign, tmalignant, tkumar) are the thresholds determined using all in-sample images, just benign in-sample images, just malignant in-sample images, and, as reference, the parameters used in the paper by Kumar et al. [140], respectively. A few items to note:

First, while the thresholds from [140] ($t_{kumar}$) are presented for comparison, these thresholds were chosen for a dataset consisting of spore specimens, not nuclei in histopathology imagery.

Second, the concavity depth is relatively small (approximately a pixel); this would seem to indicate that most concavities in the images are considered indicative of a split line.

Third, for concavity-concavity split lines, we note that the threshold for concavity-concavity alignment (CCT) is relatively large, only 35 less than the maximum value of 180, indicating that this parameter is not as discriminating as other parameters. Additionally, the value of CLT is not much larger than 90, as expected per previous discussion of the CL metric.

Fourth, for concavity-boundary split lines, the threshold for CR is very small, while CA is a middling value. It appears from these data, that concavity-boundary splits are (not surprisingly) more difficult to determine. One should keep in mind, however, that a concavity-boundary split candidate is considered only after all concavity-concavity split candidates have been eliminated.

Lastly, we note the very similar threshold results between the benign and malignant in-sample images, indicating that these parameters are general between the two classes.

4.5.4 Results

Detailed below are the results using the concavity-based segmentation method of Kumar et al. [140] on binary pixel-level classifications. We will subsequently refer to these segmentations as the Kumar method. Average performance of the Kumar method is presented in FIGS. 45A-B for the different image types, as well as the Wilcoxon p-values in Table 21. Table 21 shows Wilcoxon paired signed-rank test p-values for performances of multispectral versus RGB imagery for Kumar nuclear segmentation. Starred (*) entries correspond to statistical significance at the p-value of 0.05. Using the Bonferroni correction for these 15 tests, we look for the corrected p-value of $0.05/14 \approx 0.0033$, which are presented as bold entries in the table. Note that all bold entries also satisfy the less conservative p-value of 0.05 although they are not explicitly starred. This method has very poor performance, especially in comparison to the previously presented methods. Referring to the example segmentation shown in FIGS. 46A-B, we conclude that this decrease in performance is due to three main factors:

1. Decreased performance of the GT term (term 1): When presented with binary nuclei with some pixels missing (due to imperfections in the classification process), the Kumar method tends to split these nuclei into multiple sections, due to the presence of many artificial concavities. As an example in FIGS. 46A-B, look for the nucleus indicated by the arrow which has been split into multiple parts.

2. Decreased performance of the PM term (term 2): The WSCDT, WSH-min, and WSGran methods presented in the previous section all rely on the watershed transform of the Euclidean distance transform of the complemented binary image for the underlying segmentation. This results in an "interpolation" of sorts in regards to regions of missing pixels close to the object centroid. Thus, the Kumar segmentation is penalized for missing these pixels; this is most easily seen by comparing the WSGran and Kumar segmentation outputs (compare FIG. 38B with FIG. 46B).

3. Decreased performance of the ER term (term 5): The WSCDT, WSHmin, and WSGran methods all include some inherent filtering of small regions.

In the case of WSGran this filtering is directly related to the use of granulometries to determine markers. For WSHmin this filtering of small objects is a side effect of the suppression of shallow minima; small objects will have small Euclidean distances which results in shallow minima. The WSCDT eliminates small regions due to a subtlety in the discrete nature of the algorithm as implemented in Matlab: since each watershed line must be an 8-connected line, any region with too few pixels for both a watershed line and an interior basin will be discounted as part of the background (or the interior of the larger enclosing basin). It is this term that appears to be the largest detriment to the overall performance of the Kumar algorithm (judged by looking at the average difference in the terms between Kumar and WSCDT for the same images)

It is these observations that motivate the use of the watershed transform and area-based filtering techniques using the output of the Kumar segmentation as markers for individual nuclei.

4.5.5 Concavity-Based Segmentation as Markers for Watershed Segmentation (WSCM)

Now we use the results of the concavity-based segmentation discussed in the previous section as markers for a subsequent watershed segmentation. This is motivated by the observation that while the concavity-based segmentation is designed to determine the best places to split a clump of objects, the watershed transform is better suited to determine the shape of the resulting splits. For this segmentation, we use the centroids of the regions found by the Kumar method as markers for the foreground (nuclei) objects. An erosion of the background is used as the background markers. Additionally, prior to the watershed transform, all binary regions with an area less than some predetermined threshold are removed.

The plots of average performance of WSCM with respect to the minimum object area are shown in FIG. 47A-B. The removal of small areas does increase the performance of the WSCM method up to a minimum object area of approximately 100 pixels, after which the performance begins to slowly degrade.

FIG. 48A-E shows the performance of individual metric terms for different minimum object areas, i.e. the value of Concavity-Based Segmentation as Markers for Watershed Segmentation (WSCM) performance metric terms versus minimum object area a for different imagery. It should be noted that all terms plotted here are performance, i.e., one minus the penalty, where the penalties are the terms previously discussed in relation to the segmentation metric. The terms are denoted by a brief description in the charts, but as reference, they are plotted in numerical order, i.e., blue circles are term 1, red squares are term 2, and so forth. The increase in overall performance as minimum object area increases is due to the increase in performance of terms 1 (extra segmented regions per ground truth region) and 5 (excess segmented regions), where term 5 appears to have the largest effect on performance increase. Simultaneously, terms 2, 3, and 4 (pixels missed, extra pixels, and nuclei detected, respectively) slowly decrease. As terms 1 and 5 level off, the decrease in terms 2, 3, and 4 result in a gradual decrease of the overall performance. This analysis corresponds nicely with our analysis of the major contributing factors to the poorer performance of the Kumar method with respect to the other watershed-based methods.

FIG. 49A-D shows example segmentations for different minimum object areas. Qualitatively the overall tendency towards undersegmentation (similar to that seen with WSGran) is relatively constant with respect to the minimum object area. This can also be seen in FIG. 48 in the low performance of term 3 (extra pixels), and the slow decrease in this term with respect to minimum object area. Comparing the WSGran outputs (FIG. 38) there is a qualitative similarity; indeed, comparison of the individual metric terms for WSGran (FIG. 37) yields similar values and trends to the two segmentations. As reference, the Wilcoxon p-values for the WSCM method, a=105, are shown in Table 22. Table 22 shows Wilcoxon paired signed-rank test p-values for performances of multispectral versus RGB imagery for Concavity-Based Segmentation as Markers for Watershed Segmentation (WSCM) nuclear segmentation, a=105. Starred entries correspond to statistical significance at the p-value of 0.05. Using the Bonferroni correction for these 15 tests, we look for the corrected p-value of $0.05/15 \approx 0.0033$, which are presented as bold entries in the table. Note that all bold entries also satisfy the less conservative p-value of 0.05 although they are not explicitly starred.

4.5.6 A Note on Computational Efficiency

One of the disadvantages of the concavity-based method is the computation time. Table 23 lists the average computation time per multispectral image, in seconds, for the six methods thus far discussed (WSCDT, WSHmin, WSGran, WSBlob, Kumar, WSCM) using an Intel® Xeon™ 3.6 Ghz CPU. The concavity-based methods require approximately 5 times more computation time than even the most computationally intensive (WSBlob) of the other methods, and approximately 123 times more computation than WSGran, WSHmin, and WSCDT. The WSCDT, WSHmin, and WSGran methods utilize existing Matlab functions, and require only one pass through the image for the computations. The increase in computation time for the WSBlob method is due to the local maxima search of the blobdetector method. The concavity-based method of [140], on the other hand, loops through the connected components of the binary image and iteratively calculates the split lines. As a connected component is split, the method will loop through each of these new connected components and compute the split lines. Thus the Kumar and WSCM methods are (not quite linearly) dependent on the number of connected components in the image, with an average of 0.26 and 0.28 seconds computation time per connected component, respectively. The watershed methods, on the other hand, have a very uniform computation time across the various images. Due to the unsatisfactory computation time for the concavity-based methods, and the lack of increase in performance using these methods, we choose to stick with the WSGran and WSHmin segmentations.

4.6 Ideal Maximum Segmentation Performance of Nuclei

The description below details how the imperfect pixel-level nuclear classifications impact the nuclear segmentations presented. To this end, we applied each of our segmentation methods to the entire markup mask stored in the ground truth file. Table 24 displays the maximum average performance and standard deviation for an ideal pixel-level input, as well as the maximum performances and standard deviations for the actual segmentations (on real nuclei classifier outputs). More specifically, Table 24 shows Ideal maximum average nuclear segmentation performance (P)± standard deviation. The total markup from the ground truth is used as the pixel-level classification. The Parameter(s) columns specify the image type and/or segmentation parameter value for which the maximum average performance occurs. Example outputs for each of these ideal cases is shown in FIG. 50A-F (WSHmin is not included since it had identical performance to WSCDT for hmin=1).

There is unexpectedly good performance using the standard WSCDT method on the ground truth image mask. This indicates that the boundaries of correctly defined cell nuclei are smooth enough for a reasonable watershed-based segmentation (see FIG. 50B). This is further indicated by the performance of the watershed using the ground truth nuclei centers as markers, denoted by WSGT in Table 24 and FIG. 50C. The WSHmin method performs equally well, for small values of hmin, but the performance tapers off quickly as hmin increases beyond a value of 1. The WSGran performance is slightly less than that of WSCDT, and is maximum for a granulometric SE radius of r=2 (see FIG. 50D). The Kumar method performed the best for these ideal input images, validating the theory behind that algorithm; an example is shown in FIG. 50E. The WSCM method was applied only for a=0 since the reasoning behind suppressing small areas had to do with imperfections in the underlying nuclear classifications. The WSCM method has a lower performance than the Kumar method for an ideal binary input (see FIG. 50F). This indicates that the watershed transform may not be the ideal algorithm for use in segmentation of clumped nuclei; a higher-level shape-based algorithm such as the Kumar method may be more applicable.

We now compare the ideal and actual segmentations based on their performance and the performance of the individual metric terms, summarized in Table 25. Table 25 shows Ideal maximum average nuclear segmentation term performance. The total markup from the ground truth is used as the pixel-level classification. The major contribution to decreased actual performance for WSCDT appears to be due to term 5, indicating that the actual WSCDT segmentations have more extra regions not associated with ground truth nuclei. The detection rate for nuclei (term 4) is almost the same as in the actual segmentations as in the ideal; thus the degraded performance of the actual segmentations have to do with errors in proper delineation of the individual nuclei, along with the errors associated with extra regions. Similar analysis hold for the comparison of actual to ideal WSHmin segmentations, although the actual WSHmin segmentations have much better performance for term 5 (the suppression of shallow minima eliminates many of the extra regions). Actual WSGran segmentations have significantly decreased performance for terms 3 and 5 compared to the ideal WSGran segmentations. This indicates that the actual WSGran segmentations are more undersegmented than the ideal, although the ideal are quite undersegmented to begin with (refer to FIG. 50C). Actual Kumar and WSCM segmentations similarly have lower performance for terms 3 and 5, and Kumar additionally has decreased performance for term 1 (extra watershed regions per ground truth region). As reference, the term performances are also presented for the WSGT example. There is very similar performance to that of the WSCDT, with slightly better performance on term 1 and slightly worse performance on term 3, indicating a tendency towards undersegmentation in WSGT rather than oversegmentation in WSCDT.

A consistent theme throughout is the degradation in performance of terms 3 and 5. This implies that the pixel-level nuclear classifications provide two difficulties not present (or as prevalent) in the ground truth. First, the pixel-level classifications present clumps of nuclei with fewer clues (e.g., concavities) as to the correct split lines. Qualitatively, in many images, there are subtle spectral changes between adjacent nuclei that indicate the presence of a cell membrane and/or cytoplasm. This region is often only on the order of one pixel wide for closely clustered nuclei, and is most likely misclassified as nuclear material by the pixel-level classifiers. Also, many clustered nuclei display only shape-related cues as to the existence of multiple nuclei. Second, the pixel-level classifications yield the presence of extra regions not associated with ground truth nuclei. These are most likely the false alarm components of the classifications.

4.7 Segmentation of Cytoplasm and Stroma 4.7.1 Voronoi-Based Segmentation of Cytoplasm In this section, we use the centroids of the nuclei as the markers of a Voronoi-based segmentation for cytoplasm. Since we are only interested in the cytoplasm contained within each Voronoi cell, we mask the cytoplasm pixels contained within each Voronoi cell prior to any feature extraction of the cytoplasm objects. An example of Voronoi-based segmentation of cytoplasm can be seen in FIG. 51B.

4.7.2 Connected Components-Based Segmentation of Stroma

There do not seem to exist any pathology-based rules regarding the discrete nature of stromal components of tissue. That is, the stroma is generally regarded as a single entity, while the spatial distribution especially with respect to cells and other similar metrics may be considered important features. Thus, we treat each connected component of stroma as an object. An example of such a stromal segmentation can be seen in FIG. 51C.

4.7.3 Voronoi-Based Segmentation of Cytoplasm and Stroma

We also use the Voronoi segmentation for the combined cytoplasm and stroma class. Thus we are associating both cytoplasm and stroma pixels within the Voronoi cell of a nucleus as "belonging" to that biological cell. An example of this segmentation can be seen in FIG. 51D.

4.8 Summary

In this section, we have detailed our segmentation metric for cell nuclei as well as the application of that metric to several different nuclei segmentations. We have also detailed the methods for segmentation of cytoplasm and stroma.

4.8.1 Segmentation Evaluation

We have shown this segmentation metric and its constituent terms to correspond well with the qualitative observations of segmentation accuracy, including the general tendency of an algorithm to over- or under-segment an image. This metric also allows for a direct quantitative comparison between the outputs of different segmentation algorithms. While the metric defines a single performance, we have shown the usefulness of observing the performance of the individual metric terms. We have also discussed a new method for specification of ground truth for this object-level segmentation problem. This involves not only the delineation of cell nuclei within an approximate truth window, but also the marking of non-delineated objects within the truth window. This allows us to focus our segmentation evaluation on only those objects that were delineated by the user.

In comparison to other work in segmentation evaluation, our metric does not require the computation of region or boundary correspondences. While this metric was originally conceived and developed to match human intuition about a "good" nuclear segmentation, the metric has many similarities to the 5-scenario metric of [118].

4.8.2 Nuclear Segmentation

We have presented several methods for segmentation of nuclei given the pixel-level classification of nuclear material. We used the watershed transform as the basis for most of our segmentations as this method is known to provide a good match to object shape. The other segmentation method that we presented used the concavities of the object boundary to search for split lines. We constructed training data and conducted an exhaustive search for the best threshold parameters for this rule-based method, as well as defining a new criterion for the "best" split line among several possibilities. We also developed a method that combines the advantages of both the concavity-based and watershed-based methods.

All of our nuclei segmentations have relatively poor performance, and a very high standard deviation, indicating the complete failure of decent segmentation for many images. We have shown, however, that these poor performances are due in large part to errors in the underlying pixel-level nuclear classification. While there is obviously room for improvement in the nuclei segmentation, we are more interested here in a proof-of-concept of our object-level classification and segmentation framework. We will, therefore, use the best of our segmentation outputs as input to the further steps in our scheme, and address some of the shortcomings of the first-level segmentations.

Additionally, we have continued with analysis of multi-spectral versus RGB imagery, showing that for nuclear segmentation RGB imagery performs better. The statistical significance of this difference in performance was verified using the Wilcoxon signed rank test.

Before moving on to the future directions for this research, we would like to note the difficulty of this nuclear segmentation problem. While many researchers have addressed it to some extent, the results for H&E stained histopathology imagery have generally been unsatisfactory, especially for automated systems that do not invoke user input for defining regions of clumped nuclei (e.g., [17]).

4.9 Other Considerations

4.9.1 Segmentation Evaluation

Another embodiment may include a human studies experiment to correlate our segmentation metric with human perception of the segmentation accuracy [120]. Our development of the metric was based on human intuition regarding "good" nuclear segmentations, but it would be good to statistically quantify the similarities between the metric rankings and human rankings. This is particularly important in our application domain, as clinical diagnosis is based on the perception of this imagery by the human pathologist.

Similarly, another option is to quantify the precision/variability of our metric. This could entail a comprehensive analysis of the metric performance for a variety of (possibly subtly) different segmentations. It is desired that the variation in our metric would be directly proportional to the variation in segmentation output. We have already presented an analysis of the variation of our segmentations and the metric output over our image set, which is an equally important quantification of variability.

Another embodiment involves the use of this metric in other application domains. While the specific terms were developed with the segmentation of cell nuclei in mind, it is reasonable to expect that similar metrics would be directly applicable to another problem, e.g., landcover classification for satellite imagery.

The approach to segmentation evaluation in [127] may also be viable, particularly the ability to perform ROC-like analysis over large dimensions of metrics. The incorporation of the five terms of our segmentation metric may benefit from a more formal aggregation and analysis. This would also allow the easier addition of further metrics, such as computational efficiency.

The concept of Ultimate Measurement Accuracy, presented in [122], is also quite synergistic with our proposed research focus. For each additional level in our analysis, we look back to the previous steps and try to quantify and understand the effects that errors in these initial analyses may have on the current higher-level analysis.

4.9.2 Nuclear Segmentation

It has been shown that a great deal of the degradation in performance is associated with an imperfect pixel-level nuclear classification. This highlights the need for feedback in the hierarchical analysis, whereby it is the accuracy of the higher-level analysis that is of ultimate importance;

Additional embodiments may also be domain specific. While we have avoided any segmentations that rely on assumptions of the underlying object shape, e.g., ellipse fitting, such algorithms could be used to compute markers for subsequent segmentation. The use of concavity-based markers for a watershed segmentation actually decreased the performance, so care should be taken when applying this approach.

The best of the nuclear segmentation methods for ideal input is the Kumar concavity-based algorithm. The performance of actual imagery with this algorithm is, in part, due to the presence of many artifactual concavities and holes from imperfect pixel-level classification. One embodiment may be to quantify any differences in the characteristics of "true" concavities and the artifactual ones and similarly for holes. A better discrimination of "true" concavities may allow for the actual Kumar performance to approach that of the ideal.

Most of the segmentation methods presented have a tendency to undersegment, even for ideal pixel-level input. One embodiment would be to combine the results of an undersegmented and oversegmented output that could provide a nice separation of individual nuclei. This would be a region merging algorithm, taking into account a priori knowledge in the form of the undersegmented output as well as other information (e.g., concavities, shape).

5. FEATURE EXTRACTION AND SELECTION

5.1 Introduction

This section details the extraction and use of relevant image features for automated analysis of medical imagery, particularly cancer imagery. Useful features for cancer classification and diagnosis has often been approached by the definition of features flagged by clinicians as particularly important features for the diagnosis process. The vast majority of these features are nuclear features. The methods described below use of a comprehensive set of both object-level and spatial-relation features for the classification and characterization of histopathology imagery. Feature extraction and selection are applied to nuclei, cytoplasm, and stromal entities within the imagery and show very good classification using even solely cytoplasm and stromal information. Additionally, the use of imperfectly segmented objects within this classification framework is detailed and demonstrated that this feature extraction and selection approach is capable of utilizing such imperfect objects and yielding classification performances close to that of perfectly segmented objects. The use of an automated feature extraction and selection scheme for classification of imperfectly segmented nuclei is a novel and beneficial approach.

5.2 Motivation

Feature selection is a means to select the relevant and important features from a large set of features, many of which may be redundant, irrelevant, or not particularly useful (and possibly detrimental) to the classification performance. Because automated quantitative image analysis techniques are becoming more mainstream, it is possible to extract as many features as possible for future analysis. While humans have innate abilities to process and understand imagery, they do not tend to excel at explaining how they reach their decisions. As such, large feature sets are generated in the hopes that some subset of features incorporates the information the human expert is using for analysis.

A comprehensive set of both object-level and spatial relation features for the classification and characterization of histopathology imagery are detailed below. A feature extraction and selection process may be performed on imperfectly segmented histologic entities and still yield similar classification performance as compared to feature extraction and selection performed on well-segmented entities. In this section we define all the object-level features extracted from the imagery in Section 5.3 and the spatial-relation features in Section 5.4, including a discussion of the implementation of region-based spatial features (Section 5.5). Feature selection is performed and results are presented for object- and image-level classification in Section 5.6. Discussion of the best feature subsets is presented in Section 5.7.

5.3 Object-Level Feature Definitions

The object-level features can be categorized as belonging to one of four categories: size and shape, radiometric and densitometric, texture, and chromatin-specific. While the radiometric and densitometric, texture, and chromatin-specific features could be considered low-level features (i.e., generally extracted from a local neighborhood), they are included here since we are extracting each of them from an object region. The size and shape metrics are true object-level metrics; this distinction will become important in Section 6. In the feature descriptions to follow, fractal dimension (FD) related features are discussed separately, although each of the FD features can be attributed to one of the four previously mentioned categories. A summary of the object-level features is listed in Table 26. In the following, features denoted by the superscript[†] are features included as is from the original Matlab regionprops function.

5.3.1 Size and Shape Features

Area[†]: The total number of pixels in the object $$Area = \sum_n \sum_m \Omega(n, m) \tag{5.1}$$

where $\Omega(n, m)$ is the object mask consisting of ones within the object and zeros elsewhere.

Elliptical Features: Computed for the ellipse with the same second moments as the object.

Major and Minor Axis Length:

$$majlen = 2\sqrt{2} \cdot \sqrt{m_{xx} + m_{yy} + \sqrt{(m_{xx} - m_{yy})^2 + 4m_{xy}^2}} \tag{5.2}$$

$$minlen = 2\sqrt{2} \cdot \sqrt{m_{xx} + m_{yy} - \sqrt{(m_{xx} - m_{yy})^2 + 4m_{xy}^2}} \tag{5.3}$$

where $$m_{xx} = \frac{1}{M}\sum_{i=1}^{M}(x_i - \bar{x})^2 + \frac{1}{12}$$

$$m_{yy} = \frac{1}{M}\sum_{i=1}^{M}(y_i - \bar{y})^2 + \frac{1}{12} \tag{5.4}$$

$$m_{xy} = \frac{1}{M}\sum_{i=1}^{M}(x_i - \bar{x})(y_i - \bar{y})$$

and $\bar{x}$ and $\bar{y}$ are the x- and y-centroids, respectively, of the object:

$$\bar{x} = \frac{\sum_n \sum_m n\Omega(n, m)}{Area} \tag{5.5}$$

$$\bar{y} = \frac{\sum_n \sum_m m\Omega(n, m)}{Area} \tag{5.6}$$

and M is the total number of pixels in the object.

Eccentricity: A measure of how much a conic section deviates from circular A circle has eccentricity 0, a line (i.e., a degenerate ellipse) an eccentricity of 1, and an ellipse between $$ecc = \frac{2\sqrt{\left(\frac{majlen}{2}\right)^2 - \left(\frac{minlen}{2}\right)^2}}{majlen} \tag{5.7}$$

Orientation: Defined as an angle between the major axis of the ellipse and the x-axis of the original image coordinates.

$$\theta_O = \begin{cases} \tan^{-1}\left(\dfrac{m_{yy} - m_{xx} + \sqrt{(m_{yy} - m_{xx})^2 + 4m_{xy}^2}}{2m_{xy}}\right) & \text{if } m_{yy} > m_{xx}, \\ \tan^{-1}\left(\dfrac{2m_{xy}}{m_{xx} - m_{yy} + \sqrt{(m_{xx} - m_{yy})^2 + 4m_{xy}^2}}\right) & \text{else.} \end{cases} \quad (5.8)$$

EllipticalDeviation: A measure of how much the image object deviates from the ellipse with the same second moments [154]. This measure takes into account the pixels included in the ellipse and not in the object, as well as those pixels included in the object but not in the ellipse. This metric is normalized by the total object area. Defining E(n, m) as the ellipse mask, elliptical deviation is defined as $$EllDev = \frac{\sum_{(n,m)\in\Omega, \notin E} \Omega(n,m) + \sum_{(n,m)\in E, \notin \Omega} E(n,m)}{\text{Area}} \quad (5.9)$$

Convex Hull Features: These features rely on the computation of the convex hull of the object mask.

ConvexArea: The area of the convex hull of the object.

$$ConvexArea = \sum_n \sum_m convhull(\Omega(n,m)) \quad (5.10)$$

ConvexDeficiency: The pixels within the convex hull that are not within the object [154].

$$ConvexDeficiency = \frac{ConvexArea - \text{Area}}{\text{Area}} \quad (5.11)$$

Solidity: The fraction of pixels within the convex hull that are within the object.

$$Solidity = \frac{\text{Area}}{ConvexArea} \quad (5.12)$$

Filled Image Features: For computation of these features, attention is paid to both the object regions as well as the holes within the object.

FilledArea: The area of the filled object.

$$FilledArea = \sum_n \sum_m \text{fill}(\Omega(n,m)) \quad (5.13)$$

EulerNumber:

$$EulerNumber = N_{regions} - N_{holes} \quad (5.14)$$

where $N_{regions}$ is the number of regions contained within the object, and Nholes is the number of holes within the object.

Bounding Box Features: These features are related to the bounding box of the object, which is defined as the smallest rectangle that completely contains the object, where the sides of the rectangle are aligned with the image axes.

Extent: The fraction of pixels within the bounding box that are also within the object.

$$Extent = \frac{\text{Area}}{N \cdot M} \quad (5.15)$$

where N and M are the width and height of the bounding box.

AspectRatio: The ratio of the height to width of the bounding box:

$$AspectRatio = \frac{M}{N} \quad (5.16)$$

Boundary Features: These features are related to the boundary of the object.

Perimeter: The distance around the boundary of the object, where boundary pixels are 8-connected.

$$Perimeter = \sum_{n=1}^{N} \sqrt{(x(n+1) - x(n))^2 + (y(n+1) - y(n))^2} \quad (5.17)$$

where x and y are the x- and y-coordinates of the N boundary pixels, and by definition x(N+1)=x(1) and y(N+1)=y(1) (to take care of the distance between the last and first boundary pixels).

Radii: The vector of distances between the boundary pixels and the object centroid.

$$Radii = \sqrt{(x-\bar{x})^2 + (y-\bar{y})^2} \quad (5.18)$$

where x and y are the vectors of the x- and y-coordinates of the boundary pixels and x' and y' are the x- and y-centroids of the object.

PerimeterFFT: Characterizes the variations in the object boundary by treating the object radii as a one dimensional signal.

The Fast Fourier Transform (FFT) is used to measure energies at various frequencies:

$$PerimeterFFT = \sum_{n=0}^{N-1} x(n) e^{-j2\pi nk/N}, \; k = 0, 1, \ldots, N-1 \quad (5.19)$$

where we choose N=1024. As handled by the Matlab fft code, x(n) is zero-padded if less than 1024 samples and truncated if more. Energies are computed as:

$$PerimeterFFTLow = \sum_{n=0}^{240} |PerimeterFFT(n)|^2 \quad (5.20)$$

$$PerimeterFFTMed = \sum_{n=341}^{683} |PerimeterFFT(n)|^2 \quad (5.21)$$

$$PerimeterFFTHi = \sum_{n=684}^{1023} |PerimeterFFT(n)|^2 \quad (5.22)$$

$$PerimeterFFTh = \sum_{n=32 \cdot h}^{32(h+1)-1} |PerimeterFFT(n)|^2 \quad (5.23)$$

where $h = 0, 1, \ldots, 32$.

PerimeterCurvature: The angle between line segments connecting subsequent boundary points [154].

$$\theta_{curve} = \arctan\left(\frac{y(n+1) - y(n)}{x(n+1) - x(n)}\right), n = 1, \ldots, N \quad (5.24)$$

where x and y are the x- and y-coordinates of the N boundary pixels, and by definition x(N+1)=x(1) and y(N+1)=y(1) (to take care of the curvature between the last and first boundary pixels).

BendingEnergy: A measure analogous to the physical energy required to bend a rod. This metric is calculated as the sum of the difference in curvature between subsequent boundary points [31, 150, 154].

$$BendingEnergy = \sum_{n=1}^{N} (\theta_{curve}(n+1) - \theta_{curve}(n)) \quad (5.25)$$

where n=1, ..., N and, similar to the extension of x and y in Equation (5.24), $\theta_{curve}(N+1) = \theta_{curve}(1)$.

Other Shape Features: Provide measures of the shape of the object, similar to some previously defined parameters (e.g., Eccentricity and AspectRatio). These features, however, are not dependent on either the second-moment ellipse or the bounding box.

EquivDiameter†: The diameter of the circle with the same area as the object.

$$EquivDiameter = 2\sqrt{\frac{\pi}{Area}} \quad (5.26)$$

Sphericity: Ratio of the radii of the largest circle fully inscribed in the object to that of the smallest circle which fully circumscribes the object. This is also equivalent to the ratio of the smallest to largest radii of the object, measured from the centroid.

$$Sphericity = \frac{\min(Radii)}{\max(Radii)} \quad (5.27)$$

Compactness: A measure of the roundness of the object, giving the minimum value of 1 for circles:

$$Compactness = \frac{4\pi Area}{Perimeter^2} \quad (5.28)$$

InertiaShape: Another measure of roundness, again giving 1 for circles:

$$InertiaShape = \frac{2\pi \sum_n \sum_m Radii(n,m)^2}{Area^2} \quad (5.29)$$

where in this case Radii is extended to include the radii of all object pixels, not just the boundary pixels. Note that this features is a normalized moment of inertia for the object.

Centers of Mass: The deviation of the center of mass from the object centroid, calculated for both the grayscale intensity image and the normalized optical density image.

$$GCenterMass = \frac{\sqrt{(x_{GCM} - \bar{x})^2 + (y_{GCM} - \bar{y})^2}}{\text{mean}(Radii)} \quad (5.30)$$

where the center of mass ($x_{GCM}, y_{GCM}$) of the grayscale intensity image $A_I$ is calculated as $$x_{GCM} = \frac{1}{N} \sum_n \sum_m n A_I(n,m) \quad (5.31)$$

$$y_{GCM} = \frac{1}{N} \sum_n \sum_m m A_I(n,m) \quad (5.32)$$

where N is the number of pixels in the $A_i$ image.

ODCenterMass:

$$ODCenterMass = \frac{\sqrt{(x_{ODCM} - \bar{x})^2 + (y_{ODCM} - \bar{y})^2}}{\text{mean}(Radii)} \quad (5.33)$$

where, similarly, the center of mass ($x_{ODCM}, y_{ODCM}$) of the optical density image OD is calculated as in Equation (5.32).

Reflection Symmetry Features: This is a metric of the reflection symmetry of the object, based on the quadrant sum as presented in Section 4, specifically Equations (4.4) and (4.5). The quadrant sum is computed for each the object mask (BW ReflSymmetry), the grayscale intensity image (GReflSymmetry), and the normalized optical density image (ODReflSymmetry).

5.3.2 Radiometric and Densitometric

ImageBands: The values of the image bands for each object pixel.

$$ImageBands = [A(n,m,1), \ldots, A(n,m,B)], \forall (n,m) \in \Omega \quad (5.34)$$

where A is the original image, B is the number of image bands in A, and $\Omega$ is the object mask, as in (5.1). Thus ImageBands is an Area×B matrix with each row corresponding to an object pixel and each column corresponding to an image band.

Intensity: Calculated as the mean value for each object pixel, averaged across the image bands:

$$Intensity(k) = \frac{1}{B} \sum_{b=1}^{B} ImageBands(k,b), k = 1, \ldots, Area \quad (5.35)$$

ODV: The values of the optical density 1 image for each image band, as well as the intensity image:

$$ODV = [OD_1, OD_2, \ldots, OD_B, OD_I] \quad (5.36)$$

where each row of ODV is an object pixel, and each column is the optical density value for an image band. That is, OD* are column vectors $$OD_b = -\log_{10}\left(\frac{ImageBands(k,b)}{A_{mx}}\right), \quad (5.37)$$

$$k = 1, \ldots, Area, b = 1, \ldots, B$$

-continued $$OD_l = -\log_{10}\left(\frac{\text{Intensity}(k)}{A_{mx}}\right), \quad (5.38)$$

$$k = 1, \ldots, \text{Area}$$

where $A_{mx}$ is the maximum value of A (i.e., the transmission value for a blank slide, usually 255 for 8-bit images), and B is the number of image bands.

IOD: The Integrated Optical Density (IOD) is the summation of the optical density values of the object. For the case of nuclei, this can provide a measure of the amount of DNA present within each nucleus. In this implementation, there is a vector of values corresponding to each of the columns in ODV.

$$IOD(b) = \sum_{k=1}^{Area} ODV(k, b), \quad (5.39)$$

$$b = 1, \ldots, B+1$$

MOD: The Mean Optical Density (MOD) is the IOD normalized by the nuclear area.

$$MOD(b) = \frac{IOD(b)}{\text{Area}} \quad (5.40)$$

Hue: The hue value for each object pixel [9, 79].

$$\theta = \arccos\left(0.5 \frac{2R - G - B}{\sqrt{(R-G)^2 + (R-B)(G-B)}}\right) \quad (5.41)$$

$$\text{Hue}(k) = \begin{cases} \theta(k) & \text{if } B < G, \\ 2\pi - \theta(k) & \text{else.} \end{cases} \quad (5.42)$$

where R, G, and B are the values of the red, green, and blue channel, respectively, of A(n, m), (n, m)∈Ω. For images with less than three channels, the Hue parameter is not calculated, and for images with more than three channels (i.e., multispectral), the image is first converted to an RGB image via the 'ccd' transform described in Section 2.

5.3.3 Texture Features

Co-occurrence Matrix Features: These metrics are computed from a gray-level co-occurrence matrix (GLCM), which tallies the number of occurrences of gray-level i in a specific spatial relation with gray-level j. Common spatial relations are horizontally and vertically adjacent pixels at a distance of some k pixels. Since we are not interested in the orientation of texture, the horizontal and vertical matrices are accumulated as recommended in [154].

The co-occurrence matrix is calculated with the Matlab function graycomatrix for the intensity image discretized to 64 levels (to reduce computational intensity), and for distances of k=1, . . . , 5 pixels. Defining the GLCM as C(i, j), i, j=0, . . . , 63, the following metrics are used, where the metrics denoted by † were used as included in the Matlab graycoprops function:

GLCMInertia[†]: [8, 18, 20, 45, 65, 151, 152, 154]

$$GLCM \ \text{Inertia} = \sum_i \sum_j (i-j)^2 C(i, j) \quad (5.43)$$

GLCMEnergy[†]: [8, 18, 20, 45, 65, 151, 152, 154]

$$GLCM \ \text{Energy} = \sum_i \sum_j C^2(i, j) \quad (5.44)$$

GLCMEntropy: [8, 18, 20, 45, 65, 151, 152, 154]

$$GLCM \ \text{Entropy} = \sum_i \sum_j C(i, j)\log_2(C(i, j)) \quad (5.45)$$

GLCMHomogeneity: [8, 18, 20, 45, 65, 151, 152]

$$GLCM \ \text{Homogencity} = \sum_i \sum_j \frac{1}{1+(i-j)^2} C(i, j) \quad (5.46)$$

GLCMMaxProb: [18, 20, 45]

$$GLCM \ MaxProx = \max_{i,j} C(i, j) \quad (5.47)$$

GLCMClusterShade: [8, 18, 20, 45, 65, 151, 152, 154]

$$GLCM \ ClusterShade = \sum_i \sum_j (k - M_x + j - M_y)^3 C(i, j) \quad (5.48)$$

$$M_x = \sum_i \sum_j iC(i, j) \quad (5.49)$$

$$M_y = \sum_i \sum_j jC(i, j) \quad (5.50)$$

GLCMClusterProminence: [8, 18, 20, 45, 65, 151, 152, 154]

$$GLCM \ ClusterProminence = \sum_i \sum_j (k - M_x + j - M_y)^4 C(i, j) \quad (5.51)$$

GLCMCorrelation[†]: [8, 18, 20, 45, 65, 151, 152, 154, 159]

$$GLCM \ \text{Correlation} = \frac{\sum_i \sum_j (i - M_x)(j - M_y) C(i, j)}{S_x \cdot S_y} \quad (5.52)$$

$$S_x = \sqrt{\sum_i (i - M_x)^2 C(i, j)} \quad (5.53)$$

$$S_y = \sqrt{\sum_j (j - M_y)^2 C(i, j)} \quad (5.54)$$

The same features are also calculated using a co-occurrence matrix of the optical density image, discretized to 64 levels and for distances of k=1, ..., 5 pixels. These metrics are computed via the same equations, replacing the co-occurrence matrix of the grayscale intensity image with the co-occurrence matrix of the optical density image, yielding the features ODCMInertia, ODCMEnergy, ODCMEntropy, OCDMHomogeneity, ODCMMaxProb, ODCMClusterShade, ODCMClusterProminence, and ODCMCorrelation.

Run-Length Texture Features: These features are based on the gray level run length (GLRL) matrix $G(i, j|\theta)$, which quantifies the number of runs of length j, gray level i, in direction $\theta$. From this 2-dimensional matrix, several features can be computed. Typically, the image is discretized to a smaller number of gray levels since the method is sensitive to noise; in this implementation the grayscale intensity image is discretized to 16 levels. We have implemented the method of [160] which requires the computation of two vectors rather than the full 2-dimensional GLRL matrix. Specifically, the run-length distribution $r(j|\theta)$ and the gray-level distribution $g(i|\theta)$ are defined as $$r(j|\theta) = \sum_i G(i, j|\theta) \quad (5.55)$$

$$g(i|\theta) = \sum_j G(i, j|\theta) \quad (5.56)$$

and the total number of runs in the image S is $$S = \sum_i \sum_j G(i, j|\theta) = \sum_i g(i|\theta) = \sum_j r(j|\theta) \quad (5.57)$$

The following features are extracted from the GLRL matrix $G(i, j|\theta)$ for $$\theta = 0, \frac{\pi}{4}, \frac{\pi}{2}, \frac{3\pi}{4}.$$

SRE: The short runs emphasis [20].

$$SRE = \frac{1}{S} \sum_j \frac{r(j|\theta)}{j^2} \quad (5.58)$$

LRE: The long runs emphasis [20].

$$LRE = \frac{1}{S} \sum_j r(j|\theta) j^2 \quad (5.59)$$

GLN: The gray-level nonuniformity [20].

$$GLN = \frac{1}{S} \sum_i g(i|\theta)^2 \quad (5.60)$$

RLN: The run-length nonuniformity [20].

$$RLN = \frac{1}{S} \sum_j r(j|\theta)^2 \quad (5.61)$$

RP: The runs percentage [20].

$$RP = \frac{1}{\text{Area}} \sum_j r(j|\theta) \quad (5.62)$$

LGRE: The low gray-level runs emphasis [260].

$$LGRE = \frac{1}{S} \sum_i \frac{g(i|\theta)}{i^2} \quad (5.63)$$

HGRE: The high gray-level runs emphasis [160].

$$HGRE = \frac{1}{S} \sum_i g(i|\theta) i^2 \quad (5.64)$$

The same features are also calculated for the optical density image, also quantized to 16 levels after normalization to the range [0, 255], yielding the features ODSRE, ODLRE, ODGLN, ODRLN, ODRP, ODLGRE, and ODHGRE [8, 65, 151, 152, 160]. Each run-length quantity is treated as a vector for $\theta=0, \pi/4, \pi/2, 3\pi/4$ to avoid the use of orientation-dependent texture features.

Wavelet Features: The energies of the various wavelet decomposition levels are used as a texture descriptor. Several specific wavelets have been tested for this purpose, including Daubechies, biorthogonal, Gabor, and Mallat's discrete wavelet frames [18, 20, 27, 45]. We choose the CDF 9/7 (Cohen-Daubechies-Feauveau 9/7-tap) wavelet, as used in the JPEG2000 standard, as a good general wavelet transform. This decomposition is implemented in the MatlabCentral function wavelet via a lifting scheme. From a 4-level decomposition, the energies of each of the detail images at each level of decomposition as well as the energy of the low-resolution image from the final level are computed. Since this (and many other) wavelet transform is implemented in a separable fashion, it results in three detail images at each level of decomposition, commonly referred to as the horizontal ($D_h^k$), vertical ($D_v^k$), and diagonal ($D_d^k$) detail images at level k. The average energy is computed for these three detail images for each of the four decomposition levels of the grayscale intensity image:

GCDF97Wk:

$$GCDF97Wk = \frac{1}{3}\left[\frac{\sum_n \sum_m |D_h^k(n, m)|^2}{N_k M_k} + \frac{\sum_n \sum_m |D_v^k(n, m)|^2}{N_k M_k} + \frac{\sum_n \sum_m |D_d^k(n, m)|^2}{N_k M_k}\right], \quad (5.65)$$

$$k = 1, \ldots, 4$$

where $N_k$ and $M_k$ are the dimensions of the $D_k$ images as well as the energy of the final low-resolution image (A|r) of the decomposition.

GCDF97W5:

$$GCDF97W5 = \frac{\sum_n \sum_m |A_{lr}(n,m)|^2}{N_4 M_4} \quad (5.66)$$

These measurements are repeated for the normalized optical density image, yielding the features ODCDF97W1, ODCDF97W2, ODCDF97W 3, ODCDF97W4, and ODCDF97W5.

Entropy: A measure of the information content of the image, calculated as [79]

$$H = -\sum_{i=1}^{N} P(\alpha_i)\log_2(P(\alpha_i)) \quad (5.67)$$

where N is the total number of gray levels, $\alpha_i$ is the ith gray scale level, and $P(\alpha_i)$ is the probability of each level. $P(\alpha_i)$ is generally estimated from the source signal. The entropy is calculated for all image bands, the intensity image, all OD bands, and the OD of the intensity image.

5.3.4 Chromatin Density Features

As presented in [152] and [151], these features rely on the segmentation of the optical density image into areas of low, medium, and high chromatin density. This segmentation is controlled by two global thresholds, $t_1$ and $t_2$. Define the low, medium, high, and medium-high chromatin density images as $$OD_L = (OD < t_1)\Omega \quad (5.68)$$

$$OD_M = (t_1 \leq OD \leq t_2)\Omega \quad (5.69)$$

$$OD_H = (OD > t_2)\Omega \quad (5.70)$$

$$OD_{MH} = OD_M + OD_H \quad (5.71)$$

where OD is the overall optical density image, normalized to the range [0, 255]. Note that OD are binary mask images. The thresholds $t_1$ and $t_2$ were empirically chosen to be 50 and 100, respectively. While these features were specifically designed for feature extraction of cell nuclei, they are included for possible use on other histologic (or non-histologic) entities.

Area: The areas of the low, medium and high images normalized by the total area.

$$LDNAArea = \frac{\sum_n \sum_m OD_L(n,m)}{Area} \quad (5.72)$$

$$MDNAArea = \frac{\sum_n \sum_m OD_M(n,m)}{Area} \quad (5.73)$$

$$HDNAArea = \frac{\sum_n \sum_m OD_H(n,m)}{Area} \quad (5.74)$$

IOD: The integrated optical densities [8, 65, 151, 152].

$$LIOD = \frac{\sum_n \sum_m OD(n,m)OD_L(n,m)}{IOD} \quad (5.75)$$

$$MIOD = \frac{\sum_n \sum_m OD(n,m)OD_M(n,m)}{IOD} \quad (5.76)$$

$$HIOD = \frac{\sum_n \sum_m OD(n,m)OD_H(n,m)}{IOD} \quad (5.77)$$

MOD: The mean optical densities [8, 65, 151, 152].

$$LMMOD = \frac{\sum_n \sum_m OD(n,m)OD_M(n,m)}{\sum_n \sum_m OD(n,m)OD_L(n,m)} \quad (5.78)$$

$$LHMOD = \frac{\sum_n \sum_m OD(n,m)OD_H(n,m)}{\sum_n \sum_m OD(n,m)OD_L(n,m)} \quad (5.79)$$

$$LMHMOD = \frac{\sum_n \sum_m OD(n,m)OD_{MH}(n,m)}{\sum_n \sum_m OD(n,m)OD_L(n,m)} \quad (5.80)$$

Number of Regions: The number of discrete 8-connected regions LNum, MNum, and HNum [8, 151, 152].

Compactness: The compactness of the various regions [8, 65, 151, 152].

$$LCompactness = \frac{4\pi LDNAArea \cdot Area}{P_L^2} \quad (5.81)$$

$$MCompactness = \frac{4\pi MDNAArea \cdot Area}{P_M^2} \quad (5.82)$$

$$HCompactness = \frac{4\pi HDNAArea \cdot Area}{P_H^2} \quad (5.83)$$

$$MHCompactness = \frac{4\pi MHDNAArea \cdot Area}{P_{MH}^2} \quad (5.84)$$

where P is the perimeter of the given region, computed the same as in Equation (5.17).

Distance: The average distances between all pixels of each chromatin image and the centroid of the object [65, 151, 152].

$$LDist = \frac{\sum_{(n,m)\in OD_L} \sqrt{(n-\bar{x})^2 + (m-\bar{y})^2}}{LDNAArea \cdot Area \cdot mean(Radii)} \quad (5.85)$$

$$MDist = \frac{\sum_{(n,m)\in OD_M} \sqrt{(n-\bar{x})^2 + (m-\bar{y})^2}}{MDNAArea \cdot Area \cdot mean(Radii)} \quad (5.86)$$

$$HDist = \frac{\sum_{(n,m)\in OD_H} \sqrt{(n-\bar{x})^2 + (m-\bar{y})^2}}{HDNAArea \cdot Area \cdot mean(Radii)} \quad (5.87)$$

-continued $$MHDist = \frac{\sum_{(n,m) \in OD_M H} \sqrt{(n-\bar{x})^2 + (m-\bar{y})^2}}{MHDNAArea \cdot Area \cdot mean(Radii)} \quad (5.88)$$

where x' and y' are the x- and y-coordinates of the object centroid.

Center of Mass: The distance between the center of mass of the optical density image and the object centroid [8, 65, 151, 152]. Calculating the centers of mass for each of the chromatin images as in Equation (5.32), $$LCenterMass = \frac{\sqrt{(x_{CML} - \bar{x})^2 + (y_{CML} - \bar{y})^2}}{LDNAArea \cdot Area \cdot mean(Radii)} \quad (5.89)$$

$$MCenterMass = \frac{\sqrt{(x_{CMM} - \bar{x})^2 + (y_{CMM} - \bar{y})^2}}{MDNAArea \cdot Area \cdot mean(Radii)} \quad (5.90)$$

$$HCenterMass = \frac{\sqrt{(x_{CMH} - \bar{x})^2 + (y_{CMH} - \bar{y})^2}}{HDNAArea \cdot Area \cdot mean(Radii)} \quad (5.91)$$

$$MHCenterMass = \frac{\sqrt{(x_{CMMH} - \bar{x})^2 + (y_{CMMH} - \bar{y})^2}}{MHDNAArea \cdot Area \cdot mean(Radii)} \quad (5.92)$$

5.3.5 Fractal Dimension Features

The fractal dimension (FD) of objects differ from the typical integer dimensions of Euclidean geometry (e.g., a 1-D line and 2-D plane). Instead, the FD is a real-valued (not integer) measure of the space-filling properties of the object. These features are based on the work of Mandelbrot [161]. There are many methods for estimation of the FD of objects, many relying on the change in a length or area metric with respect to the size of the ruler grid used for measurement; each suffers from different estimation errors. Based on the recent work published by Behry [162], we choose the power spectrum method of [163] since it produced the most accurate and robust estimation of FD. Previous studies have shied away from the power spectrum method since it requires the computation of an FFT; with the increase in computational power, however, and the fact that the FFT of object boundaries is already computed for other metrics, we do not consider the computational intensity to be too large.

PerimeterFD: This is a measure of the fractal dimension of the object boundary [8, 22, 42, 45, 65, 150]. Defining the power spectrum as $$P = |PerimeterFFT|^2 \quad (5.93)$$

and ρ as the spatial frequency, we compute the best least-squares linear fit to the log-log plot of P versus ρ. The slope b of this best-fit line is related to the PerimeterFD via the relationship [162, 163]

$$PerimeterFD = \frac{5 - b}{2} \quad (5.94)$$

Note that for a length N FFT, the zero frequency term is excluded and only the next N/2 points are used (due to symmetry of the FFT) to compute the best-fit line. It is expected that $1 \leq PerimeterFD \leq 2$.

AreaFD: A measure of the FD of the object, treating the grayscale intensity values as a three-dimensional surface. This gives a measure of the space-filling properties of this three-dimensional surface, where the texture of the grayscale image is interpreted as this surface. Let $A_I$ be the intensity image, computed by averaging the image bands for each pixel. Similar to the PerimeterFD case, the 2-D FFT of $A_I$ is computed over the object mask Ω, and the magnitude is squared to yield the 2-D power spectrum $P_A$. Taking the two spatial frequencies u, v=[1, . . . , N/2], we compute $$\rho = \sqrt{u(i)^2 + v(j)^2}, i,j = 1, \ldots, N/2.$$

Calculating the slope b of the best-fit line for the log-log plot of $P_A$ versus ρ, $$AreaFD = \frac{8 - b}{2} \quad (5.95)$$

We expect that $1 \leq AreaFD \leq 3$.

ODAreaFD: Similar to AreaFD, this is the FD of the optical density image [8, 65, 151, 152].

5.3.6 Summary

The object-level features are summarized in Table 26. In addition to the features presented above, various statistics measures for any of the vector quantities are also calculated. Thus, the mean, median, minimum, maximum, and standard deviation are calculated for all vector features, with the option to compute the skewness and kurtosis as well. The total number of object-level features extracted is, thus, 1035 for each RGB image object (897 without skewness and kurtosis) and 7171 for a multispectral image object (6201 without skewness and kurtosis). Since the extraction of multispectral features is so much more computationally intensive, the main focus in the feature selection will be on ccd imagery. Multispectral features will be used in limited analyses to demonstrate the differences between RGB and multispectral features.

5.4 Spatial-Relation Feature Definitions

In this section we describe the graph and tree structures that we derive from our data, as well as the various features extracted from the structures. A graph is uniquely defined by a set of nodes and edges. Edges connect nodes that are neighbors according to some a priori definition of a neighborhood. Edges may be directed, resulting in a directed graph (often called a digraph). Both nodes and edges may be weighted according to some metric (e.g., node degree or edge length). Trees are graphs without cycles, where a cycle is defined as an ordered set of nodes and edges, where the set of edges is unique, and the starting and ending node is the same. We will refer to our graph and tree structures with the generic term "graph" when it will not introduce confusion.

5.4.1 Graph and Tree Structures

Voronoi Tesselation (VT): Given a set of nodes in the plane (e.g., centroids of nuclei), the Voronoi tessellation creates polygonal cells around the nodes such that all pixels within a given cell are closer to the cell node than any other node in the plane. The VT is commonly constructed as the complement (dual graph) of the Delaunay triangulation, and is used for quantification of pathology imagery in [22, 41, 155, 157].

Delaunay Triangulation (DT): The Delaunay triangulation, in addition to being the dual graph of the Voronoi tessellation, is a commonly used triangulation algorithm. From the set of all possible triangles, a triangle is accepted if the circumcircle contains no other nodes besides the triangle vertices. The DT is used with pathology imagery in [22, 41].

Minimum Spanning Tree (MST): The minimum spanning tree is the tree for which the sum of the edge lengths is minimum. The MST is generally iteratively created. First the two closest points are connected; next the point closest to either of the two included points is added to the tree. This continues until all nodes have been added. The MST is one of the most commonly used tree structures and is used for pathology imagery in [22, 41, 156, 157].

O'Callaghan Neighborhood Graph (OCG): Neighboring nodes are defined based on both a distance and direction constraint. Intuitively, node C is considered a neighbor of node A if the distance between A and C is less than a predefined threshold and if C is not eclipsed by another neighbor of A. More specifically, considering three nodes A, B and C, and assuming that A and B are neighbors, C is a neighbor of A if $$d(A,C) < t_d \quad (5.96)$$

and $$\angle ABC < t_\theta \quad (5.97)$$

where $d(\cdot)$ is the Euclidean distance function, $t_d$ is the distance threshold, and $t_\theta$ is the direction constraint. While the direction constraint is generally defined in terms of A, B, and C, a more intuitive explanation of the angle is in terms of an eclipse angle directed from B along the edge connecting A and B. Refer to FIG. 52 for an illustration of the O'Callaghan direction constraint. For this example, we are assuming that nodes A and B are neighbors, and that nodes A and C satisfy the distance constraint. The direction constraint is specified in terms of threshold to for the angle $\theta = \angle ABC$. For this example, node C does not satisfy the direction constraint, and is thus not a neighbor of A. The direction constrain can also be thought of as an angle of visual eclipse emanating from node B at a symmetric angle about the line directed from A to B, labeled as a in this example. Obviously, $\alpha = 180° - t_\theta$. A perceptually acceptable value for the direction constraint is $t_\theta = 120°$ ($\alpha = 60$) [164].

The OCG is constructed in an iterative process similar to that of the MST. It should be noted that the OCG is a digraph since (in fairly rare circumstances) node A may be a neighbor of B but not vice versa.

The OCG was used for pathology imagery in [156, 157, 165], although it was incorrectly characterized as a tree in [156].

Connected Graph (CG): In a connected graph, all nodes are connected to all other nodes. In the case of the complete graph used in [36] and [35], the edges are weighted by the Euclidean distance.

Examples of the VT, DT, MST, and OCG for a randomly generated set of nodes are shown in FIG. 53A-D; the CG is excluded since it is too cluttered with edges for an informative illustration. FIG. 53A-D is an example graph and tree structures for a randomly generated set of nodes. For the VT, we do not display the edges that end at infinity for the nodes at the border of the graph; we also ignore these edges in computations involving the VT. For the digraph OCG in FIG. 53D, symmetric edges are displayed as solid red lines, and non-symmetric edges are displayed as green dashed lines.

In addition to the graph and tree structures described above, used for analysis of pathology imagery, we will briefly mention that the k-NN graph was used in [166] and the Relative Neighbor Graph (RNG) in [167]. We forgo the implementation of the k-NN graph since we are more interested examining the features of a graph structure for a neighborhood defined by some other neighborhood constraint, rather than the arbitrary definition of a certain number of neighbors. Additionally, the work presented in [166] was focused on the matching of graph structures extracted from imagery. We are more concerned with the actual extraction process and the features that can be used from these graph structures for further image classification and analysis. We forgo implementation of the RNG in favor of the (simpler to implement) OCG, since both graph structures seek to define a neighborhood based on comparison of metrics with already existing neighbors. In the case of the RNG as presented in [167], the DT is processed to retain an edge only if the nodes are "relatively close." The use of the k-NN graph and RNG (or any other graph structure) could prove useful in our analysis.

5.4.2 Spatial Features

In the following descriptions, A is the adjacency matrix of the graph or tree. Additionally, we will use the generic term "graph" to refer to any graph or tree structure. The adjacency matrix is defined such that the ij-th entry $a_{ij}$ is the number of edges from node i to node j; there is a one-to-one correspondence between the adjacency matrix and graph structure [168]. For our graph structures, we will have no parallel edges (multiple edges between the same nodes) or loops (edges linking a single node to itself), so that $$a_{ij} \in [0,1], \forall i,j.$$

This means we can define another matrix B with edge weights (in our case inter-node distance); this facilitates easy computation of some feature values. Additionally, A and B will be symmetric for all structures except the OCG; this has some implications for computational simplicity of feature calculations.

For each of the features described below, we will make note of the graphs from which we extract the features.

Number of Nodes: The total number of nodes in the graph [41, 156, 157]. Since $$A \in \mathbb{Z}^{N_n, N_n},$$

where $N_n$ is the number of nodes, the number of nodes can be easily ascertained from the size of the adjacency matrix A. This feature will be constant for all graph structures.

Number of Edges: The total number of edges in the graph. For any non-digraph (the digraph case is considered later), the sum of the upper (or lower triangle) of A is the total number of edges in the graph. For simplicity of computation, it is easier to sum the entire matrix A and divide by two (since A is symmetric for non-digraphs):

$$N_e = \frac{1}{2} \sum_{i,j} a_{ij} \quad (5.98)$$

For the digraph OCG, A may not be symmetric and thus could have an odd value for the sum of the elements of A. For now we simply round $N_e$ to the nearest integer in the case of the OCG to allow for direct comparison of $N_e$ between the non-digraphs and the OCG. Use of the digraph characteristics of the OCG may be of use in the future. $N_e$ is calculated for the VT [157], DT [22], and OCG [156, 157]. $N_e$ is not computed for the MST since there will always be $N_n - 1$ or for the CG since it will always be $N^2_n$.

Cyclomatic Number: The cyclomatic number is defined as $$C = N_e + N_n + 1 \quad (5.99)$$

and is calculated for the VT [157], DT, and OCG [157] (all the graphs for which we calculate $N_e$). C is normalized by the number of edges, $N_e$.

Edge Length: The edge lengths (Euclidean distance) between each pair of neighboring nodes. EL is a vector of edge lengths, where an edge length is added according to $$\max(b_{ij}, b_{ji}); i=1,\ldots,n; j=i,\ldots,n; b_{ij}>0 \text{ or } b_{ji}>0 \quad (5.100)$$

EL is computed for the VT [157], DT [22, 41], MST [22, 41, 156, 157], CG [35, 36], and OCG [156, 157].

Degree: The number of edges incident with a node. This may be calculated from the adjacency matrix A by summing over the rows or columns:

$$\deg(n_i) = \sum_{j=1}^{N_n} a_{ij}, i = 1, \ldots, n \quad (5.101)$$

The degree of all nodes for the VT, DT [41], MST [41], and OCG are calculated, resulting in a vector, $$\deg=[\deg(n_1),\ldots,\deg(n_{Nn})] \quad (5.102)$$

The CG is excluded since the degree of all nodes will be $N_n-1$. An alternative definition for degree is used in [36] and [35], where degree is the sum of the edge weights for all edges incident with a node:

$$\deg_w(n_i) = \sum_{j=1}^{N_n} b_{ij}, i = 1, \ldots, n \quad (5.103)$$

This modified degree is computed for the VT, DT, MST, and OCG, yielding the vector, $$\deg_w=[\deg_w(n_1),\ldots,\deg_w(n_{Nn})] \quad (5.104)$$

In this case edge weights are defined as the Euclidean distance between the two end nodes; this could be extended to include edge weights related to other features, however.

Number of Neighbors: A vector NN consisting of the number of nodes with k neighbors, with k=1, . . . , 5 for our computations. This feature can be computed from a histogram of the deg feature, and is computed for the DT [157] (excluding the VT since it will contain the same information), MST [156, 157], and OCG [156, 157]. The CG is excluded since all nodes will have $N_n-1$ neighbors.

Randic Index: The Randic index has been used widely in chemistry applications where is has been shown to be sensitive to shape [157]. Assigning each edge a weight equal to the reciprocal of the square root of the product of the degrees of the two neighboring nodes, the Randic index of a graph is the sum of these edge weights:

$$R = \sum_{i \neq j, a_{ij} \neq 0} \frac{1}{\sqrt{\deg(n_i) * \deg(n_j)}} \quad (5.105)$$

The Randic index is computed for the VT, DT, MST [157], OCG, and CG. R is normalized by $N^2_n$/ave(deg).

Balaban Index: The Balaban index is computed via an iterative pruning process, whereby, at each iteration, points with only one neighbor (i.e., endpoints) are removed [157]. The Balaban index is defined as the sum of the squares of the number of points removed at each pruning step. This feature is a measure of the degree of branching of a tree structure, and is computed for the MST [157], normalized by $N^2_n$. This feature is not computed for any graph structures, since there is no guarantee that any endpoints will exist at any given iteration of the pruning process.

Wiener Index: The Wiener index is used in chemistry as a measure of both molecular volume and shape [157] and is defined as the sum of the distances between all pairs of nodes, where distance is defined as the minimum number of edges connecting the two nodes. The Wiener index is computed for the DT, CG, and MST [157]. The OCG is omitted due to computational difficulties with the non-symmetric adjacency matrix; this does not necessarily preclude a different method to compute the Wiener index of the OCG, but is left as future work. Additionally, the VT is omitted since it will yield the same information as the DT. The Wiener index is normalized by $N^2_n$.

Eccentricity: The eccentricity of a node is the greatest distance between itself and all other nodes in the graph. Again, distance here is defined as the minimum number of edges connecting two nodes. The eccentricities e of each node for the DT and MST are computed, yielding the vector e. Similar to the two different degree features, deg and $\deg_w$, we also compute $e_w$ using the edge weights rather than number of edges for the DT and MST. The CG is not included here since the eccentricity will always be the largest edge length, max (EL).

Number of k-Walks: A k-walk is an ordered set of nodes and edges $$W=n_1e_1n_2e_2\ldots n_{k-1}e_kn_k \quad (5.106)$$

such that edge $e_i$ has nodes $n_i$ and $n_{i+1}$ as endpoints [169]. A closed k-walk has $n_1=n_k$. One property of the adjacency matrix is that the q-th entry of $A^k$ is the number of k-walks from node $n_i$ to $n_j$ [168]. Thus the total number of closed k-walks can be computed as $$N_{kwalks}=\text{trace}(A^k) \quad (5.107)$$

The number of k-walks is computed for k=3, 4, 5 for the VT, DT, OCG, and CG, resulting in the vector $N_{kwalks}$. The MST is omitted since there will be no closed k-walks in a tree structure. The number of k-cycles is generally of more interest [157], where a k-cycle is a closed k-walk with unique nodes $n_1,\ldots,n_{k-1}$ [169]. The computation of the number of k-cycles from the adjacency matrix, however, is nontrivial and computationally intensive [170]. We substitute the more general number of closed k-walks, although it has not been established in previous work whether this is a useful metric for quantifying spatial arrangement. $N_{kwalks}$ is normalized by $N_e$.

Number of Triangles: The number of length-3 cycles in a graph is computed for the VT [157], DT, OCG [157], and CG. Generally, the number of k-cycles of a graph cannot be directly deduced from the adjacency matrix. In the case of 3-cycles, however, the following property holds [170]:

$$N_{tri} = \frac{\text{trace}(A^3)}{6} = \frac{N_{3walks}}{6} \quad (5.108)$$

Again, we normalize $N_{tri}$ by $N_e$.

Spectral Radius: The spectral radius is defined as the largest absolute value of the eigenvalues of A. Along the lines of [36] and [35], both the largest and second largest absolute eigenvalue of A are computed for the VT, DT, MST, and CG [35, 36]:

$$SR=[\lambda_1\lambda_2] \quad (5.109)$$

where $\lambda_1$ and $\lambda_2$ are the first and second largest absolute eigenvalues, respectively. SR is not computed for the OCG since the adjacency matrix is not necessarily symmetric, which can result in complex-valued eigenvalues.

Eigenexponent: The eigenexponent is defined as the slope of the sorted eigenvalues in log-log scale; per [36] and [35], the slope from the 3rd largest eigenvalue to the minimum of $N_n$ or 30 is used. The eigenexponent is computed for the VT, DT, MST, and CG [35, 36].

Fractal Dimension: An image is defined by creating a one-pixel wide line for each of the graph edges, and the same FFT-based method for computation of fractal dimension as presented in Section 5.3 is used. The fractal dimension of the DT [22, 41], MST [22, 41], OCG, and CG is computed. The VT is omitted since the point of the VT is to cover the plane with adjacent Voronoi cells.

Area: The area of the Voronoi cells in the VT [22, 41]:

$$\text{Area} = [\text{Area}(X_1), \ldots, \text{Area}(X_m)] \quad (5.110)$$

where $X_i$ is the i-th Voronoi cell, and Area computes the area in number of pixels. We only consider the Voronoi cells for which there are no vertices at infinity.

Average roundness factor: The average roundness factor of a VT is defined as [155]:

$$RF_{av} = \frac{1}{N}\sum_{i=1}^{N} \frac{4\pi \text{Area}(X_i)}{\text{Perimeter}(X_i)^2} \quad (5.111)$$

where Perimeter is the perimeter of the Voronoi cell.

Area Disorder: The area disorder of a VT is defined in terms of the mean and standard deviation of the Voronoi cell areas, $m_A$ and $\sigma_A$, respectively [155]:

$$AD = 1 - \left(1 + \frac{\sigma_A}{m_A}\right)^{-1} \quad (5.112)$$

Roundness Factor Homogeneity: The roundness factor homogeneity of a VT is defined in terms of the mean and standard deviation of the roundness factor, $m_{RF}$ and $\sigma_{RF}$, respectively [155]:

$$RFH = \left(1 + \frac{\sigma_{RF}}{m_{RF}}\right)^{-1} \quad (5.113)$$

5.4.3 Summary

The spatial-level features are summarized in Table 27. In addition to the features presented above, various statistics measures for any of the vector quantities are also calculated. Thus, the mean, median, minimum, maximum, and standard deviation are calculated for all vector features, with the option to compute the skewness and kurtosis as well. The total number of spatial-relation features extracted is, thus, 179 (145 without skewness and kurtosis) for each of the graph structure.

5.5 Region-Based Spatial Features

The spatial arrangement of nuclei or other histologic entities will not be consistent across any given image. As such, we would like to quantify the spatial features of an image on a regional basis. The question, however, is how to define a region; ideally there would be no a priori constraints on the definition of region, since that is at the heart of the very issue of extracting spatial features. Realistically, however, there must be some definition of a region for region-based feature extraction. We choose to use a sliding square window and quantify the graph structure that is enclosed within the window. Since this is essentially feature extraction within a truth window, the sliding window starts with a one pixel overlap with the truth window in the upper left and ends with one pixel overlap in the lower right. For each position of the sliding window, the extracted features are associated with each node and the Voronoi cell of each node within the window. Thus, if we were to delineate within an original image the regions with some particular feature value, we would use the Voronoi cell boundaries for this delineation. As an example, FIG. 54A-B show a sliding window approach to extraction of region-based spatial features. A square window is used to define the current area of interest, but the region to which the features are attributed is defined by the Voronoi cells of all nodes internal to the square window.

In other work, there is reference to the use of spatial features extracted for a "reference area," but it is unclear how this reference area is defined. In particular the number of nodes per reference area is used for the DT [41], MST [41, 156], and OCG [156] and the total edge length per reference area is used for the DT [22, 41], and MST [22, 41].

In order to define a reasonable size for our sliding window, we look at the spatial feature values for differently sized graphs (according to number of nodes). For this we randomly generated two types of graphs designed to be representative of nuclei in our data. For both graph types, assuming that the initial node coordinates $(x_0, y_0)$ are initialized to some arbitrary value, we:

1. Randomly select from the existing nodes, resulting in the selection of some coordinates $(x_r, y_r)$.

2. Calculate a new node at a randomly generated distance from $(x_r, y_r)$, i.e., $(x_n, y_n) = (x_r + d_x, y_r + d_y)$. $d_x$ and $d_y$ are both independently sampled from a normal distribution of mean 0 and standard deviation 12. We choose 12 to represent a typical minimum distance between cell nuclei, assuming an average nuclear diameter of 25 pixels. These are the same assumptions as used in the implementation of the WSBlob nuclear segmentation in Section 4.4.4.

(a) Random Graph Type 1: Accept the new node $(x_n, y_n)$ only if $$\sqrt{(x_n - x_i)^2 + (y_n - y_i)^2} > 10; i = 1, \ldots, k \quad (5.114)$$

where k is the current number of accepted nodes. Thus the new node is rejected if the Euclidean distance between the new node and any other existing node is less than 10 pixels. This imposes a more regular spatial distribution to the random graph, along the lines of what might be expected for normal or benign tissue.

(b) Random Graph Type 2: Accept the new node. This results in the opportunity for nodes to become more crowded, approximating the appearance of some malignant tissue.

3. Repeat step 2 N−1 times, where N is the total number of nodes desired in the random graph.

Examples of type 1 random graphs are shown in FIGS. 55A-E and examples of type 2 random graphs in FIGS. 56A-E.

All the described spatial features are extracted from each of the random graphs in FIG. 55A-E and FIG. 56A-E for number of nodes in the range [3,100], where 100 is the total number of nodes in the graphs. For each graph type, the spatial feature values are averaged and plotted versus the number of nodes. This gives insight into how the spatial features are expected to vary according to the number of nodes of a graph. These plots are presented for some spatial features in FIGS. 57A-L; features chosen for presentation here are those that are applicable to the widest range of graph structures.

Since the random graphs are designed to approximate the appearance of histology imagery, we look for the number of nodes for which the majority of the features are close to their "steady-state" value, i.e., the value representative of the entire 100-node graph. From FIGS. 57A-L note that there are very similar trends in the feature plots of type 1 and type 2 random graphs. Also note that for a number of nodes between 20 and 30, the feature value is generally expected to be close to the steady state value of the total graph. In the choice of the size of our sliding window, we would thus like the window to (most likely) encompass at least 20 to 30 nodes, or approximately 52 nodes. For each nucleus being approximately 25 pixels, this is a window of about 125×125 pixels. We choose 128×128 pixels as the closest power of 2, since this facilitates efficient computation of some of the features relying on the FFT.

5.6 Feature Selection and Classification Performance

In this section we briefly describe the feature selection technique used and then describe results for feature selection and performance.

5.6.1 An Overview of Grafting

Grafting (from "gradient feature testing") [108, 109] is used as the feature selection method for this work. Grafting is chosen based on the elegant formulation of the feature selection problem, whereby the classification of the underlying data and the feature selection process are not separated. Within the grafting frame-work, a loss function is used that shows preference for classifiers that separate the data with larger margins. Grafting also provides an efficient framework for selection of relevant features.

More specifically, given a set of m feature vectors x with corresponding ground truth labels y, the grafting framework looks to minimize the criterion $$C(\theta) = \frac{1}{m} \sum_{i=1}^{m} L(f_\theta(x_i), y_i) + \Omega(\theta) \quad (5.115)$$

where $L(\cdot)$ is a loss function to penalize incorrect classifications, $f(\cdot)$ is a predictor function (classifier), $\theta$ is the set of parameters (features) that parametrize the predictor function, and $\Omega$ is a regularization term to penalize complex (overfit) solutions [108]. The predictor function is assumed to be linear:

$$f(x) = \sum_{i=1}^{n} w_i x_i + b \quad (5.116)$$

where $w_i$ and $x_i$ are the i-th entries of weight vector w and feature vector x, respectively.

The Binomial Negative Log Likelihood (BNLL) loss function is used [108], $$L_{BNLL} = \frac{1}{m} \sum_{i=1}^{m} \ln(1 + e^{-\rho_i}) \quad (5.117)$$

where $\rho$ is the margin of the classifier, defined as $$\rho_i = y_i f(x_i) \quad (5.118)$$

since it incorporates the classifier margin, and for other mathematical advantages (refer to [108]). The regularization term is defined as:

$$\Omega_q(w) = \lambda_q \sum_{i=1}^{n} \alpha_i |w_i|^q \quad (5.119)$$

From this formulation, commonly $\alpha_i \in \{0, 1\}$, such that features are either included or excluded from consideration in the optimization. The choice of q results in regularizers with different characteristics. As implemented, the $\Omega_1$ regularizer is used.

In addition to the elegant formulation of feature selection provided by grafting, it also provides for an efficient means to perform the feature selection. Briefly, the features are considered one-by-one and the "best" feature is chosen (i.e., assigned a non-zero weight). A gradient descent optimization is subsequently performed on the current model to re-optimize the weight vector w.

5.6.2 Object-Level Feature Selection and Performance

In this section we discuss the feature selection and classification results for both object- and spatial-level features.

Individual Histologic Object Classes

The grafting method of feature selection was applied to the GT, WSHmin ($h_{min}$=3), and WSGran (r=4) nuclear, combined cytoplasm and stroma, and cytoplasm segmentations. Additionally, feature selection was applied to a simple connected-components analysis (CC) for all previously mentioned classes and also for stroma segmentation. The IS and OS performances (percentage of histologic objects correctly classified) are presented in Table 28 for a regularization parameter $A_1$ of 0.01 and in the lower portion of Table 40 for $\lambda_1$=0.05. Table 28 shows Object-level feature subset performance, with regularization parameter $\lambda_1$=0.01. In the following, "N" designates nuclei, "CS" combined cytoplasm and stroma, "C" cytoplasm, and "S" stroma. "N2" indicates the use of user-defined labels for nuclei in the malignant images, as opposed to the assumption that all benign (malignant) nuclei are (benign) malignant. Bold entries correspond to the best performance across all the segmentations (excluding GT) for each feature subset. Within these tables, the nuclei ('N'), combined cytoplasm and stroma ('CS'), cytoplasm ('C'), and stroma ('S') rows correspond to a feature selection with the assumption that all objects in the benign (malignant) images are benign (malignant). For the 'N2' row, further feedback was elicited from the user on individual regions within the malignant images to better assign the class labels within those images.

As a comparison, for nuclear-level classification (benign versus malignant) accuracies, van de Wouwer et al. [45] achieved 67.1% accuracy (leave-one-out, 9-NN classification), and Weyn et al. [18] achieved 76.1% accuracy (leave-one-out, 1-NN classification). The regularization parameter of $\lambda_1$=0.01 appears to provide both better IS and OS performance. It is very interesting to note that in Table 28, the IS classification performance on WSGran segmented nuclei approaches that of the GT nuclei. Additionally, the OS WSGran performance is comparable to that of [45] and [18]. The use of user feedback for labeling of the malignant image nuclei does not appear to improve performance significantly, if at all.

The uses of features of cytoplasm and stroma are unique to the present invention. The initial hypothesis was that cytoplasm and stroma features would be poor classifiers in and of themselves, but would slightly increase the classification performance when combined with nuclear features. Instead, as shown in Tables 28 and 40, the combined cytoplasm and stroma ('CS'), cytoplasm ('C'), and stroma ('S') classes have a performance generally exceeding that of the nuclei ('N' and 'N2'). Indeed, these performances are comparable to or exceed the nuclear classifications reported in [45] and [18]. It should be noted that the sample size used for the CS and C classes are smaller than the sample size used for the N and N2 classes; this is due to the fact that the Voronoi cells with vertices at infinity (i.e., the edge cells) are not considered. Additionally, the sample size for the S class will differ from the N and N2 classes, since the stroma class is segmented in a connected-components analysis, not relying on the nuclear segmentation for node definitions as do the CS and C segmentations.

Interestingly, in all these results, there is no clearly superior segmentation method among CC, WSHmin, and WSGran for OS imagery. This would seem to indicate that a feature selection scheme can make use of the information contained in any (reasonable) given segmentation for classification purposes. Additionally, in several cases, the performance of the CC, WSHmin, and/or WSGran segmentations approaches the best possible classification of the GT segmentation. Thus, it does not appear that too much information is lost or obscured with improperly segmented nuclei. More information about this may be gathered from examination of the feature subsets. Correspondence between the feature subset and the qualitative observations of general cancer characteristics will be considered for the best feature subset of this section.

Combined Histologic Object Classes

The combination of nuclear and cytoplasm/stroma features is also shown in Tables 28 and 440. Note the increase in performance when the CS or C class is combined with the N class (for all segmentations excluding GT); this is a performance increase over any of the individual class performances IS, although CS and C perform better OS than the combined classes. For these results, only the nuclei with corresponding CS or C segmentations are included for the feature selection process. Thus the sample size of the N+CS class is the same as the CS class itself, and similarly with the N+C class.

Use of Multispectral Object-Level Features

Multispectral features were used for WSGran segmentations of nuclei, combined cytoplasm and stroma, and cytoplasm; multispectral features were also used for CC segmentation of nuclei, combined cytoplasm and stroma, cytoplasm, and stroma. Classification results after grafting-based feature selection are shown in Tables 29 and 30 along with the corresponding results using ccd features for comparison. Table 29 shows Multispectral versus ccd object-level features, $\lambda_1$=0.05, for WSGran segmentations (N, CS, C), and CC segmentation (N, CS, C, S). Bold entries correspond to the best performance for each segmentation for each feature subset. Table 30 shows Multispectral versus ccd object-level features, $\lambda_1$=0:01, for WSGran segmentations (N, CS, C), and CC segmentation (N, CS, C, S). Bold entries correspond to the best performance for each segmentation for each feature subset.

While the use of multispectral features improves the IS performance, the OS performance is significantly degraded in many cases (at best it is equivalent to the OS ccd performance). This indicates that the multispectral features provide information that allows the classifier to more readily overfit to the IS data. This degradation in performance can also be understood as the multispectral features being much less generalizable than the corresponding RGB features when applied to unseen imagery. This is an interesting result in light of the approximately equivalent performance of multispectral and RGB imagery for the various classification tasks considered in Sections 2 and 3 and the superiority of RGB imagery for segmentation tasks presented in Section 4. Thus, not only does multispectral imagery provide no clear benefit for pixel-level classification, or object-level segmentation, but it also appears to significantly degrade the OS performance of object-level feature selection.

5.6.3 Spatial-Arrangement Feature Selection and Performance

The results from applying grafting to the spatial-arrangement features is shown in Table 31 for feature extraction over the entire truth window (i.e., without implementation of the sliding window approach discussed in Section 5.5). It is important to remember that these results are for classification of the entire image based on spatial features. Results using the region-based approach of Section 5.5 are shown in Table 32; thus, these results are object-level classification. Table 31 shows Spatial-level feature subset performance for nuclei. These results are image-level results since there is only one set of features derived per image. Bold entries correspond to the best performance across all the segmentations (excluding GT) for each feature subset. Table 32 shows Region-based spatial feature subset performance for nuclei. These results are object-level results since the region-based spatial approach allows for spatial attributes to be associated with individual image objects. Bold entries correspond to the best performance across all the segmentations (excluding GT) for each feature subset. The CC segmentation is excluded due to computational constraints.

The performance of spatial-arrangement features on a non-regional basis (Table 31) are surprisingly poor. Some of this poor performance may be attributed to the use of a graph that encompasses significantly different spatial attributes, e.g., a graph including portions of normal tissue and portions of a tumor. The use of regional-based spatial features (Table 32), however, which should minimize the inclusion of different spatial attributes, also yields poor performance. We hypothesize two reasons for the poor performance of spatial features. First, it is possible that the features which have been extracted from the imagery are not appropriate features for elucidation of the spatial arrangement attributes of the tissue. Second, it is possible that the spatial arrangement attributes are not important characteristics in and of themselves to distinguish cancerous from non-cancerous conditions. We will consider each of these possibilities in more detail.

Evidence related to the first possibility, that the spatial arrangement features extracted are not appropriate for the classification task, can be found by examining the IS and OS performance of the GT nuclei. Unfortunately, it is difficult to directly compare the results in Tables 31 and 32 since the former contains image-level classification performances and the latter contains region-level classification performances. In Table 31, we see that the OS performance for non-regional spatial-arrangement classification is actually quite good (0.83) for $\lambda_1$=0.05. This lends support in favor of the spatial features being appropriate for classifying the cancerous imagery. By noting the poor OS performances for the nuclear segmentations (CC, WSHmin, WSGran), however, it also indicates that these features, unlike the object-level features, are quite reliant on a good underlying nuclear segmentation. Observation of the region-level classification results in Table 32, however, shows poor OS performance across all nuclear segmentations, including GT. This indicates that even with a perfect nuclear segmentation, that the spatial-arrangement features cannot elicit appropriate information about the cancerous nature of the imagery. So, on the one hand there exists evidence to support the utility of the spatial features and also the uselessness of the spatial features. We will return to this issue in our discussion of image-level classification performance in Section 5.6.5.

For the second possibility, that spatial features in and of themselves are not useful in distinguishing cancer from non-cancer, the performance of combined object- and spatial-level features are analyzed in the following section. First, however, we will address this issue in more general terms. It is well accepted among pathologists that the spatial arrangement of histologic entities is of utmost importance for many visual tasks, including cancer diagnosis and even classification of tissue origin of cells. The removal of all object-level information, retaining solely spatial information in the form of nodes (i.e., the nuclei centroids) as is done for the extraction of the spatial features removes a lot of the visual cues that the pathologist uses for analysis. As an example of this, consider the example images in FIG. 58A-F, where nuclei centroids (FIG. 58A-B), nuclei ground truth masks (FIG. 58C-D), and the underlying RGB images (FIG. 58E-F) are shown for an example benign and malignant image. The classification of the images is difficult given solely the spatial information, i.e., the nuclei centroids. The addition of object-level information, in the form of binary ground truth object masks, increases the visual cues available, e.g., size of nuclei, irregularity of nuclear boundaries. Finally, the addition of the low-level cues from the RGB image (e.g., color and texture) adds yet another layer to the visual cues that can be used for a classification. This provides an empirical example of the possibility that the spatial features alone may not be particularly indicative of the cancer state of the imagery, and that the inclusion of other features, namely object- and low-level features, are needed for complete description of the imagery.

5.6.4 Combining Object- and Spatial Arrangement-Level Features

As motivated in the previous section, we apply grafting to the combination of spatial and object-level features. Results are shown in Tables 33 and 34. Table 33 shows object and spatial-level feature subset performance, $\lambda_1=0.05$. In the table, "N" designates nuclei, "CS" combined cytoplasm and stroma, "C" cytoplasm, and "S" stroma. Bold entries correspond to the best performance across all the segmentations (excluding GT) for each feature subset. The CC segmentation is excluded due to computational constraints. Table 34 shows Object and spatial-level feature subset performance, $\lambda_1=0.01$. In the table, "N" designates nuclei, "CS" combined cytoplasm and stroma, "C" cytoplasm, and "S" stroma. Bold entries correspond to the best performance across all the segmentations (excluding GT) for each feature subset. The CC segmentation is excluded due to computational constraints. The inclusion of region-based spatial features provides a slight improvement in some OS GT performance, but does not improve OS performance for the other segmentations as compared to the object-level feature performances in Tables 28 and 40, especially for $\lambda_1=0.01$. These results seem to indicate once again the reliance of the spatial features on a very good underlying nuclear segmentation. Assuming a near perfect nuclear segmentation, however, the possible improvement in performance is still very small, and it is unclear that this performance increase is even to be expected.

5.6.5 Image-Level Performances

Image-level performances are demonstrated with Receiver Operator Characteristic (ROC) curves, varying the threshold of malignant objects for which an image is considered malignant. ROC curves for OS imagery are shown in FIG. 59A-F, where the grafting results for object level feature subsets, $\lambda_1=0.01$, were used. Additionally, the AUC for each ROC curve is shown both in FIG. 59A-F and Table 35. Similarly, ROC curves and AUC scores are shown for OS imagery, regional-based spatial features and combinations of object and region-based spatial features, $\lambda_1=0.01$, in FIG. 60A-D and Table 5.36. More specifically, Table 35 shows AUC for OS image-level classification for grafting with $\lambda_1=0.01$. In the table, "N" designates nuclei, "CS" combined cytoplasm and stroma, "C" cytoplasm, and "S" stroma. Bold entries correspond to the best performance across all the segmentations (excluding GT) for each feature subset. Table 36 shows AUC for OS spatial-level and combination object- and spatial-level classification for grafting with $\lambda_1=0.01$. In the table, "N" denotes object-level nuclei, "SPN" spatial-level nuclei, "CS" combined cytoplasm and stroma, and "C" cytoplasm. Bold entries correspond to the best performance across all the segmentations (excluding GT) for each feature subset. The CC segmentation is excluded due to computational constraints.

The image-level performance using object-level features is very good, resulting in AUC values above 0.9 in many cases (refer to FIG. 59A-F and Table 5.11). Again, similar to the object-level performance in Tables 28 and 40, the cytoplasm/stroma and cytoplasm classes provide a better AUC than the nuclei class in most cases. It is interesting that for the image-level classification, the CC segmentation provides consistently better performance than the other segmentations. This is markedly different than the object-level classification performances, where the WSGran segmentation tended to provide the best performance. This is a very interesting result in light of the performance differences for nuclear segmentation of the two classifiers, where WSGran had a best average performance of 0.34 and CC of 0.09.

Additionally, the combined classes here provide worse AUC values than the individual object classes (with the exception of the stroma class). For these results, the combined cytoplasm and stroma class provides the best AUC score of 0.94 for CC segmentation. It is also interesting that the image-level performances for the CC segmentation outperform the GT segmentation.

Looking at the image-level performances of spatial- and combined object- and spatial-level features, we see very poor AUC values for all segmentations but GT (refer to FIG. 60A-D and Table 36). This corroborates our hypothesis that the spatial features are highly dependent on the accuracy of the underlying nuclear segmentation, and that the spatial features alone are not useful for classification purposes.

5.7 Feature Subsets 5.7.1 Object-Level Feature Subsets

Table 37 presents various statistics of the CC object-level feature subsets, namely the percentage of OD and non-OD features; R, G, B, I/Hue, and binary features; texture, radiometric and densitometric, and size/shape features; and nuclei and non-nuclei features.

All feature subsets display a preference for OD features, particularly the nuclei subset. This is not surprising given that the OD features provide a linear relationship between image intensity and stain density. Additionally, it has been shown that this linear relationship is particularly useful in quantifying characteristics of nuclear chromatin [151, 152].

The preference for different color features (R, G, B, I/Hue) is roughly uniform, with the cytoplasm subset slightly favoring red features, and the stroma subset slightly favoring green features. The preference for red features in the cytoplasm subset carries over into the nuclei and cytoplasm subset, albeit with less preference for red features.

The texture features are used more often in the CS, C, S subsets (as well as the combined N+CS and N+C subsets), and the size and shape features are used more often in the N and C subsets. This indicates that while nuclear chromatin texture (and cytoplasm texture) is an important characteristic to distinguish cancerous from non-cancerous nuclei (cytoplasm), that size and shape also play an important role. Not surprisingly, given our previous discussion (refer to Section 3.4) regarding the strong texture of stroma, the stroma subset has the largest reliance on texture features of any object-level feature subset.

In the two combined object-level feature subsets, N+CS and N+C, there is a stronger preference for the non-nuclear features than for the nuclear features. Given the good performance of the cytoplasm/stroma and cytoplasm classes, we might expect that there would be a roughly equivalent representation in the feature subsets when combining nuclear and non-nuclear features. There is a slight bias towards cytoplasm features in the nuclear and cytoplasm subset, and a stronger bias towards cytoplasm/stroma features in the nuclear and cytoplasm/stroma feature subset. Thus, in addition to the good performance of the individual cytoplasm/stroma and cytoplasm classes, these features are also very important when combined with nuclear features.

5.7.2 Spatial- and Combined Object- and Spatial-Level Feature Subsets

Table 38 presents statistics of the WSGran object-level feature subsets, namely the percentage of OD and non-OD features; R, G, B, I/Hue, and binary features; texture, radiometric and densitometric, and size/shape features; nuclei and non-nuclei features; VT, DT, MST, OCG, and CG features; and total percentage of object- and spatial-level features.

All object-level statistics remain similar to those presented in Table 37. Additionally, choice of graph type for spatial feature extraction is consistent across all the feature subsets. In all the combination object- and spatial-level subsets, there is a strong preference for the object-level features over those of the spatial features. Thus, while the spatial-level features may provide more IS classification accuracy, there is still a preference for the object-level features in the combined object- and spatial-level feature subsets. Given the IS and OS performance of the spatial features alone, it is likely that the inclusion of the spatial features is what degrades the performance of the combined object- and spatial-level classifiers for OS data.

5.8 Summary

In this section we have detailed a comprehensive list of object-level features and demonstrated the use of these features on various histologic objects. It has been demonstrated that these object-level features are versatile and general enough to elicit important information from even imperfectly segmented objects. This was demonstrated with the object- and image-level classification performance for the ground truth nuclei versus three different segmentations of nuclei, namely connected-components (CC), WSHmin, and WSGran. The latter two segmentations were described and analyzed in Section 4. We have presented the use of non-nuclear features, namely features of cytoplasm and stroma, and their good classification performance, often exceeding that of nuclei. Furthermore, we find that the cytoplasm and stroma features have object- and image-level classification performances often exceeding that of nuclei, which are considered the most important histologic objects for cancer characterization. This is a very unexpected result.

Using object-level features and the grafting method of feature selection, we have shown object-level classification accuracies above 0.70 for OS data. We hypothesize that it is the use of a comprehensive set of features that allows for the use of imperfectly segmented objects, at least for this particular application. As a point of comparison, the feature extraction and grafting-based feature selection for objects defined as non-overlapping tiles of 50×50 pixels yields a tile-level performance of 0.92 IS and 0.68 OS for $\lambda_1=0.01$. This corresponds to an AUC of 0.89; as reference, the ROC curve for tiles is shown in FIG. 61. Thus, with attention to the pixel-level classification and segmentation of histologic objects, we can expect an increase in performance (refer to Tables 28 and 35), but the achievement of near-perfect object-level segmentation may be unnecessary in this application. Other researchers, namely Maree et al. [171, 172] have demonstrated the use of "random subwindows" for image classification, similar to this tile-based approach here.

We have also presented a comprehensive list of spatial-level features for use in quantifying the spatial arrangement aspects of nuclei in our imagery, including a method for assigning these spatial features to a region of an image. It was expected that the spatial features would be particularly useful in the characterization of cancerous versus non-cancerous tissue. We have shown, however, that these features suffer from very poor out-of-sample performance even for the perfect GT segmentation. Additionally, the application of these features to the CC, WSHmin, and WSGran segmentations does not yield good results. It thus appears that the spatial features are either not appropriately defined to quantify the spatial characteristics that human experts are cueing on, or that these features are particularly dependent on a good underlying object segmentation.

Evidence, as presented in this section, seems to indicate the latter: that these features appear to be dependent on a good object-level segmentation. Even in combination with object-level features, the spatial-level features tend to degrade the OS performance for the CC, WSHmin, and WSGran segmentations.

Lastly, we have presented and discussed the various feature subsets as determined by the grafting algorithm. We have noted a strong preference for the optical density-related features, and found that texture features are important for classification of all histologic classes considered here. Additionally, for the combined object-level feature subsets, there is a stronger reliance on the non-nuclear features, reflecting the surprisingly better performance of the non-nuclear features when considered alone. Similarly, for the combined object- and spatial-level feature subsets, there is a preference for the object-level features which were shown to perform better in both object- and image-level classification.

5.9 Additional Considerations

The good performance of the cytoplasm and stroma features provides a possibility for application to other datasets including other tissues (e.g., prostate, colon). The focus on histopathology imagery was originally motivated in part by the desire to study the spatial arrangement aspects of the imagery. Additionally, use of these object-level features to may by applied to cytology imagery, especially in light of the poor performance of spatial features.

One embodiment contemplates application of the object-level feature extraction and selection in a completely different application domain, e.g., remote sensing. Of particular interest here, beyond the classification performance of this approach, would be the dependence of classification performance on the accuracy of the underlying object segmentations.

While the spatial features have not been shown to be useful in this study, there is definite cause for further analysis of these features. Other researchers have shown the utility of some spatial features for certain image analysis tasks, e.g., [41] and [22]. Further study of the spatial features and how they may be better tailored to human intuition about spatial arrangement of objects is certainly an open field of research.

6. HIGHER-LEVEL OBJECTS

6.1 Introduction

The size and shape features from Section 5 are applied to higher-level objects, namely "cells" and "cell clusters." These higher-level features degrade the OS performance, similar to the effect seen with multispectral object features. Additionally, we discuss the use of a "feature graph" representation for the various features. Lastly, we introduce an image representation method in the form of probabilistic graph models and indicate possible further uses for such an image representation.

6.2 Motivation

Discussed in the previous section were different levels of feature metrics required for object-level analysis, namely object-level (including many that can be considered low-level) and spatial-relation level. In this section we extend the use of the object-level features to higher-level image objects. This work is motivated, in part, by the biological evidence for the use of hierarchies (and reverse hierarchies) in human visual perception [173], building from the simple receptive fields of retinal photoreceptors, developing intermediate generalizations of these simple features, and culminating with scene comprehension/perception.

Section 6.3 discusses the segmentation method used to group histologic objects. Section 6.4 discusses the creation and use of higher-level objects in more detail, including results of classification using such objects. Section 6.5 discusses the creation of a probabilistic graph model of the imagery.

6.3 Higher Level Segmentation

For the higher-level segmentation, the Region Connection Calculus [174] (RCC) was chosen. RCC is a widely known and studied approach for spatial representation and the general artificial intelligence problem of Qualitative Spatial Reasoning (QSR) [175, 176]. The general term "reasoning" as used in QSR refers to the following problem: given the relationships between regions x and y as $R_1(x, y)$ and between y and z as $R_2(y, z)$, what can be determined about the relationship $R_3$ between x and z? This reasoning problem may be NP-complete [175-178] and will not be of initial concern in this work, but instead RCC will be used as a means to represent regions and pairwise relations between regions. The general problem of reasoning over three regions in RCC may be useful in future work, at which point other research on tractable subsets of RCC, e.g., [177-179], may be of use.

6.3.1 An Introduction to the Region Connection Calculus

RCC is based on a single primitive connection operator C, which may be defined as desired, as long as it is reflexive and symmetric [175], i.e., $$\forall x [C(x,x)] \quad (6.1)$$

$$\forall x \forall y [C(x,y) \rightarrow C(y,x)] \quad (6.2)$$

Two common Subsets of RCC, known as RCC8 and RCC5, contain 8 and 5 jointly exhaustive and pairwise disjoint (JEPD) base relations, respectively, developed using C [175]. The eight base relations of RCC8 are illustrated in FIG. 61, showing disconnected (DC), externally connected (EC), partial overlap (PO), tangential proper part and its inverse (TPP and TPPI), nontangential proper part and its inverse (NTPP and NTPPI), and equivalent (EQ). For RCC5 relations, the boundary of an object is not considered, such that DC and EC are combined to become DR (discrete), and TPP and NTPP become PP (proper part) [178]. In terms of C, these relations (plus intermediate relations part (P) and overlap (O)) are defined as [175]:

$$DC(x,y) \equiv \neg C(x,y) \quad (6.3)$$

$$P(x,y) \equiv \forall z [C(z,x) \rightarrow C(z,y)] \quad (6.4)$$

$$O(x,y) \equiv \exists z [P(z,x) \wedge P(z,y)] \quad (6.5)$$

$$EC(x,y) \equiv C(x,y) \wedge \neg O(x,y) \quad (6.6)$$

$$DR(x,y) \equiv \neg O(x,y) \quad (6.7)$$

$$PO(x,y) \equiv O(x,y) \wedge \neg P(x,y) \wedge \neg P(y,x) \quad (6.8)$$

$$PP(x,y) \equiv P(x,y) \wedge \neg P(y,x) \quad (6.9)$$

$$TPP(x,y) \equiv PP(x,y) \wedge \exists z [EC(z,x) \wedge EC(z,y)] \quad (6.10)$$

$$NTPP(x,y) \equiv PP(x,y) \wedge \exists z [EC(z,x) \wedge EC(z,y)] \quad (6.11)$$

$$EQ(x,y) \equiv P(x,y) \wedge P(y,x) \quad (6.12)$$

The applicability of these operators to biological cells is obvious from the illustration in FIG. 62. The sets of eight or five relations is commonly expanded with the use of Boolean functions sum (+), compl (complement), prod (*, product/intersection), and diff (−, difference). Indeed, RCC can be reformulated as a Boolean connection algebra [180, 181].

Additional expansions can be achieved by the creation of new predicates by combination of JEPD relations and Boolean functions. Such extensions include methods to describe shape via predicates defined on the dissection-graphs of regions [175]. Another intriguing predicate is the convex hull, which can allow for distinctions between such spatial relations as those shown in FIGS. 63A (one object strictly contained within another, i.e. NTPP) and 63B (one object contained within the convex hull of another). The convex hull predicate is defined as [175]:

$$CONV(x) \equiv EQ(x, conv(x)) \quad (6.13)$$

where conv(x) denotes the convex hull of region x.

Additionally, there is evidence that RCC8 is "conceptual cognitive adequate," a term defined as "empirical evidence supports the assumption that a system of relations is a model of people's conceptual knowledge of spatial relationships" [176, 178].

6.3.2 Implementation of RCC

While concepts of RCC and other spatial reasoning tend to shy away from pixel-based representations of objects and regions, there are not any proposed methods of avoiding the use of pixels. The spatial relation between two regions, x and y can be defined in RCC8 using set operations on the pixels within each region with the following process, where p(•) is the perimeter of a region, and d(•) is the Euclidean distance function:

If x ⊂ y
    If p(x) ∩ p(y) = ∅ ⇒ NTPP(x, y)
    Else ⇒ TPP(x, y)
Else if y ⊂ x
    If p(x) ∩ p(y) = ∅ ⇒ $NTPP^{-1}$(x, y)
    Else ⇒ $TPP^{-1}$(x, y)
Else if x≡y ⇒ EQ(x, y)
Else if x ∩y=∅
    If min(d(x, y))>1 ⇒ DC(x, y)
    Else ⇒ EC(x, y)
Else if x ∩y≠∅ ⇒ PO(x, y)

Similarly, the spatial relation between the two convex hulls of regions x and y, can be determined by the same process as above, replacing x and y by conv(x) and conv(y), respectively.

As generally modeled, cytoplasm is assumed to contain the cell nuclei, reflecting an extrapolation of the two objects to three dimensions. Thus, while the segmentation processes described in Section 4 represents the cytoplasm as (ideally) an annulus around the nuclei, human intuition about the relationship is not an EC one but rather a NTPP one. As illustrated in FIG. 64A-B showing proper part versus externally connected, and the benefit of convex hull in our implementation of RCC8. As modeled, cytoplasm is assumed to contain the cell nuclei as shown in FIG. 64A, reflecting an extrapolation of the objects to three dimensions. The segmentation and feature extraction processes of Sections 4 and 5, however, result in cytoplasm and nuclei as discrete objects as shown in FIG. 64B.

Thus, the use of the convex hull operator can allow for more intuitive modeling of relationships between histologic objects, particularly when the objects have been segmented based solely on visual properties and not based on any a priori shape information. This may extend into other application domains such as remote sensing; as an analogy, a lake in the middle of a forest would most likely be considered part of the forest rather than externally connected. Note that, in this application, the decision of the RCC relation between two objects is independent of the feature extraction process for those same objects.

6.3.3 Results

Implementing RCC8 with the convex hull operator, hereafter referred to generically as RCC8, we compute the histograms of RCC8 relations between histologic entities. Results are shown in FIG. 65A-C for the relation between nuclei and cytoplasm/stroma, nuclei and cytoplasm, and cells (nuclei and cytoplasm) and stroma. In this implementation, the relationship is determined for the objects based on the order in which they are presented to the algorithm. Thus the relation between nuclei and cytoplasm is interpreted as the relationship of nuclei to cytoplasm, not vice versa. Additionally, it should be noted that there is a threshold for distinguishing between the TPP and TPPI relations versus a PO relation. This was implemented for the empirically determined value of 5 pixels to avoid a bias towards PO for inadequately resolved region boundaries.

Interestingly, nuclei tend to have a PO or TPP relationship with cytoplasm and combined cytoplasm/stroma more often than a NTPP relationship. For the GT segmentation this is not surprising given the prevalence of clustered nuclei, indicating that the nuclei will be tangential to the Voronoi boundary and thus the cytoplasm boundary. It is a bit surprising for the other segmentations. Additionally, eccentrically located nuclei can be a characteristic of breast cancers. However, the difference in RCC8 relations between benign and malignant imagery, as shown in FIG. 66A-F, is not striking. FIG. 66A-F show histograms of RCC8 relations between histologic entities, benign and malignant. Note that the stroma histograms in FIGS. 66D and 66E are plotted on a different scale for the y-axis The DC relation is more common for the segmentation methods that tend to undersegment, namely CC and WSH-min. The few TPPI and NTPPI relations are due to either errors in the nuclear segmentation, since the GT segmentation does not display such relations, or due to configurations of clumped nuclei that contain cytoplasm and/or stroma inside.

For the RCC8 relationships between cells (nuclei and cytoplasm) and stroma, the relationship is determined for each pair of connected component regions of both cells and stroma. Thus, it is expected that the predominant relationship will be DC; in this case, we are more interested in the possible relationships other than DC. As a result, the y-axis of the cell plots in FIGS. 65C and 66E-F are plotted in the range [0, 0.03] rather than [0, 0.70] as for the other histograms. Besides the predominant DC relationship, there is a tendency towards NTPP and NTPPI relationships, as well as a few of the remaining relations EC, PO, TPP, and TPPI. There may be more of a tendency towards NTPP rather than NTPPI in malignant imagery (refer to FIG. 66A-F), but it is difficult to make any strong argument for the reasons behind this.

6.4 Use of Higher-Level Objects for Classification

The previous section addressed the use of object- and spatial-level features for nuclei, cytoplasm, and stroma for classification of histopathology images as malignant or benign. Here we consider the use of features extracted from higher-level objects for classification.

6.4.1 Use of Feature Graphs

Histo- and cyto-pathology imagery may be addressed in a hierarchical fashion. As an example, one could envision a high-level object "tissue region" with object- and architectural-level attributes. This "tissue region" would own several "cells" with their own attributes, which in turn own "nucleus" and "cytoplasm" similarly with attributes. This hierarchy of features embodies the classification and segmentation process and possibly the thought process of the user. Example cartoon cytology images are shown in FIGS. 67A-B, and an example hierarchical representation for these images in FIG. 68. Note that both FIG. 67A and 67B) share the same basic hierarchical structure since they both consist of the same basic objects in a similar configuration. The differences between these two images would be characterized in the features defined at each node of the hierarchy graph.

In light of the hierarchical structure of FIG. 68, one embodiment would use of the various object-level features in a graphical framework rather than the standard linear feature vector framework. The use of such "feature graphs" may lend a superior representation to the imagery and yield better classification results.

6.4.2 Higher-Level Objects

In this implementation of higher-level objects and the associated features, we create feature vectors consisting of features extracted from the high-level object and all other objects that constitute the high-level object. We extract all the size and shape features as described in Section 5.3.1; these high-level object features are also summarized in Table 39. We do not compute, however, the center of mass or reflection symmetry features that are computed from anything but the binary mask image. When the various statistics are included, this results in 84 features for each high-level object when skewness and kurtosis are included, and 76 without.

We consider two more levels of objects in this section: cells, and cell clusters.

1. Cells are defined as the agglomeration of nuclei and cytoplasm/stroma ($\text{Cell}_{(N,CS)}$) or nuclei and cytoplasm ($\text{Cell}_{(N,C)}$). The features associated with cell objects includes all the features associated with both constituents (N and CS or N and C), the RCC8 relation between the two, and the size and shape features of Table 39 extracted from the union of the two regions.

2. Cell clusters are defined as the connected components of cell objects, much as was done for the computation of RCC8 relations for stroma versus nuclei and cytoplasm in the previous section. Cell clusters consist of either connected components of Cluster(N,CS) or Cluster(N,C) objects, with all features from the constituent objects and the addition of size and shape features of the cell clusters.

6.4.3 Results

Object-level classification performances using the grafting method of feature selection (refer to Section 5.6.1) are shown in Table 40 for regularization parameter $\lambda_1=0.05$ and Table 413 for $\lambda_1=0.01$. Table 40 shows High-level object feature subset performance, with regularization parameter $\lambda_1=0.05$. In the table, "Cell(N,CS)" designates cell objects consisting of nuclei and cytoplasm/stroma, "Cell(N,C)" cell objects of nuclei and cytoplasm, "Cluster(N,CS)" cell cluster objects of nuclei and cytoplasm/stroma, and "Cluster(N,C)" cell objects of nuclei and cytoplasm. Bold entries correspond to the best performance across all the feature subsets for each segmentation type. For reference, the IS and OS performances (percentage of histologic objects correctly classified) for a regularization parameter $\lambda_1$ of 0.05 from Section 5 are included here. Table 41 shows High-level object feature subset performance, with regularization parameter $\lambda_1=0.01$. In the table, "Cell(N,CS)" designates cell objects consisting of nuclei and cytoplasm/stroma, "Cell(N,C)" cell objects of nuclei and cytoplasm, "Cluster(N,CS)" cell cluster objects of nuclei and cytoplasm/stroma, and "Cluster(N,C)" cell objects of nuclei and cytoplasm. Bold entries correspond to the best performance across all the feature subsets for each segmentation type. For reference, the results from Table 28 from Section 5 are included here. The addition of higher-level object features almost always improves the IS performance for all the segmentation types considered here; the OS performance, however, tends to suffer. Even while some of the higher-level feature subsets give a better performance for certain OS segmentations, the highest performance when all segmentations are considered are still for the object-level feature subsets of Section 5.

Image-level OS classification performances for the higher-level object subsets are shown via ROC curves and AUC measures in FIG. 69A-D; AUC measures are also summarized in Table 42. More specifically, Table 42 shows AUC for OS image-level classification for high-level objects for grafting with $\lambda_1=0.01$. In the table, "Cell(N,CS)" designates cell objects consisting of nuclei and cytoplasm/stroma, "Cell(N, C)" cell objects of nuclei and cytoplasm, "Cluster(N,CS)" cell cluster objects of nuclei and cytoplasm/stroma, and "Cluster(N,C)" cell objects of nuclei and cytoplasm. Bold entries correspond to the best performance across all the feature subsets for each segmentation type. For reference, the results from Table 35 from Section 5 are included here. From these results it is apparent that many of these higher-level object subsets are improving the image-level classification for the GT segmentation, but cannot exceed the image-level performance for any of the realistic segmentations. Again, similar to the object-level performance results, while the higher-level object features improve the image-level classification performance of certain segmentations, they still do not exceed the lower-level object performance for image classification.

From these results it appears that the use of higher-level image objects can improve classification performance, but that these higher-level features may be dependent on an accurate underlying lower-level object segmentation.

6.4.4 Higher-Level Object Feature Subsets

Table 43 presents various statistics of the $Cell_{NC}$ feature subset for GT and WSHmin, namely the percentage of OD and non-OD features; R, G, B, I/Hue, and binary features; texture, radiometric and densitometric, and size/shape features; and nuclei, non-nuclei, and cell features. The presentation of GT and WSHmin is motivated by the increased OS performance with the higher-level object features for these segmentations (refer to Table 41).

These feature subsets display less preference for OD features than the subsets described in Section 5, most likely due to the more prominent role of the size/shape features of the higher-level $Cell_{NC}$ object. This also explains the higher usage of binary features with respect to the other image bands. Interestingly, the preference for cytoplasm over nuclei features is diminished when the $Cell_{NC}$ features are included, even while the percentage of $Cell_{NC}$ features is rather small.

6.5 Introduction to Probabilistic Graph Models (PGMs)

Using the features that have been extracted for all the various objects illustrated in FIG. 68, a probabilistic model of the histopathology imagery can be developed; we call this representation a Probabilistic Graph Model (PGM).

6.5.1 Creation of a PGM

A PGM can be derived in a fairly straight-forward fashion from a feature hierarchy such as the one shown in FIG. 68. In such a derivation, multiple instantiations of objects within the feature hierarchy define a probability distribution of features. An example PGM derived from the feature hierarchy shown in FIG. 68 is shown in FIG. 7. Note that this derived PGM has a similar structure to the feature hierarchy, but the feature values have instead been replaced with a probability distribution of feature values. Another way to view the difference is to think of the feature hierarchy as a representation of a specific image, whereas the derived PGM is a general description of imagery belonging to a certain category (e.g., benign or malignant). This sort of analysis, taking multiple instantiations of objects in a model and formulating a class-based model, appears to be novel.

Thus, while the features of the various image objects are actually implemented and classified in a feature vector form, we are visualizing the features and their abstract relation to each other in a graphical model.

6.5.1 Further Uses of the PGMs

The representation of histopathology imagery in a probabilistic graph model may be used for generation of synthetic imagery with different feature distributions. These synthesized images may be analyzed by the expert to gain insight into the continuum of conditions between truly benign and frankly malignant (e.g., generate the image in FIG. 67B by modifying feature distributions of FIG. 67A)

For image synthesis purposes, however, a method may be specified for the agglomeration of the lower-level objects. Unfortunately, the higher-level features had limited for image classification. As such, we could create a PGM for creation of cell objects, including a nucleus, cytoplasm or cytoplasm/stroma, and the RCC8 relation between the two. This may be useful in synthesis of cytology images, for example.

6.6 Summary

In this section we have applied the size and shape features from Section 5 to higher-level objects, namely "cells" and "cell clusters." These higher-level features display a potential for increasing both object- and image-level classification performance, but seem to be dependent on an accurate underlying lower-level object segmentation. Additionally, we have discussed the plausibility of using a "feature graph" representation for the various features. Lastly, we have introduced an image representation method in the form of probabilistic graph models

6.7 Additional Considerations

With better lower-level object segmentations, the use of higher-level objects may provide considerable utility for other image analysis tasks, such as image representation by a probabilistic graph model. As such, the characteristics of lower-level agglomeration to form higher-level objects may be expanded. Voting over a region by different level objects could provide another means of image classification.

The synthesis of an image, provided a probabilistic graph model, may also be advantageously applied. Particularly for this application in histo- and cyto-pathology imagery, this would allow for very important insights into the characteristics of cancerous and non-cancerous tissue. More importantly, this could allow for the exploration of the continuum between benign and malignant conditions (the atypias) and the characteristics that may indicate a malignancy potential.

7. SUMMARY AND CONCLUSIONS

7.1 Summary of Advancements

7.1.1 Multispectral Analysis of Pixel-Level Nuclear Classification

The generated datasets are unique in histo- and cyto-pathology in that they are imaged multispectrally (usually with 29 bands covering the visible spectrum from 420 nm to 700 nm, though capability exists for other bands).

7.1.2 Pixel-Level Classification of Cytoplasm and Stroma

While the characteristics of cell nuclei are well established as useful for diagnostic purposes, it is expected that the characteristics of cytoplasm and stroma will be similarly useful. The development and analysis of a classifier for cytoplasm and stroma were documented. The best overall average performance was found to be approximately 0.86. In general, the malignant images are more difficult to properly classify into cytoplasm and stroma (0.82 malignant versus 0.87 benign IS and 0.77 versus 0.82 OS). This may indicate that it is less important to accurately distinguish the two classes as it is to characterize the features of the combined cytoplasm-stroma class as a whole.

7.1.3 Segmentation of Nuclei, Cytoplasm, and Stroma

An object-level segmentation metric applicable to our nuclear segmentations, as well as other application areas, was shown. Several common segmentation methods were compared using the new metric. A new object-level metric for segmentation evaluation was detailed and its correspondence to qualitative observations of general segmentation characteristics was shown. This metric was used to compare several methods for delineation of cell nuclei, and to illustrate the dependence of this higher-level segmentation on the accuracy of the underlying pixel-level classification. We have shown this segmentation metric and its constituent terms to correspond well with the qualitative observations of segmentation accuracy, including the general tendency of an algorithm to over- or under-segment an image. This metric also allows for a direct quantitative comparison between the outputs of different segmentation algorithms. While the metric defines a single performance, we have shown the usefulness of observing the performance of the individual metric terms.

We also detailed a new method for specification of ground truth for this object-level segmentation problem. This involves not only the delineation of cell nuclei within an approximate truth window, but also the marking of non-delineated objects within the truth window. This allows us to focus our segmentation evaluation on only those objects that were delineated by the user.

7.1.4 Feature Extraction and Selection

Various object-level and spatial-relation features extracted from our various image objects were detailed, with results on the feature selection and classification performance using various categories of features. Use of spatial arrangement features and non-nuclear features, namely cytoplasm and stroma features, were detailed.

Feature subsets for several classification tasks were developed, and the use of and analysis of performance for imperfectly segmented objects in a feature extraction, selection, and classification framework were detailed.

A comprehensive list of object-level features were detailed and the use of these features on various histologic objects was demonstrated. It was found that that these object-level features are versatile and general enough to elicit important information from even imperfectly segmented objects. The use of non-nuclear features was documented, namely features of cytoplasm and stroma, as well as their good classification performance, often exceeding that of nuclei. Using object-level features and the grafting method of feature selection, we have shown object-level classification accuracies above 0.70 for OS object-level classification, and an AUC above 0.90 for OS image-level classification. Lastly, various feature sub-sets as determined by the grafting algorithm were detailed. A strong preference for the optical density-related features was found, and it was noted that texture features are important for classification of all histologic classes considered here. Additionally, for the combined object-level feature subsets, there is a stronger reliance on the non-nuclear features, reflecting the surprisingly better performance of the non-nuclear features when considered alone.

7.1.5 Higher-Level Objects

We use the Qualitative Spatial Reasoning (QSR) formulation Region Connection Calculus (RCC) as a means to segment, i.e., agglomerate higher-level image objects. In Section 6 we use these higher-level image objects for classification as well as the construction of a probabilistic image representation.

We applied the size and shape features from Section 5 to higher-level objects, namely "cells" and "cell clusters." These higher-level features display a potential to increase both object- and image-level classification performance, but seem to accurate underlying lower-level object segmentation. Lastly, we introduced an image representation method in the form of probabilistic graph models and indicated possible further uses for such an image representation.

7.2 Conclusion

An approach for such quantitative analysis, Quantitative Object- and spatial Arrangement-Level Analysis (QOALA), using expert (pathologist) input to guide the classification process has been detailed. QOALA has yielded some very good object- and image-level classification performances.

The incorporation of cytoplasm and stroma features allows for better classification of objects and imagery than solely nuclear features. Thus, there is significant utility in using a comprehensive list of features from a wide variety of objects in the imagery. The results at the end of Section 5 describe the first of the object-level results using cell nuclei, cytoplasm, and stroma (connective tissue). This shows the use of first-level objects.

The use of higher-level objects also demonstrated significant utility, namely that the incorporation of these higher-level objects (e.g., the agglomeration of cell nuclei and cytoplasm into a "cell" object) yields better classification performance, especially when considered on the image level. Thus, the use of higher-level objects and features associated with them (similar to how it is believed that the human brain parses imagery) provides additional discriminatory information for classification.

The methods and system of the present invention may be applied in any situation in which a higher-level analysis of imagery (i.e. image understanding) is desired. Particularly for the histo/cytopathology applications, this could be used as a computer-aided diagnosis system to either enhance the pathologist diagnosis, or work as a second-tier diagnostic system similar to those used (and mandated by the FDA) for secondary diagnosis of cervical Pap-smears.

The methods and system of the present invention may also be applied in other domains, e.g., remote sensing, because the framework itself is not domain specific. Thus, it may be applicable to any image analysis application whereby the end users are interested in image objects, the classification of those objects, and the features associated with them.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

REFERENCES

The following are a list of references used in the description above:
[1] "Probability of breast cancer in American women." http://www.cancer.gov/cancertopics/breast.
[2] R. M. DeMay, The Art and Science of Cytopathology: Exfoliative Cytology/Aspiration Cytology. American Society for Clinical Pathology, 1996.
[3] "Breast cancer facts & figures 2005-2006." American Cancer Society, Inc.
[4] A. M. Hanby, "The pathology of breast cancer and the role of the histopathology laboratory," Clinical Oncology, vol. 17, pp. 234-239, 2005.
[5] G. D. Leonard and S. M. Swain, "Ductal carcinoma in situ, complexities . . . and challenges," Journal of the National Cancer Institute, vol. 96, p. . . . 906-920, June 2004.
[6] G. Viale, "Histopathology of primary breast cancer 2005," Breast, vol. 14, pp. 487-492, 2005.
[7] U. Veronesi, P. Boyle, A. Goldhirsch, R. Orecchia, and G. Viale, "Breast cancer," Lancet, vol. 365, pp. 1727-1741, May 2005.
[8] A. Neher, G. Öfner, E. Appenroth, and A. Gschwendtner, "High-resolution image cytometry on smears of normal oral mucosa: A possible approach . . . for the early detection of laryngopharyngeal cancers," Head & Neck, vol. 26, pp. 694-700, 2004.
[9] D. J. Zahniser, L. M. Isenstein, and M. L. Hutchinson, "Computerized contextual analysis in diagnosis," Cancer Letters, vol. 77, pp. 139-144, 1994.
[10] T. Mairinger, G. Mikuz, and A. Gschwendter, "Nuclear chromatin texture analysis of nonmalignant tissue can detect adjacent prostatic adenocarcinoma," Prostate, vol. 41, pp. 12-19, 1999.
[11] "On-line medical dictionary." http://cancerweb.ncl.ac.uk/omd. Published by the Centre for Cancer Education at the Department of Medical Oncology, University of Newcastle upon Tyne, UK.
[12] Personal communication with Dr. David Rimm, Department of Pathology, Yale University, Jan. 11, 2006.
[13] "Varispec brochure." http://www.cri-inc.com/file/VariSpec-Brochure.pdf.
[14] M. H. Ross, G. I. Kaye, and W. Pawlina, Histology: A Text and Atlas With Cell and Molecular Biology. Lippincott Williams & Wilkins, 4th ed., 2003.
[15] F. Schnorrenberg, C. S. Pattichis, K. C. Kyriacou, and C. N. Schizas, "Computer-aided detection of breast cancer nuclei," IEEE Transactions on Information Technology B, vol. 1, pp. 128-140, June 1997.
[16] A. Hoque, S. M. Lippman, I. V. Boiko, E. N. Atkinson, N. Sneige, M. D. Lagios, R. Schwarting, W. J. Colburn, K. Dhingra, M. Follen, G. J. Kelloff, C. W. Boone, and W. N. Hittelman, "Quantitative nuclear morphometry by image analysis for prediction of recurrence of ductal carcinoma in situ of the breast," Cancer Epidemiology, Biomarkers, & Prevention, vol. 10, pp. 249-259, March 2001.
[17] L. Latson, B. Sebek, and K. Powell, "Automated cell nuclear segmentation in color images of hematoxylin and eosin-stained breast biopsy," Analytical and Quantitative Cytology and Histology, vol. 25, pp. 321-331, December 2003.
[18] B. Weyn, G. van de Wouwer, A. van Daele, P. Scheunders, D. van Dyck, E. van Marck, and W. Jacob, "Automated breast tumor diagnosis and grading based on wavelet chromatin texture description," Cytometry, vol. 33, pp. 32-40, 1998.
[19] N. H. Anderson, P. W. Hamilton, P. Bartels, D. Thompson, R. Montironi, and J. M. Sloan, "Computerized scene segmentation for the discrimination of architectural features ductal proliferative lesions of the breast," Journal of Pathology, vol. 181, pp. 374-380, 1997.
[20] B. Weyn, G. van de Wouwer, M. Koprowski, A. van Daele, K. Dhaene, P. Scheunders, W. Jacob, E. vanMarck, "Value of morphometry, texture analysis, densitometry, and histometry in differential diagnosis and prognosis of malignant mesothelioma," Journal of Pathology, vol. 189, pp. 581-589, 1999.
[21] W. B. Spillman, J. L. Robertson, W. R. Huckle, B. S. Govindan, and K. E. Meissner, "Complexity, fractals, disease time, and cancer," Physics Review E, vol. 70, pp. 1-12, 2004.
[22] B. Weyn, W. A. A. Tjalma, P. Vermeylen, A. van Daele, E. van Marck, and W. Jacob, "Determination of tumour prognosis based angiogenesis-related vascular patterns measured by fractal and syntactic structure analysis," Clinical Oncology, vol. 16, pp. 307-316, 2004.
[23] R. Montironi, W. F. Whimster, Y. Collan, P. W. Hamilton, D. Thompson, and P. H. Bartels, "How to develop and use a Bayesian Belief Network," Journal of Clinical Pathology, vol. 49, pp. 194-201, 1996.
[24] M. L. Morrison, W. G. McCluggage, G. J. Price, J. Diamond, M. R. M. Sheeran, K. M. Mulholland, M. Y. Walsh, R. Montironi, P. H. Bartels, D. Thompson, and P. W. Hamilton, "Expert system support using a Bayesian belief network for the classification of endometrial hyperplasia," Journal of Pathology, vol. 197, pp. 403-414, 2002.

[25] J. W. Hoppin, M. A. Kupinski, G. A. Kastis, E. Clarkson, H. H. Barrett, "Objective comparison of quantitative imaging modalities without the use of a gold standard," IEEE Transactions on Medical Imaging, vol. 21, pp. 441-449, May 2002.

[26] V. Sharifi-Salmation, B. Pesquet-Popescu, J. Simony-Lafontaine, J. P. Rigaut, "Index for spatial heterogeneity in breast cancer," Journal of Microscopy-Oxford, vol. 216, pp. 110-122, November 2004.

[27] T. Zhao, E. S. Wachman, D. L. Farkas, "A novel scheme for abnormal cell detection in Pap smear images," in Proc. SPIE, vol. 5318, pp. 151-162, 2004.

[28] "Infrared spectroscopy from Wikipedia, the free encyclopedia." http://en.wikipedia.org/wiki/Infrared_spectroscopy.

[29] D. C. Fernandez, R. Bhargava, S. M. Hewitt, and I. W. Levin, "Infrared spectroscopic imaging for histopathologic recognition," Nature Biotechnology, vol. 23, pp. 469-474, April 2005.

[30] R. A. Shaw, J. R. Mansfield, S. Rempel, S. Low-Ying, V. V. Kupriyanov, and H. H. Mantsch, "Analysis of biomedical spectra and images: From data to diagnosis," Journal of Molecular Structure, vol. 500, pp. 129-138, 2000.

[31] G. Lin, M. K. Chawla, K. Olson, J. F. Guzowski, C. A. Barnes, and B. Roysam, "Hierarchical, model-based merging of multiple fragments for improved three-dimensional segmentation of nuclei," Cytometry Part A, vol. 63A, pp. 20-33, 2005.

[32] C. Wählby, I.- M. Sintorn, F. Erlandsson, G. Borgefors, E. Bengtsson, "Combining intensity, edge and shape information for 2D and 3D segmentation of cell nuclei in tissue sections," Journal of Microscopy, vol. 215, pp. 67-76, July 2004.

[33] B. L. Luck, K. D. Carlson, A. C. Bovik, and R. R. Richards-Kortum, "An image model/segmentation algorithm for reflectance confocal images of in vivo cervical tissue," IEEE Transactions on Image Processing, vol. 14, pp. 1265-1276, September 2005.

[34] F. Ciocchetta, R. Dell'Anna, F. Demichelis, A. Sboner, A. P. Dhillon, A. Dhillon, A. Godfrey, and A. Quaglia, "Knowledge discovery in support of early diagnosis of hepatocellular carcinoma," in Proc. Int Joint Conf on Neural Networks, vol. 1, pp. 177-181, July 2003.

[35] C. Demir, S. H. Gultekin, and B. Yener, "Augmented cell-graphs for automated cancer diagnosis," Bioinformatics, vol. 21, no. Suppl. 2, pp. ii7-ii12, 2005.

[36] C. Gunduz, B. Yener, and S. H. Gultekin, "The cell graphs of cancer," Bioinformatics, vol. 20, no. Suppl. 1, pp. i145-i151, 2004.

[37] M. Sammouda, R. Sammouda, N. Niki, N. Yamaguchi, and N. Moriyama, "Cancerous nuclei detection on digitized pathological lung color images," Journal of Biomedical Informatics, vol. 35, pp. 92-98, 2005.

[38] M. A. Roula, A. Bouridane, F. Kurugollu, and A. Amira, "A quadratic classifier based on multispectral texture features for prostate cancer diagnosis," in Proc. Int Symp on Signal Processing and Its Applications, vol. 2, pp. 37-40, July 2003.

[39] C. Angeletti, N. R. Harvey, V. Khomitch, A. H. Fischer, R. M. Levenson, and D. L. Rimm, "Detection of malignancy in cytology specimens using spectral-spatial analysis," Laboratory Investigation, vol. 85, pp. 1555-1564, 2005.

[40] M. A. Brewer, J. Ranger-Moore, M. Greene, D. S. Alberts, Y. Liu, H. G. Bartels, A. C. Baruch, and P. H. Bartels, "Preneoplastic changes in ovarian tissues," Analytical and Quantitative Cytology and Histology, vol. 26, pp. 207-216, August 2004.

[41] B. Weyn, G. vandeWouwer, S. Kumar-Singh, A. vDaele, P. Scheunders, E. van Marck, and W. Jacob, "Computer-assisted differential diagnosis of malignant mesothelioma based on syntactic structure analysis," Cytometry, vol. 35, pp. 23-29, 1999.

[42] L. Ballerini, L. Franzén, "Classification of microscopic images of breast tissue," in Proc. SPIE, vol. 5370, pp. 960-971, 2004.

[43] N. R. Harvey, R. M. Levenson, D. L. Rimm, "Investigation of automated feature extraction techniques for applications in cancer detection from multispectral histopathology images," in Proc. SPIE, vol. 5032, pp. 557-566, 2003.

[44] K.- M. Lee and W. N. Street, "An adaptive resource-allocating network for automated detection, segmentation, and classification of breast cancer nuclei topic area: Image processing and recognition," IEEE Transactions on Neural Networks, vol. 14, pp. 680-687, May 2003.

[45] G. van de Wouwer, B. Weyn, P. Scheunders, W. Jacob, E. van Marck, D. van Dyck, "Wavelets as chromatin texture descriptors for the automated identification of neoplastic nuclei," Journal of Microscopy, vol. 197, pp. 25-35, January 2000.

[46] C. Herrera-Espineira, C. Marcos-Munoz, J. Esquivias, "Automated segmentation of cell nuclei in fine needle aspirates of the breast," Analytical Quantitative Cytology and Histology, vol. 20, pp. 29-35, February 1998.

[47] D. Thompson, P. H. Bartels, H. G. Bartels, and R. Montironi, "Image segmentation of cribriform gland tissue," Analytical and Quantitative Cytology and Histology, vol. 17, pp. 314-322, October 1995.

[48] L. Jia and L. Kitchen, "Object-based image similarity computation using inductive learning of contour-segment relations," IEEE Transactions on Image Processing, vol. 9, pp. 80-87, January 2000.

[49] L. Jia and L. Kitchen, "Object-based image content characterisation for semantic-level image similarity calculation," Pattern Analysis Applications, vol. 4, pp. 215-226, 2001.

[50] Y. Xu, P. Duygulu, E. Saber, A. M. Tekalp, and F. T. Yarman-Vural, "Object based image retrieval based on multi-level segmentation," Proc. IEEE Int Conf on Acoustics, Speech, Signal Processing, vol. 6, p. 2019-2022, 2000.

[51] S. Newsam, S. Bhagavathy, C. Kenney, and B. S. Manjunath, "Object-based representations of spatial images," Acta Astronautica, vol. 48, no. 5-12, pp. 567-577, 2001.

[52] G. G. Hazel, "Object-level processing of spectral imagery for detection of targets and changes using spatial-spectral-temporal techniques," in Proc. SPIE, vol. 4381, pp. 380-390, 2001.

[53] B. Ko, H. Byun, "Integrated region-based image retrieval using region's spatial relationships," in Proc. ICPR, vol. 1, pp. 196-199, 2002.

[54] F. L. Ber and A. Napoli, "Object-based representation and classification of spatial structures and relations," in Proc. IEEE Int Conf on Tools with Artificial Intelligence, pp. 268-275, 2002.

[55] U. Braga-Neto, J. Goutsias, "Object-based image analysis using multi-scale connectivity," IEEE Transactions on Pattern Analysis and Machine Intelligence, vol. 27, pp. 892-907, June 2005.

[56] G. Cong and B. Parvin, "Model-based segmentation of nuclei," Pattern Recognition, vol. 33, pp. 1383-1393, 2000.

[57] T. McInerney and D. Terzopoulos, "Deformable models in medical image analysis: A survey," Medical Image Analysis, vol. 1, no. 2, pp. 91-108, 1996.

[58] S. Schüpp, A. Elmoataz, J. Fadili, P. Herlin, D. Bloyet, "Image segmentation via multiple active contour models and fuzzy clustering with biomedical applications," in Proc. ICPR, vol. 1, pp. 622-625, 2000.

[59] H.- S. Wu, J. Barba, and J. Gil, "A parametric fitting algorithm for segmentation of cell images," IEEE Transactions on Biomedical Engineering, vol. 45, pp. 400-407, March 1998.

[60] N. Malpica, C. Ortiz de Sol orzano, J. J. Vaquero, A. Santos, I. Vallcorba, J. M. García-Sagredo, and F. del Pozo, "Applying watershed algorithms to the segmentation of clustered nuclei," Cytometry, vol. 28, pp. 289-297, 1997.

[61] D. L. Pham, C. Xu, and J. L. Prince, "Current methods in medical image segmentation," Annual Review of Biomedical Engineering, vol. 2, pp. 315-337, 2000.

[62] D. Hoiem, R. Sukthankar, H. Schneiderman, L. Huston, "Object-based image retrieval using the statistical structure of images," in Proc. CVPR, vol. 2, pp. 490-497, 2004.

[63] N. Oswald and P. Levi, "Cooperative object recognition," Pattern Recogn Letters, vol. 22, pp. 1273-1282, 2001.

[64] H. Wersing and E. Körner, "Learning optimized features for hierarchical models of invariant object recognition," Neural Computation, vol. 15, pp. 1559-1588, 2003.

[65] R. Kamalov, M. Guillaud, D. Haskins, A. Harrison, R. Kemp, D. Chiu, M. Follen, and C. MacAulay, "A Java application for tissue section image analysis," Computer Methods and Programs in Biomedicine, vol. 77, p. 99-113, 2005.

[66] "Definiens Cellenger-automated multivariate image analysis cell-based assays." http://www.definiens.com/products/cellenger.php.

[67] "Enterprise products-Definiens eCognition server." http://www.definiens.com/products/ecognition_server.php.

[68] P. Biberthaler, M. Athelogou, S. Langer, R. Leiderer, and K. Messmer, "Evaluation of murine liver transmission electron micrographs by an innovative object-based quantitative image analysis system (Cellenger r)," European Journal of Medical Research, vol. 8, pp. 275-282, July 2003.

[69] "Comparison of automated and manual methods for counting cells in cell proliferation studies." http://www-.definiens.com/pdf/documents/PublicationsLIFE/Persohn_Baatz%202004.pdf.

[70] R. Levenson, P. J. Cronin, and K. K. Pankratov, "Spectral imaging for brightfield microscopy," in Proc. SPIE, vol. 4959, pp. 27-33, 2003.

[71] R. Jaganath, C. Angeletti, R. Levenson, D. L. Rimm, "Diagnostic classification of urothelial cells in urine cytology specimens using exclusively spectral information," Cancer Cytopathology, vol. 102, pp. 186-191, June 2004.

[72] S. M. Gentry R. Levenson, "Biomedical applications of the information-efficient spectral imaging sensor (ISIS)," in Proc. SPIE, vol. 3603, pp. 129-142, 1999.

[73] R. M. Levenson, E. S. Wachman, W. Niu, and D. L. Farkas, "Spectral imaging in biomedicine: A selective overview," in Proc. SPIE, vol. 3438, pp. 300-312, 1998.

[74] L. E. Boucheron, N. R. Harvey, and B. S. Manjunath, "Utility of multispectral imaging for analysis of routine clinical histopathology imagery," in Presented at the 2006 Workshop on Multiscale Biological Imaging, Data Mining, & Informatics, (Santa Barbara, Calif.), September 2006.

[75] L. E. Boucheron, Z. Bi, N. R. Harvey, and B. S. Manjunath, "Utility of multispectral imaging for nuclear classification of routine clinical histopathology imagery," BMC Cell Biology, vol. 8(Suppl 1):S8, 10 Jul. 2007. http://www.biomedcentral.com/1471-2121/8/S1/S8.

[76] R. M. Levenson, "Spectral imaging pathology: seeing more," Laboratory Medicine, vol. 35, pp. 244-251, April 2004.

[77] I. Barshak, J. Kopolovic, and C. Rothmann, "Spectral morphometric characterization of breast carcinoma cells," British Journal of Cancer, vol. 79, no. 9/10, pp. 1613-1619, 1999.

[78] L. Zeng and Q. Wu, "Fast segmentation of cervical cells by using spectral imaging analysis techniques," in Lecture Notes in Computer Science, vol. 4222, pp. 734-741, 2006.

[79] R. C. Gonzalez R. E. Woods, Digital Image Processing. Prentice-Hall, 2nd ed., 2002.

[80] A. C. Ruifrok, R. L. Katz, and D. A. Johnston, "Comparison of quantification of histochemical staining by Hue-Saturation-Intensity (HSI) transformation and color-deconvolution," Applied Immunohistochemistry and Molecular Morphology, vol. 11, no. 1, pp. 85-91, 2003.

[81] H. Stark J. W. Woods, Probability and Random Processes with Applications to Signal Processing. Prentice Hall, 3rd ed., 2002.

[82] C. M. Bishop, Neural Networks for Pattern Recognition. Oxford University Press, 1995.

[83] N. R. Harvey, J. Theiler, S. P. Brumby, S. Perkins, J. J. Szymanski, J. J. Bloch, R. B. Porter, M. Galassi, and A. C. Young, "Comparison of GENIE and conventional supervised classifiers for multispectral image feature extraction," IEEE Transactions on Geoscience and Remote Sensing, vol. 40, pp. 393-404, 2002.

[84] S. Theodoridis and K. Koutroumbas, Pattern Recognition. Elsevier Academic Press, 2nd ed., 2003.

[85] "Svm-light support vector machine." http://svmlight.joachims.org/.

[86] "Wilcoxon signed-rank test, from Wikipedia, the free encyclopedia." http://en.wikipedia.org/wiki/Wilcoxon_signed_rank_test.

[87] "Bonferroni correction, from Wikipedia, the free encyclopedia." http://en.wikipedia.org/wiki/Bonferroni.

[88] "Principal components analysis, from Wikipedia, the free encyclopedia." http://en.wikipedia.org/wiki/Principal_components_analysis.

[89] "Independent component analysis, Wikipedia, the free encyclopedia." http://en.wikipedia.org/wiki/Independent_components_analysis.

[90] A. J. Sims, M. K. Bennett, and A. Murray, "Image analysis can be used to detect spatial changes in histopathology of pancreatic tumours," Physics in Medicine and Biology, vol. 48, pp. N183-N191, 2003.

[91] A. J. Sims, M. K. Bennett, A. Murray, "Comparison on semi-automated image analysis and manual methods for tissue quantification in pacreatic carcinoma," Physics in Medicine and Biology, vol. 47, p. 1255-1266, 2002.

[92] R. M. Levenson D. L. Farkas, "Digital spectral imaging for histopathology and cytopathology," in Proc. SPIE, vol. 2983, pp. 123-135, 1997.

[93] Personal communication with Dr. David Rimm, Department of Pathology, Yale University, Apr. 19, 2007.

[94] K. Masood, N. Rajpoot, H. Qureshi, and K. Rajpoot, "Co-occurrence and morphological analysis for colon tissue biopsy classification," in Proc. 4th Int Workshop on Frontiers of Information Technology (FIT'06), 2006.

[95] M. Teverovskiy, V. Kumar, J. Ma, A. Kotsianti, D. Verbel, A. Tabesh, H.-Y. Pang, Y. Vengrenyuk, S. Fogarasi, and O.

Saidi, "Improved prediction of prostate cancer recurrence based on automated tissue image analysis system," in Proc. ISBI, pp. 257-260, 2004.

[96] A. Tabesh, M. Teverovskiy, H.-Y. Pang, V. P. Kumar, D. Verbel, A. Kotsianti, and O. Saidi, "Multi-feature prostate cancer diagnosis and gleason grading of histological images," To appear: IEEE Transactions on Medical Imaging, 2007.

[97] "K-means algorithm, from Wikipedia, the free encyclopedia." http://en.wikipedia.org/wiki/Kmeans.

[98] J. G. Daugman, "Complete discrete 2-D Gabor transforms by neural networks for image analysis and compression," IEEE Transactions on Acoustics, Speech, and Signal Processing, vol. 36, pp. 1169-1179, July 1988.

[99] J. Daugman, "Two-dimensional spectral analysis of cortical receptive field profiles," Vision Research, vol. 20, pp. 847-856, 1980.

[100] B. S. Manjunath W. Y. Ma, "Texture features for browsing and retrieval of image data," IEEE Transactions on Pattern Analysis and Machine Intelligence, vol. 18, pp. 837-842, August 1996.

[101] P. Wu, B. S. Manjunath, S. Newsam, H. D. Shin, "A texture descriptor for browsing and similarity retrieval," Signal Processing-Image Communication, vol. 16, pp. 33-43, 2000.

[102] A. Whitney, "A direct method of nonparametric measurement selection," IEEE Transactions on Computers, vol. 20, pp. 1100-1103, 1971.

[103] T. Marill, D. M. Green, "On the effectiveness of receptors in recognition systems," IEEE Transactions on Information Theory, vol. 9, pp. 11-17, 1963.

[104] P. Pudil, J. Novovi cová, J. Kittler, "Floating search methods in feature selection," Pattern Recognition Letters, vol. 15, pp. 1119-1125, November 1994.

[105] R. E. Shapire, Nonlinear Estimation and Classification, ch. The boosting approach to machine learning: An overview. Springer, 2003.

[106] Y. Freund, R. E. Shapire, "A decision-theoretic generalization of on-line learning and an application to boosting," Journal of Computer and System Sciences, vol. 55, no. 1, pp. 119-139, 1997.

[107] R. E. Shapire and Y. Singer, "Improved boosting algorithms using confidence-rated predictions," Machine Learning, vol. 37, no. 3, pp. 297-336, 1999.

[108] S. Perkins, K. Lacker, and J. Theiler, "Grafting: Fast, incremental feature selection by gradient descent function space," Journal of Machine Learning Research, vol. 3, pp. 1333-1356, 2003.

[109] S. Perkins, J. Theiler, "Online feature selection using grafting," in Proc. ICML, pp. 592-599, 2003.

[110] J. Theiler, K. Glocer, "Sparse linear filters for detection and classification in hyperspectral imagery," in Proc. SPIE, vol. 6233, 2006.

[111] A. Jain and D. Zongker, "Feature selection: Evaluation, application, and small sample performance," IEEE Transactions on Pattern Analysis and Machine Intelligence, vol. 19, pp. 153-158, February 1997.

[112] R. P. W. Duin, P. Juszczak, P. Paclik, E. Pekalska, D. de Ridder, and D. M. J. Tax, "PRTools4: A Matlab toolbox for pattern recognition," tech. rep., Delft University of Technology, 2004. http://www.prtools.org.

[113] J. Gil, H. Wu, and B. Y. Wang, "Image analysis and morphometry in the diagnosis of breast cancer," Microscopy Research and Technique, vol. 59, pp. 109-118, 2002.

[114] T. W. Nattkemper, "Automatic segmentation of digital micrographs: A survey," in Proc. MEDINFO, 2004.

[115] V. Chalana, Y. Kim, "A methodology for evaluation of boundary detection algorithms medical images," IEEE Transactions on Medical Imaging, vol. 16, pp. 642-652, October 1997.

[116] R. Unnikrishnan, C. Pantofaru, and M. Hebert, "A measure for objective evaluation of image segmentation algorithms," Proc. CVPR, 2005.

[117] J. K. Udupa, V. R. LeBlanc, Y. Zhuge, C. Imielinska, H. Schmidt, L. M. Currie, B. E. Hirsch, and J. Woodburn, "A framework for evaluating image segmentation algorithms," Computerized Medical Imaging Graphics, vol. 30, pp. 75-87, 2006.

[118] A. Hoover, G. Jean-Baptiste, X. Jiang, P. Flynn, H. Bunke, D. Goldgof, K. Bowyer, D. W. Eggart, A. Fitzgibbon, and R. B. Fisher, "An experimental comparison of range image segmentation algorithms," IEEE Transactions on Pattern Analysis and Machine Intelligence, vol. 18, pp. 673-689, July 1996.

[119] J. S. Cardoso and L. Corte-Real, "Toward a generic evaluation of image segmentation," IEEE Transactions on Image Processing, vol. 14, pp. 1773-1782, November 2005.

[120] W. A. Yasnoff, J. K. Mui, and J. W. Bacus, "Error measures for scene segmentation," Pattern Recognition, vol. 9, pp. 217-231, 1977.

[121] Y. J. Zhang, "A survey on evaluation methods for image segmentation," Pattern Recognition, vol. 29, no. 8, pp. 1335-1346, 1996.

[122] Y. J. Zhang, J. J. Gerbrands, "Segmentation evaluation using ultimate measurement accuracy," in Proc. SPIE, vol. 1657, pp. 449-460, 1992.

[123] Q. Huang, B. Dom, "Quantitative methods of evaluating image segmentation," in Proc. ICIP, pp. 53-56, 1995.

[124] O. Lezoray, H. Cardot, "Cooperation of color pixel classification schemes and color watershed: A study for microscopic images," IEEE Transactions on Image Processing, vol. 11, pp. 783-789, July 2002.

[125] L. Cohen, P. Vinet, P. T. Sander, A. Gagalowicz, "Hierarchical region based stereo matching," in Proc. CVPR, pp. 416-421, 1989.

[126] A. Fenster, B. Chiu, "Evaluation of segmentation algorithms for medical imaging," in Proc. IEEE Engineering in Medicine and Biology, pp. 7186-7189, September 2005.

[127] M. Everingham, H. Muller, and B. Thomas, "Evaluating image segmentation algorithms using the pareto front," in Lecture Notes in Computer Science, vol. 2353, pp. 34-48, 2002.

[128] D. Glotsos, P. Spyridonos, D. Cavouras, P. Ravazoula, P. Dadioti, and G. Nikiforidis, "Automated segmentation of routinely hematoxylin-eosin-stained microscopic images combining support vector machine clustering and active contour models," Analytical and Quantitative Cytology and Histology, vol. 26, pp. 331-340, December 2006.

[129] G. J. Price, W. G. McCluggage, M. Morrison, G. McClean, L. Venkatraman, J. Diamond, H. Bharucha, R. Montirnoni, P. H. Bartels, D. Thompson, and P. W. Hamilton, "Computerized diagnostic decision support system for classification of preinvasive cervical squamous lesions," Human Pathology, vol. 34, pp. 1193-1203, November 2003.

[130] V. Canzonieri, S. Monfardini, and A. Carbone, "Defining prognostic factors in malignancies through image analysis," European Journal of Cancer, vol. 34, no. 4, pp. 451-458, 1998.

[131] H. Honda, "Geometrical models for cells in tissues," Internatl Review of Cytology, vol. 81, pp. 191-248, 1983.

[132] T. R. Jones, A. Carpenter, P. Golland, "Voronoi-based segmentation of cells on image manifolds," Lecture Notes in Computer Science, vol. 3765, pp. 535-543, 2005.

[133] L. E. Boucheron, N. R. Harvey, and B. S. Manjunath, "A quantitative object-level metric for segmentation performance and its application to cell nuclei," in Proc: International Symposium on Visual Computing, Lecture Notes in Computer Science, vol. 4841, pp. 208-219, November 2007.

[134] D. P. Huttenlocher, G. A. Klanderman, and W. J. Rucklidge, "Comparing images using the Hausdorff distance," IEEE Transactions on Pattern Analysis and Machine Intelligence, vol. 15, pp. 850-863, September 1993.

[135] E. P. Vivek and N. Sudha, "Robust Hausdorff distance measure for face recognition," Pattern Recognition, vol. 40, pp. 431-442, 2007.

[136] E. Yörük, E. Konukoglu, B. Sankur, J. Darbon, "Shape-based hand recognition," IEEE Transactions on Image Processing, vol. 15, pp. 1803-1815, July 2006.

[137] C. R. Giardina, E. R. Dougherty, Morphological Methods in Image Processing. Prentice Hall, 1988.

[138] J. T. Newell and E. R. Dougherty, "Maximum-likelihood morphological granulometric classifiers," in Proc. SPIE, vol. 1657, pp. 386-395, 1992.

[139] J. Byun, M. R. Verardo, B. Sumengen, G. Lewis, B. Manjunath, S. K. Fisher, "Automated tool for nuclei detection in digital microscopic images: Application to retinal images," Molecular Vision, vol. 12, pp. 949-960, August 2006.

[140] S. Kumar, S. H. Ong, S. Ranganath, T. C. Ong, and F. T. Chew, "A rule-based approach for robust clump splitting," Pattern Recognition, vol. 39, pp. 1088-1098, 2006.

[141] T. T. E. Yeo, X. C. Jin, S. H. Ong, Jayasooriah, and R. Sinniah, "Clump splitting through concavity analysis," Pattern Recognition Letters, vol. 15, pp. 1013-1018, 1993.

[142] G. Fernandez, M. Kunt, and J. P. Zyrd, "A new plant image segmentation algorithm," in Lecture Notes in Computer Science, vol. 974, pp. 229-234, 1995.

[143] J. Liang, "Intelligent splitting in the chromosome domain," Pattern Recognition, vol. 22, no. 5, pp. 519-522, 1989.

[144] W. X. Wang, "Binary image segmentation of aggregates based on polygonal approximation and classification of concavities," Pattern Recognition, vol. 31, pp. 1503-1524, 1998.

[145] A. Rosenfeld, "Measuring sizes of concavities," Pattern Recognition Letters, vol. 3, pp. 71-75, 1985.

[146] J. Diamond, N. H. Anderson, D. Thompson, P. H. Bartels, P. W. Hamilton, "A computer-based training system for breast fine needle aspiration cytology," Journal of Pathology, vol. 196, pp. 113-121, 2002.

[147] P. W. Hamilton, N. H. Anderson, J. Diamond, P. H. Bartels, J. B. Gregg, D. Thompson, and R. J. Millar, "An interactive decision support system for breast fine needle aspiration cytology," Analytical Quantitative Cytology and Histology, vol. 18, pp. 185-190, June 1996.

[148] P. W. Hamilton, N. Anderson, P. H. Bartels, and D. Thompson, "Expert system support using Bayesian belief networks in diagnosis of fine needle aspiration biopsy specimens of the breast," Journal of Clinical Pathology, vol. 47, pp. 329-336, 1994.

[149] R. Malka and B. Lerner, "Classification of fluorescence in situ hybridization images using belief networks," Pattern Recognition Letters, vol. 25, pp. 1777-1785, 2004.

[150] R. Nafe, B. Yan, W. Schlote, and B. Schneider, "Application of different methods for nuclear shape analysis with special reference to differentiation of brain tumors," Analytical and Quantitative Cytology and Histology, vol. 28, pp. 69-77, April 2006.

[151] A. Doudkine, C. MacAulay, N. Pouplin, and B. Palcic, "Nuclear texture measurements in image cytometry," Pathologica, v. 87, p. 286-299, 1995.

[152] B. Palcic, C. E. MacAulay, S. A. Harrison, S. Lam, P. W. Payne, D. M. Garner, and A. Doudkine, "System and method for automatically detecting malignant cells having malignancy associated changes," Tech. Rep. U.S. Pat. No. 6,026,174, February 2000.

[153] E. C. M. Mommers, N. Poulin, J. Sangulin, C. J. Meijer, J. P. A. Baak, P. J. van Diest, "Nuclear cytometric changes in breast carcinogenesis," Journal of Pathology, vol. 193, pp. 33-39, 2001.

[154] K. Rodenacker, E. Bengtsson, "A feature set for cytometry on digitized microscopic images," Analytical Cellular Pathology, vol. 25, p. 1-36, 2003.

[155] R. Marcelpoil and Y. Usson, "Methods for the study of cellular sociology: Voronoi diagrams and parametrization of spatial relationships," Journal of Theoretical Biology, vol. 154, pp. 359-369, 1992.

[156] R. Albert, T. Schindewolf, I. Baumann, H. Harms, "Three-dimensional image processing for morphometric analysis epithelium sections," Cytometry, vol. 13, pp. 759-765, 1992.

[157] P. J. van Diest, "Syntactic structure analysis," Pathologica, v. 87, p. 255-262, June 1993.

[158] W. H. Wolberg, W. N. Street, and O. L. Mangasarian, "Machine learning techniques diagnose breast cancer frm image-processed nuclear features of fine needle aspirates," Cancer Letters, vol. 77, pp. 163-171, 1994.

[159] M. Bevk and I. Kononenko, "A statistical approach to texture description of medical images: A preliminary study," in Proc. IEEE Symposium on Computer-Based Medical Systems, pp. 239-244, 2002.

[160] F. Albregtsen, "Statistical texture measures computed from gray level run length matrices," tech. rep., Image Processing Laboratory, Department of Informatics, University of Oslo, November 1995.

[161] B. B. Mandelbrot, The Fractal Geometry of Nature. Freeman Company, 1982.

[162] G. M. Behry, "Simulation of fractal dimension evaluations," International Journal of Modelling and Simulation, vol. 26, no. 2, pp. 91-97, 2006.

[163] P. P. Ohanian, R. C. Dubes, "Performance evaluation for four classes of textural features," Pattern Recognition, vol. 25, no. 8, pp. 819-833, 1992.

[164] J. F. O'Callaghan, "Computing perceptual boundaries of dot patterns," Computer Graphics and Image Processing, vol. 3, pp. 141-162, 1974.

[165] J. F. O'Callaghan, "An alternative definition for "neighborhood of point"," IEEE Transactions on Computers, pp. 1121-1125, November 1975.

[166] J.- M. Geusebroek, A. Smeulders, F. Cornelissen, and H. Geerts, "Segmentation of tissue architecture by distance graph matching," Cytometry, vol. 35, pp. 11-22, 1999.

[167] R. Fernandez-Gonzalez, M. Barcellos-Hoff, and C. O. de Solórzano, "A tool for the quantitative spatial analysis of complex cellular systems," IEEE Transactions on Image Processing, vol. 14, pp. 1300-1313, September 2005.

[168] B. Liu, H.- J. Lai, Matrices in Combinatorics and Graph Theory. Kluwer Academic Publishers, 2000.

[169] J. Clark and D. A. Holton, A First Look at Graph Theory. World Scientific Publishing Co., 1991.

[170] L. W. Beineke and R. J. Wilson, eds., Graph Connections: Relationships between Graph Theory and other Areas of Mathematics. Clarendon Press, Oxford, 1997.

[171] R. Maree, P. Geurts, J. Piater, L. Wehenkel, "Random subwindows for robust image classification," in Proc. CVPR, 2005.

[172] R. Maree, P. Geurts, J. Piater, L. Wehenkel, "Biomedical image classification with random subwindows and decision trees," in Lecture Notes in Computer Science, vol. 3765, pp. 220-229, 2005.

[173] S. Hochstein, M. Ahissar, "View from the top: Hierarchies and reverse hierarchies in the visual system," Neuron, vol. 36, pp. 791-804, December 2002.

[174] D. A. Randell, Z. Cui, and A. G. Cohn, "A spatial logic based on regions and connection," in Proc. 3rd Int Conf on Knowledge Representation and Reasoning, pp. 165-176, 1992.

[175] A. G. Cohn, B. Bennett, J. Gooday, and N. M. Gotts, "Qualitative spatial representation and reasoning with the region connection calculus," GeoInformatica, vol. 1, pp. 275-316, 1997.

[176] J. Renz, ed., Qualitative Spatial Reasoning with Topological Information, vol. 2293 Lecture Notes in Computer Science. Springer Berlin/Heidelberg, 2002.

[177] S. Li, M. Ying, "Region Connection Calculus: Its models and composition table," Artificial Intelligence, vol. 145, pp. 121-146, 2003.

[178] J. Renz and B. Nebel, "Spatial reasoning with topological information," in Proc. Spatial Cognition, An Interdisciplinary Approach to Representing and Processing Spatial Knowledge, pp. 351-371, 1997.

[179] J. Renz, B. Nebel, "On the complexity of qualitative spatial reasoning: A maximum tractable fragment of the Region Connection Calculus," Artificial Intelligence, vol. 108, pp. 69-123, 1999.

[180] J. G. Stell, "Boolean connection algebras: A new approach to Region-Connection Calculus," Artificial Intelligence, vol. 122, pp. 111-136, 2000.

[181] I. Düntsch, H. Wang, and S. McCloskey, "A relation-algebraic approach to region connection calculus," Theoretical Computer Science, vol. 255, pp. 63-83, 2001.

[182] S. Li and Y. Li, "On the complemented disk algebra," Journal of Logic Algebraic Programming, vol. 66, pp. 195-211, 2006.

[183] I. Duntsch and M. Winter, "A representation theorem for Boolean contact algebras," Theoretical Computer Science, vol. 347, pp. 498-512, 2005.

[184] J. G. Stell, M. F. Worboys, "The algebraic structure of sets of regions," Lecture Notes in Computer Science, vol. 1329, pp. 163-174, August 2005.

[185] J. G. Stell, "Part and complement: Fundamental concepts in spatial relations," Annals of Mathematics and Artificial Intelligence, vol. 41, pp. 1-17, 2004.

[186] H. Bunke, "Graph-based tools for data mining and machine learning," in Lecture Notes in Computer Science, vol. 2734, pp. 7-19, 2003.

[187] A. Hlaoui and S. Wang, "A new median graph algorithm," Lecture Notes in Computer Science, vol. 2726, pp. 225-234, 2003.

[188] A. Hlaoui, S. Wang, "Median graph computation for graph clustering," Soft Computing, vol. 10, pp. 47-53, 2006.

[189] A. Hlaoui and S. Wang, "A new algorithm for graph matching with application to content-based image retrieval," in Lecture Notes in Computer Science, vol. 2396, pp. 291-300, 2002.

[190] X. Jiang, A. Münger, and H. Bunke, "On median graphs: Properties, algorithms, and applications," IEEE Transactions on Pattern Analysis and Machine Intelligence, vol. 23, pp. 1144-1151, October 2001.

[191] M. Ferrer, F. Serratosa, and A. Sanfeliu, "Synthesis of median spectral graph," Lecture Notes in Computer Science, vol. 3523, p. 139-146, 2005.

[192] M. Ferrer, F. Serratosa, E. Valveny, "Evaluation of spectral-based methods for median graph computation," in Lecture Notes in Computer Science, vol. 4478, pp. 580-587, 2007.

[193] M. Ferrer, E. Valveny, F. Serratosa, "Spectral median graphs applied to graphical symbol recognition," in Lecture Notes in Computer Science, vol. 4225, pp. 774-783, 2006.

[194] S. Gunter, H. Bunke, "Validation indices for graph clustering," Pattern Recognition Letters, vol. 24, pp. 1107-1113, 2003.

[195] S. Gunter and H. Bunke, "Self-organizing map for clustering in the graph domain," Pattern Recognition Letters, vol. 23, pp. 405-417, 2002.

[196] D. Conte, P. Foggia, C. Sansone, and M. Vento, "Thirty years of graph matching in pattern recognition," International Journal of Pattern Recognition, vol. 18, no. 3, pp. 265-298, 2004.

[197] A. Shokoufandeh, S. Dickinson, "Graph-theoretical methods in computer vision," Lecture Notes in Computer Science, vol. 2292, p. 148-174, 2002.

[198] "Cribriform, from Wikipedia, the free encyclopedia." http://en.wikipedia.org/wiki/Cribriform.

[199] "Papanicolaou stain, from Wikipedia, the free encyclopedia." http://en.wikipedia.org/wiki/Papanicolaou_stain.

[200] C. D. Meyer, Matrix Analysis and Applied Linear Algebra. SIAM, 2000.

[201] A. C. Ruifrok, D. A. Johnston, "Quantification of histochemical staining by color deconvolution," Analytical and Quantitative Cytology Histology, vol. 23, pp. 291-299, August 2001.

[202] "Beer-Lambert law from Wikipedia, the free encyclopedia." http://en.wikipedia.org/wiki/Beer-Lambert_law.

[203] T. F. Chan and L. A. Vese, "Active contours without edges," IEEE Transactions on Image Processing, vol. 10, pp. 266-277, February 2001.

[204] B. Sumengen and B. S. Manjunath, "Graph partitioning active contours (GPAC) for image segmentation," IEEE Transactions on Pattern Analysis and Machine Intelligence, vol. 28, pp. 509-521, April 2006.

[205] L. Bertelli, J. Byun, B. S. Manjunath, "A variational approach to exploit prior information in object-background segregation: Application to retinal images," in To appear: Proc. ICIP, September 2007.

[206] Personal communication with NGA, Apr. 11, 2005.

[207] M. A. O'Brien, "Performance evaluation of the GENIE system," in Proc. American Society for Photogrammetry and Remote Sensing, May 2003.

TABLE 1

| Ref. | Imaging Modality | Year | Tissue | Dataset | | Performance |
|---|---|---|---|---|---|---|
| [29] | Vibrational spectroscopy | 2005 | Prostate | 250 | cores, | Accuracies: 100% cancer/normal, |
| | | | | 40 | patients | 90.1%-100% for histologic classes |
| [30] | Vibrational spectroscopy | 2000 | Cervical | ? | | Accuracy: 60%-70% normal/abnormal |
| [27] | Fourier transform spectroscopy | 2004 | Cervical | 40 | images | 95.2% pixel-level sensitivity 97.6% nuclear-level sensitivity |
| [31] | Fluorescence | 2005 | Brain | 10 | images | 96.3% correct nuclear segmentation |
| [32] | Fluorescence | 2004 | Cervical | 6 | images | 91%-96% correct nuclear segmentation |
| [33] | in vivo confocal reflectance | 2005 | Cervical | ? | | 90% correct nuclear segmentation |
| [34] | Gross examination | 2003 | Liver | 212 | nodules | 95%-100% sensitivity and specificity |
| [35] | Light (H&E) | 2005 | Brain | 64 | patients | 96.9%-97.1% normal/inflamed/cancer |
| [36] | Light (H&E) | 2004 | Brain | 12 | patients | 85.7%-94.0% normal/inflamed/cancer |
| [37] | Light (H&E) | 2005 | Lung | 16 | images | 92%-97% detection of cancerous nuclei |
| [38] | Light (H&E, 33 bands) | 2003 | Prostate | 230 | nuclei | 5.1% classification error for 3 conditions |
| [39] | Light (Pap, 29 bands) | 2005 | Bladder | 37 | cases | 85%-87% sensitivity, 96% specificity |
| [8] | Light (Feulgen, 610 nm) | 2004 | Oral | 145 | cases | 72.7% sensitivity, 82.4% specificity |
| [9] | Light (Feulgen, Orange II, 610 nm, 497 nm) | 1994 | Cervical | 54 | cases | Classification accuracies: 100% normal, 45% benign change, 97% abnormal |
| [10] | Light (Feulgen, 610 nm) | 1999 | Prostate | 240 | cases | 92% sensitivity, 95% specificity |
| [40] | Light (H&E, red channel) | 2004 | Ovarian | 20 | patients | Accuracy: 66%-78% cancerous/benign |
| [20] | Light (Feulgen, 565 nm) | 1999 | Lung | 66 | cases | Accuracies: 79.5%-94.9% typing, 60.0%-82.9% prognosis |
| [41] | Light (Feulgen, 565 nm) | 1999 | Lung, Prostate | 51 44 | cases, cases | Accuracies: 82.6% typing, 75.7% grading |
| [22] | Light (CD31 immunostain, Hematoxylin) | 2004 | Cervical, Colorectal, Lung | 78 74 27 | images cases, images | Prognostic accuracies: 83.3% cervical, 70.6% colorectal, 86.4% lung |

TABLE 2

| Ref. | Imaging Modality | Year | Type | Conditions | Dataset | | Performance |
|---|---|---|---|---|---|---|---|
| [42] | Light (immunostained epithelium, Feulgen) | 2004 | Histo | Normal, fibroadenosis, ductal and lobular cancer | 20 200 | cases images | 87%-93% class, (image) |
| [43] | Light (H&E, 29 bands) | 2003 | Histo | Benign, malignant | 15 | images | 82.3%-87.4% DR 0.4%-15.8% FAR |
| [44] | Light (grayscale) | 2003 | Cyto | Benign, malignant | 140 | images | 94.1% seg, (nuclei) 94%-96% class, (image) |
| [17] | Light (H&E) | 2003 | Histo | Typical hyperplasia, atypical hyperplasia, cribriform ductal carcinoma in situ, solid ductal carcinoma in situ | 39 | images | 57.2%-71.6% seg, (nuclei) |
| [45] | Light (Feulgen, 565 nm) | 2000 | Histo | Normal, invasive ductal carcinoma | 83 | patients | 67.1% class, (nuclei) 100% class, (patient) |
| [46] | Light (Pap, grayscale) | 1998 | Cyto | Benign, malignant | 142 | cases | 89.4%-91.5% class, |
| [18] | Light (Feulgen, 565 nm) | 1998 | Histo | Normal, invasive ductal carcinoma | 83 | patients | 76.1% class, (nuclei) 100% class, (patient) 61.5% grading (nuclei) 78.5% grading (patient) |
| [15] | Light (immunostained hormone receptors, Feulgen) | 1997 | Histo | Benign, malignant | 28 | images | 83% sensitivity |
| [19] | Light (H&E) | 1997 | Histo | Ductal carcinoma in situ, ductal hyperplasia | 215 43 | images, cases | 63%-70% class, (image) 65%-83% class, (patient) |

TABLE 3

| Classifier | Image Type | DR | FAR | P |
|---|---|---|---|---|
| ML | multispectral | 0.876/0.865 | 0.111/0.097 | 0.883/0.884 |
| | rgbequal | 0.868/0.861 | 0.117/0.098 | 0.876/0.881 |
| | truecolor | 0.879/0.868 | 0.109/0.091 | 0.885/0.889 |
| | ccd | 0.879/0.868 | 0.109/0.090 | 0.885/0.889 |
| MED | multispectral | 0.888/0.895 | 0.135/0.114 | 0.876/0.891 |
| | rgbequal | 0.884/0.891 | 0.140/0.120 | 0.872/0.886 |
| | truecolor | 0.889/0.897 | 0.152/0.131 | 0.868/0.883 |
| | ccd | 0.890/0.899 | 0.147/0.125 | 0.872/0.887 |
| SAM | multispectral | 0.871/0.874 | 0.118/0.100 | 0.877/88.7 |
| | rgbequal | 0.872/0.872 | 0.123/0.105 | 0.875/0.884 |
| | truecolor | 0.862/0.860 | 0.107/0.090 | 0.878/0.885 |
| | ccd | 0.854/0.846 | 0.092/0.077 | 0.881/0.884 |
| FLDA | multispectral | 0.896/0.890 | 0.108/0.092 | 0.894/0.899 |
| | rgbequal | 0.890/0.885 | 0.117/0.098 | 0.887/0.893 |
| | truecolor | 0.888/0.881 | 0.107/0.089 | 0.890/0.896 |
| | ccd | 0.890/0.884 | 0.110/0.091 | 0.890/0.897 |
| AFE | multispectral | 0.908/0.905 | 0.109/0.095 | 0.900/0.905 |
| | rgbequal | 0.918/0.920 | 0.134/0.122 | 0.892/0.899 |
| | truecolor | 0.912/0.912 | 0.110/0.096 | 0.901/0.908 |
| | ccd | 0.910/0.911 | 0.108/0.094 | 0.901/0.908 |

TABLE 3-continued

| Classifier | Image Type | DR | FAR | P |
|---|---|---|---|---|
| LSVM | multispectral | 0.929/0.922 | 0.073/0.101 | 0.932/0.911 |
| | rgbequal | 0.920/0.883 | 0.088/0.096 | 0.928/0.894 |
| | truecolor | 0.929/0.898 | 0.079/0.099 | 0.937/0.900 |
| | ccd | 0.929/0.897 | 0.079/0.098 | 0.937/0.900 |
| NLSVM | multispectral | 0.922/0.930 | 0.069/0.117 | 0.927/0.901 |
| | rgbequal | 0.888/0.915 | 0.074/0.123 | 0.907/0.896 |
| | truecolor | 0.905/0.915 | 0.070/0.115 | 0.917/0.900 |
| | ccd | 0.906/0.915 | 0.071/0.122 | 0.918/0.900 |

TABLE 4

| Training Set | IS P | OS P |
|---|---|---|
| Set 1 | 0.876 | 0.891 |
| Set 2 | 0.871 | 0.897 |
| Set 3 | 0.884 | 0.883 |
| Set 4 | 0.890 | 0.876 |
| Set 5 | 0.878 | 0.887 |
| Set 6 | 0.884 | 0.879 |
| Set 7 | 0.892 | 0.874 |
| Set 8 | 0.884 | 0.882 |
| Set 9 | 0.879 | 0.886 |
| Set 10 | 0.876 | 0.890 |

TABLE 5

| | Image-multi vs. | | |
|---|---|---|---|
| Classifier | rgbequal | truecolor | ccd |
| ML | 4.7e−1/5.4e−1 | 1.5e−1/1.0e−1 | 1.5e−1/8.2e−2 |
| MED | 1.3e−4/5.3e−5 | 8.2e−4/1.4e−4 | 1.0e−3/8.3e−4 |
| SAM | 3.1e−2*/5.7e−3* | 1.6e−1/7.3e−1 | 5.8e−2/8.3e−1 |
| FLDA | 8.3e−3*/6.5e−2 | 4.7e−2*/7.5e−2 | 3.4e−2*/1.2e−1 |
| AFE | 3.8e−4/3.0e−3* | 5.8e−1/1.1e−1 | 8.0e−1/2.9e−2* |
| LSVM | 1.8e−1/1.2e−3 | 8.8e−2/6.3e−1 | 5.6e−2/4.3e−1 |
| NLSVM | 4.2e−6/6.9e−5 | 6.4e−4/4.7e−3* | 9.6e−4/6.0e−3* |

TABLE 6

| | | All Bands | Single Bands | |
|---|---|---|---|---|
| Classifier | Imagery | P | Max P | Max P Band |
| ML | multispectral | 0.883/0.884 | 0.892/0.900 | 620/590 nm |
| | rgbequal | 0.876/0.881 | 0.883/0.888 | R/R |
| | truecolor | 0.885/0.889 | 0.889/0.898 | R/R |
| | ccd | 0.885/0.889 | 0.889/0.898 | R/R |
| MED | multispectral | 0.876/0.891 | 0.892/0.900 | 620/600 nm |
| | rgbequal | 0.872/0.886 | 0.880/0.882 | R/R |

TABLE 6-continued

| | | All Bands | Single Bands | |
|---|---|---|---|---|
| Classifier | Imagery | P | Max P | Max P Band |
| | truecolor | 0.868/0.883 | 0.888/0.898 | R/R |
| | ccd | 0.872/0.887 | 0.889/0.898 | R/R |
| FLDA | multispectral | 0.894/0.899 | 0.892/0.901 | 620/620 nm |
| | rgbequal | 0.887/0.893 | 0.884/0.893 | R/R |
| | truecolor | 0.890/0.896 | 0.889/0.899 | R/R |
| | ccd | 0.890/0.897 | 0.889/0.900 | R/R |
| AFE | multispectral | 0.900/0.905 | 0.908/0.913 | 640/660 nm |
| | rgbequal | 0.892/0.890 | 0.899/0.908 | R/R |
| | truecolor | 0.901/0.908 | 0.897/0.909 | R/R |
| | ccd | 0.901/0.908 | 0.892/0.901 | R/R |

TABLE 7

| | Multi | Band | | |
|---|---|---|---|---|
| Classifier | Band | rgbequal R | truecolor R | ccd R |
| ML | 620/590 nm | 2.9e−2*/3.2e−2* | 4.0e−2*/3.1e−1 | 3.1−e2*/3.4e−1 |
| MED | 620/600 nm | 6.9e−2/2.2e−2* | 1.0e−1/2.5e−1 | 1.0e−1/1.7e−1 |
| FLDA | 620/620 nm | 6.3e−3*/1.7e−3 | 2.5e−1/2.5e−1 | 1.2e−1/3.6e−1 |
| AFE | 640/660 nm | 2.3e−4/9.4e−2 | 1.8e−3/4.0e−1 | 1.7e−3/4.7e−1 |

TABLE 8

| | Image | | | |
|---|---|---|---|---|
| Classifier | multi | rgbequal | truecolor | ccd |
| ML | 1.0e−3/2.4e−4 | 2.9e−4/7.3e−3* | 4.0e−1/2.0e−2* | 3.6e−1/2.3e−2* |
| MED | 3.3e−3*/5.0e−2* | 4.3e−2*/8.8e−1 | 1.4e−3/1.1e−2* | 1.4e−3/2.2e−2* |
| FLDA | 9.2e−2/8.3e−1 | 3.8e−2*/9.1e−1 | 2.6e−1/7.3e−1 | 2.7e−1/6.6e−1 |
| AFE | 3.4e−2*/2.2e−1 | 3.1e−3/1.5e−4 | 5.6e−2/9.3e−1 | 3.6e−2*/7.2e−1 |

TABLE 9

| Region | Imagery | Max Entropy | Max Entropy Band |
|---|---|---|---|
| Nuclei | multispectral | 7.11 bpp | 660 nm |
| | rgbequal | 7.00 bpp | R |
| | truecolor | 6.82 bpp | R |
| | ccd | 6.90 bpp | R |
| Non-Nuclei | multispectral | 7.35 bpp | 550 nm |
| | rgbequal | 7.19 bpp | G |
| | truecolor | 7.12 bpp | G |
| | ccd | 7.12 bpp | G |

TABLE 9-continued

| Region | Imagery | Max Entropy | Max Entropy Band |
|---|---|---|---|
| All Pixels | multispectral | 7.16 bpp | 550 nm |
| | rgbequal | 7.15 bpp | G |
| | truecolor | 7.08 bpp | G |
| | ccd | 7.08 bpp | G |

TABLE 10

| | Nuclei | | | Background | | |
|---|---|---|---|---|---|---|
| k | DR | FAR | P | DR | FAR | P |
| 3 | 0.903 | 0.103 | 0.900 | 0.982 | 0.040 | 0.971 |
| 4 | 0.900 | 0.194 | 0.852 | 0.997 | 0.016 | 0.990 |
| 5 | 0.941 | 0.163 | 0.889 | 0.995 | 0.009 | 0.993 |
| 6 | 0.909 | 0.123 | 0.893 | 0.994 | 0.005 | 0.995 |
| 7 | 0.925 | 0.143 | 0.891 | 0.993 | 0.004 | 0.994 |
| 8 | 0.932 | 0.143 | 0.894 | 0.990 | 0.003 | 0.994 |
| 9 | 0.949 | 0.171 | 0.889 | 0.983 | 0.002 | 0.990 |
| 10 | 0.954 | 0.167 | 0.834 | 0.978 | 0.002 | 0.988 |
| 11 | 0.949 | 0.162 | 0.893 | 0.968 | 0.002 | 0.983 |
| 12 | 0.939 | 0.148 | 0.896 | 0.964 | 0.001 | 0.098 |
| 13 | 0.944 | 0.163 | 0.890 | 0.951 | 0.001 | 0.975 |
| 14 | 0.948 | 0.164 | 0.892 | 0.945 | 0.001 | 0.972 |
| 15 | 0.931 | 0.155 | 0.888 | 0.940 | 0.001 | 0.970 |

TABLE 11

| Classifier | DR | FAR | P |
|---|---|---|---|
| ML | 0.868 | 0.090 | 0.889 |
| MED | 0.899 | 0.125 | 0.887 |
| SAM | 0.846 | 0.077 | 0.884 |
| FLDA | 0.884 | 0.091 | 0.897 |
| AFE | 0.911 | 0.094 | 0.908 |
| LSVM | 0.897 | 0.098 | 0.901 |
| NLSVM | 0.915 | 0.122 | 0.900 |

TABLE 12

| | Cytoplasm | | | Stroma | | | Total |
|---|---|---|---|---|---|---|---|
| | DR | FAR | P | DR | FAR | P | P |
| Gabor | 0.442 | 0.071 | 0.685 | 0.555 | 0.069 | 0.743 | 0.714 |

TABLE 13

| | Cytoplasm | | Stroma | | Total |
|---|---|---|---|---|---|
| Feature Set | DR | FAR | DR | FAR | P |
| 47-D | 0.73/0.64 | 0.14/0.10 | 0.86/0.90 | 0.27/0.36 | 0.80/0.77 |
| 35-D | 0.61/0.53 | 0.09/0.07 | 0.91/0.93 | 0.39/0.47 | 0.76/0.73 |
| 6-D | 0.11/0.10 | 0.03/0.02 | 0.97/0.98 | 0.89/0.90 | 0.54/0.54 |

TABLE 14

| | Cytoplasm | | Stroma | | Total |
|---|---|---|---|---|---|
| Training | DR | FAR | DR | FAR | P |
| Original | 0.97/0.92 | 0.23/0.21 | 0.83/0.77 | 0.01/0.06 | 0.89/0.86 |
| Masked | 0.77/0.59 | 0.31/0.26 | 0.83/0.82 | 0.11/0.15 | 0.80/0.75 |
| ccd | 0.78/0.61 | 0.15/0.22 | 0.91/0.84 | 0.12/0.16 | 0.85/0.77 |

TABLE 15

| | Cytoplasm | | Stroma | | Total |
|---|---|---|---|---|---|
| Attribute | DR | FAR | DR | FAR | P |
| 0 | 0.88/0.91 | 0.58/0.59 | 0.42/0.36 | 0.08/0.04 | 0.66/0.66 |
| 1 | 0.81/0.80 | 0.41/0.32 | 0.69/0.72 | 0.17/0.08 | 0.78/0.73 |
| 2 | 0.93/0.92 | 0.67/0.67 | 0.19/0.16 | 0.20/0.21 | 0.55/0.56 |
| 3 | 1.00/1.00 | 0.70/0.70 | 0.05/0.04 | 0.00/0.00 | 0.59/0.59 |
| 4 | 0.83/0.85 | 0.64/0.65 | 0.34/0.30 | 0.22/0.21 | 0.57/0.58 |
| All | 0.97/0.92 | 0.23/0.21 | 0.83/0.77 | 0.01/0.06 | 0.89/0.86 |

TABLE 16

| | Image-multi vs. | | |
|---|---|---|---|
| Classifier | rgbequal | truecolor | ccd |
| ML | 6.7e−2 | 7.7e−6 | 4.1e−6 |
| MED | 5.9e−2 | 6.7e−3* | 3.6e−3* |
| SAM | 1.6e−5 | 3.6e−1 | 5.1e−2 |
| FLDA | 3.0e−4 | 6.3e−3* | 1.7e−3 |
| AFE | 3.7e−7 | 7.0e−1 | 1.1e−2* |

TABLE 17

| | Image-multi vs. | | |
|---|---|---|---|
| Classifier | rgbequal | truecolor | ccd |
| ML | 3.4e−6 | 6.7e−9 | 2.8e−9 |
| MED | 2.0e−2* | 1.1e−4 | 2.7e−2* |
| SAM | 1.1e−2* | 3.4e−3 | 3.1e−2* |
| FLDA | 7.5e−1 | 4.7e−1 | 3.0e−1 |

TABLE 18

| | Image-multi vs. | | |
|---|---|---|---|
| Classifier | rgbequal | truecolor | ccd |
| ML | 5.9e−1 | 6.1e−6 | 3.1e−6 |
| MED | 6.4e−2 | 2.7e−1 | 5.0e−1 |
| SAM | 7.3e−7 | 3.8e−3* | 6.7e−1 |
| FLDA | 1.9e−6 | 1.0e−5 | 3.3e−6 |
| AFE | 2.8e−6 | 1.1e−3 | 7.0e−7 |

TABLE 19

| | Image-multi vs. | | |
|---|---|---|---|
| Classifier | rgbequal | truecolor | ccd |
| ML | 3.5e−2* | 5.2e−7 | 6.3e−7 |
| MED | 2.6e−2* | 6.9e−2 | 8.8e−1 |
| SAM | 2.0e−5 | 4.5e−1 | 6.1e−4 |
| FLDA | 3.3e−6 | 7.5e−5 | 1.7e−5 |
| AFE | 5.6e−6 | 5.5e−2 | 8.8e−4 |

TABLE 20

| Parameter | Inequality | $t_{IS}$ | $t_{benign}$ | $t_{malignant}$ | $t_{kumar}$ |
|---|---|---|---|---|---|
| CD | > | 0.95 | 0.95 | 1.08 | 3.00 |
| SA | > | 0.18 | 0.24 | 0.18 | 0.12 |
| CL | < | 111.60° | 109.62° | 111.60° | 70.00° |
| CC | < | 145.80° | 145.80° | 142.20° | 105.00° |
| CA | < | 120.12° | 120.12° | 118.90° | 90.00° |
| CR | > | 0.09 | 0.09 | 0.11 | 0.17 |

TABLE 21

| | Image-multi vs. | | |
|---|---|---|---|
| Classifier | rgbequal | truecolor | ccd |
| ML | 7.8e−3* | 4.9e−4 | 4.9e−4 |
| MED | 5.2e−1 | 8.8e−1 | 1.7e−1 |
| SAM | 2.4e−4 | 2.6e−1 | 9.1e−1 |
| FLDA | 2.9e−3 | 1.5e−1 | 1.1e−1 |
| AFE | 6.8e−3* | 5.6e−3* | 1.7e−6 |

TABLE 22

| | Image-multi vs. | | |
|---|---|---|---|
| Classifier | rgbequal | truecolor | ccd |
| ML | 4.2e−2* | 2.2e−5 | 5.3e−6 |
| MED | 3.7e−3* | 1.6e−2* | 1.4e−1 |
| SAM | 3.2e−6 | 2.3e−2* | 9.3e−2 |
| FLDA | 7.9e−7 | 4.4e−4 | 5.3e−5 |
| AFE | 1.1e−4 | 1.4e−3 | 8.0e−7 |

TABLE 23

| Method | Time (s) |
|---|---|
| WSCDT | 1.3 |
| WSHmin | 1.7 |
| WSGran | 2.7 |
| WSBlob | 64.9 |
| Kumar | 330.9 |
| WSCM | 354.7 |

TABLE 24

| | Ideal | | Actual | |
|---|---|---|---|---|
| Method | P | Parameter(s) | P | Parameter(s) |
| WSCDT | 0.64 ± 0.11 | N/A | 0.18 ± 0.17 | GENIE, ccd |
| WSHmin | 0.69 ± 0.10 | $h_{min} = 1$ | 0.27 ± 0.15 | SAM, ccd, $h_{min} = 3$ |
| WSGran | 0.68 ± 0.10 | r = 2 | 0.34 ± 0.17 | GENIE, ccd, r = 4 |
| Kumar | 0.71 ± 0.12 | N/A | 0.07 ± 0.12 | GENIE, ccd |
| WSCM | 0.64 ± 0.12 | N/A | 0.29 ± 0.17 | GENIE, ccd, a = 103 |
| WSGT | 0.69 ± 0.12 | N/A | N/A | N/A |

TABLE 25

| Method | P | $term_1$ | $term_2$ | $term_3$ | $term_4$ | $term_5$ |
|---|---|---|---|---|---|---|
| WSCDT-Ideal | 0.64 | 0.55 | 0.97 | 0.77 | 1.00 | 0.98 |
| WSCDT-Actual | 0.18 | 0.39 | 0.85 | 0.60 | 0.99 | 0.43 |
| WSHmin-Ideal | 0.63 | 0.54 | 0.97 | 0.77 | 1.00 | 0.98 |
| WSHmin-Actual | 0.27 | 0.38 | 0.72 | 0.69 | 0.89 | 0.79 |
| WSGran-Ideal | 0.68 | 0.99 | 1.00 | 0.48 | 1.00 | 0.89 |
| WSGran-Actual | 0.34 | 0.90 | 0.95 | 0.24 | 0.96 | 0.63 |
| Kumar-Ideal | 0.71 | 0.75 | 0.97 | 0.69 | 1.00 | 1.00 |
| Kumar-Actual | 0.07 | 0.51 | 0.83 | 0.41 | 1.00 | 0.19 |
| WSCM-Ideal | 0.64 | 0.78 | 1.00 | 0.61 | 1.00 | 0.89 |
| WSCM-Actual | 0.29 | 0.75 | 0.94 | 0.28 | 0.93 | 0.64 |
| WSGT | 0.63 | 0.74 | 1.00 | 0.64 | 1.00 | 0.90 |

TABLE 26

| Category | Features |
|---|---|
| Size and Shape | Area |
| | Elliptical Features: Major and minor axis length, eccentricity, orientation, elliptical deviation |
| | Convex Hull Features: Convex area, convex deficiency, solidity |
| | Filled Image Features: Filled area, Euler number |
| | Bounding Box Features: Extent, aspect ratio |
| | Boundary Features: Perimeter, radii, perimeter FFT, perimeter curvature, bending energy, perimeter FD |
| | Other Shape Features: Equivalent diameter, sphericity, compactness, inertia shape |
| | Center of Mass (gray and OD) |
| | Reflection Symmetry Features (binary, gray, and OD) |
| Radiometric and Densitometric | Image Bands |
| | Intensity |
| | Optical Density (OD) |
| | Integrated Optical Density (IOD) |
| | Mean Optical Density (MOD) |
| | Hue |
| Texture | Co-occurrence Matrix Features (gray, and OD): Inertia, energy, entropy, homogeneity, maximum probability, cluster shade, cluster prominence, correlation |
| | Fractal dimension (gray and OD) |
| | Run-length Features (gray and OD): Short runs emphasis, long runs emphasis, gray-level non-uniformity, run-length non-uniformity, runs percentage, low gray-level runs emphasis, high gray-level runs emphasis |
| | Wavelet Features (gray and OD): Energies of detail and low resolution images |
| | Entropy (gray and OD) |
| Chromatin-Specific | Area, IOD, MOD, number of regions compactness, distance, center of mass |

TABLE 27

| Category | Features |
|---|---|
| Voronoi Tessellation | Number of nodes, number of edges, cyclomatic number, number of triangles, number of k-walks, spectral radius, eigenexponent, Randic index, area, roundness factor, area disorder, roundness factor homogeneity |
| Delannay Triangulation | Number of nodes, edge length, degree, number of edges, cyclomatic number, number of triangles, number of k-walks, spectral radius, eigenexponent, Wiener index, eccentricity, Randic index, fractal dimension |
| Minimum Spanning Tree | Number of nodes, edge length, degree, number of neighbors, Wiener index, eccentricity, Randic index, Balaban index, fractal dimension |
| O'Callaghan Neighborhood Graph | Number of nodes, number of edges, cyclomatic number, number of neighbors, number of triangles, number of k-walks, spectral radius, eigenexponent, Randic index, fractal dimension |
| Connected Graph | Edge length, number of triangles, number of k-walks, spectral radius, eigenexponent, Wiener index, eccentricity, Randic index, fractal dimension |

TABLE 28

| Object | GT | Performance CC | WSHmin | WSGran |
|---|---|---|---|---|
| N | 0.85/0.77 | 0.74/0.69 | 0.78/0.63 | 0.81/0.67 |
| N2 | 0.88/0.70 | 0.73/0.60 | 0.75/0.66 | 0.77/0.64 |
| CS | 0.90/0.51 | 0.82/0.70 | 0.81/0.60 | 0.88/0.73 |
| C | 0.90/0.34 | 0.79/0.63 | 0.82/0.63 | 0.87/0.72 |
| S | N/A | 0.81/0.60 | N/A | N/A |
| N + CS | 0.94/0.79 | 0.84/0.72 | 0.84/0.62 | 0.90/0.70 |
| N + C | 0.94/0.68 | 0.83/0.67 | 0.85/0.65 | 0.89/0.71 |

TABLE 29

| | CC Performance | | WSGran Performance | |
|---|---|---|---|---|
| Object | ccd | multi | ccd | multi |
| N | 0.62/0.43 | 0.70/0.49 | 0.62/0.61 | 0.77/0.56 |
| CS | 0.69/0.56 | 0.80/0.55 | 0.73/0.63 | 0.86/0.57 |
| C | 0.65/0.50 | 0.70/0.60 | 0.74/0.58 | 0.86/0.61 |
| S | 0.66/0.50 | 0.73/0.56 | N/A | N/A |

TABLE 30

| | CC Performance | | WSGran Performance | |
|---|---|---|---|---|
| Object | ccd | multi | ccd | multi |
| N | 0.74/0.69 | 0.91/0.63 | 0.81/0.67 | 0.90/0.58 |
| CS | 0.81/0.75 | 0.95/0.58 | 0.86/0.69 | 0.96/0.64 |
| C | 0.83/0.73 | 0.93/0.73 | 0.85/0.76 | 0.95/0.69 |
| S | 0.81/0.60 | 0.95/0.60 | N/A | N/A |

TABLE 31

| Object | GT | Performance CC | WSHmin | WSGran |
|---|---|---|---|---|
| $\lambda_1 = 0.05$ | 1.00/0.83 | 1.0/0.55 | 0.97/0.69 | 0.97/0.48 |
| $\lambda_1 = 0.01$ | 1.00/0.62 | 1.00/0.55 | 1.00/0.69 | 1.00/0.41 |

TABLE 32

| Object | GT | Performance WSHmin | WSGran |
|---|---|---|---|
| $\lambda_1 = 0.05$ | 0.75/0.58 | 0.65/0.60 | 0.70/0.56 |
| $\lambda_1 = 0.01$ | 0.84/0.58 | 0.77/0.63 | 0.79/0.50 |

TABLE 33

| Object | GT | Performance WSHmin | WSGran |
|---|---|---|---|
| N + SPN | 0.78/0.71 | 0.67/0.67 | 0.76/0.57 |
| N + CS + SPN | 0.82/0.72 | 0.72/0.69 | 0.78/0.61 |
| N + C + SPN | 0.80/0.72 | 0.73/0.69 | 0.78/0.59 |

TABLE 34

| Object | GT | Performance WSHmin | WSGran |
|---|---|---|---|
| N + SPN | 0.93/0.78 | 0.84/0.63 | 0.86/0.56 |
| N + CS + SPN | 0.96/0.76 | 0.89/0.72 | 0.91/0.64 |
| N + C + SPN | 0.96/0.72 | 0.89/0.72 | 0.93/0.65 |

TABLE 35

| Object | GT | Performance CC | WSHmin | WSGran |
|---|---|---|---|---|
| N | 0.92 | 0.93 | 0.78 | 0.87 |
| CS | 0.89 | 0.94 | 0.88 | 0.71 |
| C | 0.86 | 0.91 | 0.83 | 0.84 |
| S | N/A | 0.77 | N/A | N/A |
| N + CS | 0.96 | 0.92 | 0.90 | 0.67 |
| N + C | 0.92 | 0.88 | 0.84 | 0.86 |

TABLE 36

| Object | GT | Performance WSHmin | WSGran |
|---|---|---|---|
| SPN | 0.55 | 0.77 | 0.47 |
| N + SPN | 0.93 | 0.85 | 0.56 |
| N + CS + SPN | 0.93 | 0.84 | 0.59 |
| N + C + SPN | 0.94 | 0.83 | 0.65 |

TABLE 37

| Category | N | CS | C | S | N + CS | N + C |
|---|---|---|---|---|---|---|
| OD | 0.84 | 0.65 | 0.62 | 0.64 | 0.70 | 0.65 |
| Non-OD | 0.16 | 0.35 | 0.38 | 0.36 | 0.30 | 0.35 |
| R | 0.26 | 0.25 | 0.33 | 0.22 | 0.24 | 0.29 |
| G | 0.19 | 0.23 | 0.16 | 0.37 | 0.22 | 0.17 |
| B | 0.26 | 0.27 | 0.21 | 0.13 | 0.25 | 0.27 |
| I/Hue | 0.28 | 0.23 | 0.25 | 0.25 | 0.27 | 0.23 |
| Binary | 0.00 | 0.02 | 0.05 | 0.01 | 0.02 | 0.04 |
| Texture | 0.51 | 0.59 | 0.62 | 0.67 | 0.58 | 0.61 |
| Radio-/Densito-metric | 0.19 | 0.18 | 0.11 | 0.12 | 0.14 | 0.11 |
| Size/Shape | 0.30 | 0.23 | 0.27 | 0.21 | 0.28 | 0.29 |
| Nuclei | 1.00 | 0.00 | 0.00 | 0.00 | 0.27 | 0.41 |
| Non-Nuclei | 0.00 | 1.00 | 1.00 | 1.00 | 0.73 | 0.59 |

TABLE 38

| Category | SPN | N + SPN | N + CS + SPN | N + C + SPN |
|---|---|---|---|---|
| | | Object-Level | | |
| OD | N/A | 0.63 | 0.58 | 0.59 |
| Non-OD | N/A | 0.37 | 0.42 | 0.41 |
| R | N/A | 0.31 | 0.27 | 0.26 |
| G | N/A | 0.10 | 0.23 | 0.27 |
| B | N/A | 0.23 | 0.27 | 0.20 |
| I/Hue | N/A | 0.27 | 0.18 | 0.19 |
| Binary | N/A | 0.00 | 0.05 | 0.08 |
| Texture | N/A | 0.62 | 0.61 | 0.53 |
| Radio-/Densito-metric | N/A | 0.19 | 0.19 | 0.17 |
| Size/Shape | N/A | 0.19 | 0.20 | 0.30 |
| Nuclei | N/A | 1.00 | 0.36 | 0.43 |
| Non-Nuclei | N/A | 0.00 | 0.64 | 0.57 |
| | | Spatial-Level | | |
| VT | 0.30 | 0.32 | 0.35 | 0.30 |
| DT | 0.09 | 0.09 | 0.05 | 0.05 |
| MST | 0.13 | 0.23 | 0.20 | 0.20 |
| OCG | 0.35 | 0.27 | 0.30 | 0.35 |

TABLE 38-continued

| Category | SPN | N + SPN | N + CS + SPN | N + C + SPN |
|---|---|---|---|---|
| CG | 0.13 | 0.05 | 0.10 | 0.10 |
| Object-Level | 0.00 | 0.70 | 0.84 | 0.84 |
| Spatial-Level | 1.00 | 0.30 | 0.16 | 0.16 |

TABLE 39

| | |
|---|---|
| Area: | Area |
| Elliptical Features: | Major and minor axis length, eccentricity, orientation, elliptical deviation |
| Convex Hull Features: | Convex area, convex deficiency, solidity |
| Filled Image Features: | Filled area, Euler number |
| Bounding Box Features: | Extent, aspect ratio |
| Boundary Features: | Perimeter, radii, perimeter FFT, perimeter curvature, bending energy, perimeter FD |
| Other Shape Features: | Equivalent diameter, sphericity, compactness, inertia shape |
| Reflection Symmetry Features: | Binary |

TABLE 40

| | Performance | | | |
|---|---|---|---|---|
| Object | GT | CC | WSHmin | WSGran |
| Cell$_{(N,CS)}$ | 0.79/0.78 | 0.77/0.56 | 0.66/0.61 | 0.70/0.58 |
| Cell$_{(N,C)}$ | 0.81/0.79 | 0.74/0.69 | 0.68/0.62 | 0.76/0.54 |
| Cluster$_{(N,CS)}$ | 0.81/0.74 | 0.90/0.53 | N/A | N/A |
| Cluster$_{(N,C)}$ | 0.82/0.76 | 0.79/0.55 | N/A | N/A |
| N | 0.79/0.77 | 0.62/0.43 | 0.66/0.65 | 0.62/0.61 |
| CS | 0.74/0.72 | 0.69/0.56 | 0.67/0.61 | 0.73/0.63 |
| C | 0.73/0.63 | 0.65/0.50 | 0.67/0.60 | 0.74/0.58 |
| S | N/A | 0.66/0.50 | N/A | N/A |
| N + CS | 0.75/0.79 | 0.70/0.57 | 0.68/0.65 | 0.74/0.63 |
| N + C | 0.77/0.76 | 0.67/0.52 | 0.69/0.65 | 0.73/0.58 |

TABLE 41

| | Performance | | | |
|---|---|---|---|---|
| Object | GT | CC | WSHmin | WSGran |
| Cell$_{(N,CS)}$ | 0.97/0.78 | 0.92/0.53 | 0.87/0.65 | 0.94/0.63 |
| Cell$_{(N,C)}$ | 0.97/0.82 | 0.95/0.69 | 0.88/0.69 | 0.94/0.66 |
| Cluster$_{(N,CS)}$ | 1.00/0.67 | 1.00/0.57 | N/A | N/A |
| Cluster$_{(N,C)}$ | 0.99/0.65 | 0.95/0.57 | N/A | N/A |
| N | 0.85/0.77 | 0.74/0.69 | 0.78/0.63 | 0.81/0.67 |
| CS | 0.90/0.51 | 0.82/0.70 | 0.81/0.60 | 0.88/0.73 |
| C | 0.90/0.34 | 0.79/0.63 | 0.82/0.63 | 0.87/0.72 |
| S | N/A | 0.81/0.60 | N/A | N/A |
| N + CS | 0.94/0.79 | 0.84/0.72 | 0.84/0.62 | 0.90/0.70 |
| N + C | 0.94/0.68 | 0.83/0.67 | 0.85/0.65 | 0.89/0.71 |

TABLE 42

| | Performance | | | |
|---|---|---|---|---|
| Object | GT | CC | WSHmin | WSGran |
| Cell$_{(N,CS)}$ | 0.93 | 0.88 | 0.91 | 0.70 |
| Cell$_{(N,C)}$ | 0.97 | 0.79 | 0.93 | 0.76 |
| Cluster$_{(N,CS)}$ | 0.79 | 0.41 | N/A | N/A |
| Cluster$_{(N,C)}$ | 0.98 | 0.42 | N/A | N/A |
| N | 0.92 | 0.93 | 0.78 | 0.87 |
| CS | 0.89 | 0.94 | 0.88 | 0.71 |
| C | 0.86 | 0.91 | 0.83 | 0.84 |
| S | N/A | 0.77 | N/A | N/A |
| N + CS | 0.96 | 0.92 | 0.90 | 0.67 |
| N + C | 0.92 | 0.88 | 0.84 | 0.86 |

TABLE 43

| Category | GT | WSHmin |
|---|---|---|
| OD | 0.56 | 0.58 |
| Non-OD | 0.44 | 0.42 |
| R | 0.24 | 0.22 |
| G | 0.23 | 0.22 |
| B | 0.25 | 0.23 |
| I/Hue | 0.17 | 0.19 |
| Binary | 0.11 | 0.14 |
| Texture | 0.60 | 0.46 |
| Radio-/Densito-metric | 0.15 | 0.15 |
| Size/Shape | 0.25 | 0.40 |
| Nuclei | 0.53 | 0.43 |
| Non-Nuclei | 0.43 | 0.50 |
| Cell | 0.04 | 0.07 |

What is claimed is:

1. A method of analyzing an image of stained biological tissue material, the method comprising:
   (a) obtaining a first image of a stained biological tissue material using a microscope coupled to an image capture device;
   (b) inputting said first image into a computer processor; and
   (c) executing programming on the computer processor, said programming performing steps comprising:
      (i) performing a first level classification of said stained biological tissue material within said first image on a pixel by pixel basis by assigning a classification to each pixel;
      wherein said classification is based on a desired staining property of said stained biological tissue material or a desired spatial property of said stained biological tissue material or both;
      said staining and spatial properties comprising at least one of color, or texture, or an anomaly compared to the rest of said image, or pixel location within said image, or topological relationship between pixels, or connectivity relationship between pixels; and
      producing, on an output device, a second image comprising classified pixels;
      (ii) segmenting said classified pixels within said second image by applying a segmentation algorithm;
      wherein said segmenting is based on a desired staining property of said stained biological tissue material or a desired spatial property of said stained biological tissue material or both;
      said staining and spatial properties comprising at least one of contour, or color, or texture, or an anomaly compared to the rest of said image, or pixel location within said image, shape, or topological relationship between said classified pixels, or connectivity relationship between said classified pixels;
      agglomerating at least one set of said classified pixels whereby nuclear material objects, cytoplasm material objects, and stromal material objects in said stained biological tissue material is capable of being delineated; and producing, on the output device, a third image of said biological tissue material from agglomerated sets of classified and segmented pixels; and wherein said third image comprises at least one of delineated nuclear material objects, or delineated cytoplasm material objects, or delineated stromal material objects;

(iii) classifying at least one of said objects within said third image from step (ii) on a second level object basis by assigning a classification to at least one of said objects within said third image from step (ii);

wherein said classification is based on a desired staining property of said stained biological tissue material or a desired spatial property of said stained biological tissue material or both;

said staining and spatial properties comprising at least one of contour, color, texture, an anomaly compared to the rest of said image, object location within said image, shape, topological relationship between said objects within said third image from step (ii), or connectivity relationship between said objects within said third image from step (ii); and producing, on the output device, a fourth image comprising at least one of classified delineated nuclear material objects, or classified delineated cytoplasm material objects, or classified delineated stromal material objects;

(iv) segmenting at least one of said objects within said fourth image from step (iii) by applying a segmentation algorithm;

wherein said segmenting is based on a desired staining property of said stained biological tissue material or a desired spatial property of said stained biological tissue material or both;

said staining and spatial properties comprising at least one of contour, or color, or texture, or an anomaly compared to the rest of said image, or object location within said image, shape, or topological relationship between said objects within said fourth image from step (iii), or connectivity relationship between said objects within said fourth image from step (iii);

agglomerating one or more sets of said objects within said fourth image from step (iii) in order to delineate cells or extracellular objects from said stained biological tissue material; and producing, on an output device, a fifth image of said stained biological tissue material from agglomerated sets of said classified and segmented objects within said fourth image from step (iii);

wherein said fifth image comprises delineated cells or delineated extracellular objects or both;

(v) generating information on at least one of histology, or cytopathology, or histopathology based on at least one of said second image or an image produced in a subsequent step, and providing the information to the user, wherein said information is capable of providing information beyond just distinguishing cell nuclei as cancerous or non-cancerous; and (vi) outputting said at least said generated information to an output device;

wherein said generated information is available to the user.

2. A method as recited in claim 1, further comprising:
optionally adding additional classifying and segmenting steps in order to produce a further image of said stained biological tissue material comprising additional delineated tissue.

3. A method as recited in claim 2, further comprising:
displaying at least one of said produced images on the output device;

allowing a said user to markup at least one of said images in order to re-classify said stained biological tissue material and produce an image markup; and using said image markup subsequent to classification in order to develop one or more said classifiers for specific classifications of said stained biological tissue material, wherein said one or more classifiers are used in order to re-classify materials in subsequent images.

4. A method as recited in claim 3, wherein said image markup is used as an input for a classification algorithm of said subsequent images.

5. A method as recited in claim 3, further comprising:
inputting said image markup as training data into said computer processor; and incorporating machine learning using said training data in order to develop one or more classifiers, wherein at least one of said developed classifiers are used in order to classify subsequent images.

6. A method as recited in claim 2, further comprising:
displaying segmented regions of at least one of said third image or images produced in a subsequent step following the generation of the third image;

allowing the user to markup at least one of said third image or images produced in a subsequent step following the generation of the third image in order to re-segment said stained biological tissue material and produce an image markup; and using said image markup subsequent to re-segmentation in order to further develop said segmentation algorithms of steps (ii) and (iv).

7. A method as recited in claim 3, wherein said markup is performed via a graphic user interface in order to edit re-segmented regions in the images.

8. A method as recited in claim 6, wherein said markup is performed via a graphic user interface in order to edit re-segmented regions in the images.

9. A method as recited in claim 6, wherein each segmentation algorithm of steps (ii) and (iv) provides a segmentation output, the method further comprising:
applying a segmentation metric in order to quantitatively compare the outputs of the individual segmentation algorithms of steps (ii) and (iv); and subsequently selecting an output based on said segmentation metric comparison.

10. A method as recited in claim 9, wherein the segmentation metric is a function of: a number of segmented regions; a size and shape of the region of pixels missed; a size and shape of excess pixels; a fraction of nuclei detected; and a number of extra segmented regions.

11. A method as recited in claim 10, wherein the at least one said segmentation is a function of the equation:

$$P = \frac{1}{N_D} \sum_{i=1}^{N_D} \max\left(0, \left[1 - \alpha_1 \frac{SR-1}{\delta_{SR}} - \alpha_2 \frac{1}{1.75}\left(\frac{PM}{GT} + \frac{2QS_{PM}}{GT}\right) - \alpha_3 \frac{1}{1.75}\left(\frac{EP}{GT} + \frac{2QS_{EP}}{GT}\right)\right]\right) \cdot \left(1 - \alpha_4 \frac{N-N_D}{N}\right) - \alpha_5 \frac{ER}{N \cdot \delta_{ER}}$$

defining a segmentation algorithm;
wherein $0 \leq a_i \leq 1$, i=1,...,5; and
wherein N is a number of ground truth nuclei in a user markup, $N_D$ is a number of nuclei detected by the segmentation algorithm, SR is the number of segmented regions overlapping the current ground truth nucleus, $\delta_{SR}$ is an upper limit for the number of segmented regions, PM is the number of pixels missed, GT is the number of pixels in the ground truth user markup, $QS_{PM}$ is a quadrant sum of the pixels missed, EP is the number of excess pixels, $QS_{EP}$ is a quadrant sum of excess pixels, ER is the number of extra segmented regions, and $\delta_{ER}$ as the fraction of total ground truth nuclei allowed as excess regions.

12. A method as recited in claim 2, wherein classifying one or more biological tissue materials comprises
classifying cytoplasm material and stromal material by subtracting out pixels related to image background and nuclear material.

13. An apparatus configured for analyzing an image of stained biological tissue material, the apparatus comprising:
(a) a first image of a stained biological tissue material that is input into a computer processor;
(b) an output device connected to the computer processor that is capable of displaying images; and
(c) non-transitory programming executable on the computer processor for performing steps comprising:
(i) performing a first level classification of said stained biological tissue material within said first image on a pixel by pixel basis by assigning a classification to each pixel;
wherein said classification is based on a desired staining property of said stained biological tissue material or a desired spatial property of said stained biological tissue material or both;
said staining and spatial properties comprising at least one of color, or texture, or an anomaly compared to the rest of said image, or pixel location within said image, or topological relationship between pixels, or connectivity relationship between pixels; and
producing, on an output device, a second image comprising classified pixels;
(ii) segmenting said classified pixels within said second image by applying a segmentation algorithm;
wherein said segmenting is based on a desired staining property of said stained biological tissue material or a desired spatial property of said stained biological tissue material or both;
said staining and spatial properties comprising at least one of contour, or color, or texture, or an anomaly compared to the rest of said image, or pixel location within said image, shape, or topological relationship between said classified pixels, or connectivity relationship between said classified pixels;
agglomerating at least one set of said classified pixels whereby nuclear material objects, cytoplasm material objects, and stromal material objects in said stained biological tissue material is capable of being delineated; and
producing, on the output device, a third image of said biological tissue material from agglomerated sets of classified and segmented pixels; and
wherein said third image comprises at least one of delineated nuclear material objects, or delineated cytoplasm material objects, or delineated stromal material objects;
(iii) classifying at least one of said objects within said third image from step (ii) on a second level object basis by assigning a classification to at least one of said objects within said third image from step (ii);
wherein said classification is based on a desired staining property of said stained biological tissue material or a desired spatial property of said stained biological tissue material or both;
said staining and spatial properties comprising at least one of contour, color, texture, an anomaly compared to the rest of said image, object location within said image, shape, topological relationship between said objects within said third image from step (ii), or connectivity relationship between said objects within said third image from step (ii); and
producing, on the output device, a fourth image comprising at least one of classified delineated nuclear material objects, or classified delineated cytoplasm material objects, or classified delineated stromal material objects;
(iv) segmenting at least one of said objects within said fourth image from step (iii) by applying a segmentation algorithm;
wherein said segmenting is based on a desired staining property of said stained biological tissue material or a desired spatial property of said stained biological tissue material or both;
said staining and spatial properties comprising at least one of contour, or color, or texture, anomalies or an anomaly compared to the rest of said image, or object location within said image, shape or topological relationship between said objects within said fourth image from step (iii), or connectivity relationship between said objects within said fourth image from step (iii);
agglomerating one or more sets of said objects within said fourth image from step (iii) in order to delineate cells or extracellular objects from said stained biological tissue material; and
producing, on an output device, a fifth image of said stained biological tissue material from agglomerated sets of said classified and segmented objects within said fourth image from step (iii);
wherein said fifth image comprises delineated cells or delineated extracellular objects or both;
(v) generating information on at least one of histology, or cytopathology, or histopathology based on at least one of said second image or an image produced in a subsequent step, and providing the information to the user, wherein said information is capable of providing information beyond just distinguishing cell nuclei as cancerous or non-cancerous; and
(vi) outputting said at least said generated information to an output device;
wherein said generated information is available to the user.

14. An apparatus as recited in claim 13, further comprising:
non-transitory programming executable on the computer processor for performing steps comprising:
optional classifying and segmenting steps in order to produce a further image of stained biological tissue material comprising additional delineated tissue.

15. An apparatus as recited in claim 13, further comprising:
non-transitory programming executable on the computer processor for performing steps comprising:
extracting one or more parameters from said third image in order to classify at least one of said delineated nuclear material objects, said delineated cytoplasm material objects and said delineated stromal material objects.

16. An apparatus as recited in claim 13, further comprising:
non-transitory programming executable on the computer processor for performing steps comprising:
extracting one or more parameters from said fifth image in order to classify at least one of said delineated cells and extracellular objects.

17. An apparatus as recited in claim 14, further comprising:
non-transitory programming executable on the computer processor for performing steps comprising:
extracting one or more parameters from said further image in order to classify at least one of said delineated cells and extracellular objects.

18. An apparatus as recited in claim 13, further comprising:
non-transitory programming executable on the computer processor for performing steps comprising:
receiving an image markup, wherein said image markup is created using a user interface configured to allow said user to markup an image subsequent to classifying in order to re-classify, at least one of said pixels, said delineated nuclear material objects, said delineated cytoplasm material objects and said delineated stromal material objects, said delineated cells, said delineated extracellular objects and said delineated tissue.

19. An apparatus as recited in claim 18, further comprising:
non-transitory programming executable on the computer processor for performing steps comprising:
inputting said image markup as training data; and
incorporating machine learning using said training data in order to develop one or more classifiers, wherein any one or more of said developed classifiers are used in order to re-classify subsequent images.

20. An apparatus as recited in claim 13, further comprising:
non-transitory programming executable on the computer processor for performing steps comprising:
receiving an image markup, wherein said image markup is created using an user interface configured to allow said user to markup an image subsequent to segmenting in order to re-segment at least one of said classified pixels, said categorized delineated nuclear material objects, said classified delineated nuclear material objects and said classified delineated cells and extracellular objects.

21. An apparatus as recited in claim 20, further comprising:
non-transitory programming executable on the computer processor for performing steps comprising:
inputting said image markup as training data; and
incorporating machine learning using said training data in order to further develop at least one of said segmentation algorithms of steps ii and iv of claim 13, that is then used in order to re-segment subsequently produced images on said output device.

22. An apparatus as recited in claim 21, further comprising:
non-transitory programming executable on the computer processor for performing steps comprising:
comparing the outputs of each further developed segmentation algorithm quantitatively using a segmentation metric; and
subsequently selecting an output based on said segmentation metric comparison.

23. An apparatus as recited in claim 22, wherein the segmentation metric is a function of: a number of segmented regions; a size and shape of the region of pixels missed; a size and shape of excess pixels; a fraction of nuclei detected; and a number of extra segmented regions.

24. A non-transitory computer readable media containing programming executable on a computer processor in order to analyze an image of stained biological tissue material by performing the steps comprising:

(i) performing a first level classification of said stained biological tissue material within said first image on a pixel by pixel basis by assigning a classification to each pixel;
wherein said classification is based on a desired staining property of said stained biological tissue material or a desired spatial property of said stained biological tissue material or both;
said staining and spatial properties comprising at least one of color, or texture, or an anomaly compared to the rest of said image, or pixel location within said image, or topological relationship between pixels, or connectivity relationship between pixels; and
producing, on an output device, a second image comprising classified pixels;

(ii) segmenting said classified pixels within said second image by applying a segmentation algorithm;
wherein said segmenting is based on a desired staining property of said stained biological tissue material or a desired spatial property of said stained biological tissue material or both;
said staining and spatial properties comprising at least one of contour, or color, or texture, or an anomaly compared to the rest of said image, or pixel location within said image, shape, or topological relationship between said classified pixels, or connectivity relationship between said classified pixels;
agglomerating at least one set of said classified pixels whereby nuclear material objects, cytoplasm material objects, and stromal material objects in said stained biological tissue material is capable of being delineated; and
producing, on the output device, a third image of said biological tissue material from agglomerated sets of classified and segmented pixels; and
wherein said third image comprises at least one of delineated nuclear material objects, or delineated cytoplasm material objects, or delineated stromal material objects;

(iii) classifying at least one of said objects within said third image from step (ii) on a second level object basis by assigning a classification to at least one of said objects within said third image from step (ii);
wherein said classification is based on a desired staining property of said stained biological tissue material or a desired spatial property of said stained biological tissue material or both;
said staining and spatial properties comprising at least one of contour, color, texture, an anomaly compared to the rest of said image, object location within said image, shape, topological relationship between said objects within said third image from step (ii), or connectivity relationship between said objects within said third image from step (ii); and
producing, on the output device, a fourth image comprising at least one classified delineated nuclear material objects, or classified delineated cytoplasm material objects, or classified delineated stromal material objects;

(iv) segmenting at least one of said objects within said fourth image from step (iii) by applying a segmentation algorithm;
wherein said segmenting is based on a desired staining property of said stained biological tissue material or a desired spatial property of said stained biological tissue material or both;
said staining and spatial properties comprising at least one of contour, or color, or texture, or an anomaly compared to the rest of said image, or object location within said image, shape, or topological relationship between said objects within said fourth image from step (iii), or connectivity relationship between said objects within said fourth image from step (iii);

agglomerating one or more sets of said objects within said fourth image from step (iii) in order to delineate cells or extracellular objects from said biological tissue material; and producing, on an output device, a fifth image of said biological tissue material from agglomerated sets of said classified and segmented objects within said fourth image from step (iii);

wherein said fifth image comprises delineated cells or delineated extracellular objects or both;

(v) generating information on at least one of histology, or cytopathology, or histopathology based on at least one of said second image or an image produced in a subsequent step, and providing the information to the user, wherein said information is capable of providing information beyond just distinguishing cell nuclei as cancerous or non-cancerous; and (vi) outputting at least said generated information to an output device;

wherein said generated information is available to the user.

25. A non-transitory computer readable media containing programming executable on a computer processor in order to analyze an image of stained biological tissue material by performing steps as recited in claim 24, further comprising:
optional additional classifying and segmenting steps in order to produce a further image of said stained biological tissue material comprising delineated tissue.

26. A non-transitory computer readable media containing programming executable on a computer processor in order to analyze an image of stained biological tissue material by performing steps as recited in claim 24, further comprising:
extracting one or more parameters from said third image in order to classify at least one of said delineated nuclear material objects, said delineated cytoplasm material objects and said delineated stromal material objects.

27. A non-transitory computer readable media containing programming executable on a computer processor in order to analyze an image of stained biological tissue material by performing steps as recited in claim 24, further comprising:
extracting one or more parameters from said fifth image in order to classify at least one of said delineated cells and extracellular objects.

28. A non-transitory computer readable media containing programming executable on a computer processor in order to analyze an image of stained biological tissue material by performing steps as recited in claim 25, further comprising:
extracting one or more parameters from said further image in order to classify at least one of said delineated cells and extracellular objects.

29. A non-transitory computer readable media containing programming executable on a computer processor in order to analyze an image of stained biological tissue material by performing steps as recited in claim 28, further comprising:
receiving an image markup, wherein said image markup is created using a user interface configured to allow said user to markup an image subsequent to classifying in order to re-classify, any one or more of said pixels, said delineated nuclear material objects, said delineated cytoplasm material objects and said delineated stromal material objects, said delineated cells, said delineated extracellular objects and said delineated tissue.

30. A non-transitory computer readable media containing programming executable on a computer processor in order to analyze an image of stained biological tissue material by performing steps as recited in claim 29, further comprising:
inputting said image markup as training data; and
incorporating machine learning using said training data in order to develop classifiers, wherein any one or more of said developed classifiers are used in order to re-classify subsequent images.

31. A non-transitory computer readable media containing programming executable on a computer processor in order to analyze an image of stained biological tissue material by performing steps as recited in claim 24, further comprising:
receiving an image markup, wherein said image markup is created using an user interface configured to allow said user to markup an image subsequent to segmenting in order to re-segment any one or more of;
said classified pixels, said classified delineated nuclear material objects, said classified delineated nuclear material objects and said classified delineated cells and extracellular objects.

32. A non-transitory computer readable media containing programming executable on a computer processor in order to analyze an image of biological tissue material by performing steps as recited in claim 31, further comprising:
inputting said image markup as training data; and
incorporating machine learning using said training data in order to further develop at least one of said segmentation algorithms of steps ii and iv of claim 24, that is then used in order to re-segment subsequently produced images on said output device.

33. A non-transitory computer readable media containing programming executable on a computer processor in order to analyze an image of stained biological tissue material by performing steps as recited in claim 24, further comprising:
comparing the outputs of each further developed segmentation algorithm quantitatively using a segmentation metric; and
subsequently selecting an output based on said segmentation metric comparison.

34. A non-transitory computer readable media containing programming executable on a computer processor in order to analyze an image of stained biological tissue material by performing steps as recited in claim 33, wherein the segmentation metric is a function of:
a number of segmented regions; a size and shape of the region of pixels missed; a size and shape of excess pixels; a fraction of nuclei detected; and a number of extra segmented regions.

* * * * *